US008914471B2

(12) United States Patent
Pazos et al.

(10) Patent No.: US 8,914,471 B2
(45) Date of Patent: Dec. 16, 2014

(54) FILE DELIVERY OVER A BROADCAST NETWORK USING FILE SYSTEM ABSTRACTION, BROADCAST SCHEDULE MESSAGES AND SELECTIVE RECEPTION

(75) Inventors: Carlos M. D. Pazos, San Diego, CA (US); Rohit Sauhta, San Diego, CA (US); Qiang Gao, San Diego, CA (US); Mangesh K. Ghiware, San Diego, CA (US); Thadi M. Nagaraj, San Diego, CA (US); Dirceu G. Cavendish, San Diego, CA (US); Jalaj Swami, San Diego, CA (US); Ralph A. Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/004,702

(22) Filed: Jan. 11, 2011

(65) Prior Publication Data
US 2011/0295978 A1  Dec. 1, 2011

Related U.S. Application Data

(60) Provisional application No. 61/349,598, filed on May 28, 2010.

(51) Int. Cl.
*G06F 15/16* (2006.01)
*H04H 20/42* (2008.01)
(Continued)

(52) U.S. Cl.
CPC ........... *H04N 21/835* (2013.01); *H04H 20/426* (2013.01); *H04N 21/26266* (2013.01); *H04N 21/41407* (2013.01); *H04N 21/64315* (2013.01); *H04H 60/06* (2013.01)
USPC ........................................................ 709/219

(58) Field of Classification Search
USPC .......... 370/329, 348, 349, 389, 432; 455/418, 455/434, 508; 709/202, 220; 725/46, 62
See application file for complete search history.

(56) References Cited

U.S. PATENT DOCUMENTS 5,600,378 A  2/1997 Wasilewski
6,530,084 B1  3/2003 Del Sesto et al.
(Continued)

FOREIGN PATENT DOCUMENTS

CN  1382344 A  11/2002
CN  1655595 A  8/2005
(Continued)

OTHER PUBLICATIONS

Open Mobile Alliance (OMA), "Broadcast Distribution System Adaptation—3GPP2/BCMCS", V1.0, Feb. 12, 2009, pp. 63, http://www.openmobilealliance.org/Technical/release_program/docs/BCAST/V1_0-20090212-A/OMA-TS-BCAST_BCMCS_Adaptation-V1_0-20090212-A.pdf.*

(Continued)

*Primary Examiner* — Jeffrey M Rutkowski
*Assistant Examiner* — Peter Mak
(74) *Attorney, Agent, or Firm* — The Marbury Law Group, PLLC

(57) ABSTRACT

Methods, systems and devices provide mechanisms and systems for efficiently delivering files over a broadcast system to mobile devices. Files for broadcast may be logically identified as belonging to a directory in a file system. A Broadcast Schedule Message may inform receiver devices of files that will be broadcast at a specified time, as well as describe the files. File may be transmitted in file delivery pipes, which may be of different bandwidth and data rates. Receiver devices configured according to the embodiments may make use of the broadcast schedule message to select files to be received based on the service or application with which the file is associated, and whether the file is new or an update to a previously received file. Receiver devices activate receiver circuitry to capture the files within their advertised broadcast window, and pass the received files to applications or services requesting the files.

195 Claims, 78 Drawing Sheets

(51) Int. Cl.
*H04N 21/262* (2011.01)
*H04N 21/414* (2011.01)
*H04N 21/643* (2011.01)
*H04N 21/835* (2011.01)
*H04H 60/06* (2008.01)

(56) References Cited

U.S. PATENT DOCUMENTS

| | | |
|---|---|---|
| 6,629,284 B1 | 9/2003 | Leermakers |
| 6,714,264 B1 | 3/2004 | Kempisty |
| 6,751,401 B1 | 6/2004 | Arai et al. |
| 6,806,889 B1 | 10/2004 | Malaure et al. |
| 6,886,178 B1 | 4/2005 | Mao et al. |
| 7,257,583 B2 | 8/2007 | Hofmeister et al. |
| 7,596,797 B1 | 9/2009 | Kapner, III et al. |
| 7,634,787 B1 | 12/2009 | Gebhardt et al. |
| 7,852,372 B2 | 12/2010 | Sohmers |
| 7,890,988 B2 | 2/2011 | Urdang et al. |
| 8,117,564 B2 | 2/2012 | Woods et al. |
| 8,526,350 B2 | 9/2013 | Xue et al. |
| 8,676,991 B2 | 3/2014 | Gupta et al. |
| 2001/0016944 A1 | 8/2001 | Terakado et al. |
| 2001/0037507 A1 | 11/2001 | Mori |
| 2001/0054184 A1 | 12/2001 | Watanabe et al. |
| 2002/0059624 A1 | 5/2002 | Machida et al. |
| 2002/0092024 A1 | 7/2002 | Nagaoka et al. |
| 2002/0162117 A1 | 10/2002 | Pearson et al. |
| 2002/0184314 A1 | 12/2002 | Riise |
| 2002/0199187 A1 | 12/2002 | Gissin et al. |
| 2003/0039237 A1* | 2/2003 | Forslow ........................ 370/352 |
| 2003/0093530 A1 | 5/2003 | Syed |
| 2003/0133693 A1 | 7/2003 | Collins et al. |
| 2004/0215811 A1 | 10/2004 | Bar et al. |
| 2005/0015796 A1 | 1/2005 | Bruckner et al. |
| 2005/0015816 A1 | 1/2005 | Christofalo et al. |
| 2005/0251848 A1 | 11/2005 | Al-Janabi |
| 2006/0019618 A1 | 1/2006 | Seppala |
| 2006/0026231 A1 | 2/2006 | Degenhardt et al. |
| 2006/0168624 A1 | 7/2006 | Carney et al. |
| 2007/0124789 A1 | 5/2007 | Sachson et al. |
| 2007/0220564 A1 | 9/2007 | Yano et al. |
| 2007/0256015 A1 | 11/2007 | Matz |
| 2008/0010342 A1 | 1/2008 | Gebhardt et al. |
| 2008/0086742 A1 | 4/2008 | Aldrey et al. |
| 2008/0216113 A1 | 9/2008 | Yun et al. |
| 2008/0305737 A1 | 12/2008 | Childress et al. |
| 2009/0138934 A1 | 5/2009 | Aoki et al. |
| 2009/0217318 A1 | 8/2009 | VerSteeg et al. |
| 2009/0276819 A1 | 11/2009 | Kim et al. |
| 2009/0300143 A1 | 12/2009 | Musa et al. |
| 2009/0300683 A1* | 12/2009 | Rynkowski ..................... 725/58 |
| 2010/0058423 A1 | 3/2010 | Yaussy et al. |
| 2010/0095323 A1 | 4/2010 | Williamson et al. |
| 2010/0172625 A1 | 7/2010 | Lee et al. |
| 2010/0262619 A1 | 10/2010 | Zargahi et al. |
| 2011/0138417 A1 | 6/2011 | Klappert |
| 2011/0177774 A1 | 7/2011 | Gupta et al. |
| 2011/0177775 A1 | 7/2011 | Gupta et al. |
| 2011/0202947 A1 | 8/2011 | Gupta et al. |
| 2011/0202966 A1 | 8/2011 | Gupta et al. |
| 2011/0209181 A1 | 8/2011 | Gupta et al. |
| 2012/0304215 A1 | 11/2012 | McCarthy et al. |

FOREIGN PATENT DOCUMENTS

| | | |
|---|---|---|
| CN | 101212266 A | 7/2008 |
| EP | 0957597 A2 | 11/1999 |
| EP | 1152605 A1 | 11/2001 |
| EP | 1622278 A2 | 2/2006 |
| EP | 1881667 A1 | 1/2008 |
| EP | 1940057 A2 | 7/2008 |
| EP | 2007044 A1 | 12/2008 |
| GB | 2423659 A | 8/2006 |
| JP | H11168667 A | 6/1999 |
| JP | 2000031921 | 1/2000 |
| JP | 2000209563 A | 7/2000 |
| JP | 2002051020 A | 2/2002 |
| JP | 2003111054 A | 4/2003 |
| JP | 2003223387 A | 8/2003 |
| JP | 2003264817 A | 9/2003 |
| JP | 2004241941 A | 8/2004 |
| JP | 2005130085 A | 5/2005 |
| JP | 2005176107 A | 6/2005 |
| JP | 2006115213 A | 4/2006 |
| JP | 2006303938 A | 11/2006 |
| JP | 2006527556 A | 11/2006 |
| JP | 2008544584 A | 12/2008 |
| JP | 2009504070 A | 1/2009 |
| JP | 2009278332 A | 11/2009 |
| WO | WO0133852 A1 | 5/2001 |
| WO | WO03107656 A1 | 12/2003 |
| WO | 204112394 A1 | 12/2004 |
| WO | WO2005104558 A1 | 11/2005 |
| WO | WO2006075148 A2 | 7/2006 |
| WO | 2006086656 A2 | 8/2006 |
| WO | 2007018377 A1 | 2/2007 |
| WO | 2007052736 A1 | 5/2007 |
| WO | 2007109647 A2 | 9/2007 |
| WO | WO2008053568 A1 | 5/2008 |
| WO | 2008147367 A1 | 12/2008 |
| WO | 2009054478 A1 | 4/2009 |
| WO | 2009138041 A1 | 11/2009 |

OTHER PUBLICATIONS

Open Mobile Alliance (OMA), "Architecture of the Mobile Broadcast Services", V1.0, Feb. 12, 2009, pp. 109, http://www.openmobilealliance.org/Technical/release_program/docs/BCAST/V1_0-20090212-A/OMA-AD-BCAST-V1_0-20090212-A.pdf.*
Open Mobile Alliance (OMA), "Service Guide for Mobile Broadcast Services", V1.0, Feb. 12, 2009, p. 232 http://www.openmobilealliance.org/Technical/release_program/docs/BCAST/V1_0-20090212-A/OMA-TS-BCAST_Service_Guide-V1_0-20090212-A.pdf.*
"Introduction to Service Provider Video Service Technologies, Architectures, and Standards," 2006, Cisco Systems, Inc.
Hu, Jian-Hao, et al. "A Novel Push-and Pull Hybrid Data Broadcast Scheme for Wireless Information Networks." IEEE 2000, pp. 1778-1782, ISBN: 0-7803-6283-7.
Crinon R et al: "Data Broadcasting and Interactive Television", Proceedings of the IEEE, New York, US, vol. 94, No. 1, Jan. 1, 2006, pp. 102-118, XP002502467.
International Search Report and Written Opinion—PCT/US2011/038434, International Search Authority—European Patent Office—Aug. 17, 2011.
Leroux, P. et al: "Synchronized Interactive Services for Mobile Devices over IPDC/DVB-H and UMTS", Broadband Convergence Networks, 2007. BCN '07. 2nd IEEE/IFIP International Workshop on, IEEE, PI, May 1, 2007, pp. 1-12, XP031178259.
Paila, T et al: "FLUTE—File Delivery over Unidirectional Transport; draft-ietf-rmt-flute-revised-11.txt", Internet Engineering Task Force, IETF; Standardworkingdraft, Internet Society (ISOC) 4, Rue Des Falaises CH-1205 Geneva, Switzerland, No. 11, Mar. 2010, pp. 1-42, XP015067217.
"Arib STD-B24 5.1 Edition (Third Separate Volume)", Mar. 2007, Association of Radio Industries and Businesses, pp. 1, 2, 11, 15-43, 64 and 65.
Fukahori K, et al., "Advanced Satellite Communication Platform Based on Japanese BS Digital Broadcasting Standard," NTT R&D, vol. 51, No. 4 (Apr. 2002 Issue), The Telecommunications Association, Apr. 10, 2002, pp. 291-298, ISSN: 0915-2326.
"Interface Extra Edition—Introduction to Digital Broadcasting Basic Technology," Jan. 1, 2002, CQ Publishing Co., Ltd., pp. 134-158.
Mori T., et al., "End-to-End System Architecture for BS Digital Data Broadcasting Service," Matsushita Technical Journal, vol. 46, No. 6, (Dec. 2000 Issue), Matsushita Electric Industrial Co., Ltd., Dec. 18, 2000, pp. 9-18, ISSN: 1343-9529.
"Nikkei New Media Additional volume New Business Unabridged Book for Era of Convergence of Broadcasting and Telecommunications," 1st edition, Jun. 25, 2007, Nikkei Business Publications, Inc., pp. 137-144, ISBN: 978-4-8222-2517-9.

* cited by examiner

| EID | Name | Storage | Ref | Attr |
|---|---|---|---|---|
| 2009 | /nbc/f2.mp3 | C:\fdroot\nbc\f2.mp4 | 1 | |
| 1988 | cnn/f1.mp4<br>cnnhl/f1.mp4 | D:\fdroot\cnn\f1.mp4 | 2 | |

MET: Managed Element Table

| EID | FB | Selection Strings | File Names | Storage Paths | Sub-Entry |
|---|---|---|---|---|---|
| 1988 | 1 | /itv/cnn/e1/ | /itv/cnn/e1/f1 2001<br>/itv/cnn/e1/f2 2002 | D:\fdroot\itv\cnn\e1\f1<br>D:\fdroot\itv\cnn\e1\f2 | ... |

FIG. 57

FILE DELIVERY OVER A BROADCAST NETWORK USING FILE SYSTEM ABSTRACTION, BROADCAST SCHEDULE MESSAGES AND SELECTIVE RECEPTION

RELATED APPLICATIONS

This application claims the benefit of priority to U.S. Provisional Application No. 61/349,598, entitled "File Delivery Over A Broadcast Network Using File System Abstraction, Broadcast Schedule Messages And Selective Reception" filed May 28, 2010, the entire contents of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. A recent addition to wireless communication services has been the ability to broadcast television and other content to receiver devices. Mobile forward-link-only broadcast services allow users to view multimedia programming, such as television shows, as well as receive mobile editions of news, entertainment, sports, business, and other broadcast programming, using mobile receiver devices configured to receive the mobile broadcast transmissions. The growth of multimedia broadcast services represents an attractive communication platform for delivering a wide variety of content and interacting with users.

SUMMARY

The various embodiments provide systems, devices, and methods for utilizing a broadcast and/or multicast based File Delivery Framework (FDF) to deliver files to applications running on receiver devices. Specifically, the various embodiments provide mechanisms and systems for efficiently delivering files over a broadcast system to receiver devices using the FDF service of a broadcast and/or multicast network. Files and datagram packets for broadcast and/or reception may be advertised in advance by the broadcast network by broadcasting a Broadcast Schedule Message (BSM). BSMs may be transmitted in advance to inform receiver devices of the files and datagram packets that will be broadcast at a specified time in the future. The various embodiments utilize the built in redundancy, error correction and reliability mechanisms provided by the FDF service to deliver files in a more timely, coherent and effective manner.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 24 is a process flow diagram of an embodiment method for selectively receiving only the elements that the applications are interested in.

FIG. 57 is a message flow diagram illustrating an example file bundle entry in a managed element table (MET).

DETAILED DESCRIPTION

Figure 1:
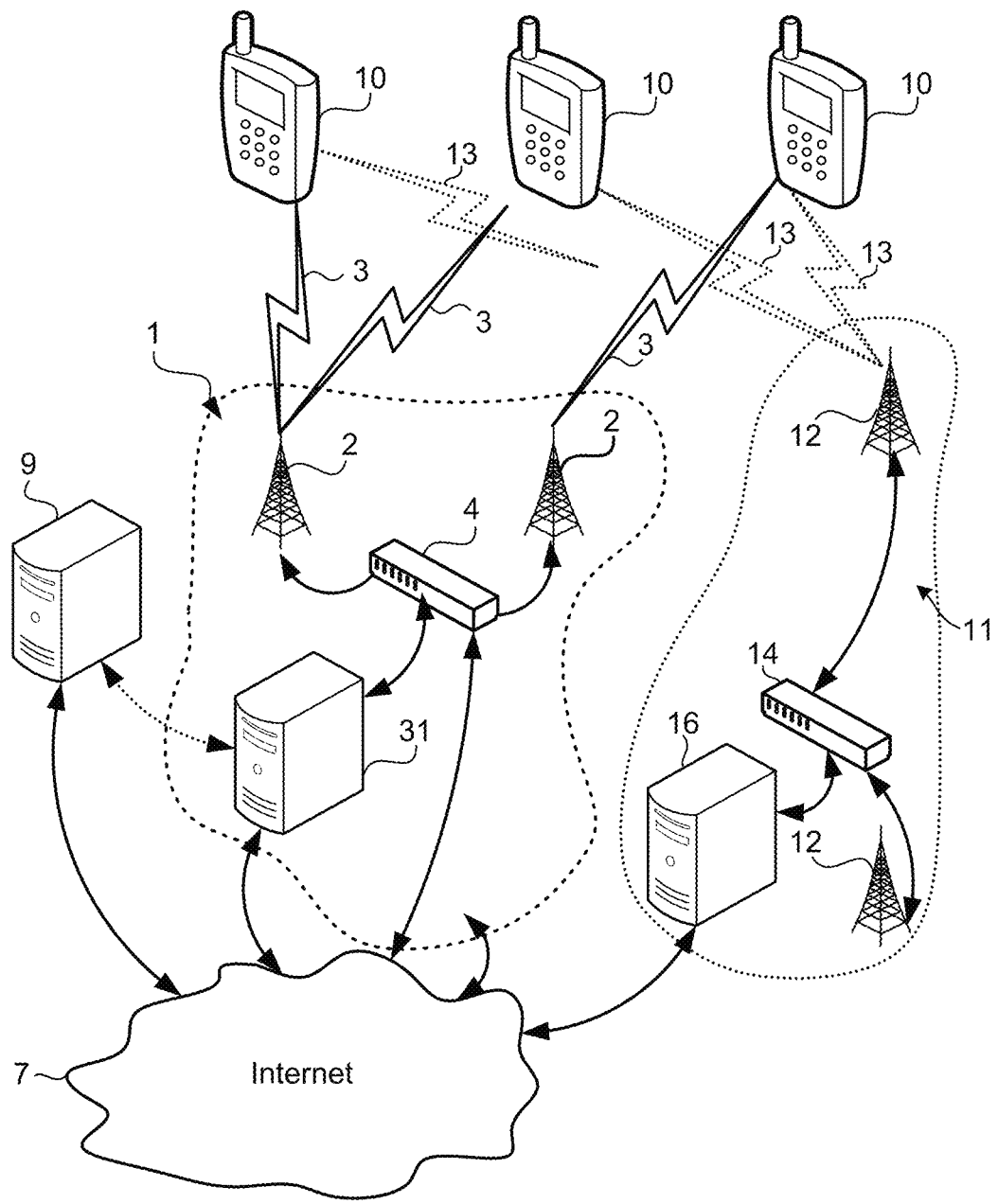
FIG. 1 is a communication system block diagram illustrating a mobile multimedia broadcast communication system and cellular "unicast" communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of mobile media broadcast receivers, cellular telephones, personal television devices, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles) and similar personal electronic devices which include a programmable processor and memory and/or forward-link-only mobile TV broadcast receiver circuitry for receiving and processing mobile TV broadcast transmissions, such as MediaFLO® FLO TV® broadcasts. However, the terms "mobile device" and "receiver device" should not be limited to the enumerated list of receivers and may include any device capable of receiving any of the mobile broadcast television services and/or implementing any of broadcast standards described below.

The words "broadcast" and "multicast" are used interchangeably herein to mean the transmission of data (information packets) so that it can be received by a large number of receiving devices simultaneously. Examples of a broadcast message are mobile television service broadcast signals, including content broadcasts (content flow) and overhead information broadcasts (overhead flow) such as metadata messages.

As used herein the term "file" refers to any of a wide variety of data structures, assemblages of data and database files which may be stored on a computing device.

The following terms and abbreviations are used herein and in the drawings: Broadcast Schedule Message (BSM); Broadcast Schedule Records (BSR); Broadcast Schedule Period (BSP); Broadcast Schedule Flow (BSF); Broadcast Schedule Monitoring Record (BSMR); Conditional Access Solutions (CAS); Constant Or Variable Bit Rate (CBR/VBR); Directory Information Message (DIM); DIST (a distribution component that transmits files and overhead messages at configured rate); File Delivery Framework (FDF); File Delivery Pipe (FDP); File Ingestion System (FIS); Flow Broadcast Schedule Record (FBSR); Forward Error Correcting (FEC) codes; FLO Serving Nodes or FSN (components involved in the actual OTA transmission, which may be a transport network specific FSN for FLO, or a BSN in general for other broadcast technologies, that provides adaptations to specific transport technologies); Initial Acquisition Flow (IAF); IP Data Services (IPDS); Local Multiplex (LM); Local Operating Infrastructure (LOI); Quality of Service (QoS); Overhead Scheduling Server or OSS (a component that manages and advertises overhead messages, metadata and/or version changes); Radio Frequency (RF); Real Time (RT); Type-Value-Length (TLV); Video-On-Demand (VOD) Application (vodApp); and Wide Multiplex (WM).

A number of different mobile broadcast television services and broadcast standards are available or contemplated in the future, all of which may implement and benefit from the various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves a broadcast communication channel. For ease of reference, the various embodiments are described with reference to the MediaFLO® system, which is implemented in the FLO TV® broadcast systems. However, references to MediaFLO® terminology and technical details are for illustrative purposes only and are not intended to limit the scope of the claims to a particular FLO communication system or technology unless specifically recited in the claim language.

The various embodiments provide mechanisms and systems for efficiently delivering files over a broadcast system to mobile devices. Files for broadcast and reception may be logically identified as belonging to a directory in a file system. In order to make a battery-efficient use of this file system abstraction for the broadcast of files to receiver devices the broadcast system may use a mechanism for conveying information about the files available for download, and the times at which these files are to be broadcast. In various embodiments, this may be accomplished by broadcasting broadcast schedule messages (BSMs) prior to, or along with, broadcasting of the files.

In general, BSMs inform receiver devices of files that will be broadcast in the future, as well as the specific time frame in which receiver devices can expect the files to be broadcast. Each BSM may include file content and broadcast schedule information such as: the association of files being broadcast with various services or applications (e.g., a service ID or a file name on an application specific directory); identification of whether a file being broadcast is a new, updated or repeated file (e.g., a file ID/Element ID or version number); the broadcast transport stream where the file can be received (e.g., a flow ID, an IP flow identified by an IP address and UDP port number); the time at which the file will be broadcast (e.g., a delivery window); and when the delivery schedule information (e.g., the BSM) may be updated with new information.

The BSM may be carried as part of an overhead transport stream (e.g., as defined by a flow ID, an IP address and UDP port number, etc.) that provides the delivery schedule information for files broadcast on a given frequency (e.g., channel 55), on a portion of the transmit spectrum in that frequency (e.g., a MediaFLO® local vs. wide multiplex), and/or for a transport technology (e.g., MediaFLO® or ATSC). The availability of these overhead flows, the channel, flow or frequency used for such transmissions, the portion of the signal or superframes where the BSMs are broadcast, and the transport technology used for transmitting BSMs may be discovered via a bootstrap overhead flow (e.g., the IAF in MediaFLO® transmissions).

A receiver device configured according to the embodiments may make use of a BSM message to select a file from the different file broadcasts being advertised. The receiver device may use the BSM to receive a particular file based on the service or application to which the file is associated, whether the file is new or a retransmission or an update to a previously received file, or a variety of other factors. In various embodiments, BSMs may support description of aliasing of application/service IDs and/or transporting bundles of files. In various embodiments, each BSM may only advertise a portion of the broadcast schedule information at a time. This provides a trade-off between content freshness and amount of battery power that receiver devices must expend to remain up to date with the latest version of the BSM.

The various embodiments may include a file ingestion system (FIS) within or in communication with the broadcast network which may provide an interface that content providers can use to notify the broadcast system of new files to broadcast. Content providers may use the file ingestion system to specify the broadcast transport requirements for files, such as the timeliness requirements (e.g., latency tolerance) and transmission robustness requirements (e.g., level of forward error correction or number of retransmissions) of each file. The file ingestion system may use the transport requirements specified by content providers at the time of new file ingestion, and attempt to pack a new file into the broadcast transmission stream along with the files that have already been accepted and scheduled for transmission. In various embodiments, file ingestion may be considered to have failed when the packing of new files into the broadcast transmission stream is not successful (i.e., a new file could not be fit within the transmission stream along with the files already scheduled for transmission). In various embodiments, the file ingestion system may consider priority across files such that new file ingestion will succeed at the expense of suppressing transmission of previously ingested files when packing is not initially successful.

Once a new file has been processed by the file ingestion system, the file ingestion system may generate a BSM that advertises only a fraction of the successfully scheduled files over a Broadcast Schedule Period (BSP). Receiver devices may use the information in the BSM to plan their reception of file broadcasts. Thus, when receiver devices determine that a file of interest to an application on the device will be broadcast, the receiver device can schedule activation of the receiver circuitry for the advertised broadcast schedule period. By advertising only a fraction of the successfully scheduled files, new file ingestions may be accommodated by inserting the new files into the broadcast schedule following the period of time covered by the last broadcast BSM, and broadcasting a new BSM with the revised schedule. In various embodiments, the broadcast system may control updates to the BSM and the transmission of files based on the existing schedule information.

As discussed above, at any given time, BSMs may advertise only a portion of the broadcast schedule information. This provides a trade-off between content freshness and scheduling flexibility on the one hand, and power consumption by receiver devices on the other. Content freshness may be maximized by limiting the amount of broadcast schedule information in each BSM. This enables greater file transmission scheduling flexibility, as a larger portion of the broadcast schedule (i.e., the portion that has not been announced in a BSM) can be adjusted to insert newly ingested files. By allowing BSMs to change frequently, broadcasters may broadcast files with shorter notice and accommodate changes in file delivery priorities and schedules. However, changing the BSM frequently requires that the receiver devices power up more often to receive the new BSMs. Each power up consumes an additional amount of the receiver device's battery power. Therefore, frequent updates to the BSMs may result in receiver devices consuming more battery power. Thus, power consumption by receiver devices may be minimized by maximizing the amount of broadcast schedule addressed in each BSM. Therefore, broadcasters may strike a balance in the frequency of updates to the BSMs between scheduling flexibility and device power consumption in order to enhance the user experience.

The file ingestion system may also support ingestion of attributes associated with files. The file ingestion system may format the file attributes so they may be carried via an overhead message (e.g., a BSM). In various embodiments, receiver devices may use these file attributes to select files for reception and download. In various embodiments, receiver devices may use filtering criteria to select files based on their file attributes.

In various embodiments, the file ingestion system may support ingesting more than one file at a time. In these embodiments, the file ingestion system may bundle two or more files together for transmission as a single file, or for transmission as a smaller set of larger files. If the files cannot be bundled together, the file ingestion system may schedule each file for transmission independently. Bundling files together allows for the more efficient application of the forward error correction (FEC) protection and improves the integrity of the data contained within the transmitted files.

In various embodiments, broadcast resources (e.g., bandwidth or segments of the broadcast signal) may be organized into file delivery "pipes" as a traffic engineering tool to improve the system's overall efficiency and resource reservation goals (e.g., a pipe for small files and a pipe for large files). File delivery pipes capture the resource allocation for file transport and support multiplexing a number of different files onto one or more transmission steams. Organizing the broadcast resources into file delivery pipes may improve efficiency by allowing for a centralized scheduling of files that time division multiplexes files over the aggregate allocated resources. Therefore, the manner in which resources are organized should be efficient and address the different requirements associated with different file delivery applications. In the various embodiments, resources may be organized into multiple file delivery pipes, and the file ingestion system may be informed of the various file delivery pipes defined in the broadcast system. So informed, the file ingestion system may schedule files for broadcast across the transmission resources in a manner that addresses the application-specific delivery requirements specified for each file and according to traffic engineering goal that may have driven the set up of different pipes (e.g., a pipe for small files and a pipe for large files to avoid head-of-line blocking of small files during large file transfers).

The various embodiments support implementing a variety of strategies for defining file delivery pipes and scheduling files for transmission across the different pipes. For example, in various embodiments, classes of applications may be mapped to specific pipes, e.g., small files with low latency requirements may be broadcast on dedicated pipes. In various embodiments, the file ingestion system may split the transmission of large files into disjoint broadcast windows to allow short file transmissions. In various embodiments, the file ingestion system may schedule multiple concurrent file transmissions on the same pipe via different flows.

In various embodiments, a broadcast-side application or service may submit a large number of files to the file ingestion system for assembly into one or more files that are suitable for transport. The corresponding receiver-side application or service may only be compatible with, or interested in, a small sub-set of the files being broadcast. In this case, the broadcast-side application or service may supply applicability metadata to the file delivery service to enable the system to construct a BSM or similar overhead file (e.g., a catalog file) that includes identifying metadata that may be used by the receiver-side application or service. For example, a BSM overhead file may list all of the files that will be broadcast within a broadcast period, along with identification or applicability information for the files that are to be broadcast. Such identifying metadata may include application-specific attributes, such as the name or identifier of applications or services which can or should receive the files. On the receiver device, the BSM overhead file may be received by the receiver device and used by the corresponding receiver-side application to select files for reception. In various embodiments, receiver-side applications may make this selection based on a variety of application-specific logic and available attributes, and by using the identification or applicability information contained in the BSM overhead file.

In various embodiments, a receiver-side application may request reception of selected files described in the BSM from the file delivery service by indicating to a file delivery service module on the receiver device the desired application or service file names, or the identifiers for the desired files. The file delivery service module on the receiver device may determine from the BSM when and on which channel/flow/broadcast resource the indicated files containing the desired files are to be broadcast. A processor in the receiver device may use this information to "wake-up" the receiver circuitry only when the broadcast is likely to contain files requested by, or files compatible with, receiver-side applications. The information in the BSM may also enable a processor on the receiver device to pinpoint the exact time frame within which the receiver needs to be on and listening for data. By pinpointing the exact time frame within which the receiver needs to be on, the receiver device may conserve significant battery power, while making processing resources available for other tasks.

In various embodiments, a broadcast-side application using the file delivery service (e.g., an FDF service) may provide the application-specific attributes associated with the files at the time the files are submitted to the file ingestion system for transport. Such application-specific attributes may be transported to receiver devices via the BSM. Receiver-side applications may request a file capture from the file delivery service module of the receiver device by indicating a regular or a logical expression within the applications-specific parameters that characterizes the file of interest. By using regular or logical expressions to characterize files of interest, the receiver device may use the application-specific parameters as filtering criteria for selecting files for reception. The file delivery service module of the receiver device may use such filtering criteria to receive only a subset of the files being broadcast by identifying from the BSM the characteristics (day/time, flow ID, etc.) of the desired files.

The various embodiments may be implemented within a variety of mobile multi-media broadcast systems, an example of which is illustrated in FIG. 1. A mobile multimedia broadcast network 1, such as a MediaFLO® broadcast network, typically includes a plurality of broadcast transmitters 2 controlled by a mobile broadcast network control center which is referred to herein as a broadcast operation center 4 (or "BOC" in the figures). The broadcast network 1 broadcasts content from the broadcast transmitters 2 as mobile broadcast transmissions 3 for reception by receiver devices 10, such as mobile television receivers, smartphones, cellular phones, personal digital assistants (PDA), interactive game devices, notebooks, smartbooks, netbooks, data processing apparatus, or other such electronic devices. Within the mobile broadcast network control center 4 (also called the broadcast operation center or "BOC") will typically be one or more servers and systems for managing real time content broadcasts, generation of electronic service guides, catalog messages and BSMs regarding the content broadcasts, and generation of metadata messages for broadcast via the overhead flow of the multimedia broadcast network 1.

In addition to the normal content delivery system, the mobile broadcast network 1 may also include a file ingestion system server (FIS) 31 for receiving, storing, scheduling and formatting files for broadcast via the mobile broadcast network 1. The file ingestion system server 31 may receive files for broadcast from a file content provider 9, either via a direct network connection or an indirect network connection, such as the Internet 7.

In addition to the mobile multimedia broadcast network 1, receiver devices 10 will typically also be configured to communicate via a unicast network 11, such as a cellular telephone network. A typical cellular telephone network includes a plurality of cellular base stations 12 coupled to a network operations center 14, which operates to connect voice and data calls between mobile devices 10 and other network destinations, such as via telephone land lines (e.g., a POTS network, not shown) and the Internet 7. Communications between receiver devices 10 and the unicast network 11 are accomplished via two-way wireless communication links 13, such as 4G, 3G, CDMA, TDMA, and other cellular telephone communication technologies. To facilitate Internet data communications, the unicast network 11 will typically include one or more servers 16 coupled to or within the network operations center 14 that provide a connection to the Internet 7. In a further embodiment, the unicast network 11 may be a wireless wide area network such as WiFi, WiMAX, etc. Receiver devices 10 may communicate with the broadcast network 1 via the unicast network 11, such as via an IP data call to a broadcast network server 6 by way of the Internet 7, for purposes of subscribing to broadcast services and transmitting user interaction messages to the broadcaster.

Figure 2:
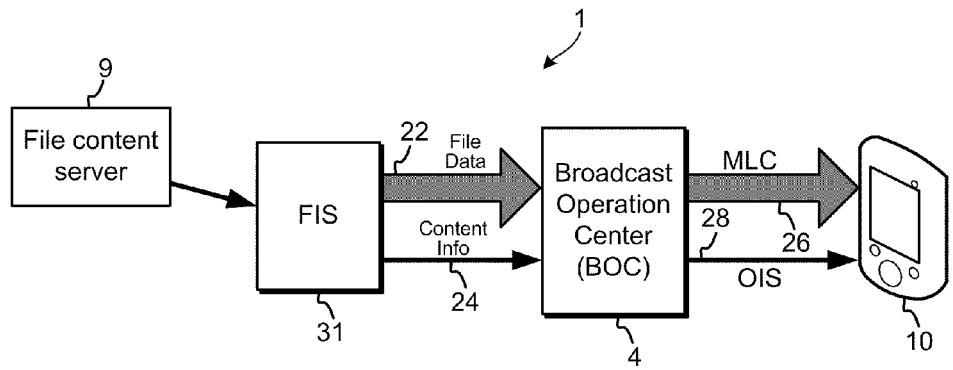
FIG. 2 is an alternative representation of a broadcast communication system block diagram of a forward link only broadcast system.

FIG. 2 illustrates information flows within a portion of a broadcast network 1 (e.g., a MediaFLO® broadcast network) according to an embodiment. File content providers 9 may provide files for transmission via the broadcast file delivery service to the file ingestion server 31. The file ingestion server 31 may schedule and store the files for broadcast as described more fully below. At the schedule broadcast time, the file ingestion server 31 may provide the scheduled files to the broadcast operation center 4 (BOC), where the broadcast signal is generated as a multiplex of information that includes content flows 26 and overhead flows 28. Thus, files for transmission via the file delivery service may be transmitted as part of the content flows 26 while the BSM is transmitted as part of one or more overhead flows 28. Receiver devices 10 receive the multiplex signal and are able to separately receive the overhead flow 28 including the BSM and other overhead information streams (e.g., a control channel) and use the information in the BSM to receive particular files from the content flow 26.

In a typical multimedia mobile broadcast system, information is transmitted in wireless signals organized into a plurality of superframes. Each superframe comprises a plurality of signals organized in terms of frequencies within a frequency band and time within set time boundaries (e.g., superframe boundaries) that encode a plurality of data packets which communicate the broadcast content and overhead information. For example, in the MediaFLO® broadcast system, broadcast transmissions are organized into one-second superframes spanning a 6 MHz frequency band (for example 716 MHz to 722 MHz). MediaFLO® broadcast signals may be sent on other frequency bands and multiple signals may be sent simultaneously by using multiple distinct frequency bands. Each superframe may include a portion dedicated to the overhead flow and a portion that carries multiple channels associated with content flows. As mentioned above, information within the overhead flow and other overhead streams (e.g., a control channel) informs receiver devices of where within the superframe that particular content flow can be obtained, as well as how many packets are associated with the streams of that content flow.

Figure 3:
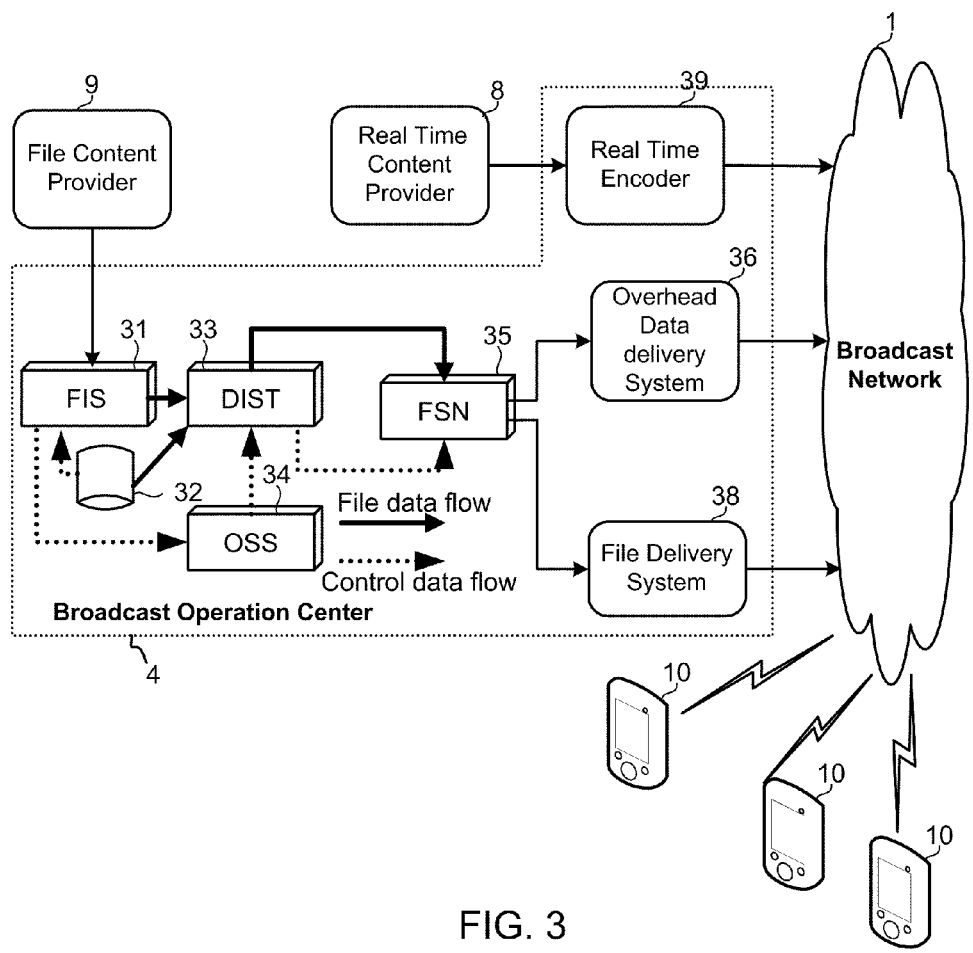
FIG. 3 is a system block diagram of elements of a broadcast communication system illustrating functional blocks involved in delivering files via the broadcast network according to an embodiment.

FIG. 3 illustrates system functional components on the broadcaster side of a broadcast communication system suitable for implementing the various embodiments for delivering files via a file delivery service. Real time content provider servers 8 may send real time content (e.g., audio, video, text, etc.) to a real-time encoder 39 within the broadcast operation center 4. The file content providers 9 may provide files for delivery via the file delivery service to a file ingestion server 31. The file ingestion server 31 may store the received files in a local database 32 and schedule received files for broadcast. Information regarding scheduled broadcast time, as well as file attribute data, may be provided to an overhead signaling server (OSS) 34, which is a component that manages and advertises overhead version changes in the BSM. As described more fully below, the ingestion and scheduling of transmission of files by the file ingestion server 31 may be dynamic such that frequent changes to the scheduled broadcast times may be communicated to the overhead signaling server 34.

The overhead signaling server 34 may provide an updated BSM to a distribution server 33, which is a component that transmits files and overhead messages at a configured rate. The distribution server 33 may provide the BSM for transmission to a forward link only (FLO) service node (FSN) 35, which directs the BSM to an overhead data delivery system 36 for transmission via the broadcast network 1. Near the scheduled time for transmitting files, the file ingestion server 31, along with the local database 32, may provide the files for transmission to the distribution server 33. The distribution server 33 may provide those files to the FLO service node 35, along with control data specifying when each file is to be broadcast. The FLO service node 35 may deliver files for transmission to the file delivery system 38, which transmits the files via the broadcast network 1. Mobile devices 10 may then receive the files from the broadcast network 1 via wireless data transmissions.

While FIG. 3 illustrates the components of the file delivery system as separate units or servers, one of skill in the art would appreciate that some or all of the different functional processes may be implemented within a single server or fewer servers than illustrated in FIG. 3. For example, the overhead service server 34, distribution server 33 and flow service node 35 may be implemented within a single server device along with the file ingestion system 31, with each of the these functions accomplished by different software modules or an integrated software system.

Figure 4:
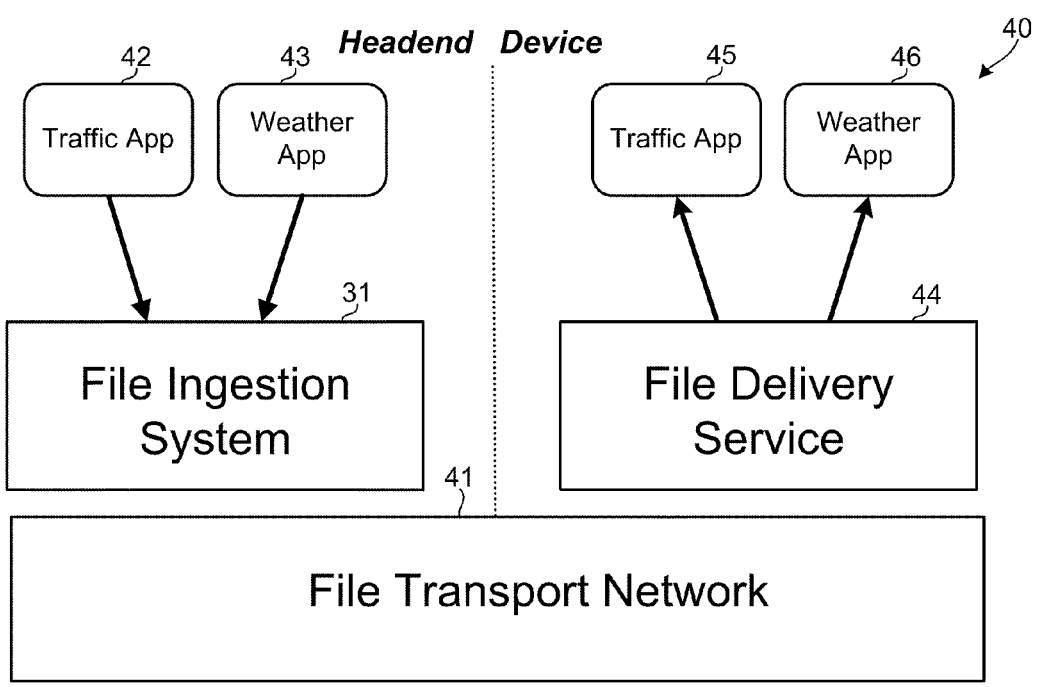
FIG. 4 is an overview system block diagram illustrating major functional components of the various embodiments.

As an illustration of various embodiments, FIG. 4 shows top-level components involved in the MediaFLO File Delivery Framework (FDF) 40. The file delivery framework 40 may provide support for different file delivery applications concurrently. The delivery of files in the form of logical concepts involves embodiment methods used for the manipulation and management of files as they are received from content providers, transmitted via the broadcast system, and received by receiver devices. At a high-level, the broadcast file delivery system 40 comprises a headend, which is the broadcast side of the communication system, and a receiver device, which selectively receives and stores transmitted files.

In the headend, applications providing files for transmission, referred to herein as "headend apps" 42, 43, define files for delivery. Within a server in the headend, the file ingestion system 31 may receive files for transport from file content providers or headend apps 42, 43, and schedule the files for delivery in the broadcast schedule. The file ingestion system 31 may also store successfully scheduled files in memory for later transport over the file transport network 41. Files provided by the headend apps 42, 43, may be packaged into one or more transport files to be ingested via a file ingestion system 31 and delivered to the receiver devices via a file transport network 41.

On the receiver device, such as a MediaFLO® receiver device, device applications 45, 46 may characterize or identify the files that are to be received, and request those files from a file delivery service module 44. The file delivery service module 44 may be implemented in the receiver device as software configured to provide file capture services for device applications 45, 46. The file delivery service module 44 may, in response to the request for files, use delivery and scheduling information to capture the requested flows, and store them in memory. The file delivery service module 44 may manage the reception, storage and maintenance of files.

In assembling files to be transmitted, the file ingestion system 31 may create transport files using a file system analogy, where a file path name in an application-specific directory structure uniquely identifies a file for a set of applications. As described above, within a server in the headend of the broadcast system the file ingestion system 31 may be provided to receive files for transport, schedule the files for delivery opportunities in the broadcast schedule, and store successfully scheduled files in memory for later transport over the file transport network 41 of the broadcast network. The file ingestion system 31 may specify additional attributes regarding the files, such as a filename, parameters descriptive of the file (e.g., genre, file type, etc.), parameters descriptive of the file contents (e.g., source and location of individual datagram packets, identity, application or file types of the datagram packets included in the file, etc.), and other information associated with the content of files for transport. The file ingestion system 31 may also specify parameters describing each file's broadcast delivery requirements. In various embodiments, the file ingestion system 31 may assign a unique identifier to files (e.g., a fileID) which can be used for versioning purposes and for bundling submitted files into combined packages for efficient application of forward error correction (FEC) codes. The file ingestion system 31 may also apply forward error correction codes to ingested files to improve their broadcast transport reliability.

In an embodiment, the file ingestion system 31 may schedule broadcast delivery opportunities for newly received files for transport. As part of this process, the file ingestion system 31 may determine a transmission schedule based on various parameters. For instance, in an embodiment, the file ingestion system 31 may create a transmission schedule as a function of the file sizes and available resources. In another embodiment, transmission schedules may also take into consideration a priority assigned to the files by the content providers. In various embodiments, the scheduling of the file broadcast times may be accomplished algorithmically to determine start times for transmission, such that the broadcast delivery requirements for the newly received files and the previously ingested files are met. The file ingestion system 31 may store successfully scheduled files for later transport over the file transport network 41. The file ingestion system 31 may, at the appropriate time, dispatch scheduled files to the broadcast network according to the file schedule information previously determined by the file ingestion system 31.

In scheduling files for transmission, the file ingestion system 31 may be aware of the transmission resources, such as file delivery pipes defined in the file transport network 41. Using the information regarding the availability of file delivery pipes, the file ingestion system 31 may schedule files across the various transmission resources so as to address the application-specific delivery requirements defined by the file content providers. In some embodiments, the file ingestion system 31 may be configured to use specific pipes for certain classes of applications. For instance, small files with low latency requirements may be broadcast on dedicated transmission pipes. Alternatively, the file ingestion system 31 may split transmissions of large files into disjoint broadcast windows to allow short file transmissions with reduced delay. The file ingestion system 31 may also schedule multiple concurrent transmissions of the same type via different transmission pipes.

In various embodiments, the file transport network 41 may be a MediaFLO® network or other broadcast network. In various embodiments, the file transport network 41 may be a combination of broadcast and unicast networks. When the transport network is a broadcast network, the file transmissions may be scheduled so that the broadcast channel can be effectively shared across all of the different files being transmitted. Additionally, if the broadcast channel can support multiple media streams at the same time, the transmission of data files may be associated with one of the multiple media streams.

As part of the file delivery framework 40, a series of BSMs may be broadcast in an overhead message flow that is available in the broadcast transport network. As discussed above, the BSMs may provide information that enables receiver devices to associate files being broadcast with a particular service or application. The BSMs may also include file ID/Element ID or version information on files being broadcast, information on the transport stream where the files can be received, information on when the file will be broadcast (e.g., a delivery window), and information on when the delivery schedule or BSM will be updated with new information.

As discussed above, files for broadcast and reception may be logically identified as belonging to a directory in a file system. In various embodiments, this file system abstraction allows files to be defined as belonging to an application-specific directory structure, in which the root (top most) directory identifies the application. For example, the file testFile belonging to the application testApp may be defined as "/testApp/testFile." In various embodiments, files may be further organized in subdirectories as a mechanism for describing semantic properties of the files. For example, files may be organized based on an association between the file's contents and a broadcast channel (e.g., CNN, ABC, etc.). Thus, files for a video-on-demand application (vodApp) may be organized as belonging to an application-specific directory, such as /vodApp/CNN/ or /vodApp/ABC/, etc.

As a further example of the file system abstraction, a weather application (weaApp) may organize files on weather updates on a per city basis, with subfolders identifying files associated with particular cities. For instance, a file name that includes the phrase "/weaApp/LA/" may include files on weather updates for Los Angeles, while a transport file name that includes the phrase "/weaApp/NY/" may include files on weather updates for New York. For example, the weaApp files may be named "weaApp/LA/f1.jpg" and "/weaApp/NY/f4.jpg" to enable the specific files to be identified and grouped by city.

This file system abstraction simplifies the definition and management of files that are transported through the broadcast file delivery service. The file system abstraction also simplifies the application development process because application developers do not need to concern themselves with the details of the broadcast transport system.

Figure 5:
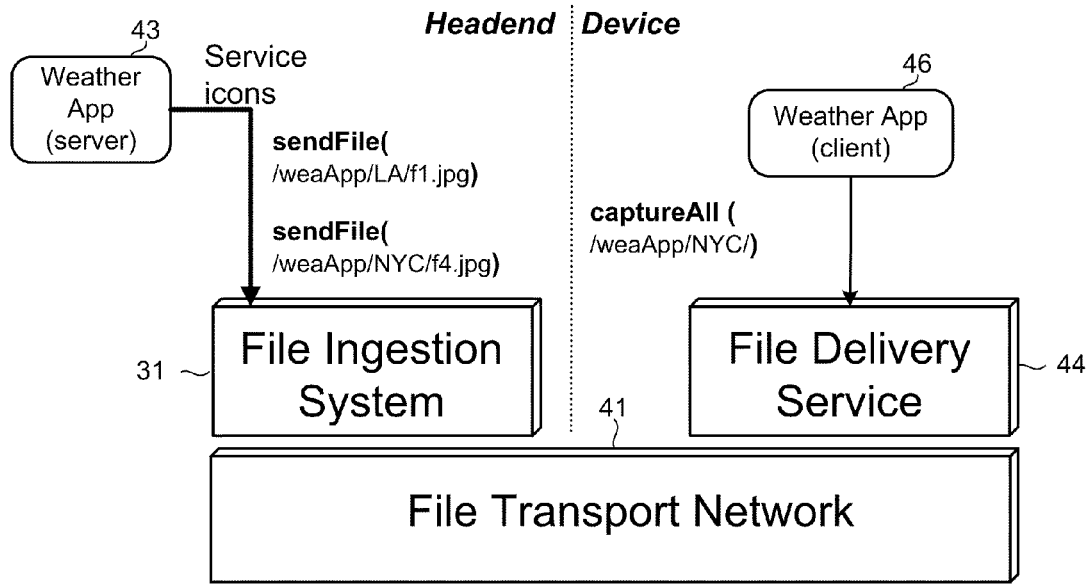
FIG. 5 is a system block diagram illustrating the ingestion and reception of files for a particular application (a weather application) according to an embodiment.

FIG. 5 illustrates an implementation of the file system abstraction. Specifically, FIG. 5 illustrates that file names that may be used in the transport of files for use by a weather application 44 via the file transport network 41. In the illustrated example, the sender-side weather application 43 may request that files be sent by issuing a send command with an appropriately named file. For example, the weather application 43 may use the command sendFile (/weaApp/LA/012510Update.jpg) to request that the LA weather files be sent. The file ingestion system 31 receives these files, and includes the file names within the BSM messages.

On the receiver device side, device applications functioning within a processor of the receiver device may request files by using the same filename structure that is used on the headend side. This is illustrated in FIG. 5, where it is shown that the client weather application 46 may register with the file delivery service 44 and request all relevant files be captured with a single command. For example, if the receiver device is located in the vicinity of New York City (such as may be determined based upon user preferences or a position determining capability like GPS), the device application 46 may request that all New York City relevant weather files be received by issuing a capture command and providing an appropriately named directory. In the illustrated example, the client weather application 46 may issue a "captureAll" command, providing "/weaApp/NYC/" as the requested directory name (the "/" may be used as a convention to differentiate directory names from file names). Thus, in the illustrated example, the client application 46 only needs to issue a "captureAll (/weaApp/NYC/)" command to receive all the relevant New York City weather files from the headend application 42. This method of requesting and sending files by using a file system abstraction greatly simplifies the file transmission and application development processes.

Figure 6:
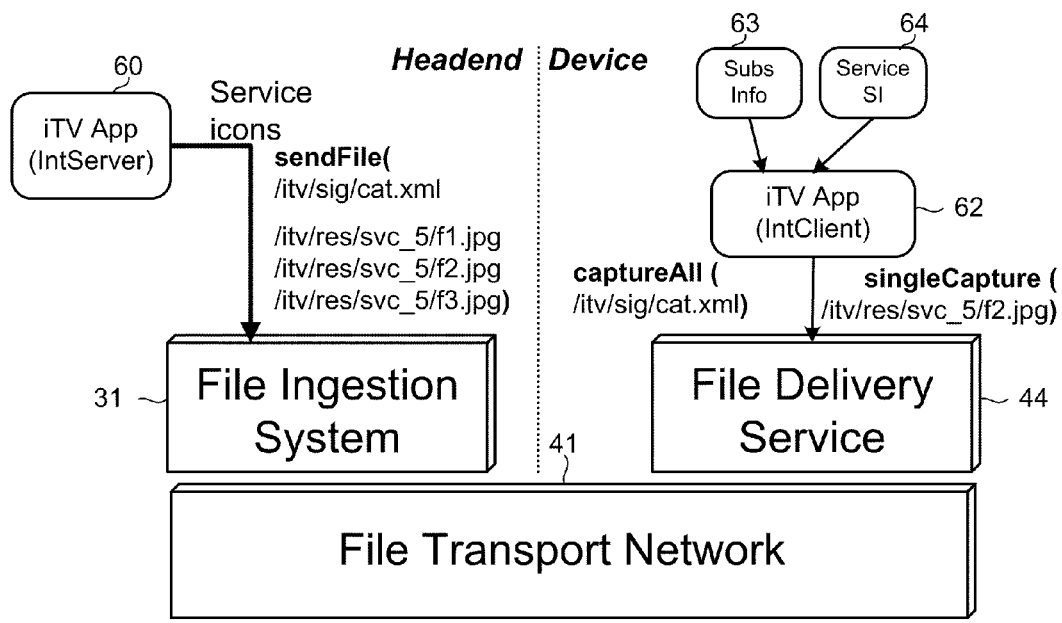
FIG. 6 is a system block diagram illustrating the ingestion and reception of files for a particular application (an iTV application) according to an embodiment.

FIG. 6 illustrates another implementation of the file system abstraction. Specifically, FIG. 6 illustrates a scenario in which a headend interactivity application (iTVApp) 60 submits image files and a catalog as an overhead file. The catalog file (/itv/sig/cat.xml) provides information on the files available from the interactivity application. When the headend interactivity application 60 submits new files for transport, an updated interactivity catalog may also be submitted along with the files. The updated interactivity catalog may describe the newly added interactivity files. Thus, in the illustrated example, an interactivity application server 60 provides a catalog file and three interactivity files to the file ingestion system 31, along with a send command. In the illustrated example, the send command may be "sendFile (/itv/sig/cat.xml; /itv/res/svc_5/f1.jpg; /itv/res/svc_5/f2.jpg; /itv/res/svc_5/f3.jpg)." On the receiver side, a client application 62 may issue a request command to the file delivery service module 44 for the continued capture of updates to the catalog file. In the illustrated example, this request command may be "captureAll (/itv/sig/cat.xml);" where a file name, rather than a directory name (argument not terminated by "/"), was used as the argument to the service request. After issuing the request command, the client application 62 may issue request commands to capture specific files based on updates to the catalog information, per application-specific processing of application-specific information in the catalog file. For example, the client application 62 may issue a "singleCapture (/itv/res/svc_5/f2.jpg)" command to capture the single file of interest"f2.jpg;" singleCapture( ) does not continue monitoring updates to the requested file as the content for these files are not expected to change.

In various embodiments, applications implementing the file system abstraction system described above may be mixed with applications implementing other ways of discovering and requesting files available for reception via the file transport network 41. Thus, in various embodiments, a hybrid system that uses both client and headend applications implementing different file abstraction and/or file request/transmission techniques may be employed. This hybrid system may contribute to the file delivery framework's (FDF) ability to concurrently support different types of file delivery applications on a single framework.

Figure 7:
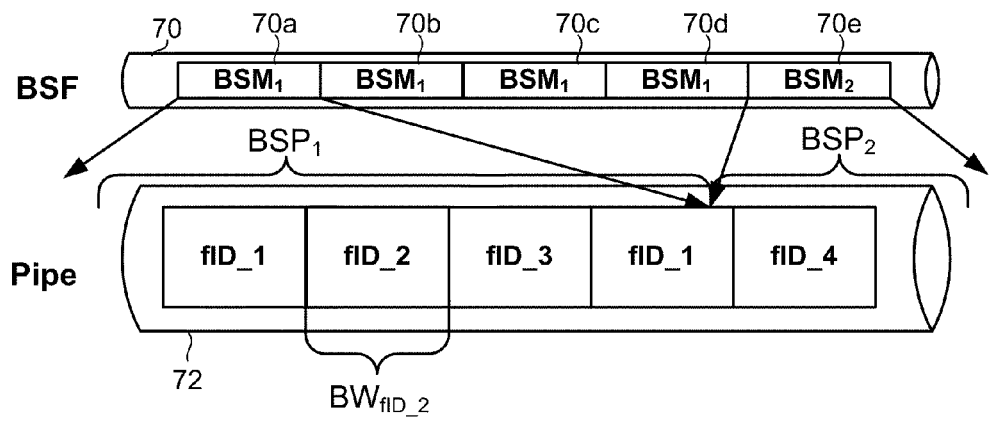
FIGS. 7 and 8 are timing diagrams illustrating how broadcast schedule messages may be transmitted to inform receiver devices of the timing and reception parameters of particular files transmitted in a broadcast pipe.

FIG. 7 illustrates the scheduling of ingested files by time multiplexing the files in a file delivery pipe in order to share transmission resources. As discussed above, in various embodiments, resources may be organized into file delivery pipes to improve the system's overall efficiency. Organizing resources into file delivery pipes improves efficiency because most broadcast networks that provide file transport services (e.g., an FDF service) are typically resource bound. In various embodiments, the file delivery pipes may be a particular group of resources that are dedicated to the transmission process. In various embodiments, the file delivery pipes may be dedicated broadcast resources. In various embodiments, the dedicated resources may include network resources that are dedicated to a particular file transport process. In various embodiments, one or more file delivery pipes may be used to transport one or more files over the file delivery network.

FIG. 7 also illustrates a file delivery pipe 72 that is scheduled to carry a sequence of files. Each file is identified with a different transport file ID and/or Element ID (e.g., fID_1 through fID_4). The transport file IDs and/or Element IDs may uniquely identify the files and provide a form of implicit versioning support (i.e., each submitted version of a file may be assigned a new file ID/Element ID). FIG. 7 illustrates that each file may be scheduled to be broadcast within a particular broadcast window (BW), in which each broadcast window (e.g., $BW_{fID\_2}$) corresponds to a period of time during which a file (e.g., fID_2) may be transmitted. In various embodiments, the broadcast window required to transmit each file over a dedicated pipe may be defined as a function of the transport pipe data rate and the size of the file being transmitted. In various embodiments, the broadcast window may be proportional to the file size divided by the file pipe data rate.

FIG. 7 also illustrates that a broadcast schedule flow (BSF) 70 may be used to carry broadcast schedule messages (BSMs) that describe the files for transport, their broadcast windows as well as transmission metadata. In various embodiments, the broadcast schedule flow 70 may be an overhead flow separate from the content flows. In various embodiments, the broadcast schedule messages may be transmitted ahead of the files so that the receiver devices may activate the receiver circuitry in time to receive their desired files. In various embodiments, the same broadcast schedule message may be rebroadcast frequently, such as in every superframe, to ensure the reliable reception of the broadcast schedule messages by the receiver devices.

As discussed above, in various embodiments, each broadcast schedule message (BSM) may only describe a fraction of the scheduled files. This is to support situations where a large number of files are available and scheduled for over-the-air transmission, and it is not practical to define all the scheduled files in a single broadcast schedule message. Advertising only fraction of the scheduled files in the broadcast schedule messages also supports situations where the schedule may change frequently as new files are continually submitted for transmission. Thus, in various embodiments, broadcast schedule messages may be generated such that they describe only a fraction of the scheduled files. In these embodiments, the broadcast schedule message may describe a series of files that will be broadcast within a given broadcast schedule period (BSP).

FIG. 7 also illustrates that each BSM may describe a series of files within each broadcast schedule period (BSP). Specifically, FIG. 7 illustrates an example where only three unique files (fID_1 through fID_3) are broadcast in a first broadcast schedule period ($BSP_1$). In the various embodiments, each broadcast schedule period may define a quantity representing the number of advertised file broadcast schedules included in a corresponding broadcast schedule message. These broadcast schedule messages may be transmitted repeatedly within the same broadcast schedule flow 70. For example, FIG. 7 illustrates that the same $BSM_1$ message, which describes all of the files scheduled for broadcast within the $BSP_1$ period, is broadcast several times in the broadcast schedule flow 70, as shown by BSMs 70a through 70d.

In various embodiments, the file delivery system can be configured such that the broadcast schedule periods (BSPs) are relatively short and the broadcast schedule messages (BSMs) are updated regularly within the broadcast schedule flow (BSF) 70. By configuring the system to use short broadcast schedule periods, and updating the broadcast schedule messages regularly, the efficiency and flexibility of the file delivery system, as well as its ability to manage continuously updated files, can be greatly improved.

FIG. 7 illustrates an example in which the broadcast schedule messages (BSMs) included within the broadcast schedule flow (BSF) 70 are being updated regularly. Specifically, FIG. 7 illustrates that $BSM_1$ 70d may be updated to $BSM_2$ 70e, which corresponds to the files that will be broadcast within $BSP_2$. FIG. 7 also illustrates that the broadcast schedule messages (e.g., $BSM_1$ and $BSM_2$) may be updated on the boundary of two BSPs (e.g., $BSP_1$ and $BSP_2$).

It should be noted that FIG. 7 illustrates a scenario in which multiple broadcast windows exist during a broadcast schedule period (BSP) for a single file, such as illustrated for fID_1. Multiple broadcast windows for a single file may be used when a file is transmitted repeatedly to improve the success rate for the file transmission, as may be appropriate for high-priority files. Multiple broadcast windows for single files may also be necessary when a file is so large that it must be split into disjoint pieces to enable other files to be transmitted concurrently. When there are multiple broadcast windows for a single file, those multiple broadcast windows may appear within the same broadcast schedule period or in different broadcast schedule periods.

Figure 8:
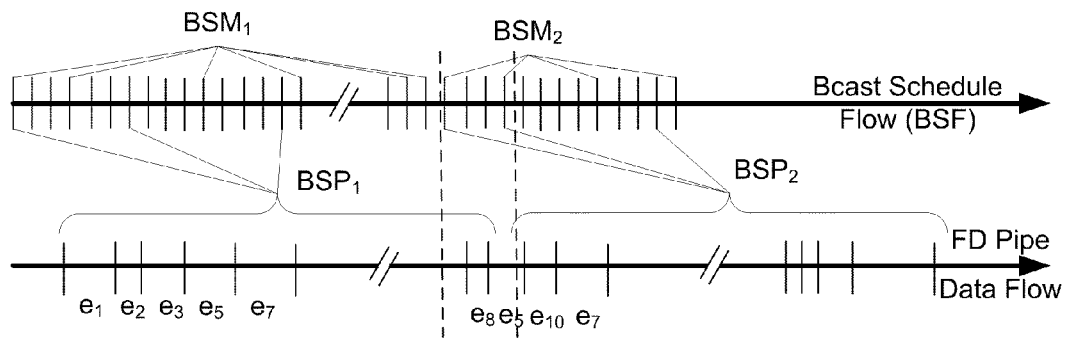

FIG. 8 illustrates that each broadcast schedule message (e.g., $BSM_1$ and $BSM_2$) may be repeated regularly, such as in every superframe, to provide broadcast window and reception information for a plurality of files broadcast within a broadcast schedule period. FIG. 8 also illustrates that the files transmitted in a file delivery pipe dataflow may be of different broadcast durations, since the files may be of different sizes.

Figure 9:
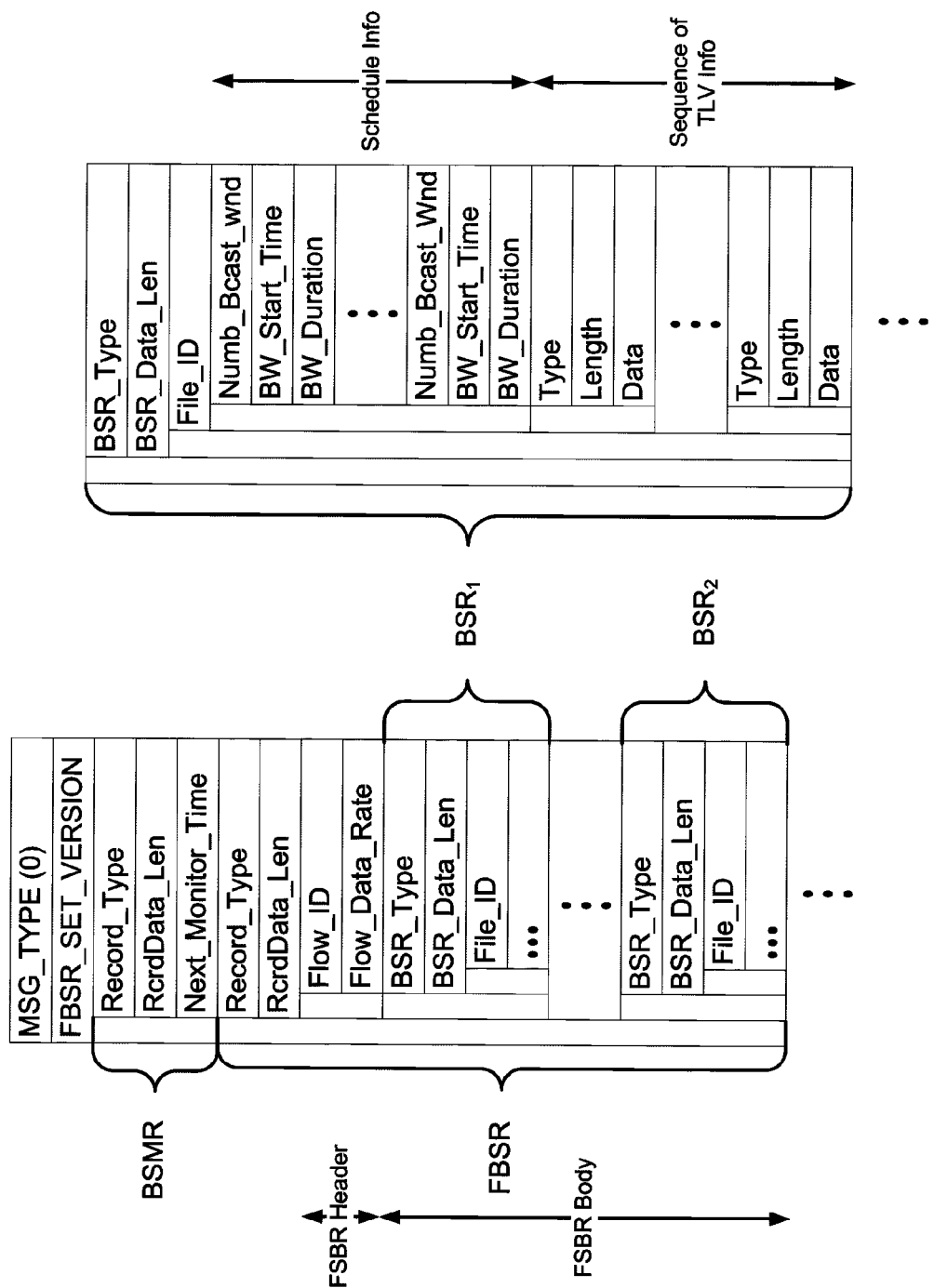
FIG. 9 is an example data structure suitable for use in a broadcast schedule message.

As discussed above, BSMs provide a mechanism for advertising the transmission schedule. BSMs may also provide an array of additional information to receiver devices. A high-level format of an example BSM is illustrated in FIG. 9. As FIG. 9 illustrates, a broadcast schedule message may include a broadcast schedule monitoring record (BSMR). The broadcast schedule monitoring record may include a next monitor time data field (Next_Monitor_Time) which specifies the next time that the receiver device should monitor the broadcast schedule flow for an updated BSM. This data field may also define the time at which the next broadcast schedule period may begin. As discussed more fully below, specifying the time the BSM will be updated enables receiver devices to conserve battery power by deactivating their receiver circuitry when redundant BSMs are being carried on the broadcast schedule flow (BSF) 70.

FIG. 9 illustrates that the BSMs may also include a flow broadcast schedule record (FBSR). The flow broadcast schedule record may describe the broadcast schedules for the files that are being broadcasted on the content flow (e.g., within a file broadcast pipe) during the current broadcast schedule period (BSP). A BSM may include multiple flow broadcast schedule records. Each flow broadcast schedule record may be in the form of a type-value-length (TLV) structure with a value portion (i.e. record data) that includes two major parts: a flow broadcast schedule record header (FBSR header); and a flow broadcast schedule record body (FBSR body).

The flow broadcast schedule record header (FBSR header) may carry information regarding the transport stream, frequency, and/or broadcast system. The flow broadcast schedule record header may include a flow ID and a flow data rate. The flow ID may be an identifier for the broadcast flow used for the transmission of a file. The flow data rate may be the data rate at which the files described in the broadcast schedule message under the flow ID are to be transmitted.

The flow broadcast schedule record body (FBSR body) may carry one or more broadcast schedule records, as illustrated by $BSR_1$ and $BSR_2$. Each broadcast schedule record (BSR) may provide broadcast information on a single file being broadcast on the content flow within a given broadcast schedule period (BSP) 70. The broadcast schedule record body (BSR body) may include a broadcast digital record type (BSR_Type), a file ID and/or Element ID (e.g., File_ID), schedule information, and a sequence of parameters encoded in type-value-length (TLV) encoding. The broadcast digital record type (e.g., BSR_Type) may provide information on the type of file being broadcast, such as a single file, a bundle of files, etc. The file ID and/or Element ID (e.g., File_ID) may identify a file content being broadcast. The schedule information may describe the broadcast window for a given file, and may describe many broadcast transmissions throughout the broadcast schedule period. A broadcast window may be defined by the broadcast window start time (BW_Start_Time) and a broadcast duration (BW_Duration). The broadcast window start time may be defined as the time at which the broadcast of a file begins. The broadcast duration may be defined as the length of time beyond the broadcast window start time that the file will be broadcast.

The flow broadcast schedule record body may further include a sequence of parameters in type-value-length (TLV) encoding that provide extensibility of the BSM to carry additional information that may further identify the file of a particular file ID and/or Element ID in a manner that may facilitate filtering and selection by receiver devices. Three types of parameters that may be included in the flow broadcast schedule record body are described below.

In a first type (e.g., type=1), prefix matching strings may be included which identify possible multiple files or directory names with which the file content identified by the file ID and/or Element ID may be associated. For example, the broadcast schedule record may only include one prefix matching string where the data is a file name, such as "/itv/res/svc_5/f2.jpg." As another example, the broadcast schedule record may include multiple prefix matching strings where each TLV has a different file name, such as "/itv/res/svc_5/f2.jpg" in one TLV and "/itv/res/svc_15/f2.jpg" in another TLV. The situation may be the case for an interactivity (itv) application that uses the same file "f2.jpg" for interactivity on service 5 (e.g., ESPN) and service 15 (e.g., ESPN2), hence "f2.jpg" has two aliases in the "/itv/" file directory structure. In a third example, the receiver device may receive requests to capture files in the form of singleCapture(/itv/res/svc_15/f2.jpg) or captureAll(/itv/res/svc_5/), in which case the receive device may perform 2-way prefix matching with the values in the prefix matching string LTVs.

In a second type (e.g., type=2), attribute strings may provide multiple attributes (e.g., gender=male; age=20-30, etc.) that characterize the file content identified by the file ID and/or Element ID, or applications or receiver devices for which the file content is suitable. In this case, a receiver device using attribute strings will have received requests to capture files that match a logical expression on a number of attributes, such as captureAll (gender=male && age=20-30), where && represents the logical AND operation.

In a third type (e.g., type=3), application or service specific identifiers are provided for a file (e.g., itv:123, or svc_3:2234, etc.) which identify the file ID and/or Element ID in the scope of a given application or service. A receiver device using application or service identifiers would make use of a catalog file to describe the available files, associated attributes, and the corresponding application or service identifier for the file. The application or service could then request the capture of a file of interest as a single capture, such as singleCapture (itv:123).

Figure 10:
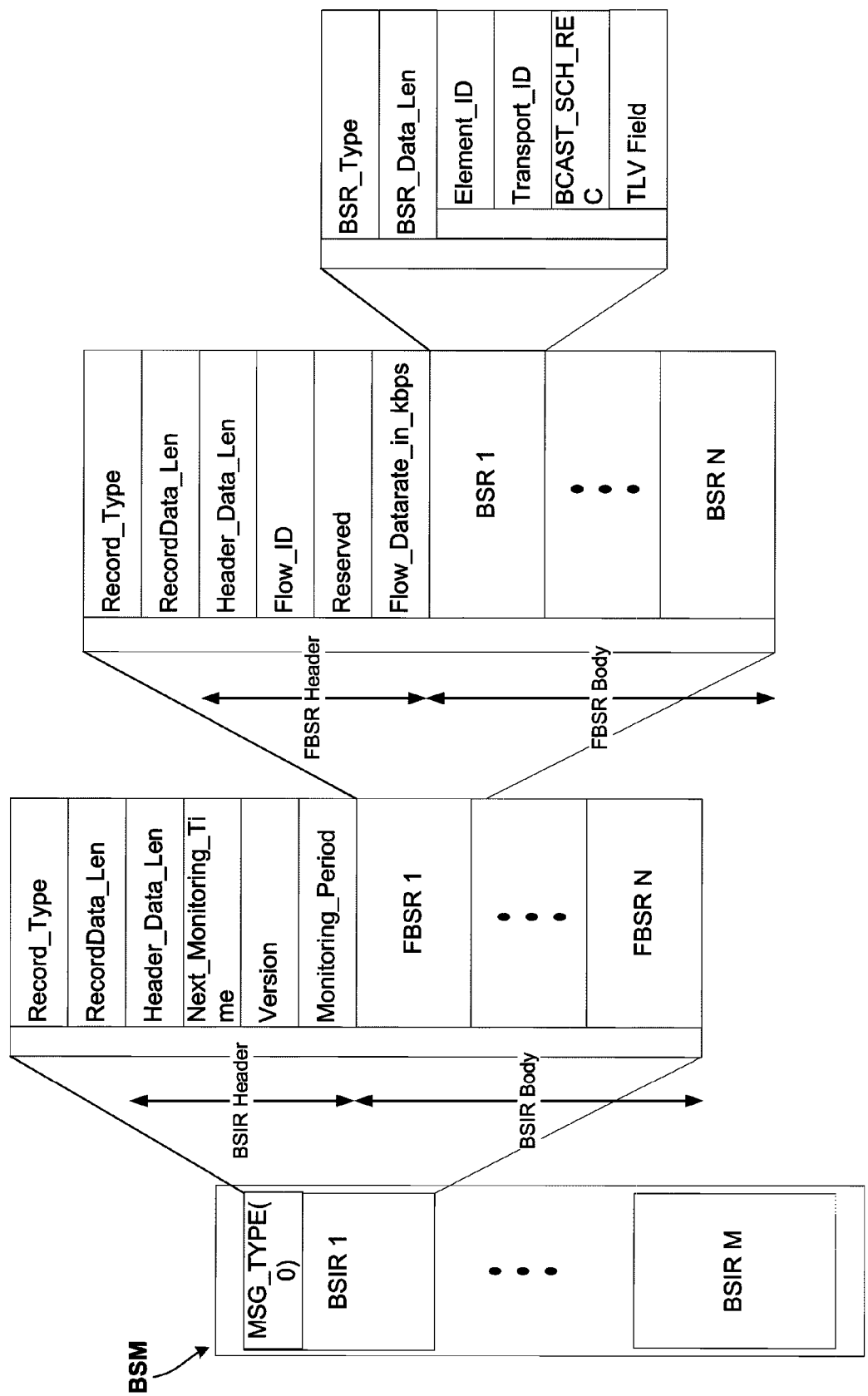
FIG. 10 is another example data structure suitable for use in a broadcast schedule message.

FIG. 10 illustrates a high-level format for another example broadcast schedule message. As illustrated in FIG. 10, a BSM may contain multiple broadcast schedule information records (BSIR$_1$ through BSIR$_M$). Each broadcast schedule information record may contain information about the broadcast schedule on one or more flows. Each broadcast schedule information record may also contain a monitoring schedule that receiver devices can use to receive updated broadcast schedules.

As illustrated in FIG. 10, each broadcast schedule information record (e.g., BSIR$_1$ through BSIR$_M$) may have a header portion (BSIR Header) and a body portion (BSIR Body). The header portion may include a next monitor time (e.g., Next_Monitor_Time) field and a monitoring period (e.g., Monitoring_Period) field. In various embodiments, the fields in the header portion (e.g., Next_Monitor_Time, Monitoring_Period, etc.) may be used to allow the file delivery framework (FDF) to deliver data at different latencies. In various embodiments, all of the broadcast schedule information records (BSIRs) within a monitoring period may be sorted in descending order, such that the receiver devices process only the first broadcast schedule information record. In various embodiments, the broadcast schedule information record may be configured to include a next monitor time (e.g., Next_Monitor_Time) field only when it is determined that the system does not support initial acquisition flow (IAF) systems.

In various embodiments, the body portion of the broadcast schedule information record (BSIR body) may include multiple flow broadcast schedule records (FBSR$_1$ through FBSR$_N$). A flow broadcast schedule record is a file delivery data flow record that describes the broadcast schedules of elements that are broadcast on the flow within the broadcast schedule period (BSP). Each flow broadcast schedule record may have a type-value-length (TLV) structure in which the value portion includes a header portion (FBSR Header) and a body portion (FBSR Body). The header portion of the flow broadcast schedule record may contain information about the data flow, such as flow ID, data rate, etc. The body portion of the flow broadcast schedule record may contain one or more broadcast schedule records (BSR$_1$ through BSR$_N$). In various embodiments, the body portion of the flow broadcast schedule record may contain a broadcast schedule record for each element that is broadcast on the flow within the broadcast schedule period (BSP). In various embodiments, each broadcast schedule record may have an element ID (Element_ID) for each element (i.e., a data unit broadcasted on the data flow), one or more file/directory names for file(s) in the element, and broadcast schedule information. In an embodiment, the file and directory names may follow a UNIX-based file naming convention. In an embodiment, the elements represented by element IDs (e.g., Element_ID) may correspond to either a particular version of file or a particular version of file bundle that consists of multiple files. In various embodiments, different versions of the same file or file bundle may correspond to different elements. In various embodiments, the element IDs may be a global unique ID assigned to each element by the file delivery framework (FDF).

Figure 11:
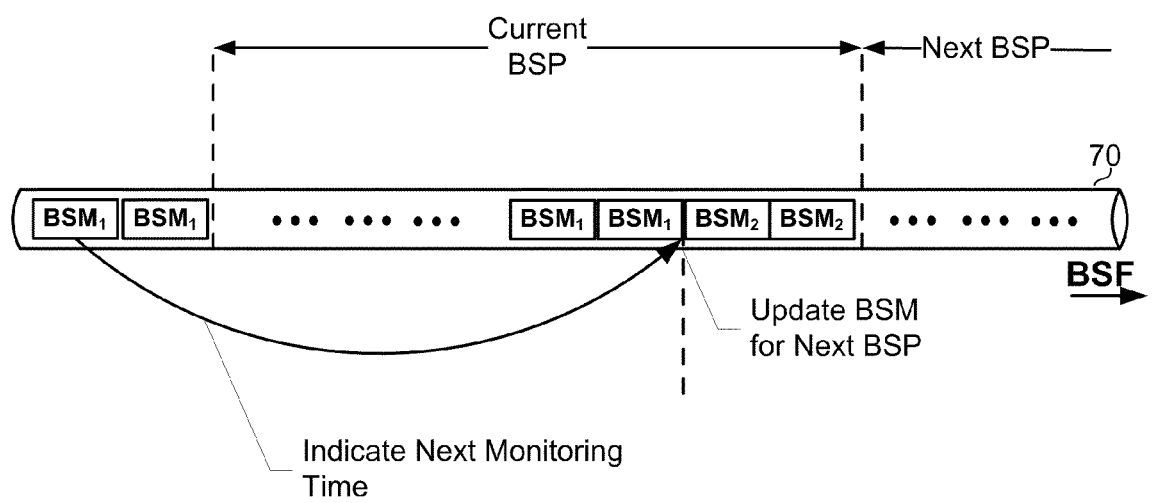
FIG. 11 is a timing diagram illustrating how the next monitor time data field of a broadcast schedule message may be used to update the broadcast schedule message (BSM) in the broadcast schedule flow (BSF) of the next broadcast schedule period (BSP).

FIG. 11 illustrates an embodiment method for using the next monitor time data field of a BSM. As discussed above, the BSM may include a next monitor time data field (e.g., Next_Monitoring_Time field in FIG. 10) which specifies the next time that the receiver device should monitor the broadcast schedule flow for an updated BSM. FIG. 11 illustrates how the next monitor time data field of a first BSM (BSM$_1$) may be used to update a second BSM (BSM$_2$) in the broadcast schedule flow (BSF) 70 for the next broadcast schedule period (Next BSP). FIG. 11 illustrates that, when a receiver device receives a BSM (e.g., BSM$_1$), the receiver may schedule the next wake-up time to monitor the broadcast schedule flow (BSF) according to the next monitoring time in BSM$_1$.

Figure 12:
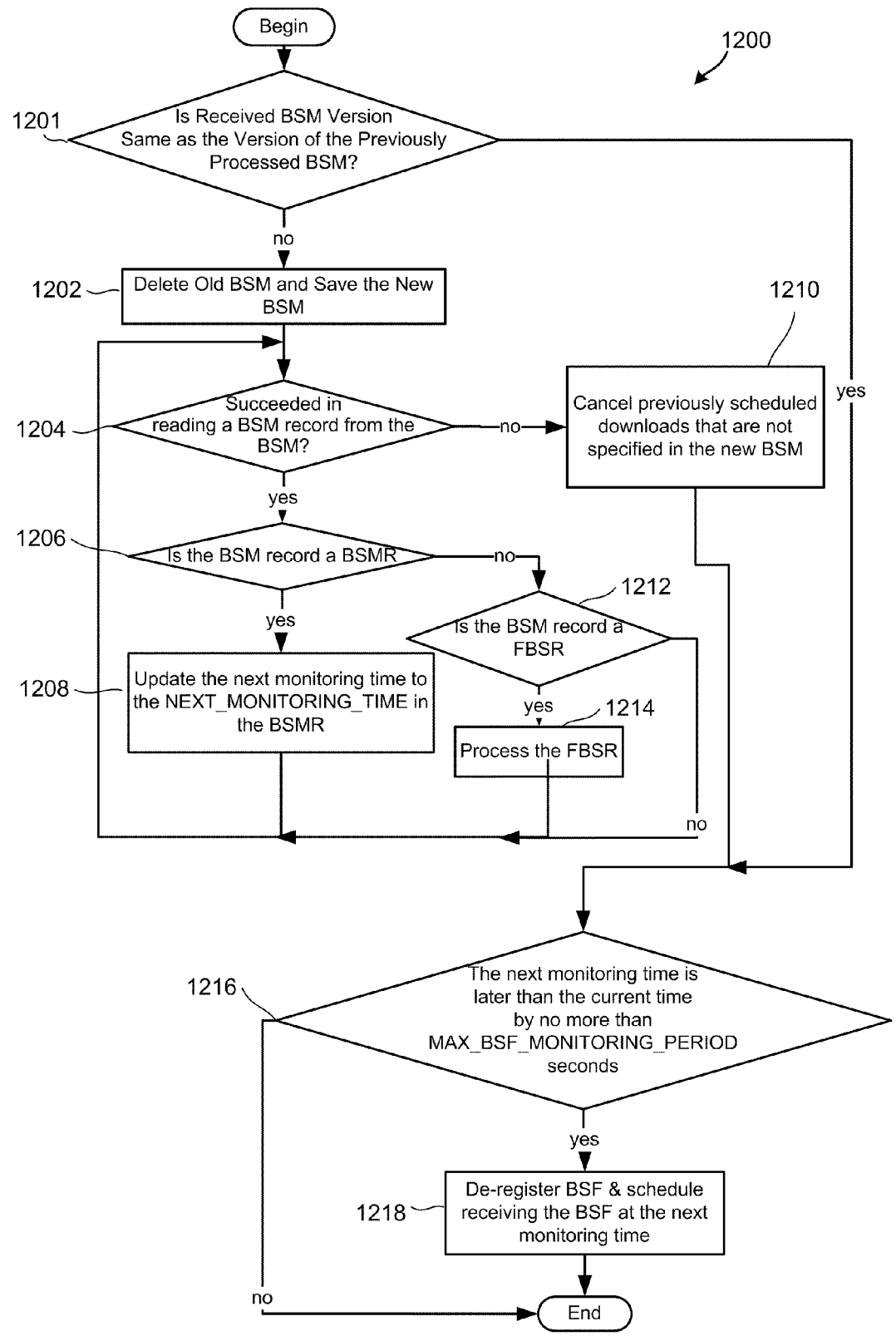
FIG. 12 is a process flow diagram of an embodiment method for processing broadcast schedule messages.

FIG. 12 is an embodiment method 1200 for processing broadcast schedule messages. FIG. 12 illustrates that, in determination step 1201, a receiver device may first determine if a received BSM has the same version property as that of the previously processed broadcast schedule message. If the version is the same (i.e., determination step 1201="Yes"), the receiver device may proceed to determination step 1216. If the version is not the same (i.e., determination step 1201="No"), in step 1202, the receiver device may delete the previous BSM and save the newly received BSM. Saving the new BSM is necessary because every time the file delivery framework (FDF) receives a request from an application for capturing files it should use the new information in the request to reprocess the saved BSM.

In determination step 1204, the receiver device may attempt to read the broadcast schedule message record from the broadcast schedule message. If successful (i.e., determination step 1204="Yes"), in determination step 1206 the receiver device may process the records (e.g., BSMR, FBSR) in the BSM and determine if the record is a broadcast schedule monitoring record (BSMR). If the record is a broadcast schedule monitoring record (i.e., determination step 1206="Yes"), in step 1208, the device may use the next monitoring time field (e.g., NEXT_MONITORING_TIME) in the broadcast schedule monitoring record as the new next monitoring time. If the record is not a broadcast schedule monitoring record (i.e., determination step 1206="No"), in determination step 1212, the receiver device may determine if the record is a flow broadcast schedule record (FBSR). If the record is not a flow broadcast schedule record (i.e., determination step 1212="No"), the receiver device returns to determination step 1204 to read a new broadcast schedule message record. If the record is a flow broadcast schedule record (i.e., determination step 1212="Yes"), in step 1214, the device may process the flow broadcast schedule record and make a data filtering decision, and then return to determination step 1204 to read a new broadcast schedule message record.

If in determination step 1204, the receiver device fails to read a broadcast schedule message record from a BSM (i.e., determination step 1204="No"), in step 1210 the receiver device cancels the previously scheduled downloads not specified in the new BSM, and proceeds to determination step 1216. In various embodiments, a file delivery core (FDC) may cancel the previously scheduled downloads that are not specified in the new BSM. In various embodiments, a broadcast server may use this feature to cancel a broadcasted element by sending an updated BSM The file delivery core is discussed in more detail below with reference to FIG. 19.

Returning to FIG. 12, after processing all the fields in the broadcast schedule message or upon receiving a previously processed BSM (i.e., determination step 1201="Yes"), in determination step 1216, the receiver device may check whether the next monitoring time (e.g., NEXT_MONITORING_TIME) is later than the current time—and if the difference between the current time and the next monitoring time is no more than a time period specified by a device provisioning parameter (e.g., MAX_BSF_MONITORING_PERIOD). If the next monitoring time is not later than the current time (i.e., determination step 1216="No"), the process ends and the device may stop monitoring the broadcast schedule flow broadcast schedule flow and wait to receive the next updated BSM. If the next monitoring time is later than the current time and the difference between the current time and the next monitoring time is no more than the specified time period (i.e., determination step 1216="Yes"), in step 1218, the receiver device may deregister the broadcast schedule flow (i.e., stop receiving the current broadcast schedule flow) and schedule receiving the broadcast schedule flow at the next monitoring time. Otherwise, the device may continue receiving the broadcast schedule flow.

Figure 13:
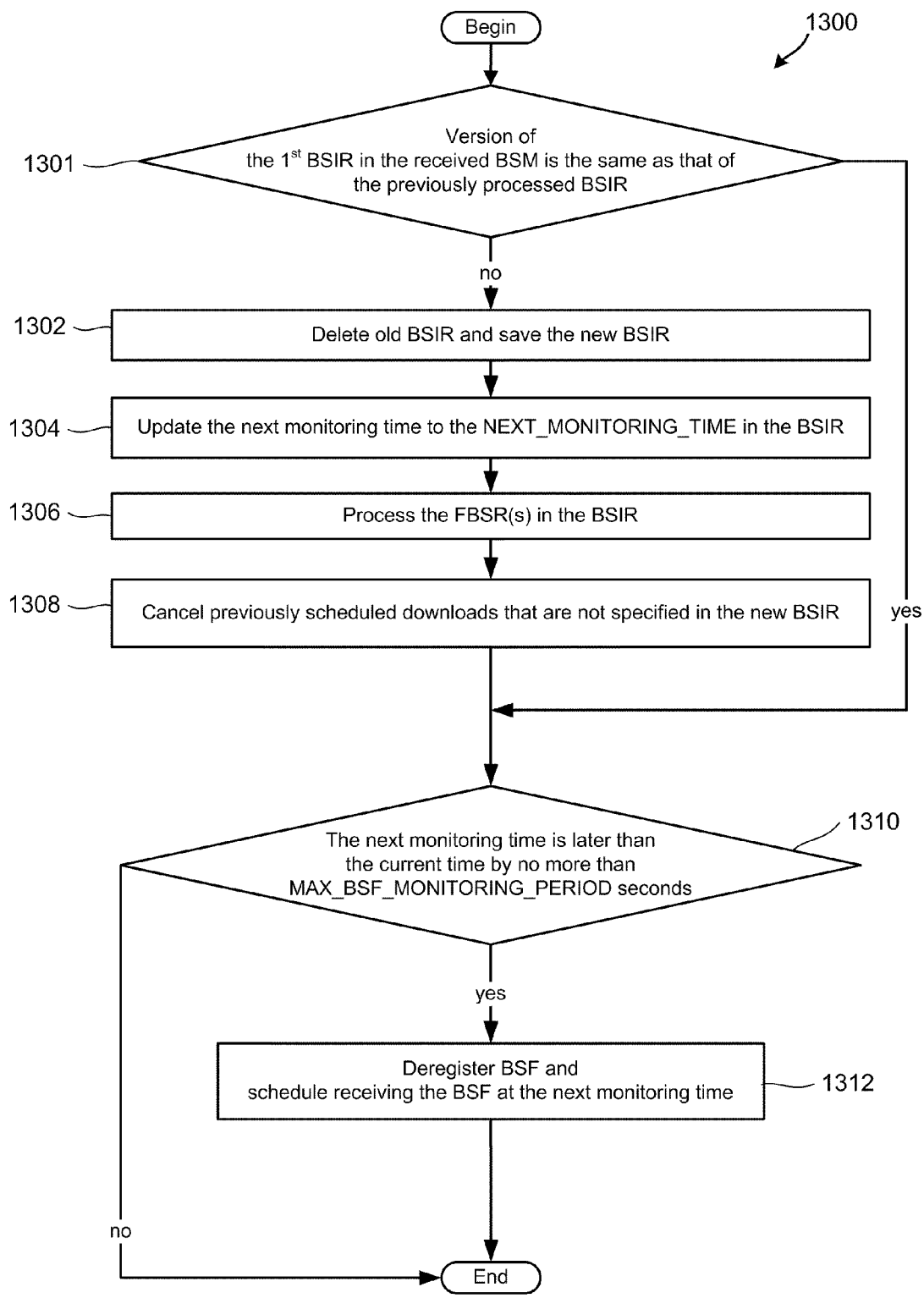
FIG. 13 is a process flow diagram of an embodiment method for implementing update detection on a broadcast schedule flow.

FIG. 13 illustrates an embodiment method 1300 for implementing update detection on a broadcast schedule flow (BSF) 70. FIG. 13 illustrates that, in determination step 1301, the device may first check if the version of the first broadcast schedule information record (BSIR) in the received broadcast schedule message (BSM) is the same as that of the previously processed broadcast schedule information record. If the version is the same (i.e., determination step 1301="Yes"), it may proceed to determination step 1310. If the version is not the same (i.e., determination step 1301="No"), in step 1302, the receiver may delete the previously saved broadcast schedule information record and save the new broadcast schedule information record. Saving the new broadcast schedule information record allows the file delivery framework (FDF) to use the new information in the request to reprocess the saved broadcast schedule information record every time the file delivery framework receives a new file capture request from an application. In step 1304, the device may use the next monitoring time field (e.g., NEXT_MONITORING_TIME) in the broadcast schedule information record as the new next monitoring time. In step 1306, the receiver device may process all of the flow broadcast schedule records (FBSRs) in the broadcast schedule information record. In various embodiments, the device may use the processing of the flow broadcast schedule records to make data filtering decisions. In step 1308, the file delivery core (FDC) may cancel the previously scheduled downloads that are not specified in the new broadcast schedule information record. In various embodiments, the broadcast server can use this feature to cancel an element broadcast by sending an updated broadcast schedule message.

After processing all the fields in the broadcast schedule information record (BSIR), in determination step 1310, the receiver device may check if the next monitoring time is later than the current time—and if the difference between the current time and the next monitoring time is no more than a device provisioning parameter (e.g., MAX_BSF_MONITORING_PERIOD). In various embodiments, if the next monitoring time is not later than the current time (i.e., determination step 1310="No"), the device may stop monitoring the broadcast schedule flow 70. If the next monitoring time is later than the current time and the difference between the current time and the next monitoring time is no more than the device provisioning parameter (MAX_BSF_MONITORING_PERIOD) (i.e., determination step 1310="Yes"), in step 1312, the receiver device may deregister broadcast schedule flow (i.e. stop receiving the BSF) and schedule to receive the broadcast schedule flow 70 at the next monitoring time. Otherwise, the device may continue receiving the broadcast schedule flow 70.

In the embodiment methods described above with reference to FIGS. 12 and 13, if the receiver device is out of flow coverage at the specified monitoring time, the device may not know when to wake up again to receive the broadcast schedule flow 70. This scenario is illustrated in FIG. 14, which shows that a receiver device may be outside of the coverage area at various times.

Figure 14:
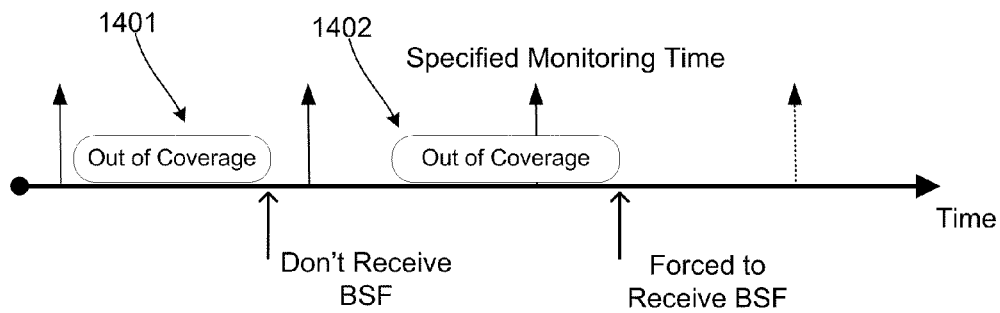
FIG. 14 is a timing diagram illustrating that a receiver device may be outside of a broadcast network's and/or broadcast flow's coverage area at various times.

FIG. 14 is a timeline diagram illustrating how a receiver device may be outside of a broadcast network's and/or broadcast flow's coverage area (1401, 1402) at various times related to the timing of broadcast schedule flow transmissions. In such cases, the receiver device may reenter the coverage area before the next specified monitoring time, as represented by block 1401. At other times, a receiver device may not reenter the coverage area until have the next specified monitoring time has passed, as represented by block 1402. FIG. 14 illustrates that, in various embodiments, the receiver device may receive the broadcast schedule flow 70 every time it reenters flow coverage after being out of the flow coverage area. In some embodiments, the receiver device may make an individual determination as to whether it should receive the broadcast schedule flow 70 based on determining that it was out of flow coverage at a specified monitoring time. In various embodiments, the receiver device may be forced to receive the broadcast schedule flow 70 when returning to a flow coverage area (illustrated as "Forced to Receive BSF"). In other embodiments, the receiver device may be configured to receive the broadcast schedule flow 70 every time a service core starts. In other embodiments, the receiver device can make a determination as to whether the next specified monitoring time has passed, and make adjustments as necessary to ensure it has received the latest version of the broadcast schedule flow.

Figure 15:
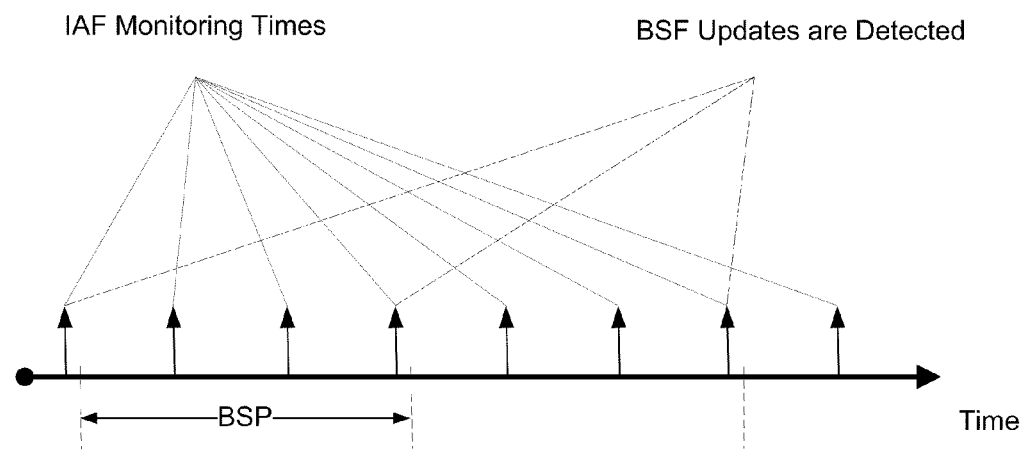
FIG. 15 is a timing diagram illustrating an embodiment method for detecting updates to the broadcast schedule flow (BSF) on systems that support initial acquisition flow (IAF).

FIG. 15 illustrates an embodiment method for detecting updates to the broadcast schedule flow (BSF) 70 on systems that support initial acquisition flow (IAF). Specifically, FIG. 15 illustrates a timeline for detecting broadcast schedule flow 70 updates based on an initial acquisition flow. In various embodiments, the detection of updates to broadcast schedule messages (BSMs) on the broadcast schedule flow 70 may be based on the contents of a directory information message (DIM) message on the initial acquisition flow. In various embodiments, a receiver device may periodically wake up according to a next monitor time value (e.g., NEXT_MONITORING_TIME) specified in a previous directory information message. In various embodiments, the receiver device may receive the latest directory information message from the initial acquisition flow and compare the broadcast schedule message version information (e.g., BSM_VERSION) to the version information of the latest, unexpired, processed broadcast schedule message. In these embodiments, if the compared versions are different, the receiver device may determine that there has been an update to the broadcast schedule message and activate receiver circuitry in the receiver device to receive the updated broadcast schedule message on the broadcast schedule flow 70. In various embodiments, a receiver device may receive the updated broadcast schedule message using common overhead flow receiving mechanisms. In various embodiments, the file delivery framework (FDF) on the receiver device may set a broadcast schedule message device parameter (e.g., FDF_BSM_EXPIRY_TIME) to indicate that the broadcast schedule message has expired, seconds after the broadcast schedule message has been processed. In these embodiments, by indicating that the broadcast schedule message has expired, the receiver device can address cases where the device has been out of flow coverage for a period of time and has a stale broadcast schedule message. In various embodiments, the receiver device may activate receiver circuitry to receive a new broadcast schedule message whenever the receiver device detects that it has a stale broadcast schedule message.

Figure 16:
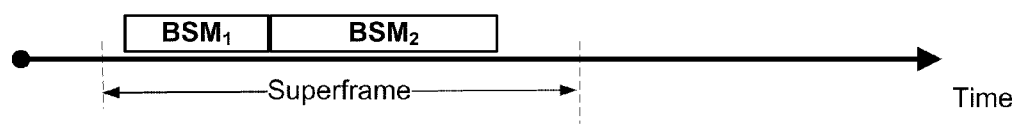
FIG. 16 is a timing diagram illustrating an embodiment method for receiving, within the same superframe, two different versions of a broadcast schedule message.

FIG. 16 is a timeline diagram illustrating an embodiment method for receiving, within the same superframe, two different versions of a broadcast schedule message (e.g., $BSM_1$, $BSM_2$). As discussed above, in various embodiments, information may be transmitted in wireless signals organized into a plurality of superframes. Each superframe may include signals within a frequency band and within set time boundaries that comprises a plurality of data packets that communicate the broadcast content. FIG. 16 illustrates that two different versions of a broadcast schedule message ($BSM_1$, $BSM_2$) may be received within the set time boundaries of a single superframe.

Figure 17:
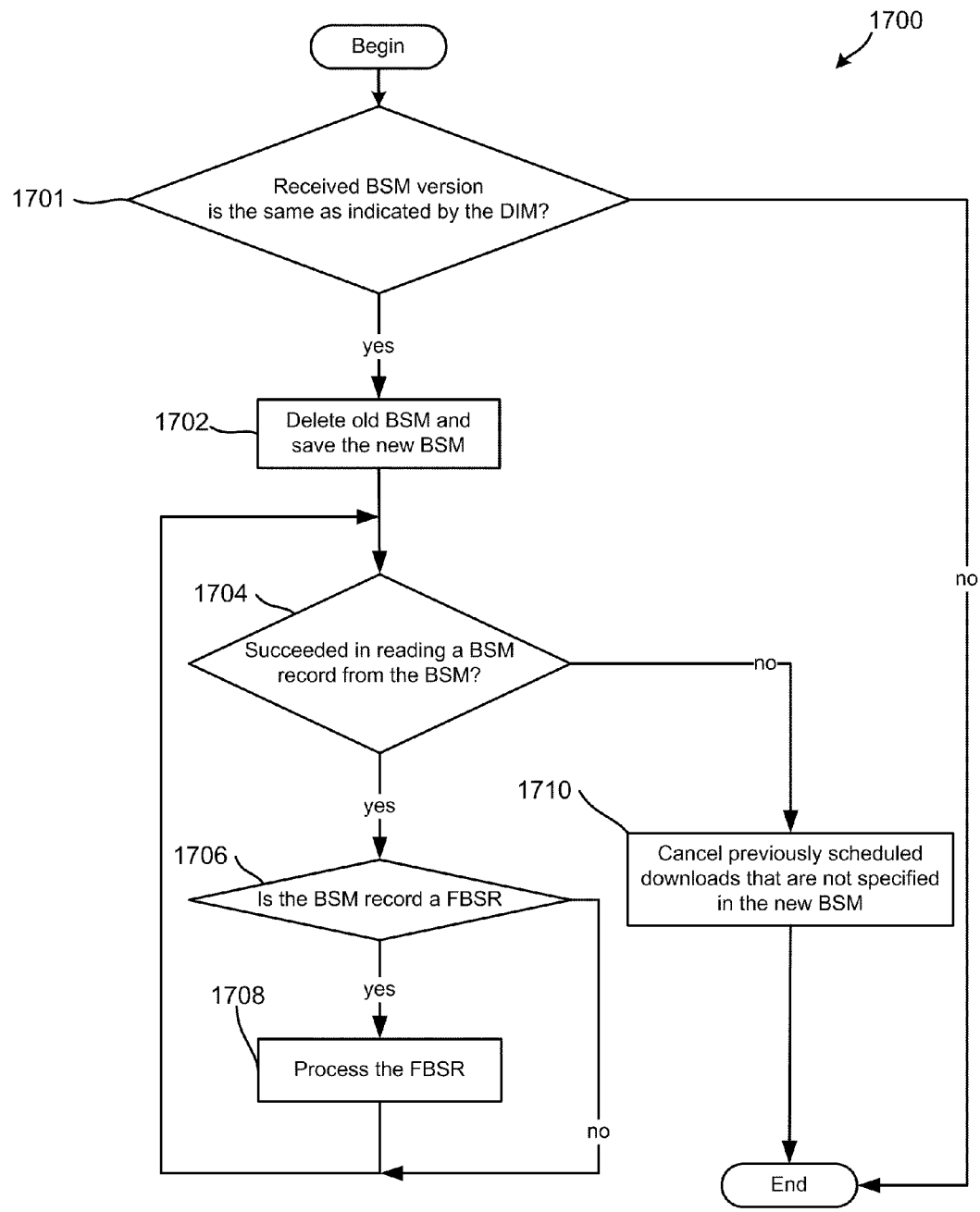
FIG. 17 is a process flow diagram of an embodiment method for processing broadcast schedule messages (BSMs) with support from an initial acquisition flow (IAF) system.

FIG. 17 illustrates an embodiment method 1700 for processing broadcast schedule messages (BSMs) with support from an initial acquisition flow (IAF) system. In determination step 1701, the receiver device may determine whether the version parameter (e.g., BSM_VERSION) in the broadcast schedule message is the same as the version parameter indicated in the directory info message (DIM). If the versions are different (i.e., determination step 1701="no"), the device may ignore the received broadcast schedule message and end the processing. In various embodiments, this may be necessary because the device may receive multiple versions of the same broadcast schedule messages within a superframe as illustrated by FIG. 16. In such scenarios, the device may only process the latest version (e.g., $BSM_2$) indicated by the directory info message. In various embodiments, the server can prevent multiple versions of broadcast schedule messages within the same superframe by broadcasting the updated broadcast schedule message a few seconds (or microseconds) before the initial acquisition flow's next monitoring time.

Returning to FIG. 17, if it is determined that the version parameters are the same (i.e., determination step 1701="yes"), in step 1702, the receiver device may delete the previously saved broadcast schedule message and save the new broadcast schedule message. In various embodiments, saving the new broadcast schedule message may be important because, every time the file delivery framework receives a request from an application for capturing files, it may use the new information in the request to reprocess the saved broadcast schedule message. In determination step 1704, the receiver device may attempt to read the broadcast schedule message record (BSMR) from the broadcast schedule message. If BSMR read was successful (i.e., determination step 1704="yes"), in determination step 1706 the receiver device may process the records (e.g., BSMR) in the received broadcast schedule message and determine if the record is a flow broadcast schedule record (FBSR). If so (i.e., determination step 1706="yes"), in step 1708, the receiver device may process the flow broadcast schedule record and make a data filtering decision. This process may be repeated by returning to determination step 1704 until all the fields in the broadcast schedule message have been processed which will be determined by a failed BSMR read attempt. If the receiver device could not successfully read the broadcast schedule message in determination step 1704 (i.e., determination step 1704="no"), a file delivery core (FDC) may cancel the previously scheduled downloads that are not specified in the new broadcast schedule message in step 1710.

Figure 18:
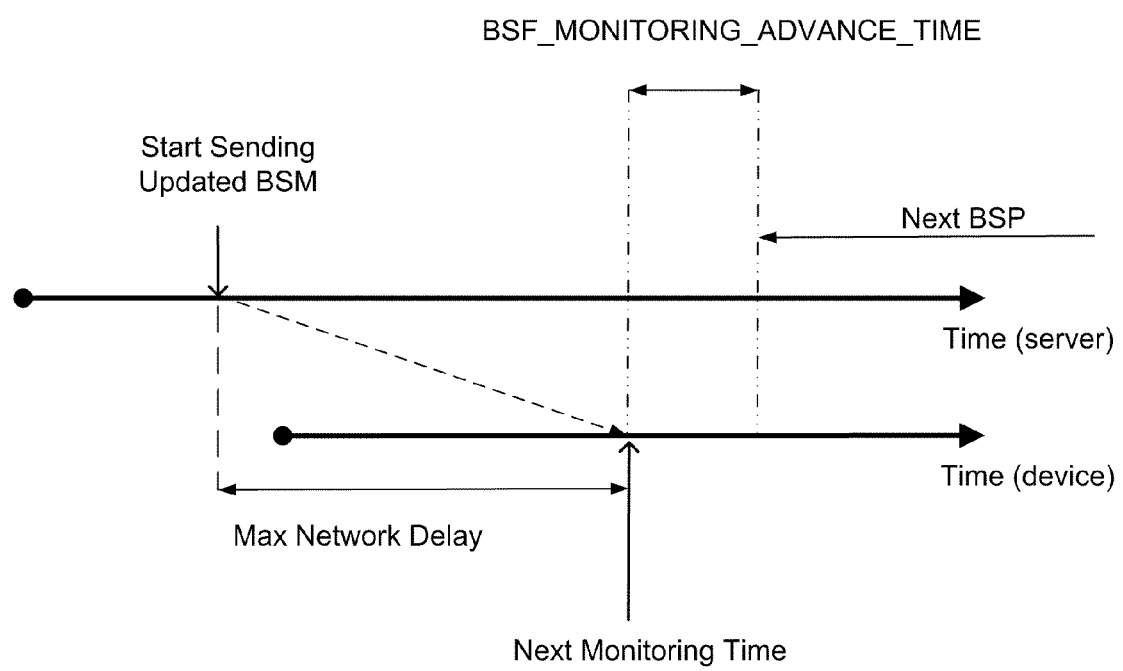
FIG. 18 is a timing diagram illustrating an embodiment method for timing the broadcasting of updated broadcast schedule messages (BSMs) between a receiver device and a broadcast server.

FIG. 18 is a timeline diagram illustrating an embodiment method for controlling the timing of the broadcast of updated broadcast schedule messages (BSMs) between a receiver device and a broadcast server. FIG. 18 illustrates that, in various embodiments, a broadcast server may set a next monitoring field device provision parameter (e.g., Next Monitoring Time) to be a variable number of seconds (e.g., BSF_MONITORING_ADVANCE_TIME) prior to the broadcast schedule period (BSP) start time. This may allow the receiver device to have enough time to detect a broadcast schedule message update and receive the updated broadcast schedule message before the start of the corresponding broadcast schedule period.

FIG. 18 also illustrates that, in various embodiments, the server may use a maximum network delay device provision parameter (e.g., Max Network Delay) that identifies a delay from the server to the device to determine a start time for the server to start sending the updated broadcast schedule message. In various embodiments, the server may set the next monitoring time in the local-area broadcast schedule message and the wide-area broadcast schedule message to be the same value. This allows the device to save energy. Since, a receiver device may move between multiplexes (e.g., one broadcast region to another), a receiver device may receive a broadcast schedule flow (BSF) 70 on a new multiplex every time the receiver moves to a new multiplex.

If the next monitoring time is later than the current time by no more than a number of seconds (e.g., MAX_BSF_MONITORING_PERIOD), a receiver device may deregister the broadcast schedule flow 70 after processing the fields in a received broadcast schedule message. After processing the fields in a received broadcast schedule message, a receiver device may continue receiving the broadcast schedule flow 70, on the condition that the next monitoring time is not later than the current time. After processing the fields in a received broadcast schedule message, the device may continue to receive the broadcast schedule flow 70 if the next monitoring time is later than the current time by more than a number of seconds (e.g., MAX_BSF_MONITORING_PERIOD).

A receiver device may schedule receiving the broadcast schedule flow (BSF) 70 at the next monitoring time. If the device is out of flow coverage at the broadcast schedule flow's monitoring time, the device may receive the broadcast schedule flow 70 when it reenters the flow coverage area. A receiver device may receive the broadcast schedule flow 70 whenever the file delivery framework (FDF) on the device starts. The file delivery framework on the device may expire a broadcast schedule message (BSM) a number of seconds (e.g., FDF_BSM_EXPIRY_TIME) after it has been processed. The file delivery framework on the device may cancel a previously scheduled download if it is no longer specified in the latest broadcast schedule message. The server may set the next monitoring time in the local-area and wide-area broadcast schedule messages to be the same value. The server may set the next monitoring time for broadcast schedule flow 70 to be a number of seconds (e.g., BSF_MONITORING_ADVANCE_TIME) prior to the corresponding broadcast schedule period start time. A receiver device may receive the updated broadcast schedule message on the broadcast schedule flow 70 when the version of a broadcast schedule message (e.g., BSM_VERSION) for a given multiplex in the directory information message (DIM) received from the initial acquisition flow (IAF) is different from the version of the latest broadcast schedule message for the same multiplex the device has processed.

In various embodiments, the server may set the initial acquisition flow's (IAF) next monitoring time a number of seconds (e.g., BSF_MONITORING_ADVANCE_TIME) ahead of the start time of the next broadcast schedule period (BSP). The server may broadcast an updated broadcast schedule message before bumping up the version identifier (e.g., BSM_VERSION) for it in the directory information message (DIM) at the next monitor time. The receiver device may process a broadcast schedule message received on a broadcast schedule flow 70, if its version identifier (e.g., BSM_VERSION) is equal to the version identifier of the same broadcast schedule flow 70 in the latest directory information message. The device may save a broadcast schedule message received on a broadcast schedule flow 70 if its BSM_VERSION is equal to the BSM_VERSION for the same broadcast schedule flow 70 in the latest directory information message. When the device moves to a new multiplex, it may receive the broadcast schedule flow 70 on the new multiplex.

Figure 19:
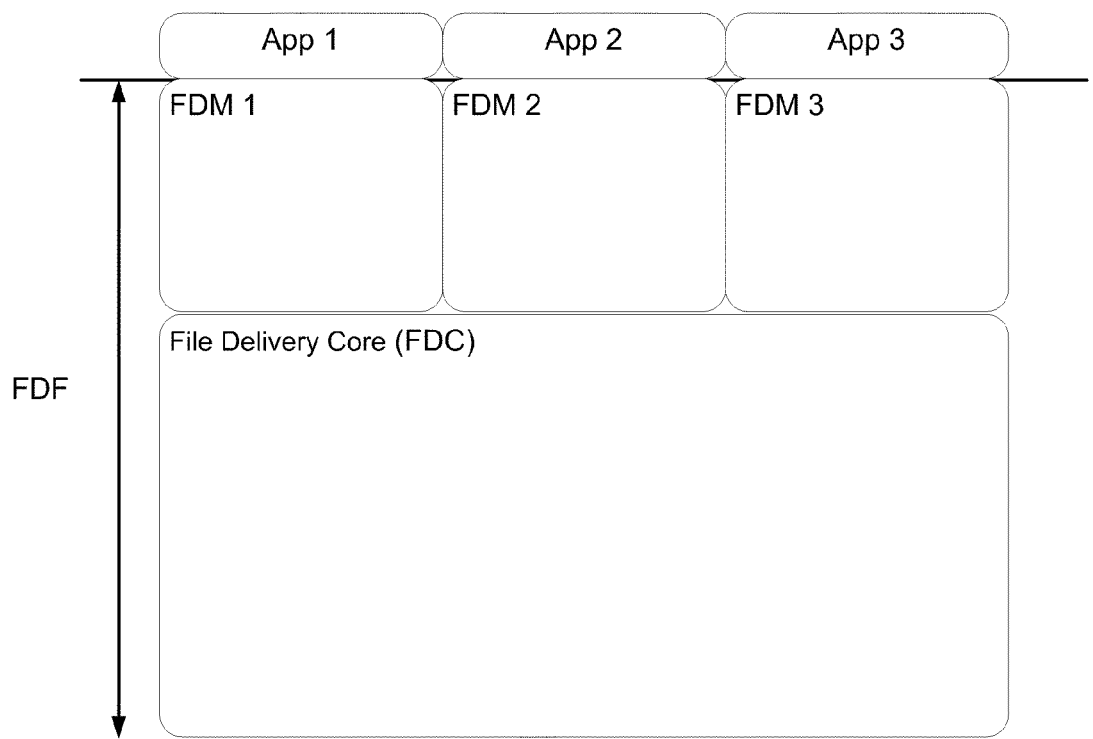
FIG. 19 is a system block diagram illustrating a layered view of the file delivery framework (FDF) on a receiver device.

FIG. 19 illustrates a software architecture of the file delivery framework (FDF) on a receiver device. Specifically, FIG. 19 illustrates that the file delivery framework may include a file delivery core (FDC) layer and a file delivery file management (FDM) layer. The file delivery core may be responsible for transporting data (e.g., processing BSFs), receiving data from the data flow, and performing various other functions on the received data (e.g., FEC decoding). The file delivery file management layer may be responsible for managing the data received by file delivery core layer as files. Since file management is device platform dependent (e.g., Linux and Windows Mobile have different file name conventions), in various embodiments, each application may be its own instance of a file delivery file management layer. This allows universal mobile receiver (UMR) devices, on which the file delivery core runs, to work with applications on different types of devices.

Figure 20:
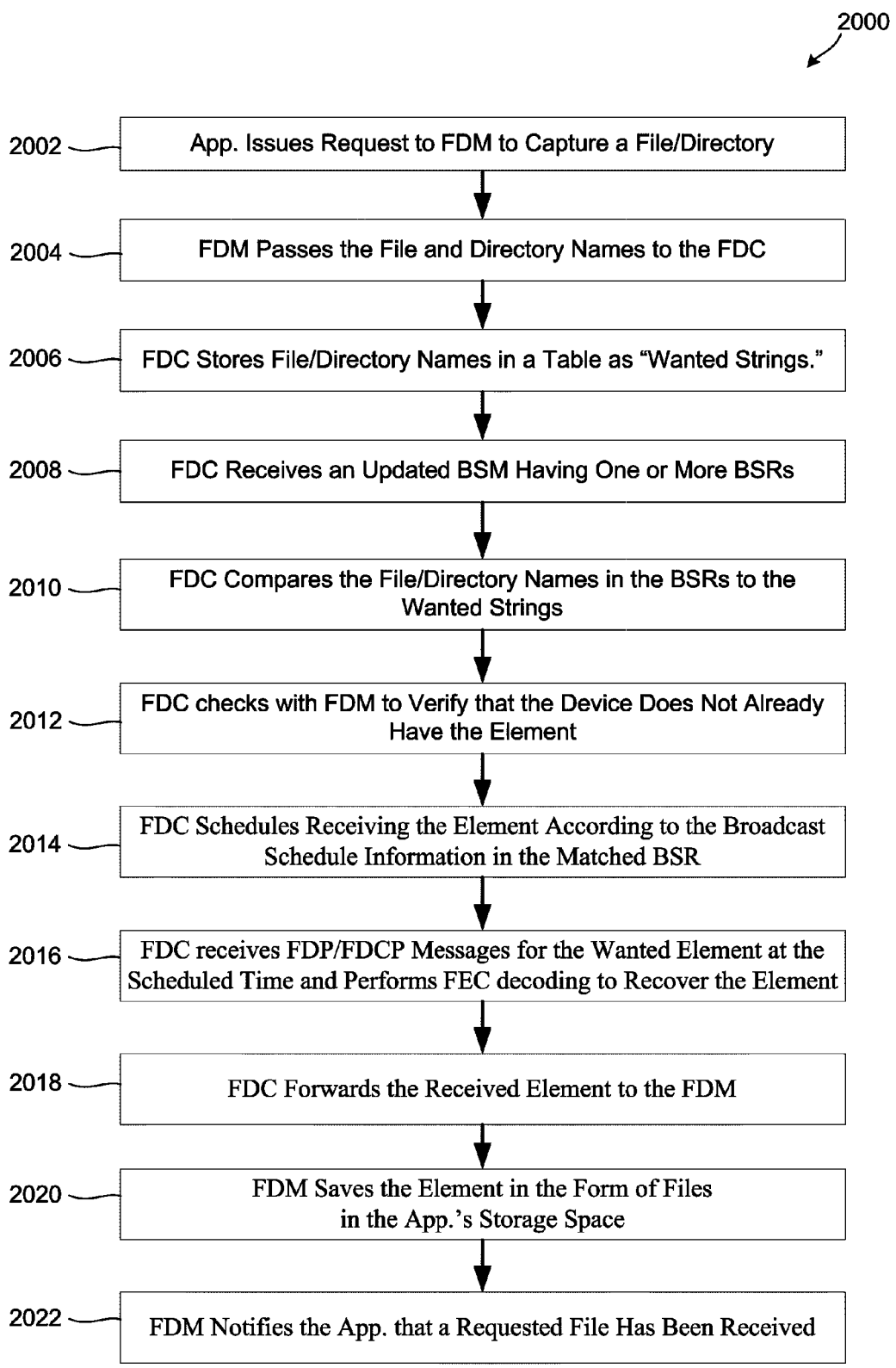
FIG. 20 is a process flow diagram of an embodiment method for implementing a file delivery framework (FDF) that supports file sharing across the different applications.

FIG. 20 illustrates an embodiment method 2000 for implementing a file delivery framework that supports file sharing across the different applications. FIG. 20 illustrates that, in step 2002, an application may issue a request to the file delivery file management layer to capture a file or directory. This capture request could be a "capture once" request or an "auto-capture" request. In step 2004, the file delivery file management layer passes the file and directory names to the file delivery core, where the file delivery core stores them in a table as "wanted strings."

In step 2006, the file delivery core may receive an updated broadcast schedule message (BSM) from the broadcast schedule flow (BSF) having one or more broadcast schedule records (BSRs), one for each element broadcasted in the corresponding broadcast schedule period (BSP). In step 2008, the file delivery core compares the file/directory names in the broadcast schedule record to the wanted strings, for each broadcast schedule record. If there is a match, in step 2010, the file delivery core may check with the file delivery file management (FDM) layer to see if the device already has the element identified by the element ID in the matched broadcast schedule record. If not, in step 2014, the file delivery core (FDC) may schedule receiving the element according to the broadcast schedule information in the matched broadcast schedule record (BSR). In step 2016, the file delivery core may receive one or more file delivery protocol (FDP) and/or file delivery control protocol (FDCP) messages for the wanted element at the scheduled time, and perform forward error correction (FEC) decoding to recover the element data. In step 2018, the file delivery core may forward the received element to the file delivery file management layer. In step 2020, the file delivery file management layer may save the element (in the form of files) in the application's storage space, in accordance with the application's storage policy. In various embodiments, the file delivery file management layer may also maintain various pieces of additional information, such as the memory location where the element is stored and the element's ID. In step 2022, the file delivery file management may notify the application that a file has been received for it.

Figure 21:
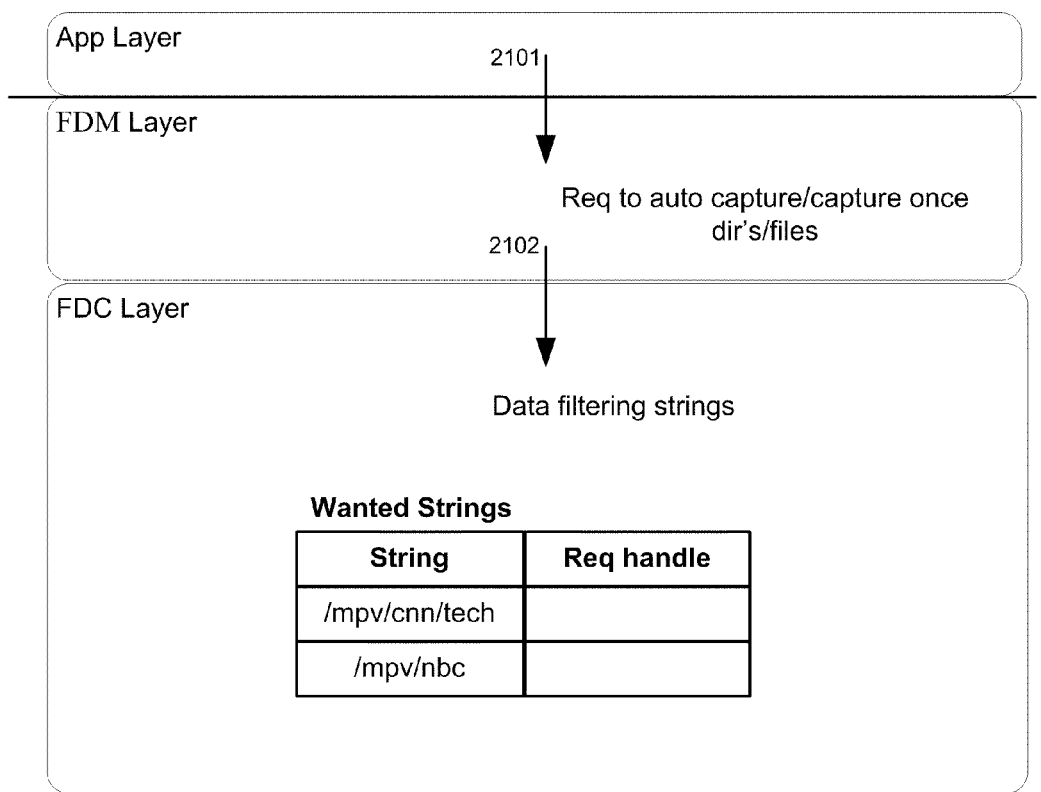
FIG. 21 is a system block diagram illustrating the structure, dataflow and high-level steps that may be used to share files across different applications.
Figure 22:
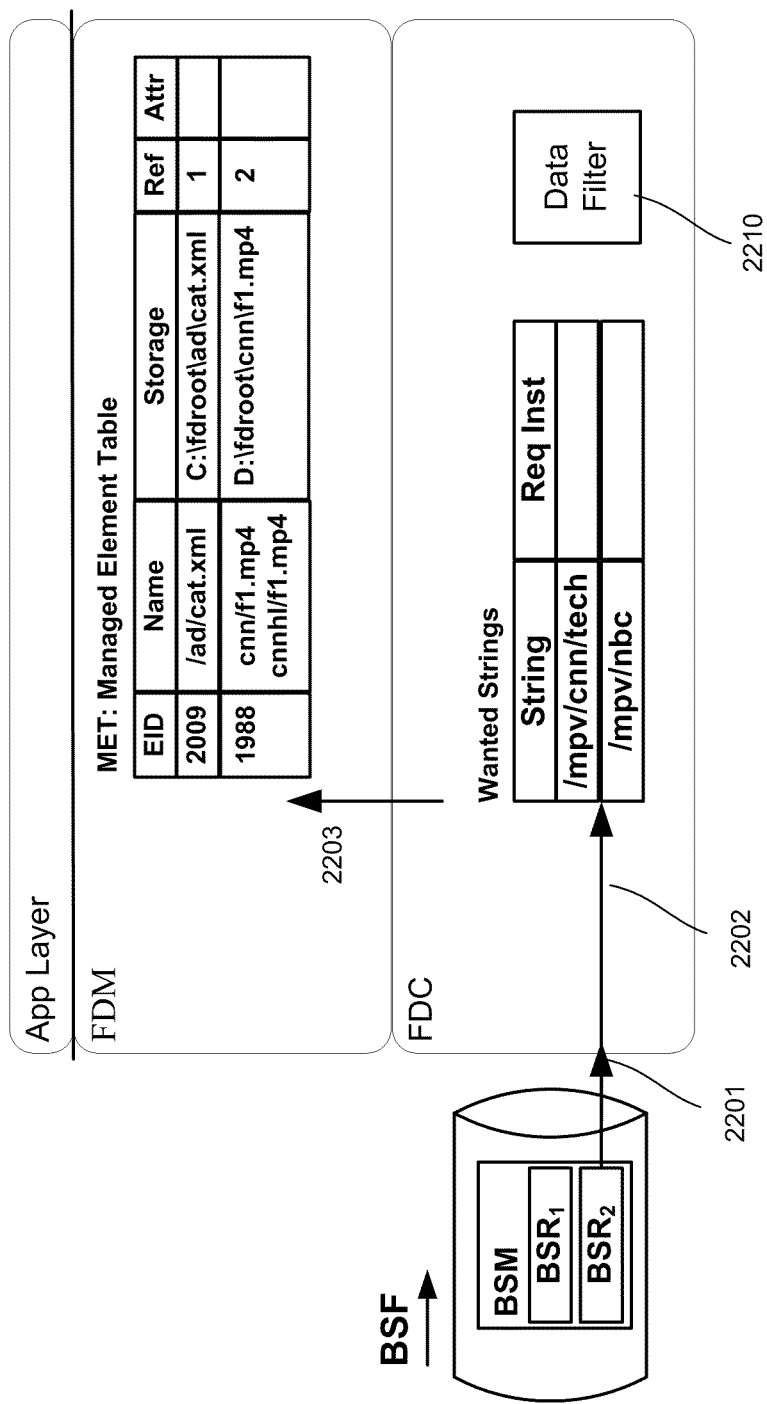
FIG. 22 is a system block diagram illustrating the structure and dataflow of a file delivery framework (FDF) on a receiver device, and the decision process by which the file delivery framework chooses to receive or decline a file.
Figure 23:
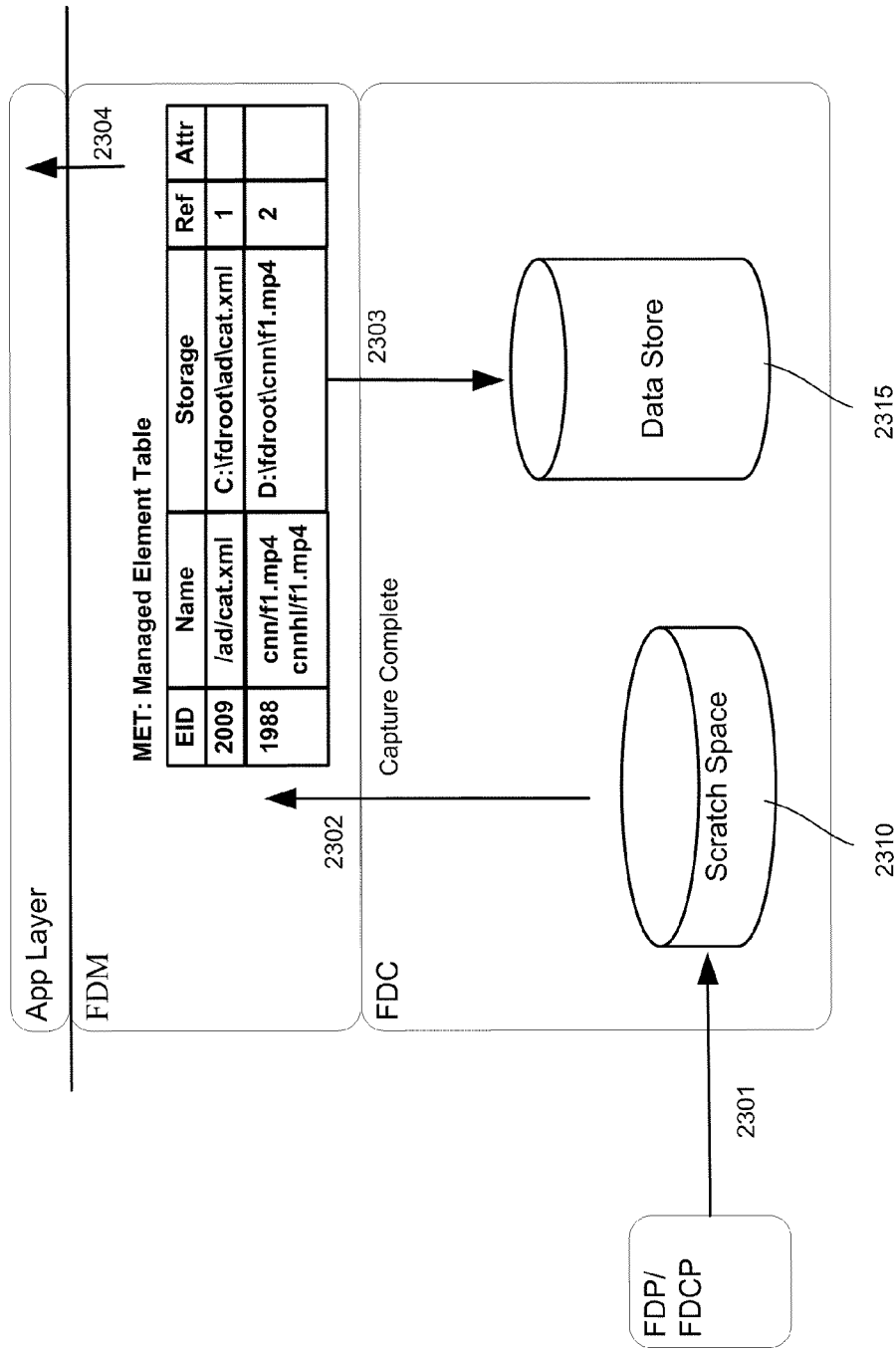
FIG. 23 is a system block diagram illustrating a structure and dataflow of a file delivery framework (FDF) on a receiver device, and a process by which the file delivery framework on a receiver device receives and stores files.

FIGS. 21-23 are software architecture diagrams illustrating the structure and dataflow of a file delivery framework (FDF) on a receiver device. FIG. 21 illustrates the structure, dataflow and high-level steps that may be used by the framework to manage the interaction between the different layers and to keep track of and maintain a "wanted strings" table. Specifically, FIG. 21 illustrates an embodiment function partitioning between the file delivery file management (FDM) layer and file delivery core (FDC) layer, in which the file delivery file management layer passes application requests to the file delivery core layer. For example, FIG. 20 illustrates that an application may issue a request (arrow 2101) for the file delivery file management layer to capture a file once, or auto-capture a file or directory. This request 2001 corresponds to step 2002 described above with reference to FIG. 20. In the embodiment illustrated in FIG. 21, the files and directories are specified by their names. In other embodiments, the files and directories may be specified by using a variety of naming and/or identification conventions, some examples of which are discussed below.

Referring to FIG. 21, once a request is issued by an application, the file delivery framework (FDF) may maintain the name of the file or directory requested to be captured once (e.g., via a Capture_Once command) until the file or some files in the directory are successfully received. The file delivery framework may also maintain the name of the file or directory requested by an application to be automatically captured (e.g., via an Auto_Capture command) until the application cancels the request. The file delivery file management layer may pass (arrow 2102) the file and directory names to the file delivery core. The file delivery core may store the file and directory names in a table as "wanted strings."

FIG. 22 illustrates the structure and dataflow of a file delivery framework (FDF) on a receiver device, and the decision process by which the file delivery framework chooses to receive a file. For example, the file delivery core (FDC) layer may receive (arrow 2201) an updated broadcast schedule message (BSM) from the broadcast schedule flow (BSF). The broadcast schedule message may have one or more broadcast schedule records ($BSR_1$, $BSR_2$), one for each element broadcasted in the corresponding broadcast schedule period (BSP). A broadcast schedule record may contain an element ID for a corresponding element, one or more file/directory names for file(s) in the element, and broadcast schedule information. The file delivery core may compare (arrow 2202) the file/directory names in the broadcast schedule record to the wanted strings for each broadcast schedule record. If there is a match, the file delivery core may check with the file delivery file management layer (arrow 2203) to see if the device already has the element identified by the element ID in the matched broadcast schedule record. If not, the file delivery core may schedule receiving the element according to the broadcast schedule information in the matched broadcast schedule record. It should be noted that, in various embodiments, different versions of a file may have different element IDs. It should also be noted that, in various embodiments, filtering, based on the element IDs, may be used to enable the file delivery framework to receive updates to files that already exist on the device, as discussed in more detail below.

FIG. 22 also illustrates that, in various embodiments, the file delivery file management (FDM) layer may maintain a managed element table (MET). The managed element table may contain information about all the elements received by the file delivery framework. In various embodiments, the managed element table may also contain various pieces of additional information, such as element IDs, file names, aliases (in embodiments where an element can have multiple file names), storage names, and other attributes. The managed element table is discussed in more detail below with reference to FIGS. 40 and 57.

Returning to FIG. 22, in various embodiments, the file delivery file management (FDM) layer may maintain a wanted string table (e.g., Wanted Strings). The wanted string table may include various pieces of information, such as a file or directory name requested by an application (e.g., String). The wanted string table may also include a request handle (e.g., Req Inst) that uniquely identifies a request from the application. In various embodiments, the file delivery core may use the request handle to identify the file delivery file management layer instances that should be notified when the file delivery core receives an element matching a particular request.

FIG. 22 also illustrates that the file delivery core (FDC) may receive updated broadcast schedule messages (BSMs) on the broadcast schedule flow (BSF). The file delivery core also may have a data filtering unit 2210 that selectively receives only the elements the applications are interested in. That is, the data filtering unit 2210 may be responsible for selectively receiving the elements the applications have registered to receive, as determined by the broadcast schedule message. In various embodiments, the data filtering unit may process flow broadcast schedule records (FBSRs) in a latest broadcast schedule message to determine whether any of the elements that the applications are interested in will be broadcasted. In various embodiments, the data filtering unit may use the flow broadcast schedule records, along with the broadcast schedule information contained within the broadcast schedule message, to schedule the receiver devices downloading of the elements that the applications are interested in. In various embodiments, the file delivery core may use this schedule to wake up the receiver circuitry at the scheduled time to receive the elements in which the applications are interested.

FIG. 23 illustrates an example structure and dataflow of a file delivery framework (FDF) on a receiver device, and the process by which the file delivery framework on a receiver device may receive and store files. In the illustrated example, the file delivery core (FDC) receives FDP/FDCP messages (arrow 2301) for a wanted element at a scheduled time, and stores it in a scratch space 2310. In some embodiments the file delivery core may also perform forward error correction decoding on the FDP/FDCP messages (carrying FEC encoded symbols and FEC encoding information, respectively) to recover the element data. The file delivery core may forward (arrow 2302) the received element to the file delivery file management (FDM) layer. The file delivery file management layer may save the element (arrow 2303) in the form of files in the application's storage space 2315, in accordance with the application's storage policy. In various embodiments, the file delivery file management layer may also maintain various pieces of information, such as where the element is stored (Storage) and the element's ID (EID). After saving the element in the application's storage space, the file delivery file management layer may notify the application (arrow 2304) that a file has been received for the application.

Figure 24:
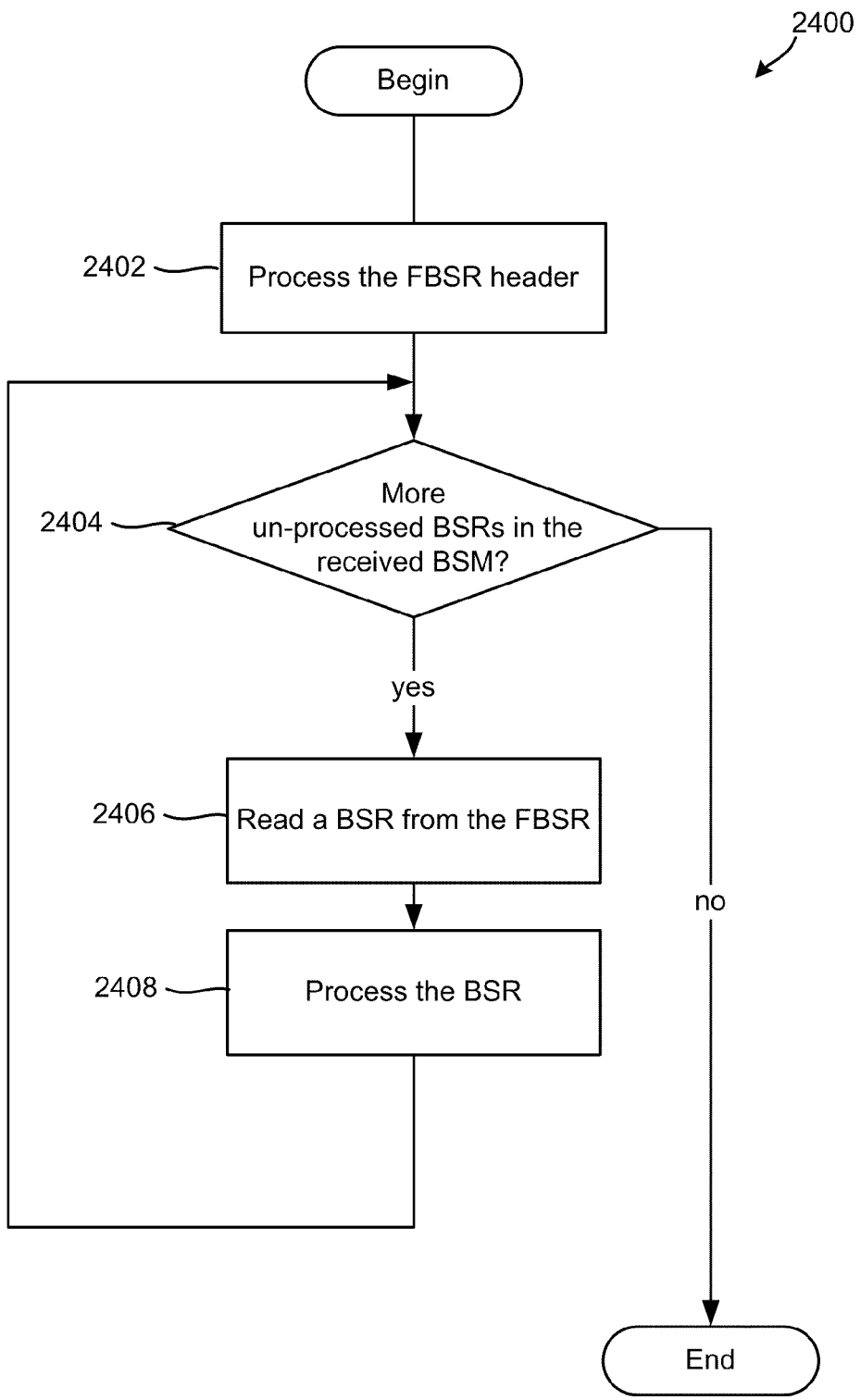

FIG. 24 illustrates an embodiment method 2400 for implementing the data filtering unit 2210 in the file delivery core to selectively receive only the elements that the applications are interested in, with reception determined based on information in the broadcast schedule messages. In step 2402, the data filtering unit 2210 processes the flow broadcast schedule record (FBSR) headers to identify broadcast schedule records (BSRs) names or characteristics. In determination step 2404, the data filtering unit 2210 may determine if there are any un-processed broadcast schedule records of interest (i.e., records satisfy naming conventions or selection criteria specified by requesting applications) in the received broadcast schedule message. If not (i.e., determination step 2404="no"), the data filtering unit 2210 may shut down. However, if there are unprocessed broadcast schedule records of interest (i.e., determination step 2404="yes"), in step 2406, the data filtering unit 2210 may read the unprocessed broadcast schedule records from the flow broadcast schedule record body (e.g., FBSR body). In step 2408, the data filtering unit 2210 may process the broadcast schedule records, and return to determination step 2404 to determine if all the flow broadcast schedule records of interest have been processed. This process may continue until all the flow broadcast schedule records of interest have been processed (i.e., determination step 2404="no").

Figure 25:
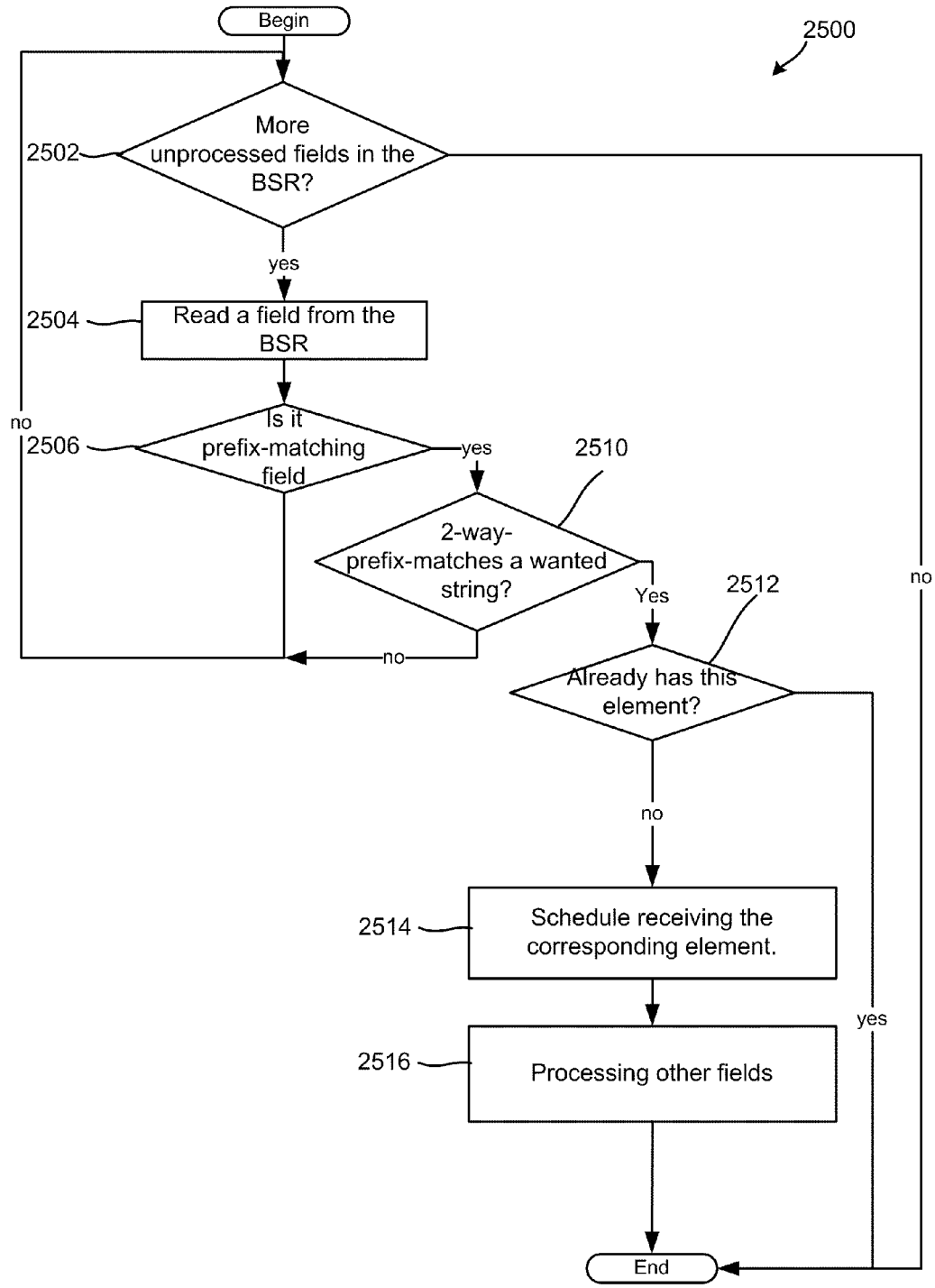
FIG. 25 is a process flow diagram of an embodiment method for processing broadcast scheduling records.

FIG. 25 illustrates an embodiment method 2500 for processing the broadcast schedule records in a flow broadcast schedule record. In determination step 2502, the data filtering unit 2210 of a file delivery core determines if there are any unprocessed fields in the broadcast schedule record. If so (i.e., determination step 2502="yes"), the file delivery core determines if it should receive the element described by the broadcast schedule record. In various embodiments, the file delivery core may decide to receive an element whenever: the corresponding broadcast schedule record has at least one attribute string that two-way-token-prefix-matches a wanted string; the element doesn't exist in file delivery core's scratch space; and the element does not exist in the application's storage space. The process by which the fide delivery core decides to receive an element is discussed in more detail below.

Returning to FIG. 25, determining whether an element should be received may begin in step 2504 with the data filtering unit 2210 reading a field of interest from an unprocessed broadcast schedule record. In determination step 2506, the data filtering unit 2210 may determine if the field of interest, or element, is a prefix-matching field. If the element is not a prefix-matching field (i.e., determination step 2506="no"), the data filtering unit 2210 may return to determination step 2502 to determine if there are any more unprocessed fields in the broadcast schedule record. However, if the field of interest is a prefix-matching field (i.e., determination step 2506="yes"), in determination step 2510, the data filtering unit 2210 may determine if the element "two-way-token-prefix-matches" a wanted string.

In various embodiments, string s1 "two-way-token-prefix-matches" string s2 whenever s1 is a token-prefix of s2 or s2 is a token-prefix of s1. In various embodiments, the token-prefix match in the file delivery framework may be based on tokens that are defined as the components in the file, or on tokens that are defined as directory names that are separated by the slash "/" punctuation character. For example, in such embodiments, the file name "/cnn/tech/f1.mp4" will be determined to have three tokens: cnn; tech; and f1.mp4. Thus, the file delivery framework may consider string s1 is a prefix of string s2 if any the following are true: s1 has tokens t1, 1, t1, 2, ..., t1, K; s2 has tokens t2, 1, t2, 2, t2, 3, ..., t2, L; k is less than or equal to L; t1, j is equal to t2, j for j=1, 2, ..., K. In these embodiments, if the broadcast schedule record indicates that a file is broadcasted for "/cnn/tech/" and the application wants any files under "/cnn/"—the file delivery core should receive the file broadcasted for /cnn/tech/. Likewise, if the broadcast schedule record indicates a file is broadcasted for "/cnn" and the application wants any files under "/cnn/tech/" then the file delivery core should receive the file broadcasted for /cnn, so as to avoid missing any files that may be under "/cnn/tech/". In an embodiment, all the string matches may be case sensitive. In an embodiment, the file delivery core may apply the same string matching algorithm regardless of whether the broadcast schedule record is for a file or for a file bundle.

Returning to FIG. 25, if the 2-way-prefix-matches a wanted string (i.e., determination step 2510="yes"), the flow may proceed to determination step 2512 in which the data filtering unit 2210 may determine if the file delivery file management (FDM) layer already contains the element. If so (i.e., determination step 2512="yes"), the processing stops. If the file delivery file management layer does not contain the element (i.e., determination step 2512="no"), the data filtering unit 2210 may schedule receiving the corresponding element in step 2514, if it has not already been scheduled. In various embodiments, the corresponding element may be scheduled according to the broadcast schedule record (e.g., BCAST_SCHEDULE_RECORD) on the flow id (e.g., FLOW_ID). In step 2516, the data filtering unit 2210 may process the other fields in the broadcast schedule record.

Figure 26:
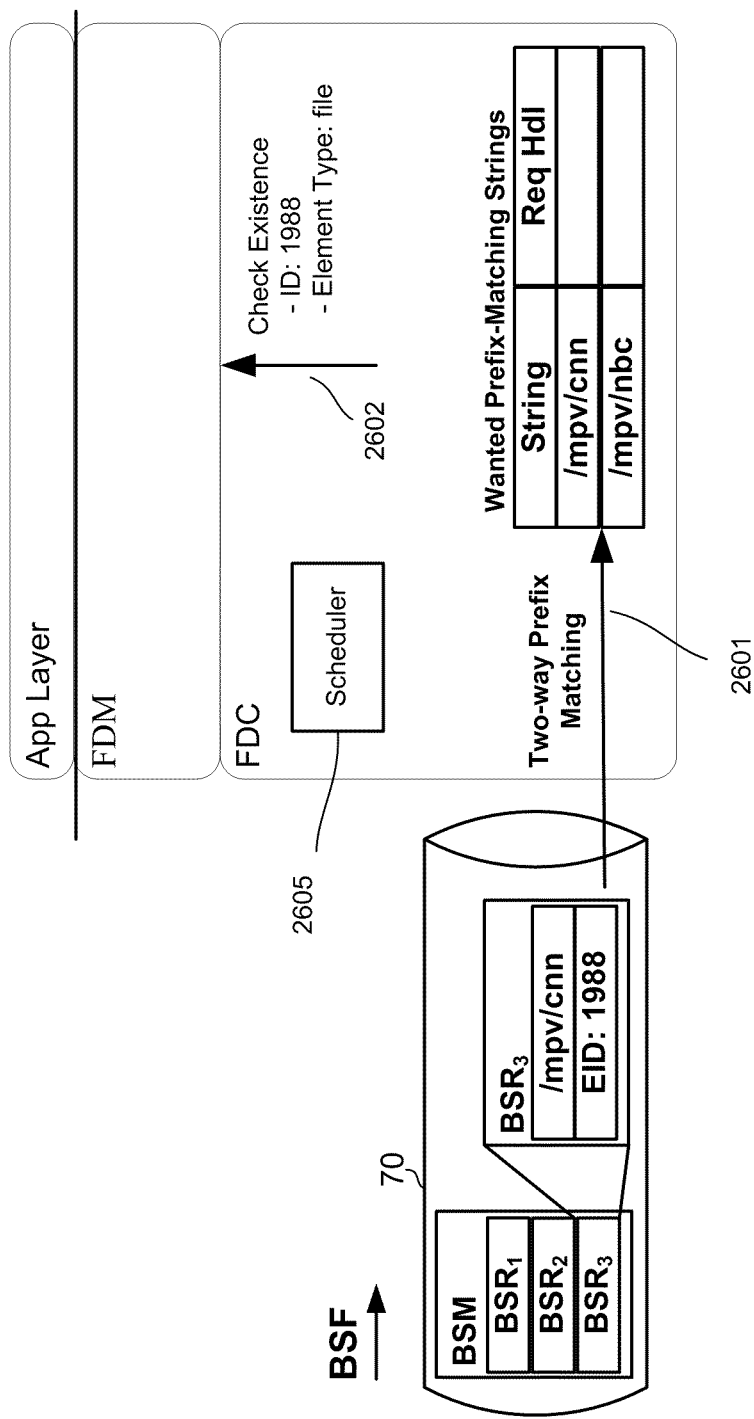
FIG. 26 is a system block diagram illustrating a structure and dataflow of a file delivery framework (FDF) on a receiver device, and a process by which broadcast schedule records are processed.

FIG. 26 illustrates the structure and dataflow of a file delivery framework (FDF) on a receiver device, and the process by which broadcast schedule records may be processed. As discussed above, the file delivery core (FDC) may receive an element if the corresponding broadcast schedule record (BSR) has at least one attribute string that two-way-token-prefix-matches a wanted string, and the element doesn't exist in file delivery core's scratch space. Arrow 2601 illustrates the dataflow and process by which the data filtering unit 2210 of the file delivery core reads an element from an unprocessed broadcast schedule record, determines if the element is a prefix-matching field, and determines if the element two-way-token-prefix-matches a wanted string. Arrow 2602 illustrates the dataflow and process by which the data filtering unit 2210 of the file delivery core determines if the file delivery file management (FDM) layer already contains the element. If the file delivery file management layer does not contain the element, the file delivery core may schedule receiving the corresponding element, if it has not already been scheduled. If the decision is to receive the element, a scheduler 2605 in the file delivery core may schedule receiving the element at the broadcast window specified in the broadcast schedule record. In various embodiments, the file delivery framework on the receiver device may schedule receiving the element described by a broadcast schedule record if the broadcast schedule record has at least one attribute string that two-way-token-prefix-matches a file or directory name requested by applications, and the element does not already exist on the device.

Figure 27:
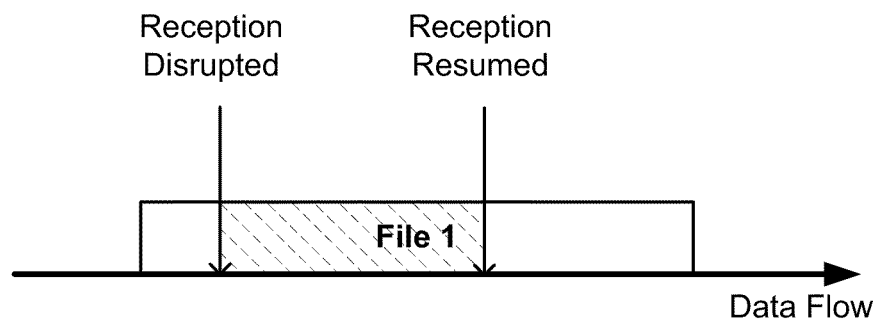
FIG. 27 is a system block diagram illustrating an embodiment method for the reception of files on the file delivery framework.

FIG. 27 is a timeline diagram illustrating a situation in which reception of a file is disrupted during the time the file is being broadcast. In the various embodiments, by storing the partial file in the scratch space 2310, the file delivery core can wait for the file transfer to resume and make a second determination as to the feasibility of applying the forward error correction code on the downloaded files.

Figure 28:
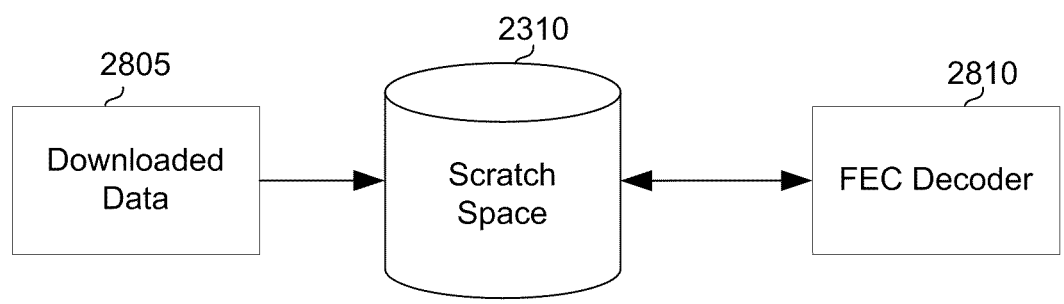
FIG. 28 is a system block diagram illustrating a structure, dataflow of a scratch space management, and a process that may be implemented in a file delivery core (FDC).

FIG. 28 illustrates how downloaded data 2805 may be passed to and stored in a scratch space memory 2310. As discussed above, the file delivery core may have a scratch space memory 2310 for storing downloaded files before applying forward error correction (FEC) decoding on the downloaded files, as well as for holding decoded files. In various embodiments, the file delivery core stores unfinished downloads, finished but un-decoded downloads, and decoded downloads in the scratch space 2310.

In a variety of situations, the scratch space 2310 may store unfinished downloads. For example, the downloaded data be stored in the scratch space for forward error correction decoding (i.e., the download is unfinished). In the various embodiments, the downloaded data may be kept in the scratch space 2310 until the broadcast is over, which may accommodate situations of interrupted data reception as illustrated in FIG. 27.

As discussed above, the scratch space 2310 may also store finished but un-decoded downloads. That is, in various situations, downloads may have enough data for successful forward error correction (FEC) decoding but the forward error correction decoding has not been completed yet (i.e., the downloads are finished but un-decoded). In these situations, the file delivery core may store these files in the scratch space until they can be decoded. In some embodiments, to limit processor usage, the forward error correction decoder may decode one file a time. In some embodiments, the forward error correction decoder may be prevented from decoding a file when the device is downloading file delivery data. In some embodiments, the scratch space 2310 may store decoded downloads that have not yet been delivered to the requesting application.

In an embodiment, the scratch space 2310 may be located on the internal memory of the receiving device. In other embodiments, receiver devices may have a scratch space 2310 on both internal and external memories. In these embodiments, the file delivery framework application may have both an internal memory storage policy as well as an external memory storage policy. In various embodiments, the file delivery core may use the internal scratch space for those applications that use the internal memory storage policy, and use the external scratch space for those applications that use the external memory storage policy.

In various embodiments, the scratch space management policies may include policies and functions for moving data among various memory locations. The scratch space management policies may include functions to move successfully decoded elements from the scratch space 2310 to application storage space. The scratch space management policies may include functions to periodically delete useless data on the scratch space 2310. The scratch space management policies may include functions to delete data on the scratch space 2310 when the scratch space 2310 runs out of, or is about to run out of, space. The file delivery framework on the device may use the scratch space 2310 in the internal memory or external memories for various applications. The file delivery framework on the device may use the scratch space 2310 in the internal memory for applications that use the internal memory storage policy. The file delivery framework on the device may use the scratch space 2310 in the external memory for applications that use the external memory storage policy. The file delivery framework on the device may use the scratch space 2310 with any combination of internal and external memories and storage policies.

Figure 29:
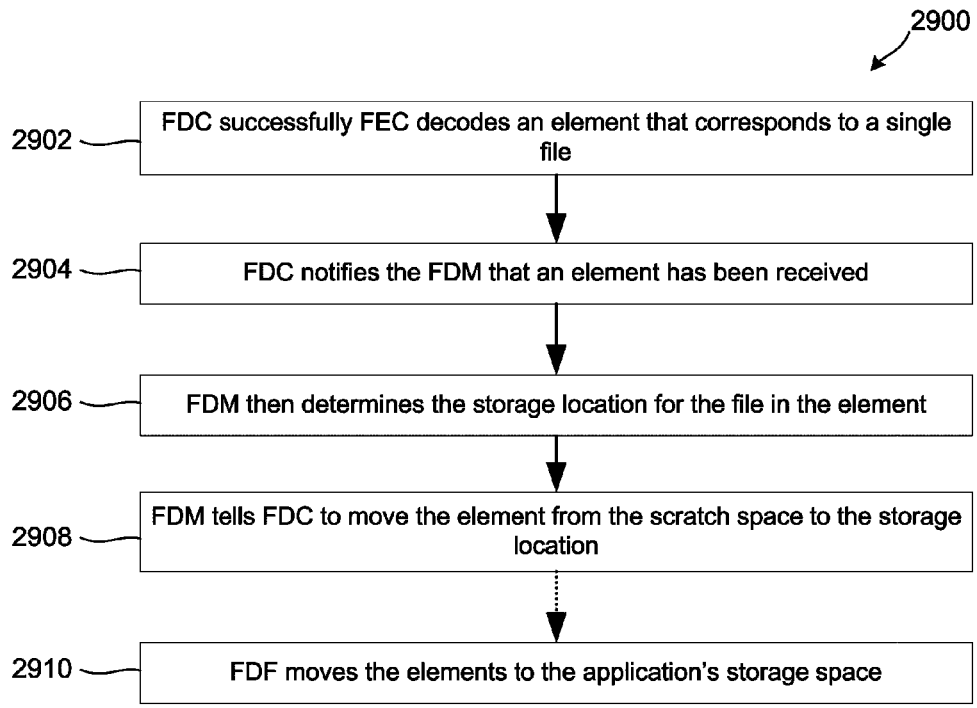
FIG. 29 is a process flow diagram of an embodiment method for processing and storing elements.

FIG. 29 illustrates an embodiment method 2900 for processing and storing elements. In step 2902, the file delivery core successfully forward error correction (FEC) decodes an element that corresponds to a single file. In step 2904, the file delivery core may notify the file delivery file management (FDM) layer that an element has been received. In step 2906, the file delivery file management layer may determine the storage location for the file in the element. In step 2908, the file delivery file management layer may direct the file delivery core to move the element from the scratch space 2310 to the storage location. In step 2910, the file delivery framework on the device may move the elements to the application's storage space 2310 after successfully receiving elements for an application, if there is enough space in the application's storage space.

In various embodiments, the file delivery core may periodically delete useless data on the scratch space. In various embodiments, the file delivery core may periodically clean up the scratch space by deleting the data in unfinished downloads whose broadcasts have ended and there is no unicast fallback mechanism for them. In various embodiments, the file delivery core may periodically clean up the scratch space by deleting the data in successfully decoded elements that failed to be moved to application storage space and have been in the scratch space for a number of seconds indicated by a device provision parameter (e.g., FDF_MAX_ELEMENT_TIME_IN_SCRATCH_SPACE). In various embodiments, the clean-up period may be controlled by a device configuration parameter, such as FDF_SCRATCH_SPACE_CLEAN_UP_PERIOD. In various embodiments, the periodic scratch space clean-up mechanism may keep a footprint of the scratch space small. In an embodiment, the file delivery framework deletes unfinished download data (data is not enough for successful FEC decoding) whose broadcasts have ended and there is no unicast fallback for them, once every few (e.g., FDF_SCRATCH_SPACE_CLEAN_UP_PERIOD) seconds. In an embodiment, the file delivery framework deletes data that was successfully decoded more than a variable number of seconds (e.g., DF_MAX_ELEMENT_TIME_IN_SCRATCH_SPACE seconds) ago and failed to be moved to the application storage space.

In various embodiments, the file delivery core may determine that it has run out of scratch space if the scratch space size reaches an upper threshold limit. The file delivery core may also determine that it has run out of scratch space if the memory space where the scratch space resides is full. In an embodiment, the internal scratch space upper limit may be specified by an original equipment manufacturer (OEM) provisioning device parameter (e.g., FDF_MAX_INTERNAL_SCRATCH_SPACE_SIZE). If the OEM provisioning device parameter (e.g., FDF_MAX_INTERNAL_SCRATCH_SPACE_SIZE) is absent, the receiver device may use the parameter's default value as the internal scratch space upper limit. In various embodiments, the external scratch space upper limit may be specified by a device debug parameter, such as FDF_MAX_EXTERNAL_SCRATCH_SPACE_SIZE.

Figure 30:
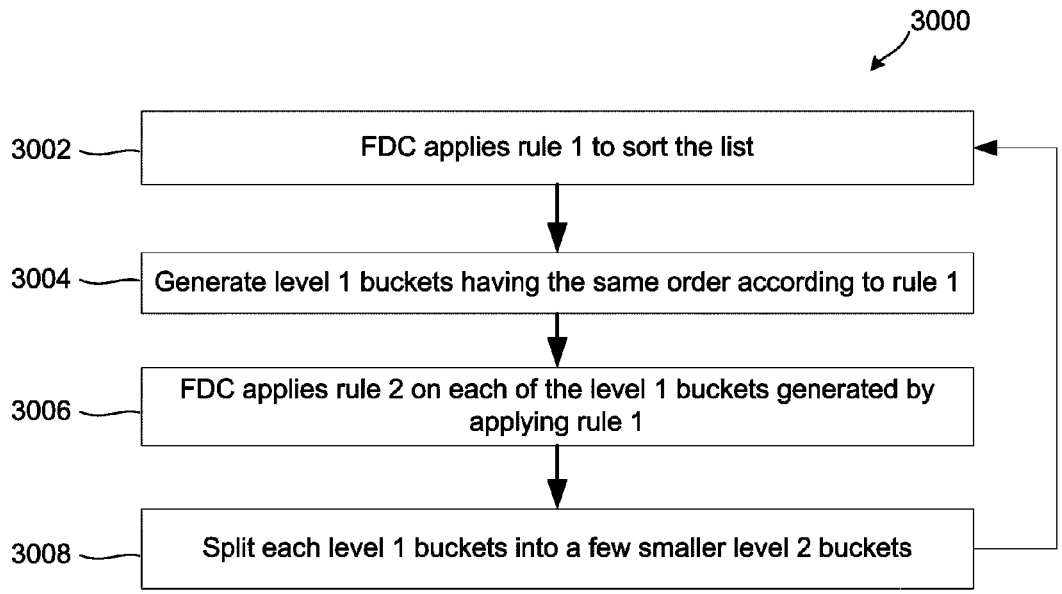
FIG. 30 is a process flow diagram of an embodiment method for selecting items to delete from the scratch space.

FIG. 30 illustrates an embodiment method 3000 for selecting items to delete from the scratch space memory. In various embodiments, the file delivery core use a series of rules to determine when data needs to be deleted from the scratch space and which data should be deleted. For example, the file delivery core may use a number of prioritized rules (ex. rule 1 and rule 2) to determine which data should be deleted, in which the rules are implemented in a priority order (e.g., rule 1 has higher priority than rule 2). For example, the first rule (Rule 1) may be that decoded elements have the highest priority, while the second rule (Rule 2) may be that finished downloads have higher priority than unfinished downloads. In various embodiments, the file delivery core may maintain a sorted list with an entry for each data piece in the scratch space. In various embodiments, the file delivery core may use the prioritized rules (e.g., Rule 1 and Rule 2) to sort the list such as illustrated in FIG. 30.

In step 3002 of FIG. 30, the file delivery core may apply the first rule (Rule 1) to sort the list. In step 3004, the file delivery core may create a few level 1 buckets, so that entries in the same level (e.g., level 1) bucket have the same order or priority according to the first rule (e.g., Rule 1). In step 3006, the file delivery core may apply a second rule (e.g., Rule 2) to each of the first level (e.g., level 1) buckets generated in step 3004. This will split each of the first level (e.g., level 1) buckets into a few smaller second level buckets, as illustrated in step 3008. This may result in the entries in the same level (e.g., level 2) buckets having the same order or priority according to the first and second rules (e.g., Rule 1 and Rule 2). In an embodiment, this process may be continued until the all the rules have been applied to the entries in the list of items stored in the scratch space.

Figure 31:
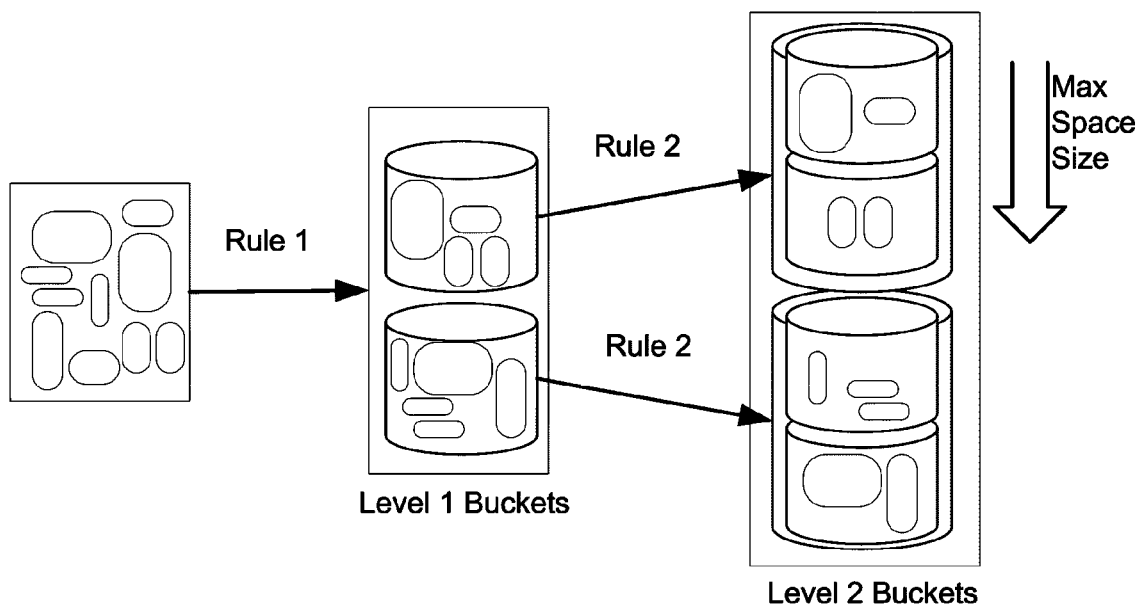
FIG. 31 is a system block diagram illustrating a structure and dataflow of an embodiment method of sorting and organizing data.

FIG. 31 illustrates the application of method 3000 to a list of list of items stored in the scratch space. Specifically, FIG. 31 illustrates that the first rule (e.g., Rule 1) may be applied to all data in the scratch space that is eligible for deletion. The application of the first rule separates the data in the scratch space into a number of first level buckets (Level 1 Buckets). The second rule (e.g., Rule 2) is then applied to each of the first level buckets to further separate the data into a number of second level buckets (Level 2 Buckets). In an embodiment, the second level buckets may be organized in accordance with their maximum space sizes.

In various embodiments, the file delivery core may determine if it will run out of scratch every time the file delivery core receives data from the data flow for an element, and again when a finished but un-decoded download in the scratch space is selected for forward error correction (FEC) decoding. The latter check may be necessary because encoded elements of different sizes may require different amounts of temporary memory in the scratch space for forward error correction decoding.

In various embodiments, if the file delivery core detects that it will run out of scratch space, it may delete data with the lowest order in the sorted list. The file delivery core may continue to delete data until the new space requirements can be met. In various embodiments, if there are multiple data units that have the lowest order, the file delivery core may randomly pick one or more to delete. If an unfinished download needs to be deleted and its download is still ongoing, the FDF may abort the download before the deletion. When the file delivery core starts to download an element, it may add an entry for it to the sorted list. If an element that is being downloaded is chosen to be deleted due to running out of scratch space, the file delivery framework may cancel its download.

In various embodiments, the file delivery framework on the device may determine that it will run out of the internal scratch space based on whether the internal scratch space size in bytes is equal to or greater than an OEM provisioning device parameter (e.g., FDF_MAX_INTERNAL_S-CRATCH_SPACE_SIZE). In an embodiment, if the OEM provisioning device parameter (e.g, FDF_MAX_INTERNAL_SCRATCH_SPACE_SIZE), is absent on the device, the device may use the parameter's default value as the upper limit of the internal scratch space. In an embodiment, the file delivery framework on the device may determine that it will run out of the external scratch space based on whether the external scratch space size is equal or greater than a device debug parameter (e.g., FDF_MAX_EXTERNAL_S-CRATCH_SPACE_SIZE). In an embodiment, the file delivery framework on the device may determine that it will run out of scratch space based on whether the memory card where the scratch space resides runs out of space. In an embodiment, the file delivery framework on the device may check to determine if it will run out of the internal scratch space when it receives data from the data flow for an application that uses internal memory storage policy. In an embodiment, the file delivery framework on the device may check to determine if it will run out of the external scratch space when it receives data from the data flow for an application that uses external memory storage policy. In an embodiment, the file delivery framework on the device may check to determine if it will run out of scratch space when it starts to forward error correction (FEC) decode an element in the scratch space. In an embodiment, the file delivery framework on the device may stop writing data to the scratch space if it runs out of scratch space. In an embodiment, when detecting there is not enough scratch space for a new need, the file delivery framework on the device may delete only the minimum necessary amount data from the scratch space that enables the new storage requirement to be met. In an embodiment, when deleting data from the scratch space in response to running out of scratch space, the file delivery framework on the device may delete data that has the lowest order or priority as determined according to two rules: rule 1—decoded element has highest priority; and rule 2—the finished downloads have higher priority than the unfinished one, where rule 1 has higher priority than rule 2. In an embodiment, if an element that is being downloaded is chosen to be deleted in response to running out of scratch space, the file delivery framework on the device may cancel its download.

In various embodiments, the file delivery framework may use multiple file delivery data flows to fully support the demand for file delivery services. This may be the case when there are multiple multiplexes (e.g., a wide multiplex and a local multiplex, or more than one multiplex on multiple radio frequencies in a multi-frequency network deployment), and more than one of the multiplexes has one or more file delivery data flows. In various embodiments, these multiplexes may all use the same broadcast technology, such as MediaFLO® technology, different broadcast technologies (e.g., Media-FLO®, ISDB-T, etc.), or any combination of broadcast technologies.

Figure 32:
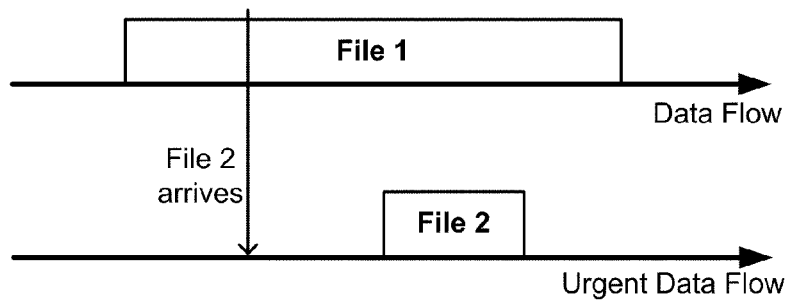
FIG. 32 is a timeline diagram illustrating how urgent files may be delivered concurrently on an urgent data flow.

As discussed above, the file delivery framework may use multiple file delivery data flows when there are multiple multiplexes. In an embodiment, the file delivery framework may also use multiple file delivery data flows when there is a single multiplex with more than one data flow. For example, FIG. 32 is a timeline diagram illustrating how multiple file delivery data flows may be used on a single multiplex having two data flows for carrying file transmissions. Specifically, FIG. 32 illustrates how a first data flow is provided to carry regular file transmissions and another data flow is provided to carry more urgent file transmissions. In this embodiment, if an urgent file (e.g., File 2) is received for transmission while a larger lower priority file (e.g., File 1) is being transmitted, the urgent file (i.e., File 2) can be transmitted on the urgent data flow without having to wait for the conclusion of the transmission of the other lower priority file (i.e., File 1). In this manner, the file delivery framework can accommodate low and high priority files, as well as prompt transmission of late arriving urgent files, while using a single multiplex.

Figure 33:
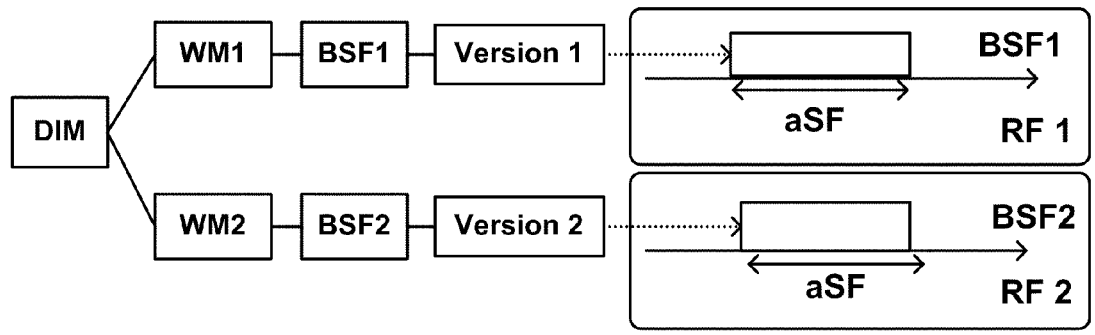
FIG. 33 is a message flow diagram illustrating how files may be processed for flow over separate broadcast service flows.

In various embodiments, the file delivery framework may include a broadcast schedule flow for each multiplex that has at least one file delivery data flow. As illustrated in FIG. 33, a broadcast schedule message broadcasted on the broadcast schedule flow may only describe broadcast schedules for the data flows on the respective multiplex. In other words, in various embodiments, there may only be one broadcast schedule message (BSM) per multiplex. Thus, in various embodiments, a single broadcast schedule message may carry broadcast schedule information for transmissions on different multiplexes. FIG. 33 illustrates how, in these embodiments, different versions (Version 1, Version 2) of broadcast schedule flows (BSF1, BSF2) on different multiplexes (WM1, WM2), or even on different broadcast networks, may be signaled by different records in a directory information message (DIM). Receiver devices may detect and receive updated broadcast schedule messages on a broadcast schedule flow (e.g., BSF1) independently of other broadcast schedule flows (e.g., BSF2). Thus, as illustrated in FIG. 33, a directory information message (DIM) may specify that a first wide multiplex (e.g., WM1) includes a first broadcast schedule flow (e.g., BSF1) of a first version (e.g., Version 1), and that a second wide multiplex (e.g., WM1) includes a second broadcast schedule flow (e.g., BSF2) of a second version (e.g., Version 2). In various embodiments, the broadcast schedule flows (e.g., BSF1, BSF2) may be broadcast simultaneously on different radio frequency networks (e.g., RF1, RF2). In various embodiments, the directory information message may be an overhead message carried in an initial acquisition flow (IAF) to provide bootstrapping information regarding which broadcast networks in which transport stream identifiers (e.g., a flow ID for a broadcast schedule flow) in those networks are used to carry broadcast schedule messages.

Figure 34:
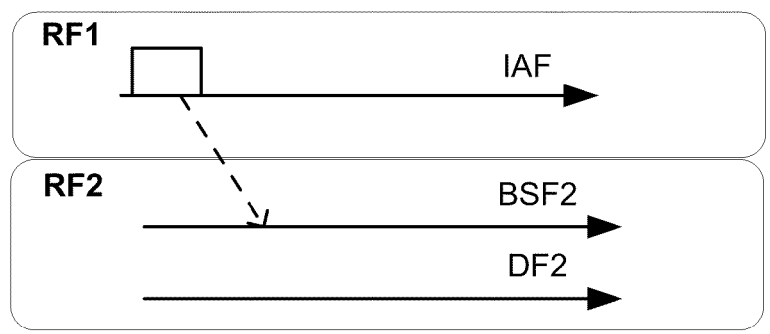
FIG. 34 is a timeline diagram illustrating how in a multi frequency network (MFN), a receiver device may detect that there is an update to a broadcast service flow, but at the same time, identify that it cannot receive the update.

FIG. 34 illustrates an example of how in a multi-frequency network (MFN), it is possible for a receiver device to detect that there is an update to a broadcast schedule flow, but at the same time, identify that it cannot receive the update. In the example illustrated in FIG. 34, an initial acquisition flow (e.g., IAF) indicates that a broadcast schedule flow (e.g., BSF2) on a second radio frequency network (e.g., RF2) is updated. However, the device cannot switch to the second radio frequency network (e.g., RF2). In such circumstances, the file delivery framework may experience an extra data loss, because the receiver device cannot receive the file delivery data flow (as described by BSF 2) on the second radio frequency network (e.g., RF2). In an embodiment, the receiver device may detect the existence of the update and identify the update as non-receivable. In an embodiment, when a receiver device identifies an update as non-receivable, the receiver device may activate a recovery process to mitigate the data loss.

Figure 35:
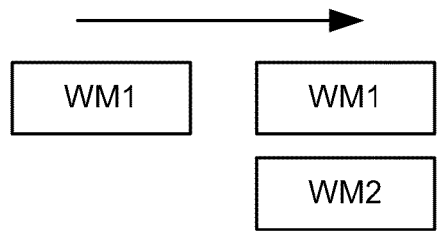
FIG. 35 is a timeline diagram illustrating how receiver devices moving to a new multiplex may be forced to receive the BSM for the new multiplex.

FIG. 35 illustrates how receiver devices may be configured such that when the device moves to a new multiplex, the device may be forced to receive the broadcast schedule message for the new multiplex. In various embodiments, this mobility behavior may be implemented so as to be applicable to both local multiplexes (e.g., LM1, LM2) and wide multiplexes (e.g., WM1, WM2).

Figure 36:
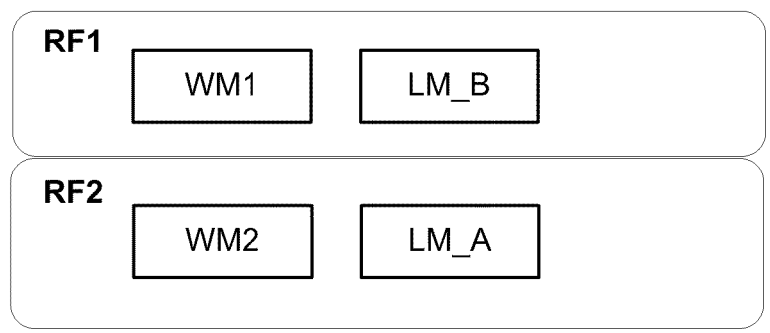
FIG. 36 is a timeline/block diagram illustrating a file delivery framework configuration in which more than one multiplex is on the same radio frequency.

FIG. 36 illustrates a file delivery framework configuration that supports more than one multiplex on the same radio frequency. That is, in the various embodiments, different multiplexes do not necessarily have to be on different radio frequencies. For example, a first radio frequency (e.g., RF1) may contain both a local multiplex (e.g., LM_B) and a wide multiplex (e.g., WM1). When the file delivery core receives multiple data flows on the same radio frequency, the total rate of the flows should be no more than a device platform specific parameter (e.g., FDF_MAX_FD_RECEIVE_RATE). Since the file delivery framework may run in the background, this limit on the total flow rate may reduce the impact of file delivery framework on foreground tasks like real time video reception and display. In various embodiments, the data flow rates may be signaled or specified in broadcast schedule messages. In an embodiment, if the file delivery core needs to receive multiple data flows at the same time on the same radio frequency according to the data filtering decision, and the total rate of the flows is more than a specific parameter (e.g., FDF_MAX_FD_RECEIVE_RATE), the file delivery core may randomly pick a subset of data flows to receive such that the total rate of the picked data flows is no more than the specific parameter (e.g., FDF_MAX_FD_RECEIVE_RATE). In various embodiments, the file delivery framework may determine if two data flows on two different multiplexes are on the same radio frequency by obtaining their radio frequency IDs from a flow protocol stack (FPS).

Figure 37:
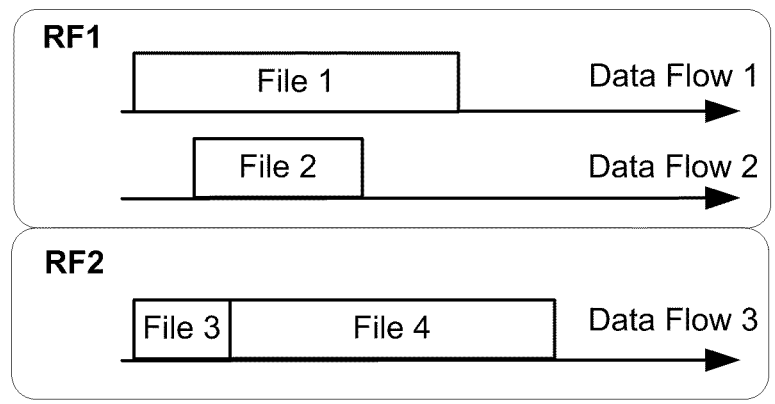
FIG. 37 is a timeline/block diagram illustrating a file delivery framework configuration in which the file delivery core (FDC) is configured to schedule file downloads on different radio frequencies independently.

FIG. 37 illustrates a file delivery framework configuration in which the file delivery core is configured to schedule file downloads on different radio frequencies independently. That is, in a multi-frequency network deployment, the file delivery core may schedule receiving file delivery data flows (e.g., Data Flow 1-2) on a radio frequency (e.g., RF1) and register them to the flow protocol stack (e.g., FPS) regardless of the existence other radio frequencies (e.g., RF2). If there are multiple files (e.g., Files 1-4) that are going to be broadcasted at the same time on different radio frequencies (e.g., RF1, RF2), the file delivery core may schedule receiving all of them, even though it can only receive one radio frequency. In this embodiment, it is up to flow protocol stack to decide which radio frequency it can receive, because only the flow protocol stack possesses information regarding all of the services (including real-time services having a higher priority than file delivery service) the device needs to handle. In an embodiment, when the file delivery framework on the device needs to receive multiple data flows at the same time on the same radio frequency and the total data rate of the flows is more than a specific parameter (e.g., FDF_MAX_FD_RECEIVE_RATE), the file delivery framework may randomly pick a subset of data flows to receive such that the total rate of the picked data flows is no more than the specific parameter (e.g., FDF_MAX_FD_RECEIVE_RATE). In an embodiment, the file delivery framework on the device may schedule receiving file delivery data flow(s) on a radio frequency regardless of the presence of other radio frequencies.

Figure 38:
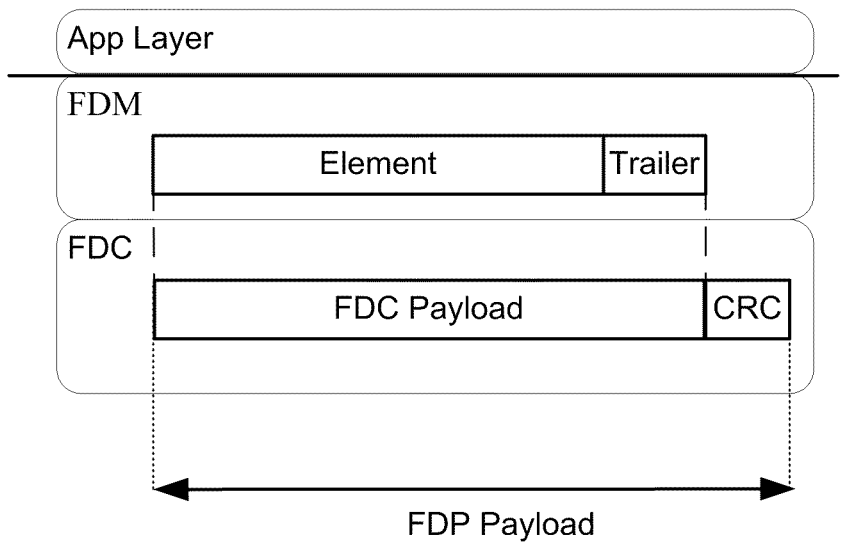
FIG. 38 is a system block diagram illustrating a structure of a file delivery pipe (FDP) payload.

FIG. 38 illustrates how a file delivery pipe (FDP) payload (i.e., the outcome of FEC decoding performed by a FDCP/FDP sub-layer) may include two parts: a file delivery core payload (FDC Payload); and a cyclic redundancy check (CRC) trailer. The file delivery pipe payload may include the element and the file delivery core payload trailer. In an embodiment, the cyclic redundancy check trailer may be a 16-bit checksum generated using a standard CRC-CCITT generator polynomial. In various embodiments, the file delivery core may perform a cyclic redundancy check on the received file delivery core payload based on a 16 bit cyclic redundancy check checksum trailer. If the cyclic redundancy check is successful, the file delivery core may strip the cyclic redundancy check checksum and pass the file delivery core payload to the file delivery file management (FDM) layer. In an embodiment, the file delivery framework on the device may use a CRC-CCITT generator polynomial to perform a cyclic redundancy check on the received file delivery core payload based on the 16-bit cyclic redundancy check checksum in the payload. In an embodiment, the file delivery framework on the device may discard a received file delivery core payload if the checksum on it fails. In various embodiments, when an application exits, the file delivery framework may release the resources allocated to it. The allocated resources that are released may include entries in the wanted string table.

As discussed above, the file delivery file management (FDM) layer may be responsible for managing the data received by the file delivery core (FDC) as files. Each file delivered by the file delivery framework may have one or more device platform independent file names that follow UNIX file naming convention (e.g., root directory is represented by "/" and directories or file base names are separated by "/"). Each file received by the file delivery framework on the device may also have a storage name that specifies the physical storage location of the file. The storage names may be device platform dependent. For example, a file with file name "/tad/f1.mp4" may be stored at "c:\fdroot\tad\f1.mp4" and "/ext/fdroot/tad/f1.mp4" on a Window Mobile and Linux based devices, respectively. It should be noted that, in various embodiments, the communication between the file delivery framework and the device applications may be based on a device platform independent file name, and not on a device platform dependent storage name.

When the file delivery framework receives a file for an application, it may automatically map its file name to a storage name according to the application's storage policy, and store the file at the location pointed to by the storage name. An application's storage policy may specify the type of memory (internal or external) that the file delivery framework can use to store files it receives for the application. In an embodiment, when registering with the file delivery framework, an application may specify one of the following storage policies: internal memory only; internal first and then external; external memory only; and external first and then internal. In an embodiment, a receiver device may be configured to support only an "internal memory only" policy. In another embodiment, a receiver device may be configured to support only "internal memory only" and "external memory only" policies. In yet other embodiments, receiver devices may be configured to support all storage policies, or any combination thereof.

Figures 39, 40:
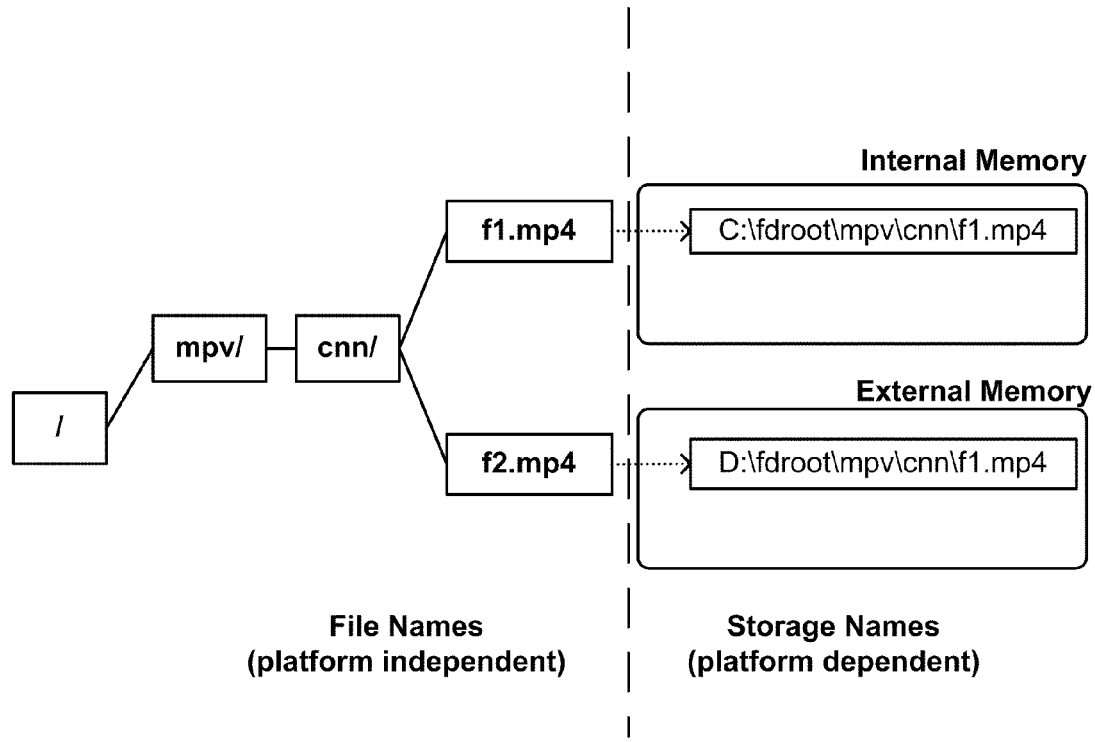
FIG. 39 is a message flow diagram illustrating a file delivery framework mapping of file names to storage names.
FIG. 40 is a block diagram illustrating a managed element table (MET).

FIG. 39 illustrates an example file naming convention and mapping of file names to storage names according to an embodiment. In this example, the file delivery framework maps a file name to a storage name as followings: each separator "/" in the file name is converted to a device platform dependent separator (e.g., "\"); and the converted string is appended after the physical base directory (e.g., C:, D:) corresponding to the memory type selected (e.g., internal, external) by the application's storage policy. In an embodiment, the application may provide the physical base directories during a registration phase. In an embodiment, an application may ask the file delivery framework to map its file name to a storage name, and then use the storage name to access the file, before the application first accesses a file received by the file delivery framework.

FIG. 40 illustrates an example managed element table (MET). As discussed above, each application's file delivery file management (FDM) layer may maintain a managed element table that has information about all the elements (file or file bundle) that the file delivery framework has received for the application and still exist on the device. The managed element table may contain various pieces of information, such as element IDs (EID), file names (Name), storage names (Storage), reference numbers (Ref) and other attributes (Attr). In an embodiment, the file delivery framework may map a file name to a storage name by mapping the root directory in the file name "/" to "fdroot" at the root of physical memory selected according to the storage policy, converting each separator "/" in the rest of the file name after the root directory "/" to a device platform dependent separator, and appending the converted string after the "fdroot/".

In an embodiment, the file delivery framework on the device may map a file name to a storage name by converting each separator "/" in the file name to device platform dependent separator and then appending the converted string after the physical base directory corresponding to the memory type selected by the application's storage policy. In an embodiment, the file delivery framework on the device may support the "internal memory only" storage policy for applications. In an embodiment, the file delivery framework on the device may support the "external memory only" storage policy for applications.

In the various embodiments, when an application registers with the file delivery framework, it may specify: the application's storage policy; the application's physical base directories wherein the file delivery framework may save all the files received for the application; and the application's storage quota. In various embodiments, there may be multiple base directories, one for each memory type. In these embodiments, the file delivery framework may use the application's storage policy to decide which base directory should be used. In an embodiment, the registration may be handled by file delivery file management layer. In an embodiment, the file delivery framework on the device may support application registration with storage policy, physical base directories, and storage quota. In an embodiment, the file delivery framework on the device may enforce a quota on an application's storage space that is specified during registration.

Figure 41:
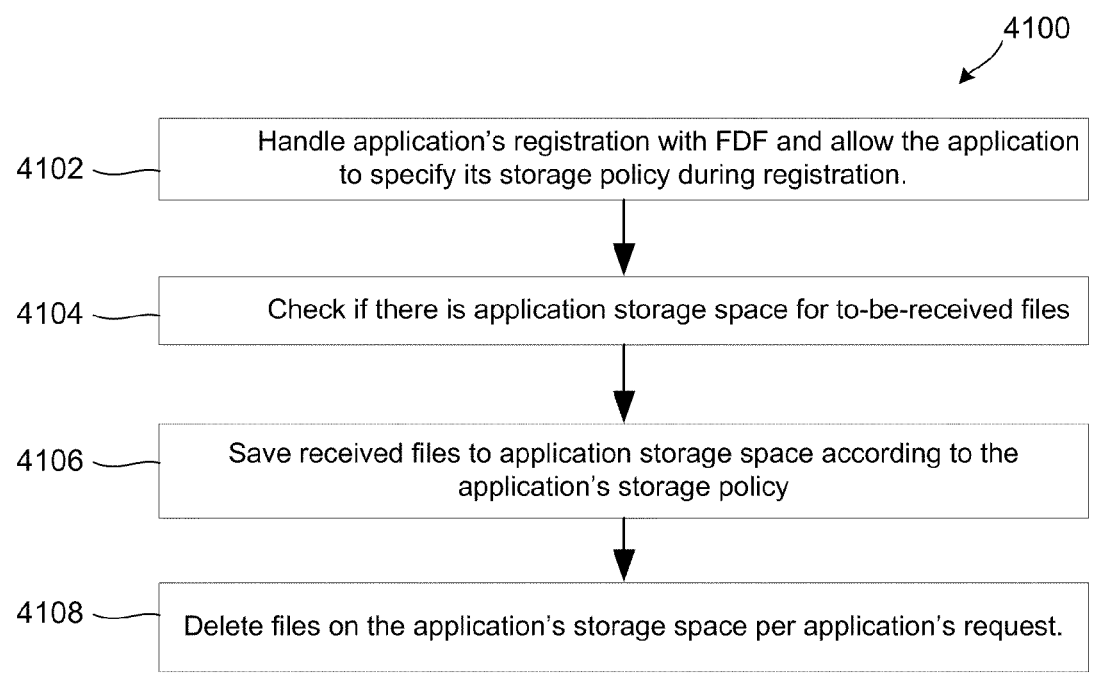
FIG. 41 is a process flow diagram of an embodiment method for managing storage space for an application.

FIG. 41 illustrates an embodiment method 4100 by which the file delivery file management (FDM) layer may be configured to manage and interact with an application's storage space. In step 4102, the file delivery file management layer may handle an application's registration with the file delivery framework (FDF) and allow the application to specify its storage policy during registration. In step 4104, the file delivery file management layer may check whether there is application storage space for to-be-received files. In step 4106, the file delivery file management layer may save the received files to application storage space according to the application's storage policy. In step 4108, the file delivery file management layer may delete files stored in the application's storage space per the application's request.

Figure 42:
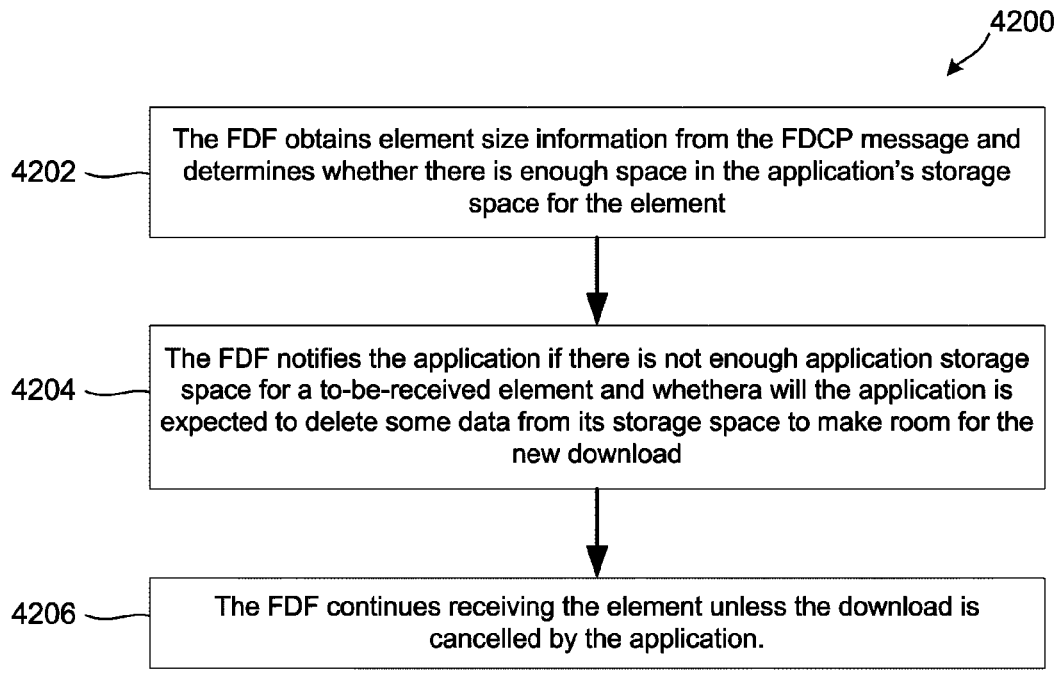
FIG. 42 is a process flow diagram of an embodiment method for checking storage space for an element to be received for an application.

FIG. 42 illustrates an embodiment method 4200 that may be implemented in the file delivery framework (FDF) for checking an application's storage space for a to-be-received element. In step 4201, the file delivery framework may obtain the element size information from the FDP/FDCP message and determine whether there is enough space in the application's storage space for the element. In step 4202, the file delivery framework may notify the application if there is not enough application storage space to store a to-be-received element. In step 4203, the file delivery framework may continue receiving the element unless the download is cancelled by the application.

Figure 43:
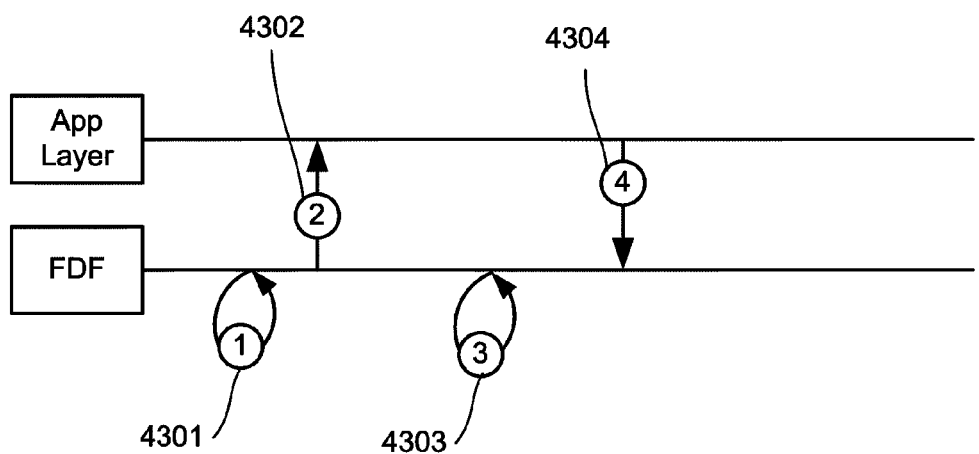
FIG. 43 is a flow diagram illustrating a dataflow and interactions between a application layer and a file delivery framework for checking storage space for an element to be received for an application.

FIG. 43 illustrates dataflow and call flow interactions between the application layer (App Layer) and the file delivery framework (FDF) that may be implemented in method 4200 described above for determining whether an application's storage have sufficient space for a to-be-received element (e.g., a file or a file bundle) that matches attribute strings in the broadcast schedule record. In operation 4301, the file delivery framework may obtain the element size information from the FDP/FDCP message and determine whether there is not enough space in the application's storage space for receiving and storing the element. In call flow 4302, the file delivery framework notifies the application if there is n insufficient application storage space for the to-be-received element. In operation 4303, the file delivery framework may wait for the application to delete some data from its storage space and continue receiving the element. In call flow 4304, the application may issue a cancel notification to the file delivery framework instructing it stop receiving the element.

Figure 44:
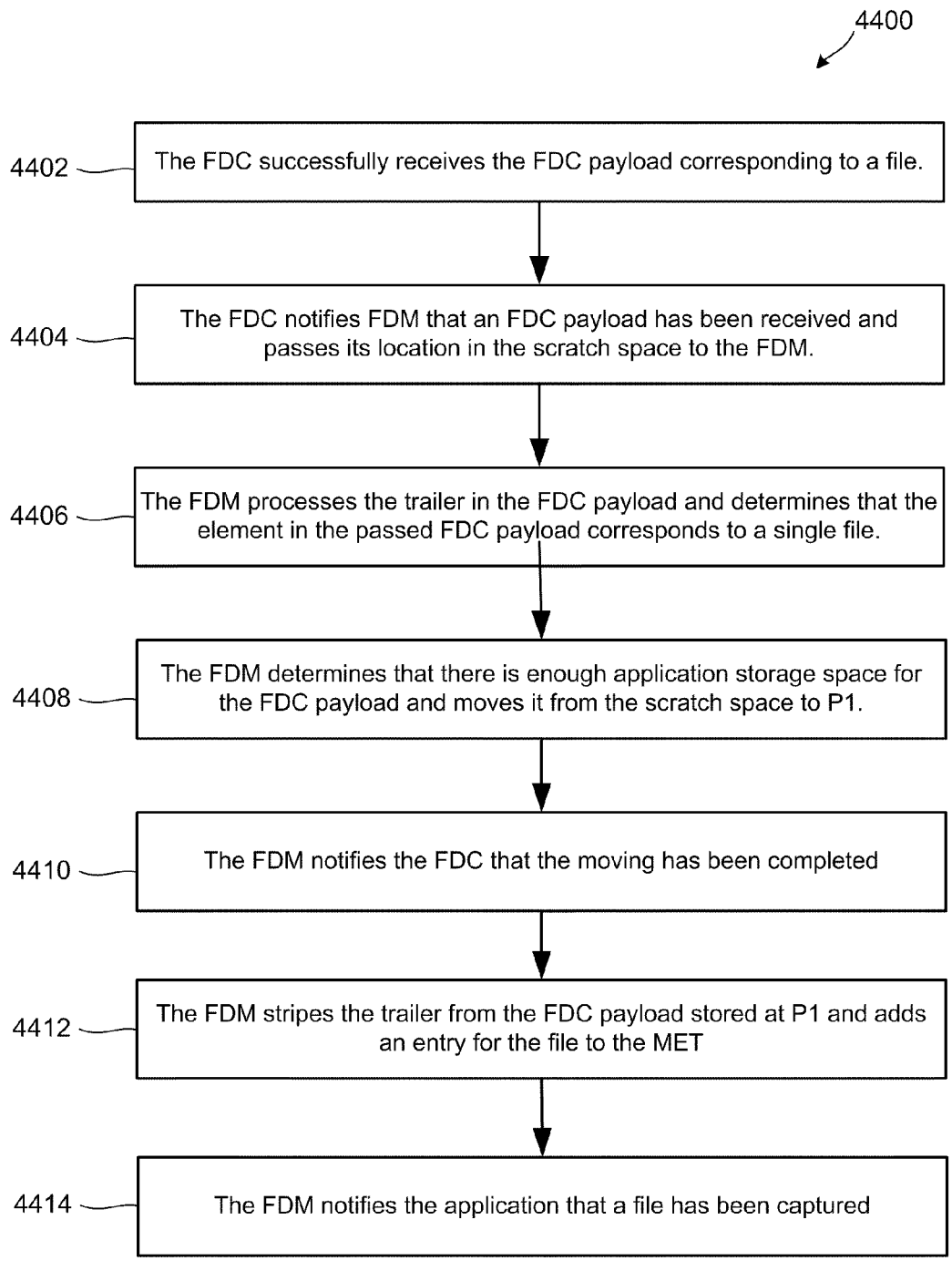
FIG. 44 is a process flow diagram of an embodiment method for moving of a received file to an application storage space.

FIG. 44 illustrates an embodiment method 4400 that may be implemented in the file delivery framework for moving of a received file to the corresponding application's storage space. In step 4402, the file delivery core successfully receives the file delivery core payload corresponding to a file. In step 4404, the file delivery core may notify the file delivery file management layer that a file delivery core payload has been received and has its storage location in the scratch space to the file delivery file management layer. In step 4406, the file delivery file management layer may process the trailer in the file delivery core payload and determine whether the element in the passed file delivery core payload corresponds to a single file. The file delivery file management layer may map the file's name to a storage name (e.g., P1). In an embodiment, if the file has multiple names, the file delivery file management layer may only map the first name to the storage name. In step 4408, the file delivery file management layer may determine whether there is sufficient application storage space for the file delivery core payload, and may move the payload from the scratch space memory to an application storage space location identified by the storage name (e.g., P1). In an embodiment, if one of the file's names already exists in the managed element table (MET), an extra memory for the file delivery core payload may be used to determine if there is sufficient application storage space. In an embodiment, this extra memory may be defined as a location that represents the difference between the value of two variables, such as the difference between the FDC_payload_size and the old_file_size. In step 4410, the file delivery file management layer may notify the file delivery core that movement of the files has been completed. In step 4412, the file delivery file management layer may strip the trailer from the stored file delivery core payload (e.g., the payload stored at P1) and add an entry for the file in the managed element table (see e.g., FIG. 40). In an embodiment, if the trailer in the file delivery core payload indicates that the file has multiple file names, the file delivery file management layer may add information to the managed element table which maps all of the file names to the named storage location (e.g., P1). In step 4414, the file delivery file management layer may notify the application that a file has been captured.

Figure 45:
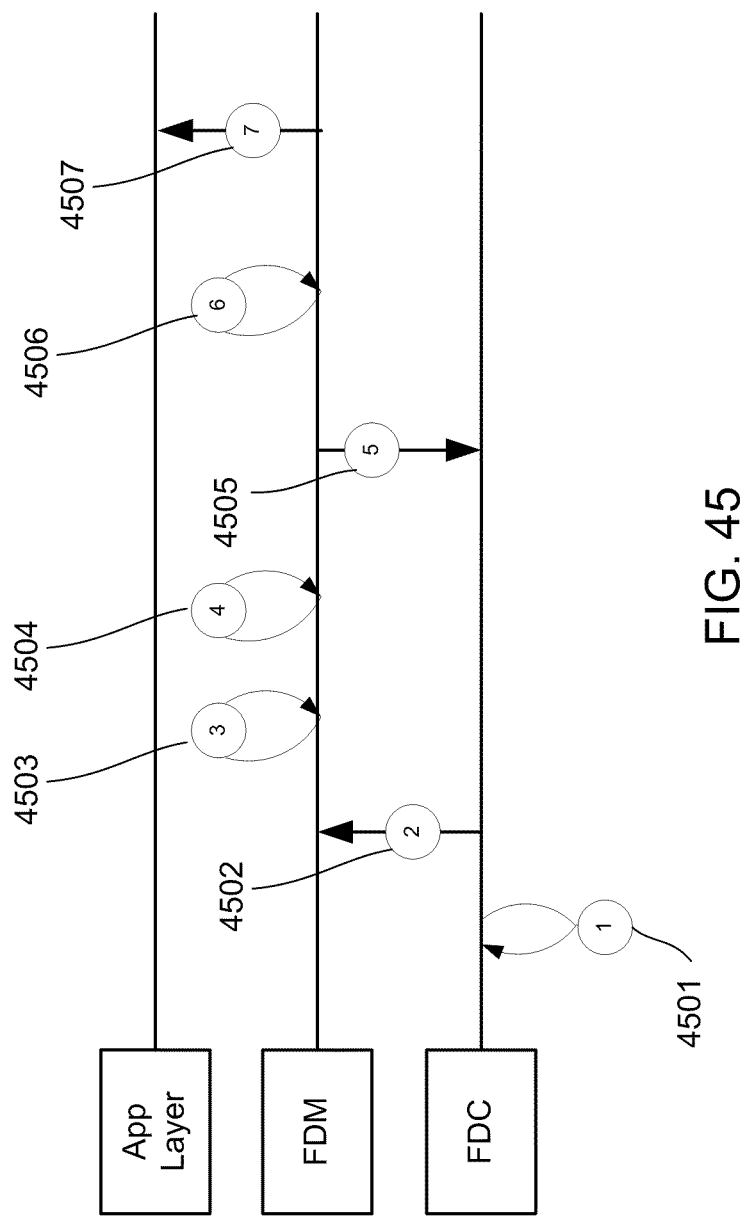
FIG. 45 is a flow diagram illustrating a dataflow and interactions between an application layer (App layer), a file delivery core (FDC) and a file delivery file management (FDM) layer while moving a received file to an application storage space

FIG. 45 illustrates data flows and interactions between the application layer (App layer), the file delivery core (FDC) layer and the file delivery file management (FDM) layer that may transpire in method 4400 win the file delivery framework (FDF) moves a received file to the application storage space. In operation 4501, the file delivery core receives a file delivery core payload. In call flow 4502, the file delivery core notifies the file delivery file management layer that a file delivery core payload has been received. In operation 4503, the file delivery file management layer maps the file name to a storage name (e.g., P1). In operation 4504, the file delivery file management layer moves the file delivery core payload from the scratch space to the storage location (e.g., P1), if there is sufficient storage space. In call flow 4505, the file delivery file management layer notifies the file delivery core that the moving of the file delivery core payload is complete. In operation 4506, the file delivery file management layer strips the trailer from the file delivery core payload stored at the storage location (e.g., P1). In call flow 4507, the file delivery file management layer notifies the application layer that the capture is complete.

In an embodiment, if it is determined that the received file is to replace an old version of the file that already exists on the device, and the replacement fails (e.g., the old version is being locked at the fifth step, 4505, of FIG. 45), the file delivery core may send an error message to file delivery file management layer in call flow 4507. After receiving this error message, the file delivery file management layer may periodically retry the request in call flow 4505, until it receives a "move complete" message from file delivery core, or until it has repeated the request in call flow 4505 a predetermined number of times (e.g., FDF_MAX_FILE_REPLACE_RETRY_NUM). In an embodiment, the retry period (or number of times) may be defined by a device parameter (e.g., FDF_FILE_REPLACE_RETRY_PERIOD), such as a number of seconds. If all tries fail, the file delivery framework may give up on moving the data from the scratch space to the application storage space.

In an embodiment, finished downloads that have been in the scratch space for more than a predefined number of seconds, such as indicated by a device parameter (e.g., FDF_MAX_ELEMENT_TIME_IN_SCRATCH_SPACE), may be deleted in a periodic clean-up mechanism. In an embodiment, if the file delivery framework on the device fails to move a received file to the application storage space, it may continue to retry moving the file once every few seconds until the moving is successful or until a predefined maximum number of retries have been attempted. After that, the periodic cleanup mechanism may delete the unmoved file from the scratch space at an appropriate time.

Figure 46:
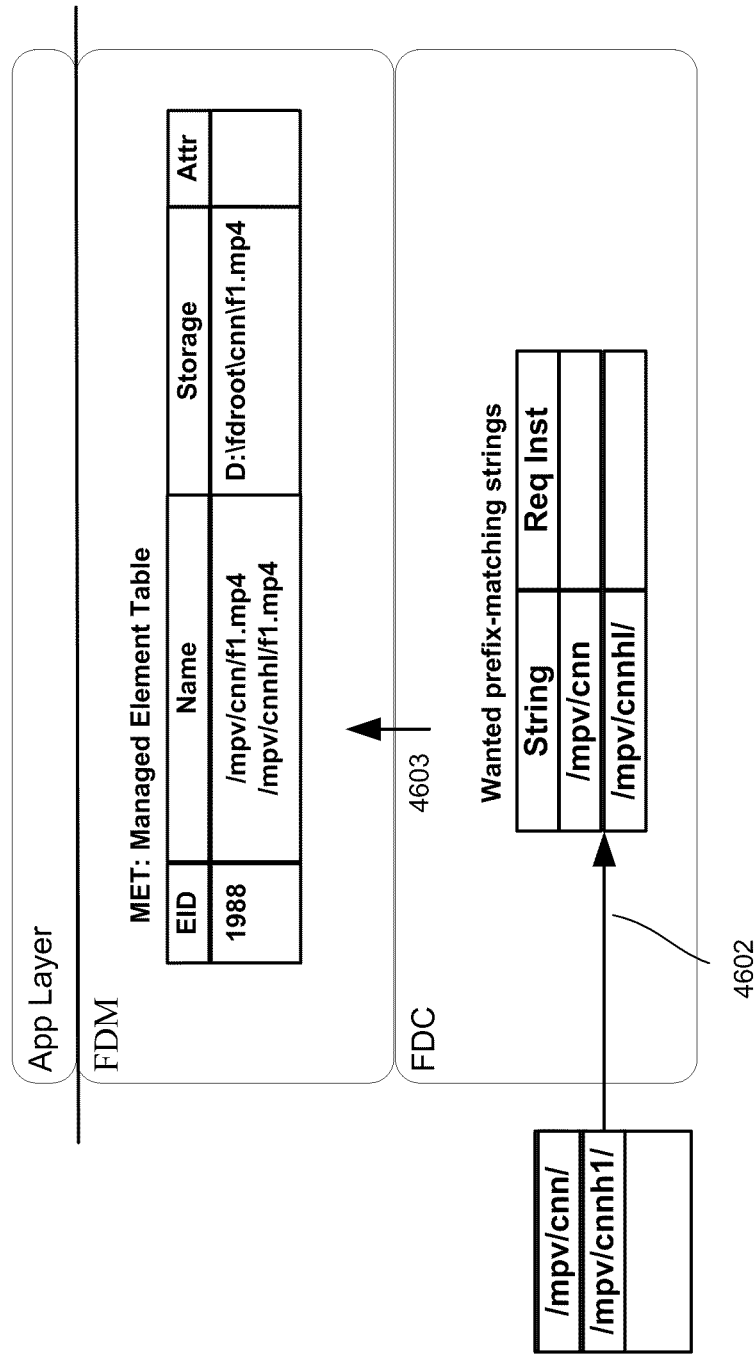
FIG. 46 is a process flow diagram of an embodiment method for mapping multiple file names to the same storage name in a managed element table of a file delivery file management (FDM) layer.

FIG. 46 software architecture and data structure diagram illustrating how multiple file names may be mapped to a single storage name. Specifically, FIG. 46 illustrates an embodiment in which multiple file names (e.g., /mpv/cnn/f1.mp4, /mpv/cnnh1/f1.mp4) are be mapped to the same storage name (e.g., D:\fdroot\cnn\f1.mp4) in the managed element table (MET). When a file is received (call flow 4602), it may be renamed, and the file name and storage location may be saved to the managed element table (call flow 4603). This figure also illustrates how multiple file names may be mapped to a single storage name identified in the managed element table.

Figure 47:
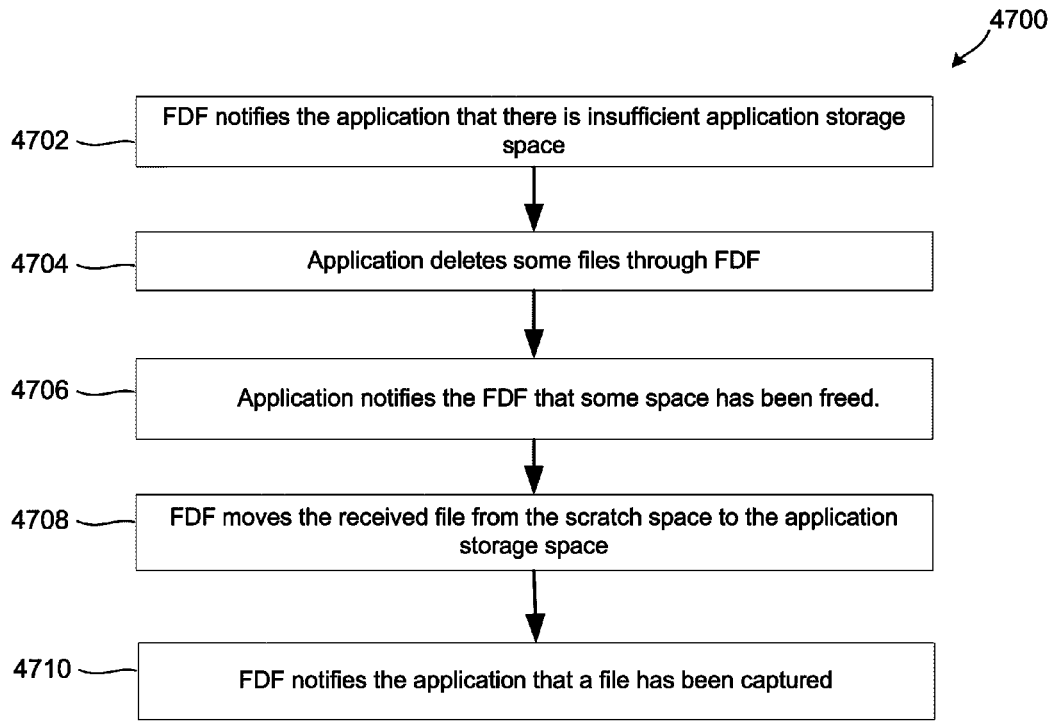
FIG. 47 is a process flow diagram of an embodiment method for handling situations in which there is not enough application storage space for a received file.

FIG. 47 illustrates an embodiment method 4700 that may be implemented in the file delivery framework for handling situations in which there is insufficient application storage space to store a received file. As discussed above, if the file delivery file management (FDM) layer determines that there is insufficient application storage space for the file delivery core payload, or that the application storage space is full, the delivery file management layer may issue a request to the application layer requesting that the application free up space in step 4702. In response to this message, in step 4704 the application may delete some files. In step 4706, the application may notify the file delivery framework that some storage space has been freed up through file deletions. In step 4708, the file delivery framework may move the received file from the scratch space to the application storage space. In step 4710, the file delivery file management layer may notify the application that the file has been captured. If the file delivery framework never receives notification from the application that storage space has been freed up, the received file may be kept in the scratch space until it is deleted by the scratch space periodic clean-up mechanism.

Figure 48:
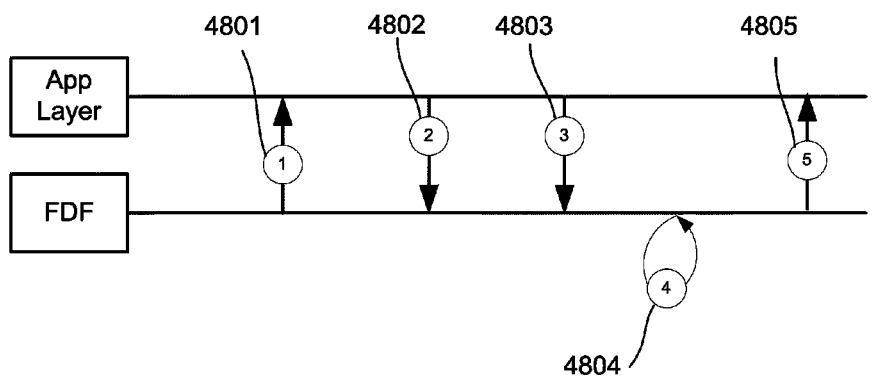
FIG. 48 is a flow diagram illustrating a dataflow and interactions between an application layer (App layer) and a file delivery framework (FDF) in handling situations in which there is not enough application storage space for a received file.
Figure 49:
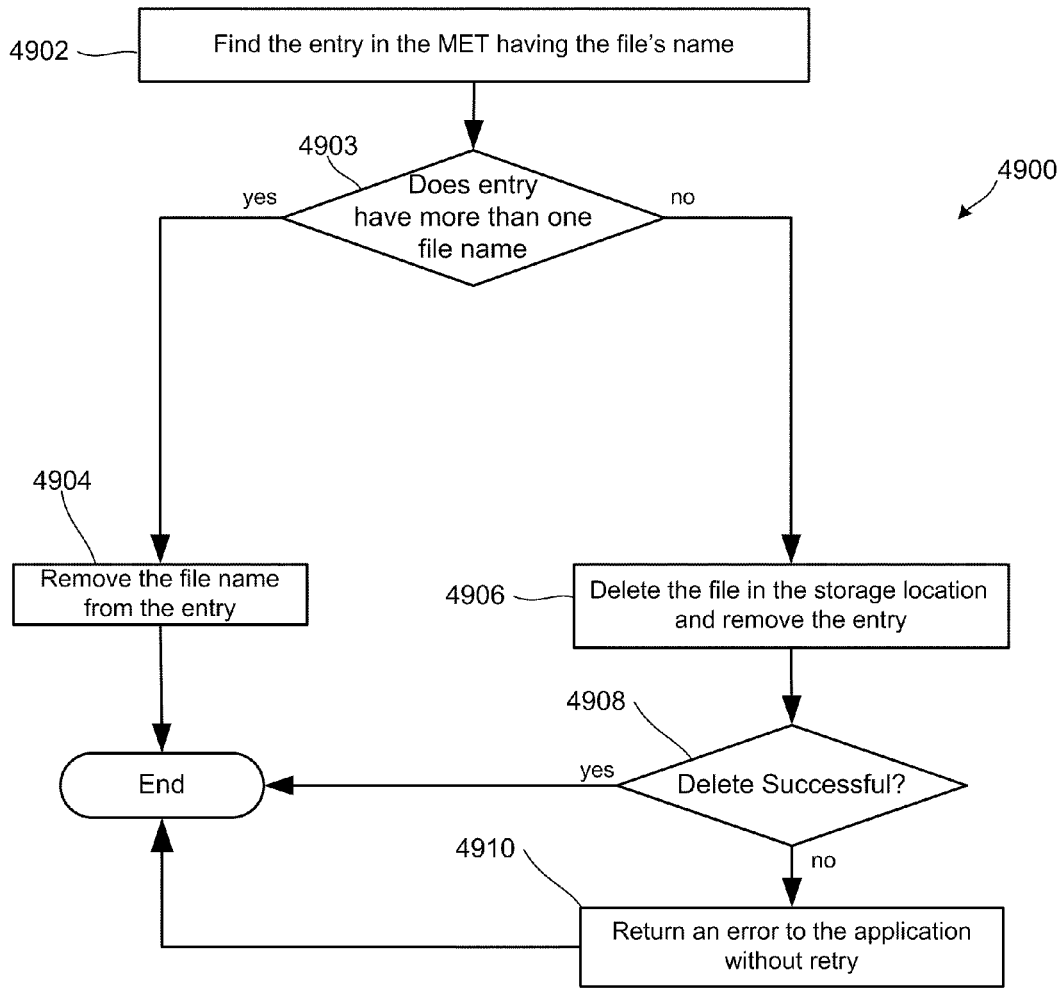
FIG. 49 is a process flow diagram of an embodiment method for handling delete functions.

FIG. 48 illustrates dataflow and call flow interactions between the application layer (App layer) and the file delivery framework (FDF) in execution of method 4700. In call flow 4801, the file delivery framework sends a notification to the application layer to notify the application that there is insufficient application storage space for the file delivery core payload. In call flow 4802, the application layer sends an instruction to the file delivery network directly to delete some of the files from the application storage space. In call flow 4803, the application layer sends the file delivery framework a notification indicating that storage space has been made available (e.g., by deleting a file). In operation 4804, the file delivery framework moves the file from the scratch space to the application storage space. In call flow 4805, the file delivery framework notifies the application layer that the file capture is complete. I FIG. 49 illustrates an example method 4900 that may be implemented by the file delivery framework for deleting files from the application storage space in response to an application request that the file delivery framework delete a file. In response to a request from an application to delete a file identified by a file name, in step 4902, the file delivery framework may search for and find an entry in the managed element table (MET) corresponding to the file name. In determination step 4903, the file delivery framework may determine from the managed element table whether the file has more than one filename. If the entry has more than one file name (i.e., determination step 4903="yes"), in step 4904, the file delivery framework may simply remove the file name from the entry and end process. Thus, in an embodiment, if a file designated for deletion has multiple file names, the file delivery framework may remove the file name without deleting the file. If the file delivery framework determines that there is only one file name associated with the file identified for deletion (i.e., determination step 4903="no"), in step 4906, the file delivery framework may delete the file in the storage location and remove the entry from the managed element table. In determination step 4908, the file delivery framework may determine whether the file deletion was successful. If the deletion was successful (i.e., determination step 4908="yes"), the procedure may end. If the delete was not successful (i.e., determination step 4908="no"), in step 4910, the file delivery framework may return an error to the application and end the procedure without retrying the delete request. In an embodiment, the file delivery framework on the device may provide an interface through which the application may request deletion of files specified by file names.

As discussed above, the file delivery framework may support bundling multiple files together and broadcasting the file bundle as a single element. As mentioned previously, this helps to reduce the forward error correcting (FEC) overhead (i.e., the larger the element, the less FEC overhead is needed) and improve the delivery reliability (i.e., the larger the element, the more time diversity). File bundling is particularly useful for delivering multiple small files. In the various embodiments, the file bundling feature may be implemented as a file delivery file management layer feature that has a minimal impact on the file delivery core. In the various embodiments, the file bundling feature may be implemented in a manner that renders him the feature transparent to applications.

Figure 50:
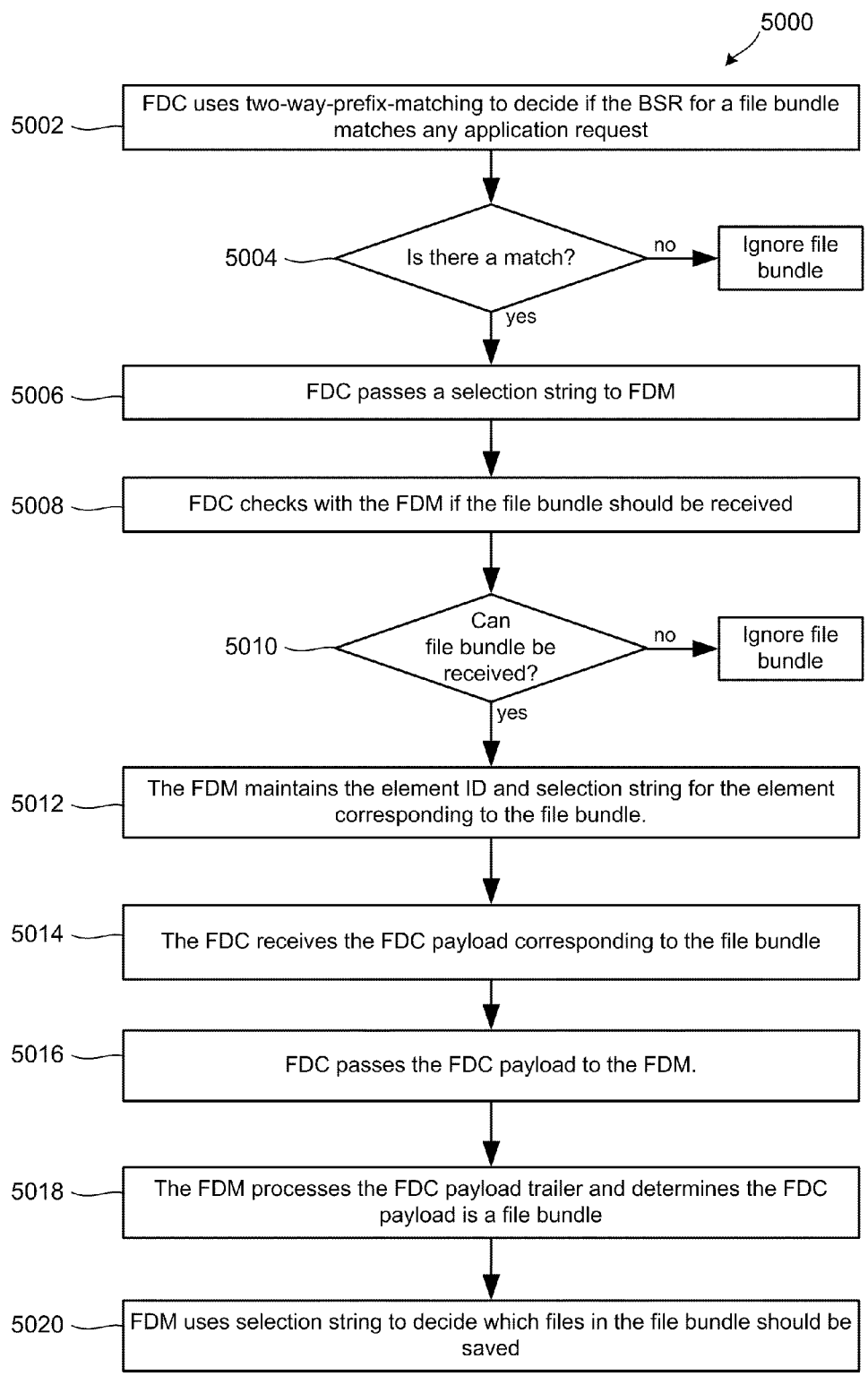
FIG. 50 is a process flow diagram of an embodiment method for implementing a file bundling feature on the file delivery framework.

FIG. 50 illustrates an example method 5000 that may be implemented as a file bundling feature within the file delivery framework. In step 5002, the file delivery core may use a two-way-prefix-matching scheme to determine if the broadcast schedule record (BSR) for a file bundle matches any application request. In an embodiment, this may be the same two-way-prefix-matching scheme used on individual files, such as described above with reference to FIGS. 25-26. In determination step 5004, the file delivery core may determine if there is a two-way-prefix-match. If there is no match (i.e., determination step 5004="no"), the file delivery core may ignore the file bundle. If there is a match (i.e., determination step 5004="yes"), in step 5006, the file delivery core may pass a selection string to the file delivery file management layer. This selection string may specify the files within the file bundle that the application is interested in receiving. In step 5008, the file delivery core may send a message to the file delivery file management layer requesting it to determine whether the file bundle should be received or not. In an embodiment, a selection string may be passed to the file delivery file management layer as part of this request in step 5008. In an embodiment, steps 5006 and 5008 may be combined into one unit/function call that passes the selections string as part of a request to determine whether a file bundle should be received.

In determination step 5010, the file delivery file management layer may determine whether the file bundle can be received by the file delivery file management layer, as well as whether the file bundle needs to be received. If the file delivery file management layer determines that the file bundle does not need the received (i.e., determination step 5010="no"), the file bundle may be ignored. If the file bundle needs to be received by the file delivery file management layer (i.e., determination step 5010="yes"), in step 5012, the file delivery file management layer may maintain the element ID and selection string for the element corresponding to the file bundle. In step 5014, the file delivery core receives the file delivery core payload corresponding to the file bundle and may pass it to the file delivery file management layer. In step 5016, the file delivery core may pass the file delivery core payload to the file delivery file management layer. In step 5018, the file delivery file management layer may process the file delivery core payload trailer and determine whether the file delivery core payload is a file bundle. In step 5020, the file delivery file management layer may use the selection string it saved for the file bundle to identify the files within the file bundle that should be saved.

Figure 51:
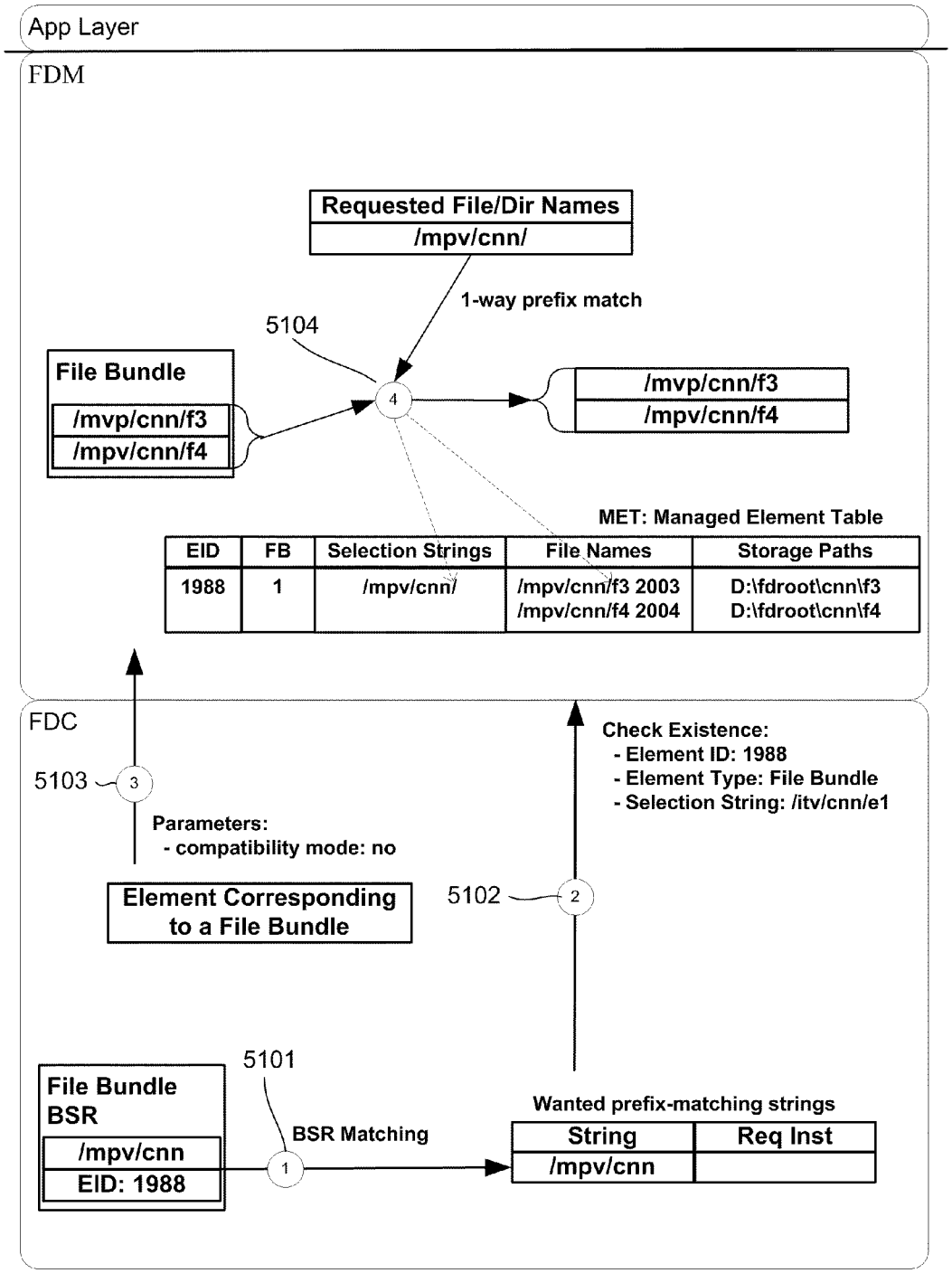
FIG. 51 is a flow diagram illustrating a dataflow and interactions between an application layer (App Layer), a file delivery core (FDC) layer and a file delivery file management (FDM) layer in a file bundling feature on the file delivery framework.

FIG. 51 illustrates data flows and interaction call flows between the application layer (App layer), the file delivery core (FDC) layer and the file delivery file management (FDM) layer in implementing the operations of method 5000.

In operation 5101, the file bundle broadcast schedule record (BSR) is received by the file delivery core and two-way-prefix-matched to generate a broadcast schedule record matching entry. In call flow 5102, the file delivery core passes the selection string, element id and element type to the file delivery file management layer which checks whether the file already exists, and whether the file bundle should be received by the file delivery file management layer. In operation 5103, an element, or file delivery core payload, corresponding to a file bundle is received by the file delivery core and passed to the file delivery file management layer. In operation 5104, the file delivery file management layer processes the file delivery core payload to select particular files from the received file bundle and save the selected files in memory.

Figure 52:
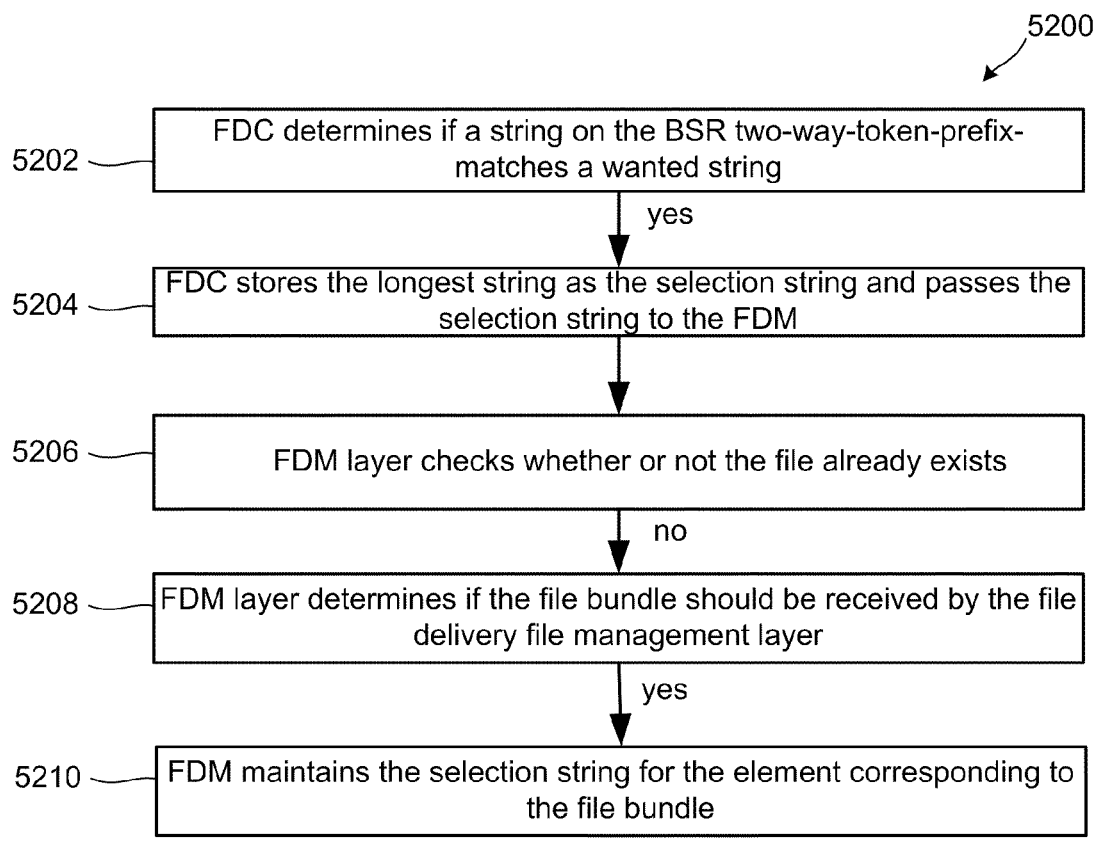
FIG. 52 is a process flow diagram of an embodiment method for generating a selection string to be used by the file delivery file management layer to select files in a file bundle to be saved.

FIG. 52 illustrates an example method 5200 that may be used to generate the selection string to be used by the file delivery file management layer to select files in a received file bundle for saving. In step 5202, the file delivery core may determine if a string in the broadcast schedule record two-way-token-prefix-matches a wanted string (i.e., a string identified by an application for selecting files for reception). If so, in step 5204, the file delivery core may set the longest string as its selection string, and has the selection string to the file delivery file management layer. In step 5206, the file delivery file management layer may check whether the file already exists. In step 5208, the file delivery file management layer determines whether the file bundle should be received by the file delivery file management layer. If the file delivery file management layer determines that the file bundle should be received, in step 5210, the file delivery file management layer maintains the selection string for the element corresponding to the file bundle.

Figure 53:
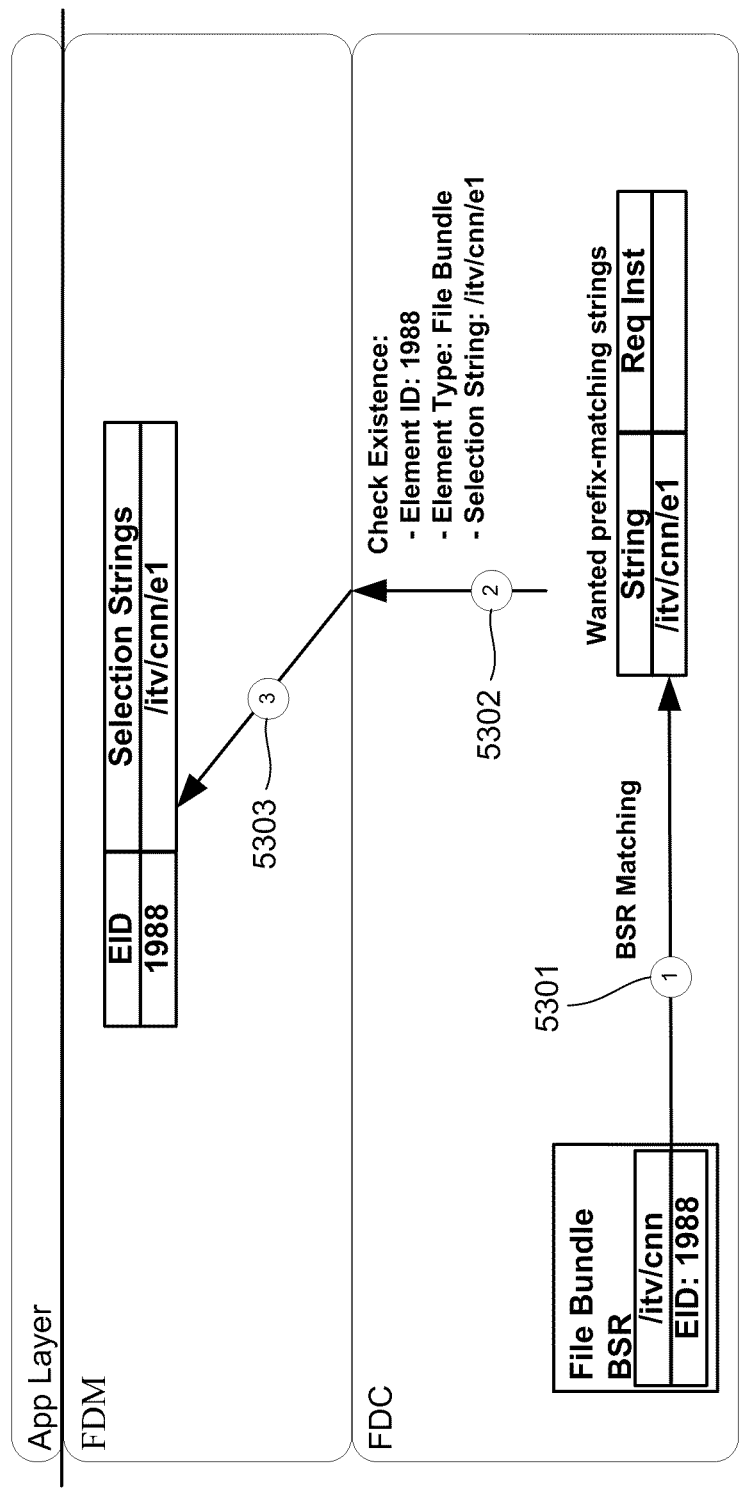
FIG. 53 is a flow diagram illustrating an example dataflow and interactions between an application layer (App layer), a file delivery core (FDC) layer and a file delivery file management (FDM) layer in determining a selection string to be used by the file bundling feature on the file delivery framework.

FIG. 53 illustrates an example of data flows and interaction call flows between the application layer (App Layer), the file delivery core (FDC) layer and the file delivery file management (FDM) layer in method 5200. As discussed above, the selection string may be used by the file delivery file management layer to select files in a file bundle to be saved. If a string on the broadcast schedule record two-way-token-prefix-matches a wanted string, the file delivery core may use the longest string of these two as the selection string and pass it to the file delivery file management layer. In the illustrated example of FIG. 53, in operation 5301, the file bundle broadcast schedule record (having a string "/itv/cnn/") is received by the file delivery core and two-way-prefix-matched to the wanted string "/itv/cnn/e1/". In operation 5302, the file delivery core generates the selection string "/itv/cnn/e1/" and passes the selection string, element id and element type to the file delivery file management layer are used in determining whether the file already exists and if the file bundle should be received by the file delivery file management layer. If the file delivery file management layer determines that the file bundle can and needs to be received by the file delivery file management layer, in a operation 5303 the file delivery file management layer maintains the selection string "/itv/cnn/e1/" for the element corresponding to the file bundle. In an embodiment, the file delivery framework on the device uses the wanted string as a selection string for the file bundle if it determines that an attribute string in a file bundle broadcast schedule record is a prefix of a wanted string.

Figure 54:
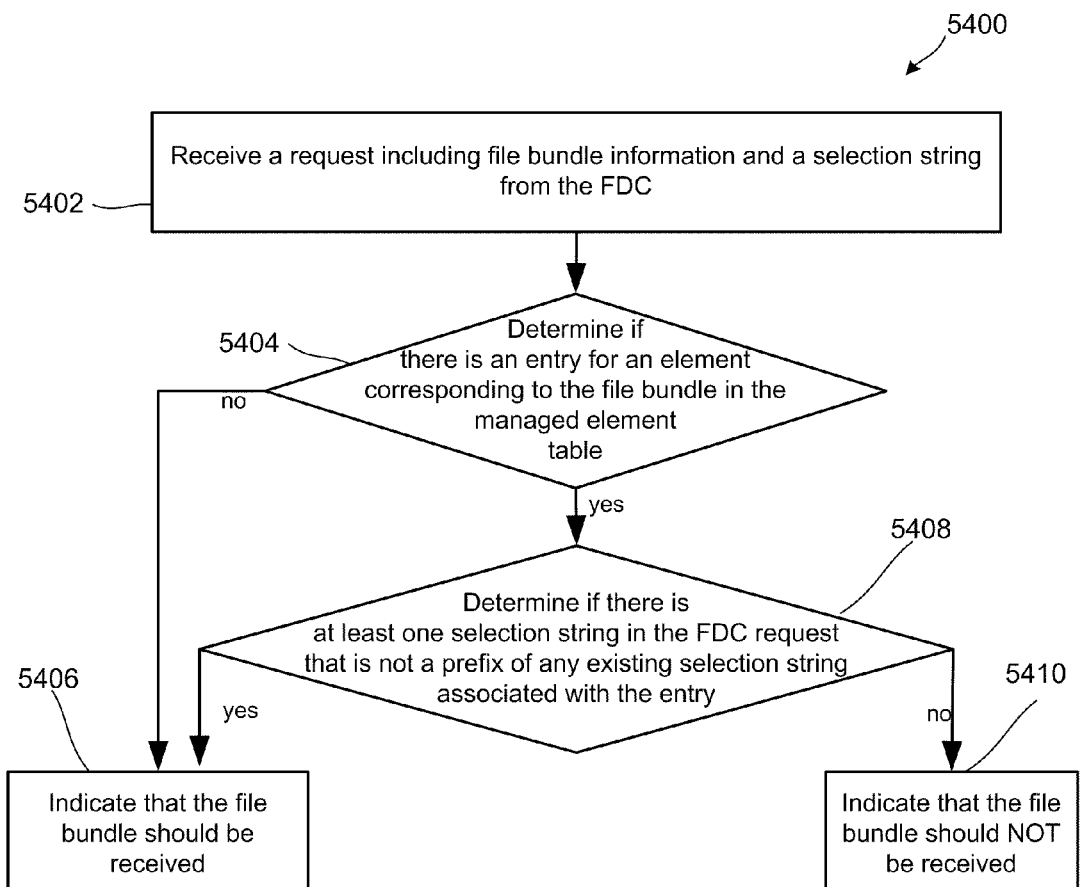
FIG. 54 is a process flow diagram of an embodiment method for determining whether a file bundle should be received.

FIG. 54 illustrates an example method 5400 may be used to determine whether a file bundle should be received. In step 5402, the file delivery core may send a request, including file bundle information and a selection string, to the file delivery file management (FDM) layer requesting that the file delivery file management layer indicate whether the file bundle should be received. In determination step 5404, the file delivery file management layer may determine if there is an entry for an element corresponding to the file bundle in the managed element table. If such an entry does not exist (i.e., determination step 5404="no"), in step 5406, the file delivery file management layer may indicate to the file delivery core that the file bundle should be received. If the entry does exist in the managed element table (i.e., determination step 5404="yes"), in determination step 5408, the file delivery file management layer may determine if there is at least one selection string in the file delivery core request that is not a prefix of any existing selection string associated with the entry in the managed element table. If so (i.e., determination step 5408="yes"), the file delivery file management layer may indicate to the file delivery core that the file bundle should be received in step 5406. Otherwise (i.e., determination step 5408="no"), the file delivery file management layer may indicate to the file delivery core that the file should not be received in step 5410.

Figure 55:
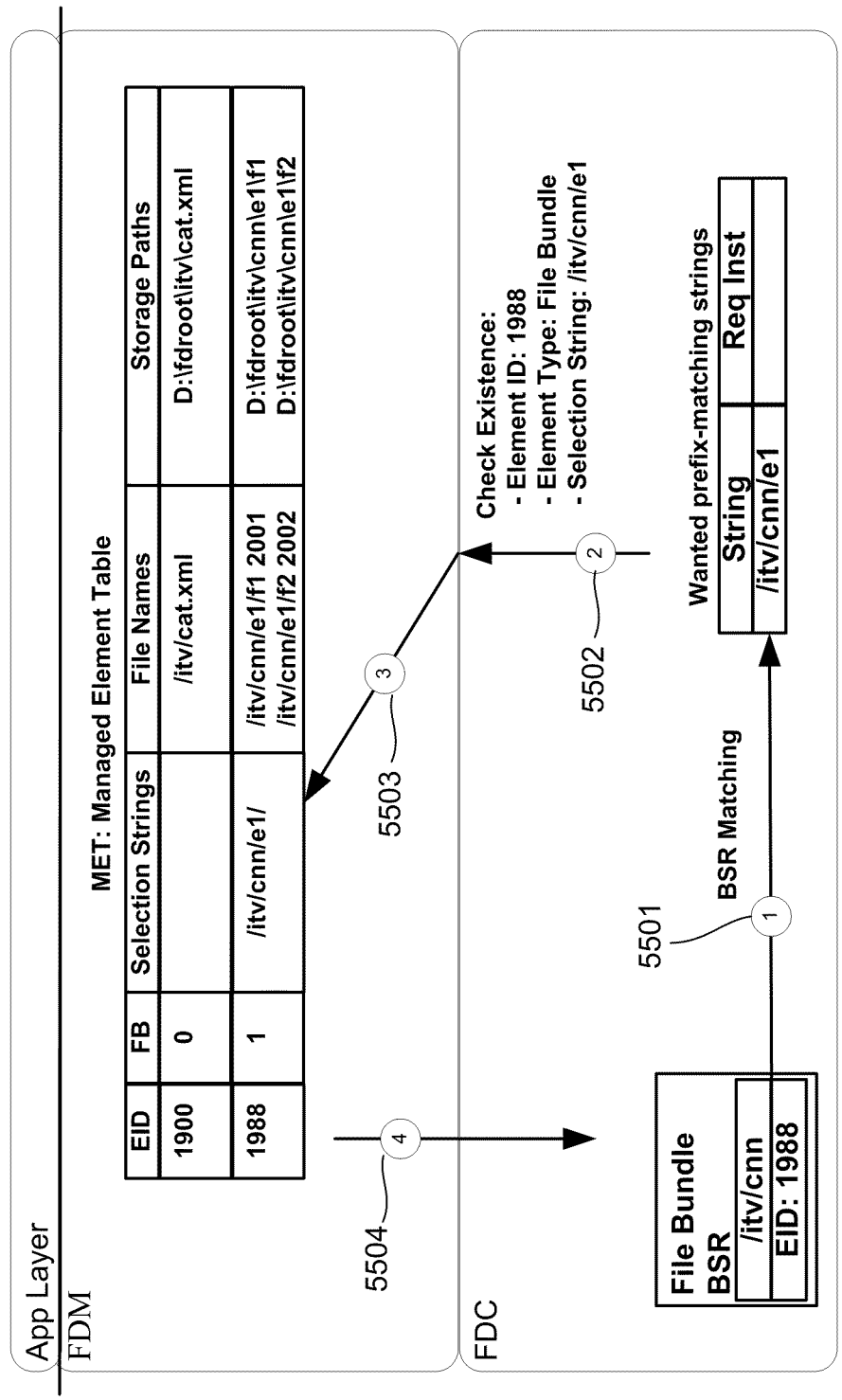
FIG. 55 is a flow diagram illustrating an example dataflow and interactions between an application layer (App Layer), a file delivery core (FDC) layer and a file delivery file management (FDM) layer in determining whether a file bundle should be received.

FIG. 55 illustrates example data flows and interaction call flows between the application layer (App Layer), the file delivery core (FDC) layer and the file delivery file management (FDM) layer the may occur in method 5400. In operation 5501, a file bundle broadcast schedule record (BSR) having a string "/itv/cnn/" may be received by the file delivery core and two-way-prefix-matched to the wanted string "/itv/cnn/e1/". In call flow 5502, the file delivery core may generate the selection string "/itv/cnn/e1/" and pass the selection string, element id and element type to the file delivery file management layer which may use this string to determine whether the file already exists and if the file bundle should be received by the file delivery file management layer. That is, in call flow 5502, the file delivery core sends the file delivery file management layer a request for a decision on whether the file bundle should be received. In operation 5503, the file delivery file management layer determines whether to receive the file. The file delivery file management layer may make this decision to receive the file if there is no entry for the element corresponding to the file bundle in the managed element table (MET).

If the file delivery file management layer determines that an entry for the file bundle does exist in the managed element table, the file delivery file management layer may still choose to receive the file if at least one of the selection strings is not a prefix of any existing selection string in the entry. This is illustrated in FIG. 55, where the file delivery file management layer of the device already has files under /itv/cnn/e1. This is indicated by the selection string value "/itv/cnn/e1/" in the Selection Strings column of the second row (EID=1988) of the managed element table. Since the application has issued a new request to receive all files under /itv/cnn/, and the string "/itv/cnn" is broader than the string "/itv/cnn/e1", the device needs to download the entire file bundle again. Accordingly, in call flow 5504, the file delivery file management layer may request that file delivery core receive the file bundle so that the device may download the file bundle again. Thus, in an embodiment, the file delivery framework on the device may schedule receiving the file bundle element described by a broadcast schedule record if: the broadcast schedule record has at least one attribute string that two-way-token-prefix-matches a wanted string, the file bundle exists on the device, and one of the selection strings will be broadcast (as determined from the broadcast schedule record); and the wanted strings is not a token-prefix of any existing selection strings associated with the existing file bundle.

Figure 56:
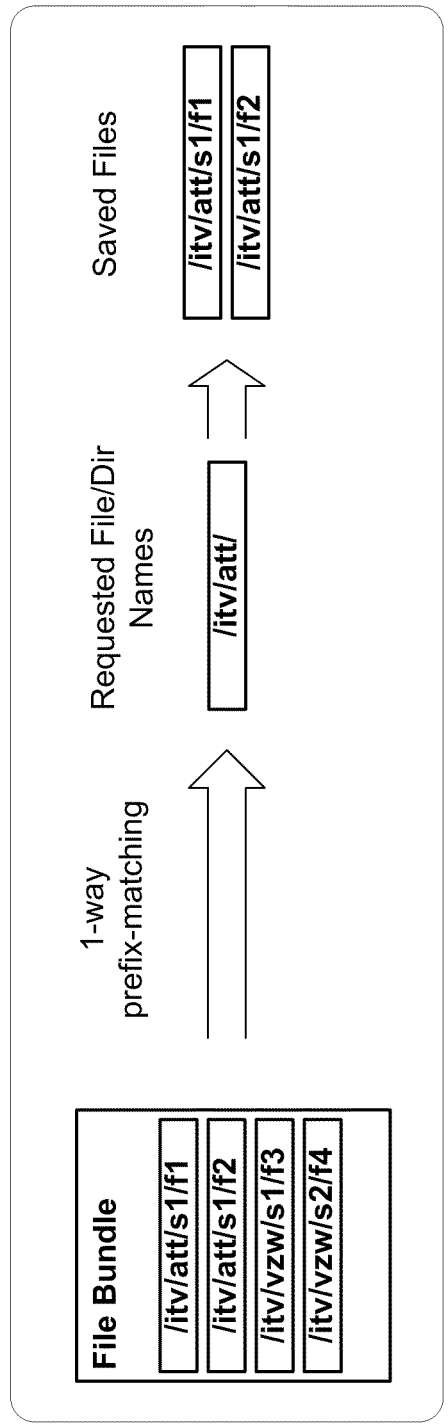
FIG. 56 is a flow diagram illustrating an example dataflow and interactions between an application layer (App Layer), a file delivery core (FDC) layer and a file delivery file management (FDM) layer in saving files in file bundles.

FIG. 56 illustrates how files in file bundles may be selected and saved based upon file name prefixes. As discussed above, the file delivery file management layer may save a file in the file bundle if one of the file/dir names requested by the application is a prefix of the file's name. This is illustrated in FIG. 56, which shows that only those files having the file name prefixes "/itv/att" are saved, resulting in two out of the four files in the bundle being save. If the application were to receive "/itv/vzw/s1/f3" the file delivery framework may have to receive the file bundle again.

FIG. 57 is a data structure diagram illustrating an example file bundle entry in a managed element table (MET). As illustrated in FIG. 57, in an embodiment, the entry for an element corresponding to a file bundle in the managed element table may have the following information: ID of the element corresponding to the file bundle (EID); a flag indicating the element is a file bundle (FB); selection strings that specify which files in the file bundle have been saved (Selection Strings); and a sub-entry that has the file name(s), element ID and storage name for each element in the file bundle.

Figure 58:
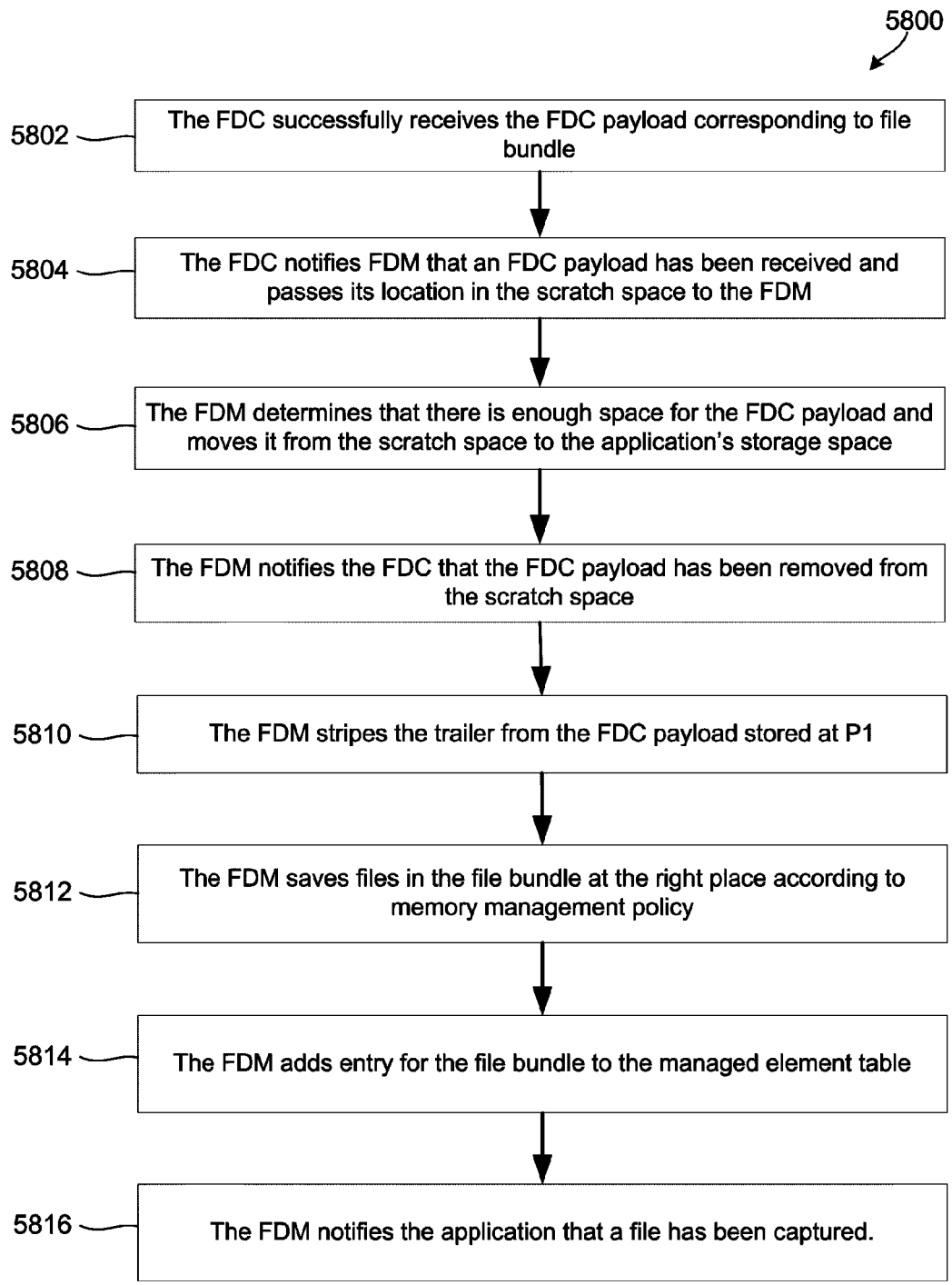
FIG. 58 is a process flow diagram of an embodiment method for receiving and saving a file bundle in an application storage space.

FIG. 58 illustrates an example method 5800 for receiving and saving a file bundle in an application storage space. As discussed above, after successfully receiving an element corresponding to a file bundle, the file delivery framework may save the files in the bundle in the application storage space. In step 5802, the file delivery core successfully receives the file delivery core payload corresponding to a file bundle. In step 5804, the file delivery core may notify the file delivery file management layer that a file delivery core payload has been received and has its location in the scratch space to the file delivery file management layer. In step 5806, the file delivery file management layer may determine that there is enough space for the file delivery core payload and move it from the scratch space to the application's storage space. In step 5808, the file delivery file management layer may notify the file delivery core that the file delivery core payload has been removed from the scratch space. In step 5810, the file delivery file management layer may strip the trailer from the file delivery core payload stored in a memory (e.g., P1). In step 5812, the file delivery file management layer may save files in the file bundle at an appropriate location in accordance with the application's memory management policy. In step 5814, the file delivery file management layer may add an entry for the file bundle to the managed element table. In step 5816, the file delivery file management layer may notify the application that a file has been captured.

Figure 59:
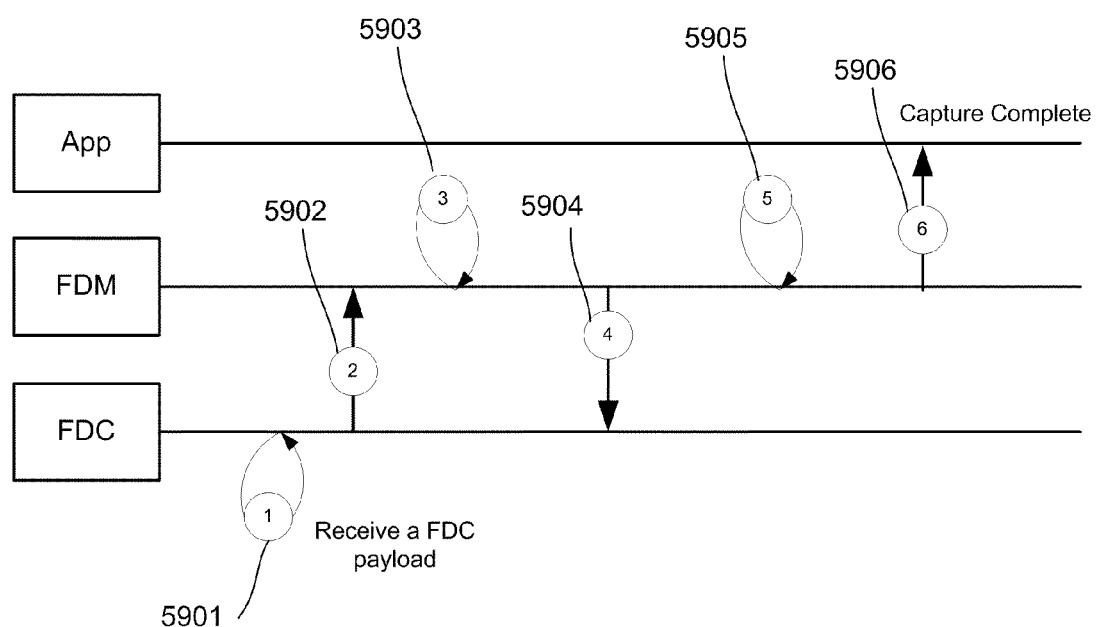
FIG. 59 is a flow diagram illustrating an example dataflow and interactions between an application layer (App Layer), a file delivery core (FDC) layer and a file delivery file management (FDM) layer in receiving and saving a file bundle in an application storage space.

FIG. 59 is an example of data flows and interaction call flows between the application layer (App layer), the file delivery core (FDC) layer and the file delivery file management (FDM) layer in method 5800. In operation 5901, the file delivery core successfully receives the file delivery core payload corresponding to file bundle. In call flow 5902, the file delivery core notifies the file delivery file management layer that a file delivery core payload has been received. The file delivery core then passes the file delivery payload's location in the scratch space to the file delivery file management layer. In operation 5903, the file delivery file management layer determines whether there is sufficient space for the file delivery core payload and moves the file from the scratch space to the application's storage space. In call flow 5904, the file delivery file management layer notifies the file delivery core that the file delivery core payload has been removed from the scratch space. In operation 5905, the file delivery file management layer strips the trailer from the file delivery core payload stored in memory (e.g., P1), saves files in the file bundle, and adds an entry for the file bundle to the managed element table. In call flow 5906, the file delivery file management layer notifies the application that a file has been captured. In an embodiment, the file delivery framework on the device may delete a received file bundle after successfully saving the files contained within the file bundle.

Figure 60:
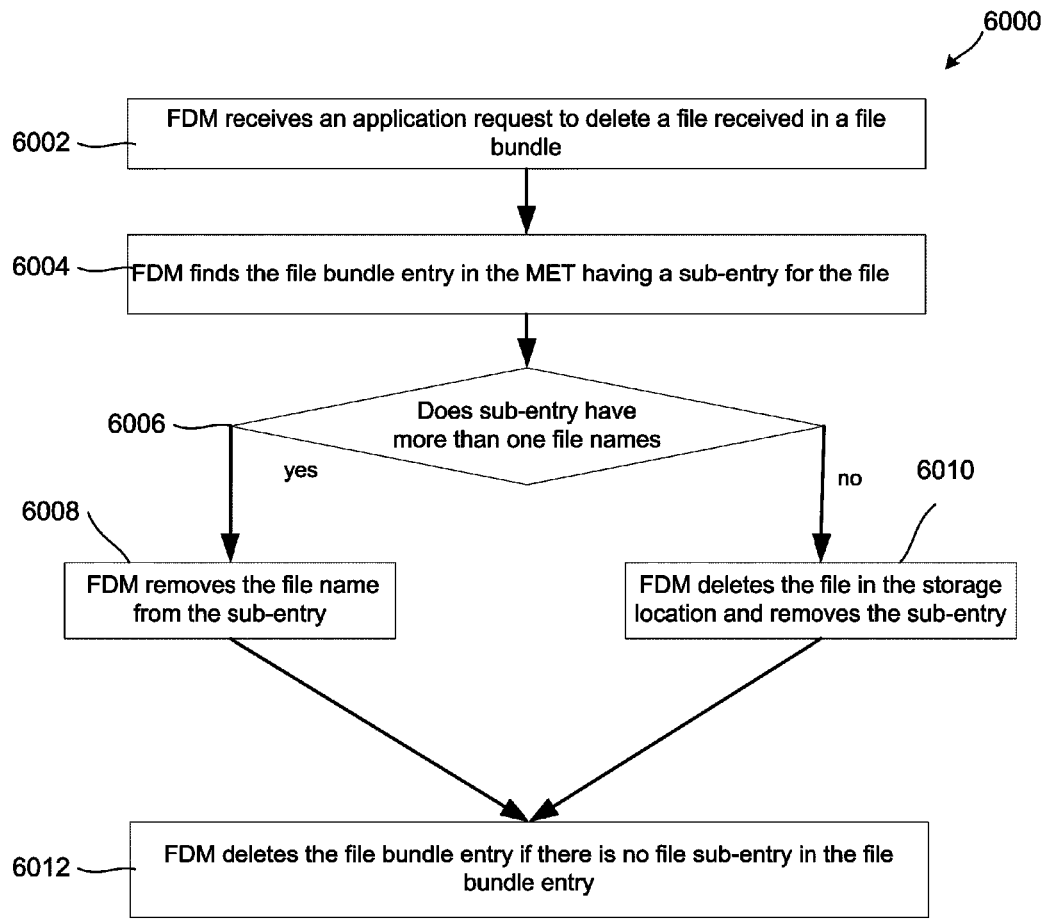
FIG. 60 is a process flow diagram of an embodiment method for deleting files received from a file bundle.

FIG. 60 illustrates an example method 6000 for deleting files received from a file bundle. In step 6002, an application may issue a request to the file delivery framework to delete a file received in a file bundle. In step 6004, the file delivery file management layer may find the file bundle entry in the managed element table that has a sub-entry for the file. In determination step 6006, the file delivery file management layer may determine if the sub-entry has more than one file names associated with it. If the file delivery file management layer determines that the sub-entry has more than one filename (i.e., determination step 6006="yes"), the file delivery file management layer may remove the file name from the sub-entry in step 6008. If the sub-entry does not have more than one file name (i.e., determination step 6006="no"), in step 6010, the file delivery file management layer may delete the file in the storage location and remove the sub-entry from the managed element table. If there is no file sub-entry in the file bundle entry (i.e., all the files received in the file bundle have been deleted), in step 6012, the file delivery file management layer may delete the file bundle entry from memory. In an embodiment, a file bundle element may be considered to exist if a subset of its files has been deleted. In an embodiment, the file delivery framework may be notified whenever the file deletion process is initiated by the application so that the deleted files are not downloaded again. In an embodiment, the file delivery framework on the device may consider a file bundle element as existing when at least one file in the file bundle exists on the device.

Figure 61:
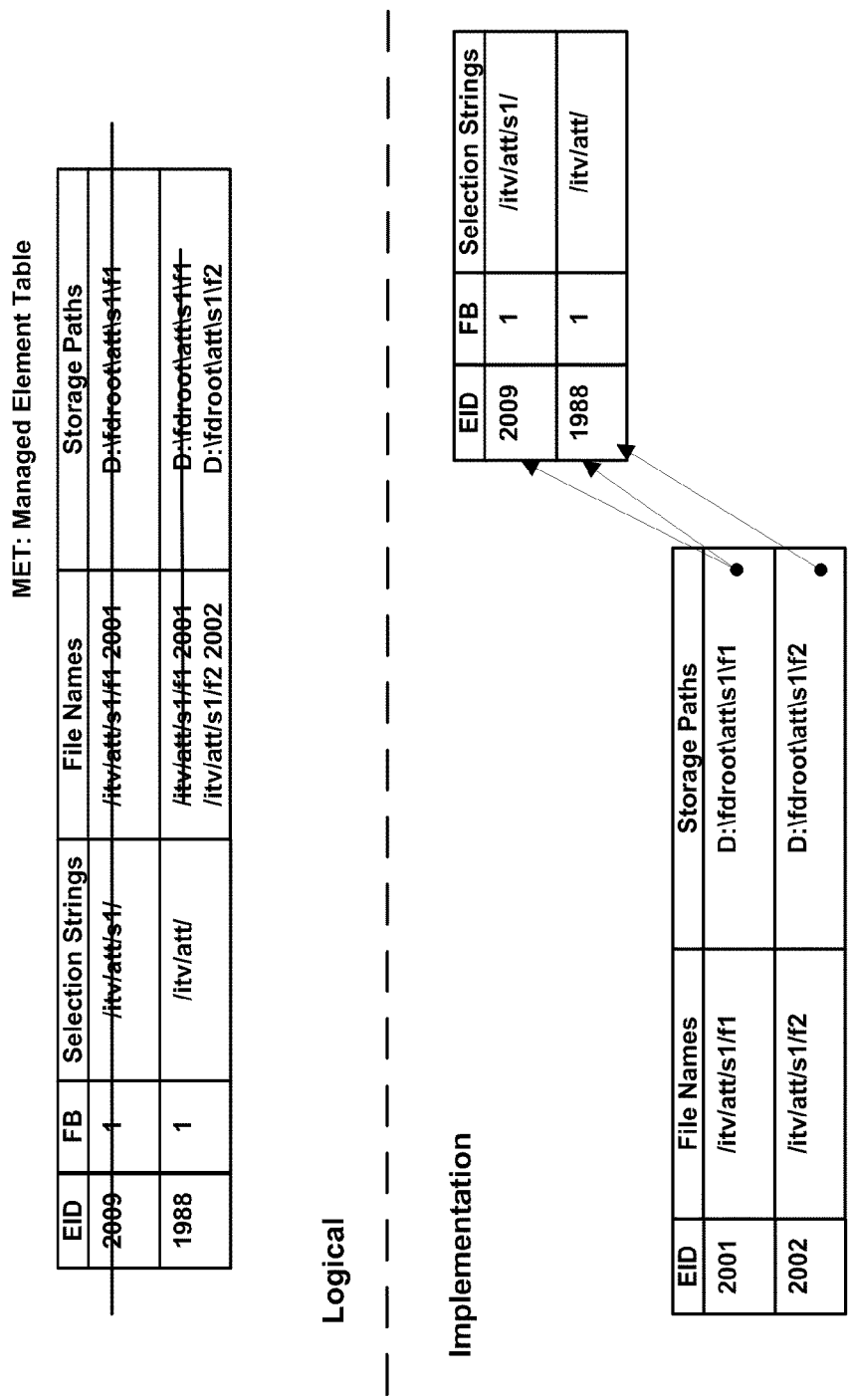
FIG. 61 is flow diagram illustrating logical and exemplary data flows involved in deleting files received from a file bundle.

FIG. 61 is a data structure diagram illustrating logical and exemplary data flows involved in deleting files received from a file bundle. FIG. 61 illustrates how when a sub-entry has only one file name associated with it (e.g., EID 2009), the file delivery file management layer may delete the file in the storage location and remove the entire sub-entry (indicated by the line through EID 2009). FIG. 61 also illustrates how, if the sub-entry has more than one file names associated with it (e.g., EID 1988), the file delivery file management layer may only remove the file name from the sub-entry (indicated by the line through the file name /itv/att/s1/f1 2001 and storage path D:/fdroot/att/s1/f1).

Figure 62:
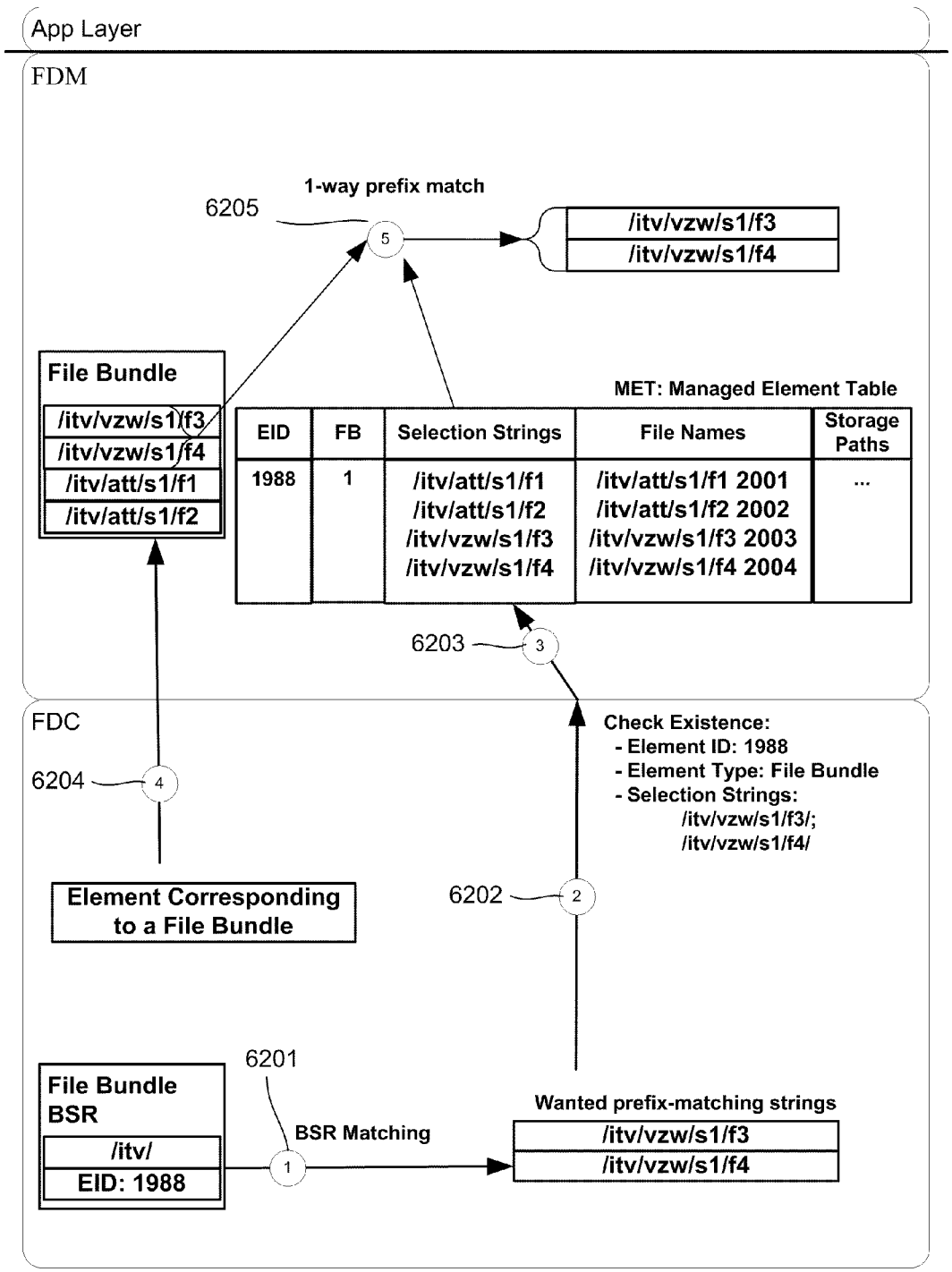
FIG. 62 is a flow diagram illustrating an example dataflow that displays interactions between an application layer (App Layer), a file delivery core (FDC) layer and a file delivery file management (FDM) layer in receiving a file bundle that was previously received.

FIG. 62 illustrates example data flows that and interaction call flows between the application layer (App layer), the file delivery core (FDC) layer and the file delivery file management (FDM) layer in receiving a file bundle that was previously received. In operation 6201, the file bundle broadcast schedule record (BSR) is received by the file delivery core and two-way-prefix-matched. In call flow 6202, the file delivery core passes the selection strings, element id and element type to the file delivery file management layer so that it may determine whether the file already exists and determine if the file bundle should be received. In operation 6203, the file delivery file management layer maintains the selection strings ("/itv/vwz/s1/f3" and "/itv/vwz/s1/f4") for the element corresponding to the file bundle. In call flow 6204, an element, or file delivery core payload, corresponding to a file bundle is received by the file delivery core and passed to the file delivery file management layer. As illustrated in FIG. 62, the file bundle may have four files: /itv/vzw/s1/f3, /itv/vzw/s2/f4, /itv/att/s1/f1, and /itv/att/s2/f2. In the illustrated example, the file delivery file management layer determines that the file delivery framework has received the file bundle before but has only saved two of the files: /itv/vzw/s1/f3 and /itv/vzw/s2/f4. This may be the case when, for example, an application running on the application layer had previously requested two of the files (e.g., /itv/att/s1/f1, and /itv/att/s2/f2) in the file bundle, and then issued another request for two new files (e.g., /itv/att/s1/f3 and /itv/att/s2/f4) which happen to be in the same file bundle as the first two files. In call flow 6203, the file delivery file management layer receives the file bundle from the file delivery core again and saves only the two, newly requested, files (e.g., /itv/vzw/s1/f3 and /itv/vzw/s2/f4) in the file bundle to a memory.

Figure 63:
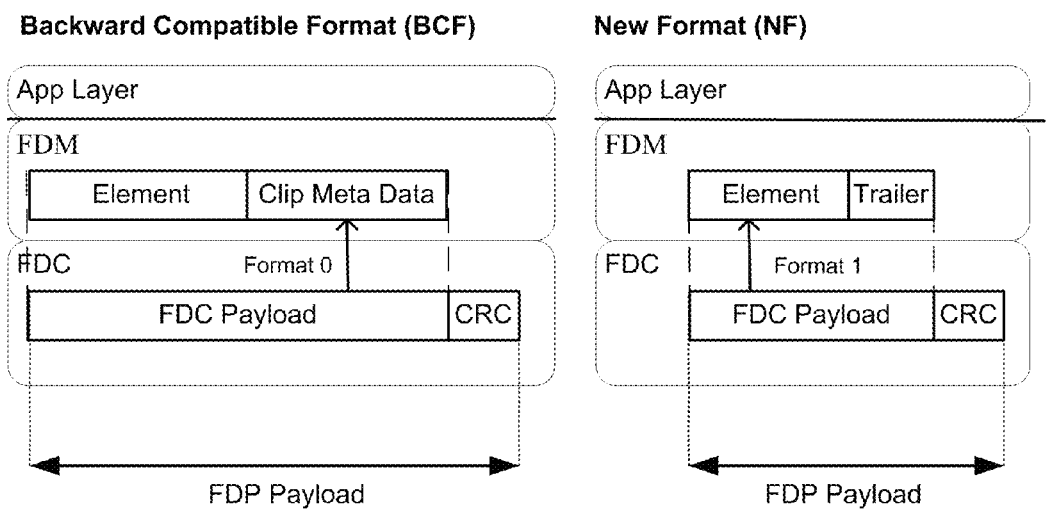
FIG. 63 is a data structure diagram illustrating various file delivery core payload formats used to exchange data between a file delivery core (FDC) and a file delivery file management (FDM) layer.

FIG. 63 illustrates an example file delivery core payload format that may be used to exchange data between the file delivery core and the file delivery file management layer. In an embodiment, the file delivery core and file delivery file management layer may be configured to support multiple file delivery core payload formats simultaneously. In an embodiment, the file delivery core payload format may be specified by a parameter, flag, or bit (e.g., FD_MODE) in the broadcast schedule record. In an embodiment, setting an FD_MODE bit to 0 selects a first format, whereas setting the FD_MODE bit to 1 selects a second format.

Figure 64:
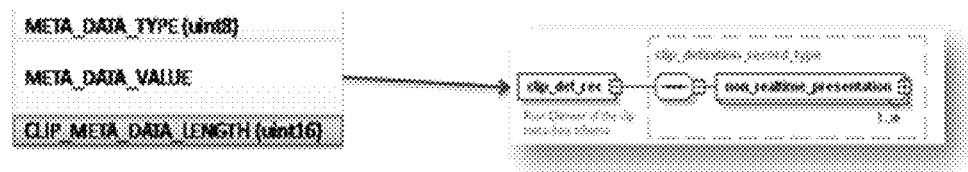
FIG. 64 is a data structure diagram illustrating another example file delivery core payload format.

FIG. 64 illustrates an example file delivery core payload format corresponding to the backward compatible format (BCF) illustrated in FIG. 63. The file delivery core payload format illustrated in FIG. 64 may contain either a single file or a file bundle that includes multiple files. The BCF file delivery core payload format may include a clip meta data at the end. The file delivery core payload format may include optional element ID and file name(s) added to a non_realtime_presentation XML element for the file or the files in the file bundle in the clip_def_rec XML element in the clip meta data. In various embodiments, receiver devices may receive, and have access to, the Element IDs and file names. In an embodiment, receiver devices may ignore any new fields that they don't recognize.

Figure 65:
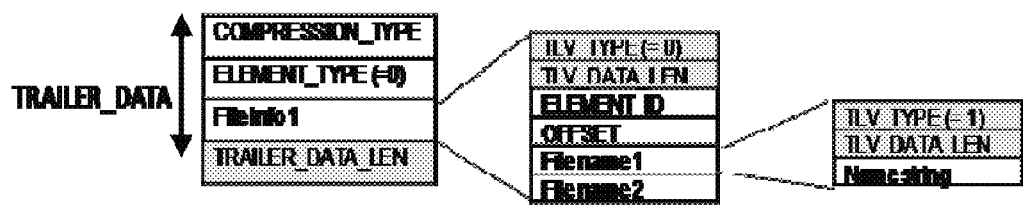
FIG. 65 is a data structure diagram illustrating an example file delivery core payload format for an element that is a single file that has two names.
Figure 66:
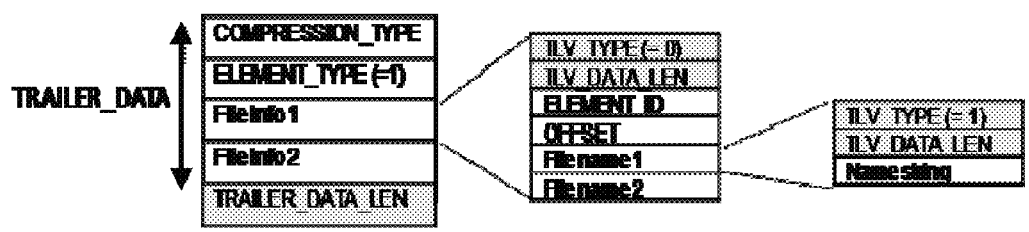
FIG. 66 is a data structure diagram illustrating an example file delivery core payload format for an element that is a file bundle that has a file that has two names.

FIGS. 65 and 66 illustrate an example file delivery core payload format corresponding to the format illustrated in FIG. 63. Specifically, FIG. 65 illustrates an example file delivery core payload format for an element that is a single file which has two names. FIG. 66 illustrates an example file delivery core payload format for an element that is a file bundle that includes a file (e.g., file 1) which has two names. The file delivery core payload formats illustrated in FIGS. 65 and 66 may contain an element portion that is either a single file or a file bundle comprising a concatenation of files. The illustrated file delivery core payload formats have a trailer section that contains the following information fields: Trailer Data Length; Trailer Data; and Element ID. The Trailer Data field may further include a Compression Type field that specifies which compression scheme is to be applied over the element portion of the file delivery core payload. In an embodiment, the Element Type field may indicate whether the element is a file or a file bundle. If the element is a file, as illustrated in FIG. 65, the trailer may also include additional information fields for element types and filenames. If the element is a file bundle, as illustrated in FIG. 66, the trailer may include information fields for element IDs, offsets, and filenames for each file in the bundle.

Figure 67:
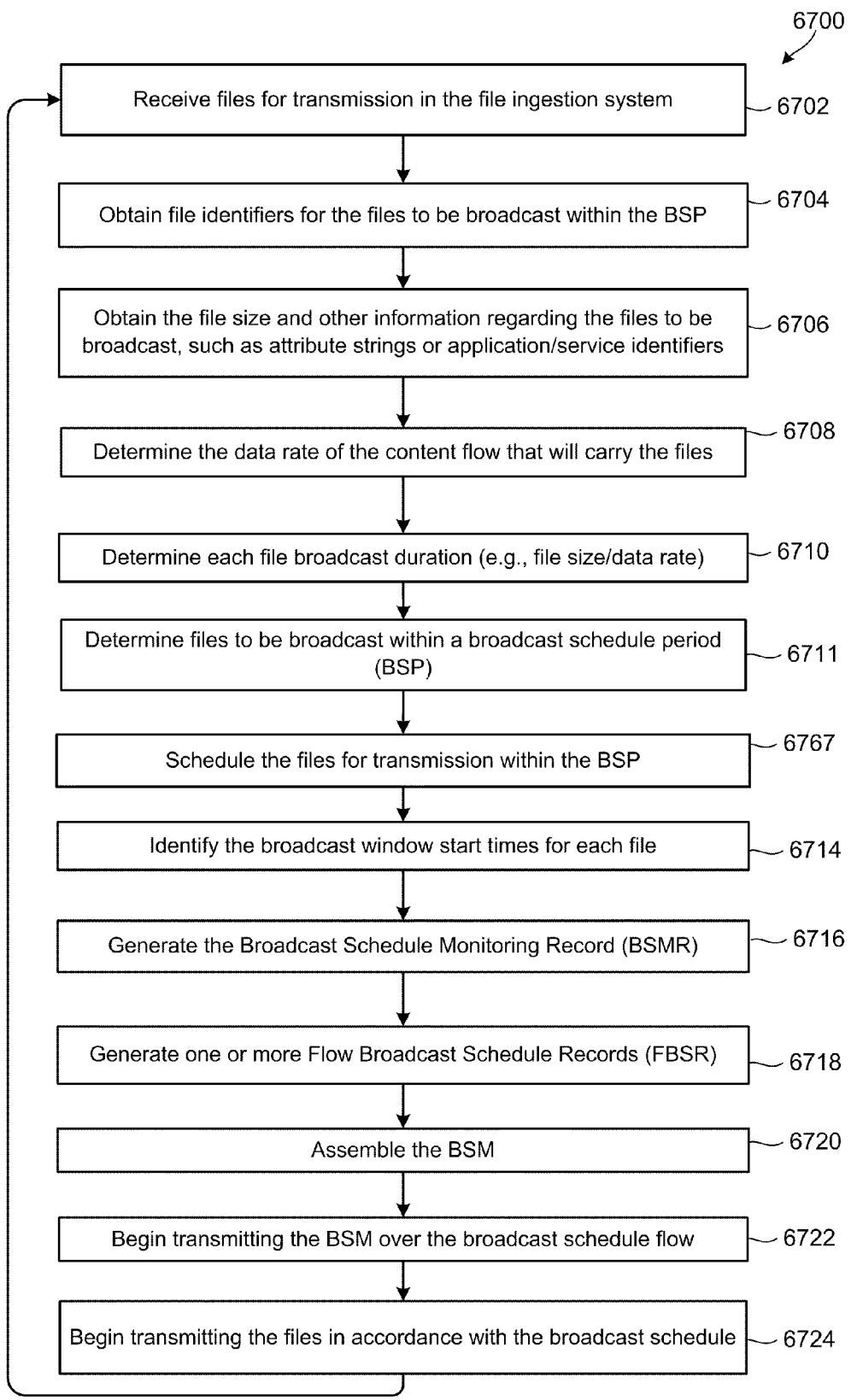
FIG. 67 is a process flow diagram of an embodiment method for generating and transmitting a broadcast schedule message.

As discussed above with reference to FIG. 4, applications (e.g., headend apps 42, 43) provide files for transmission to the file ingestion server 31. The file ingestion server 31 delivers the files, along with broadcast schedule messages, to the receiver devices via the file transport network 41. FIG. 67 illustrates an example method 6700 for ingesting the files, scheduling the files for transmission, generating broadcast schedule messages and broadcasting the generated broadcast schedule messages. In method 6700 at step 6702, a server in the headend system, such as the file ingestion server 31, may receive files for transmission from one or more headend applications 42, 43. In step 6704, the server may generate a file and/or element and obtain/generate file or element identifiers for the files to be broadcast as part of the ingestion process. In step 6706, as part of the ingestion process the server may obtain the file size, as well as other information regarding the files, such as file attribute strings, or application/service identifiers as described above. In step 6708, as part of the ingestion process the server may determine the data rate of the content flow that will carry the data files. The data rate may vary depending upon broadcast resource availability. The data rate may also remain fixed, such as if specified for a particular file delivery type.

As part of the ingestion process, in step 6710, the server may determine each file's broadcast duration, such as by dividing the file size by the file delivery data rate. In step 6711 the server may, based upon the transmission duration, determine which files are to be broadcast within the next broadcast schedule period (BSP). It should be noted that scheduling process and the BSM generation process are disjoint processes, and are described together here for brevity. For example, the file scheduling process may not be bound to the next 15 min period (e.g., a file may be scheduled for transmission 3 hours from ingestion), whereas the BSM generation process may periodically (e.g., every 15 minutes) determine the contents of the BSM as the current transmission schedule defined for the next period (e.g., 15 minutes). The processes of file scheduling at ingestion and BSM generation are discussed in greater detail further below.

In step 6712, the server may schedule the files for transmission within the broadcast schedule period. As part of scheduling files for transmission within the broadcast schedule period, in step 6714, the server may identify the broadcast window start times for each file within the broadcast schedule period. In step 6716, the server may generate a broadcast schedule message and the broadcast schedule monitoring record (BSMR) specifying the record type, the record data link and the time of the next update to the broadcast schedule message (e.g., next monitoring time).

As part of generating the broadcast schedule message, the server may generate one or more flow broadcast schedule records (FBSR) in step 6718. As part of generating the broadcast schedule message, the server may then assemble the broadcast schedule message from the received and generated information, including identifying the broadcast window for each of the files that will be broadcast within the BSP in step 6720. In step 6722, the server may submit the assembled broadcast schedule message to the broadcast network to begin repeated transmission over the broadcast schedule flow, and in step 6724, the server may submit the files for broadcast to the broadcast network so that they may be transmitted over the file delivery data flow in accordance with the broadcast schedule specified in the broadcast schedule message. This process may repeat by the server returning to step 6702 to begin developing the broadcast schedule message for the next BSP.

As discussed above, once a file delivery application within a file content provider 9 submits files for transport over the broadcast network 1, the file ingestion system 31 may schedule those files for broadcast using the broadcast resources dedicated to file transport. These dedicated broadcast resources may be conceptually viewed as file delivery pipes. As discussed above, in various embodiments, more than one file delivery pipes may be used to broadcast the files over the broadcast network. The scheduling of ingested files and the time multiplexing of files in one or more file delivery pipes is illustrated in FIG. 7.

As discussed above, the file ingestion system 31 may receive files from a variety of different sources (i.e., headend applications) in a variety of different formats. The file ingestion system 31 schedules the various received files, generating the broadcast schedule message and coordinating with a file transport network 41, to ensure the files are broadcast within the broadcast window advertised within the broadcast schedule message.

Figure 68:
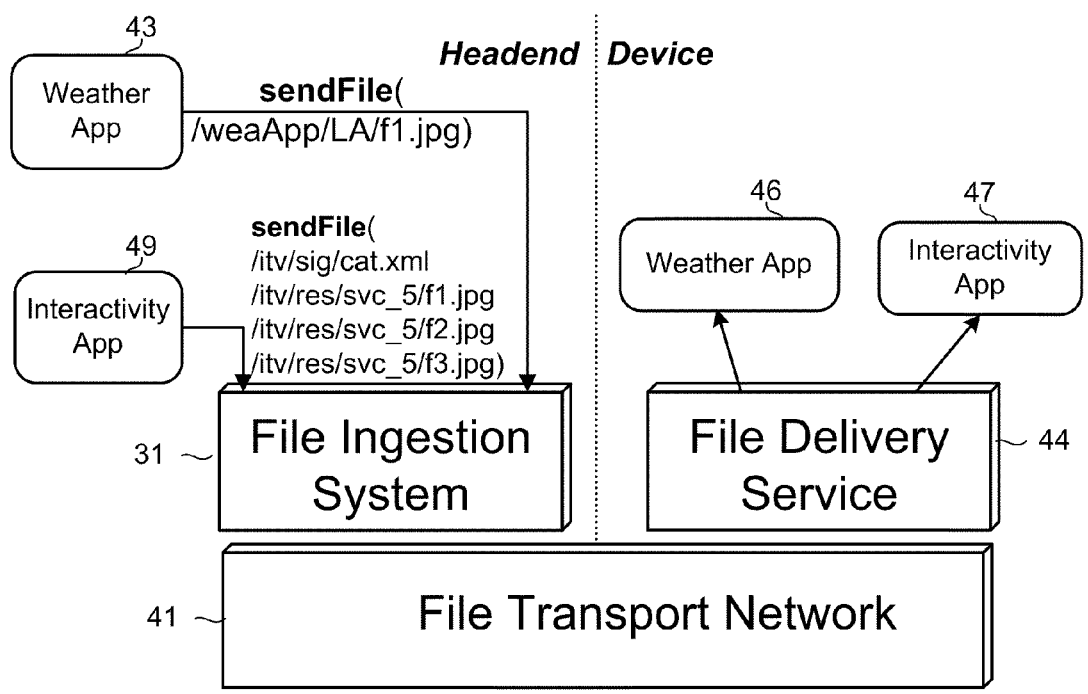
FIG. 68 is a system block diagram illustrating the ingestion and reception of files for multiple applications according to an embodiment.

FIG. 68 illustrates an example embodiment in which two headend applications submit files to the file ingestion system 31 for transport over the file transport network 41. In this illustrated example, the two headend applications are a weather application 43 and an interactivity application 49. In this example, the weather application 43 is using the file transport network 41 to deliver application files to a weather application 46 operating on the receiver device. Likewise, the interactivity application 49 is using the file transport network 41 to deliver interactivity resources and files to the interactivity application 47 on the receiver device. In the various embodiments, headend applications 43, 49 can interact with the file ingestion system 31 simply by providing the file along with the appropriate file command, such as sendFile (/weaApp/LA/f1.jpg) and other parameters in the data schema shown in FIG. 68. To send a series of files, the headend applications 43, 49 may specify the files in a single command, such as sendFile (/itv/sig/cat xml; itv/res/svc__5/ f1.jpg; /itv/res/svc__5/f2.jpg; /itv/res/svc__5/f3.jpg).

As FIG. 68 illustrates, some applications may only submit content files (e.g., a weather app might submit jpeg images) while others may submit content and overhead files (e.g., an interactivity app may submit jpeg images and a cat xml overhead file). Yet other applications may submit content files along with additional attribute information (e.g., an interactivity app may alternatively submit jpeg images and associated attributes describing characteristics for the files).

An application submitting overhead files to a file ingestion system may have different purposes for such overhead files. Such an overhead file may be used to provide the receiver devices with information regarding the files available for a device application. In an embodiment, such an overhead file may be in the form of a catalog file or a cat.xml file. A cat xml file may be used to provide a list of attributes that may enable receiver devices to select files for reception. The same attribute list information may also be made available via the ingestion interface such as by providing the data schema illustrated in FIG. 69. Additionally or alternatively, the attribute list could be carried in the broadcast schedule message.

Figure 69:
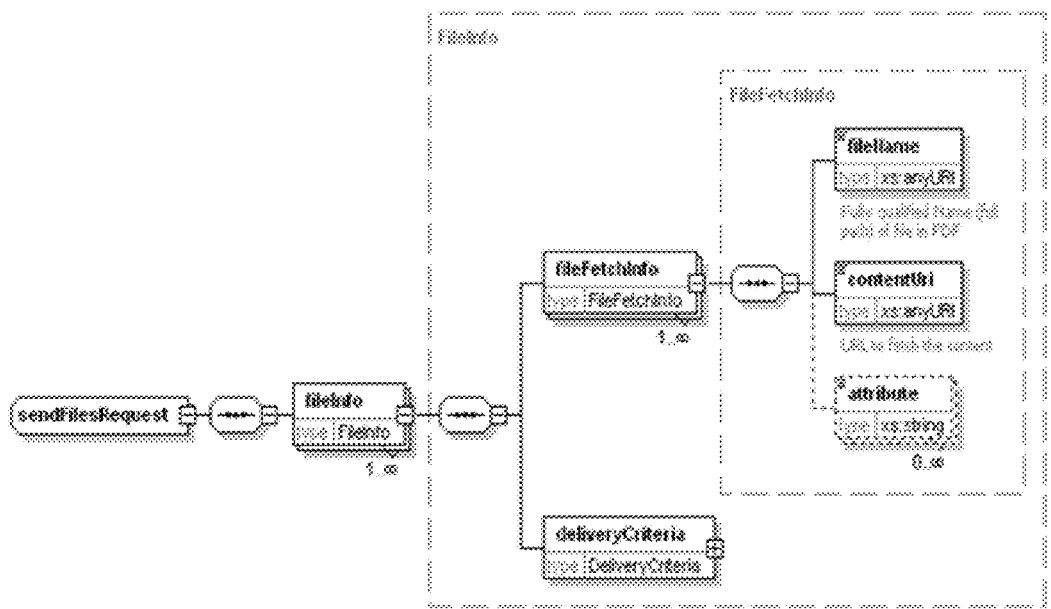
FIGS. 69 and 70 are example data schema suitable for submitting files to a file ingestion system according to an embodiment.
Figure 70:
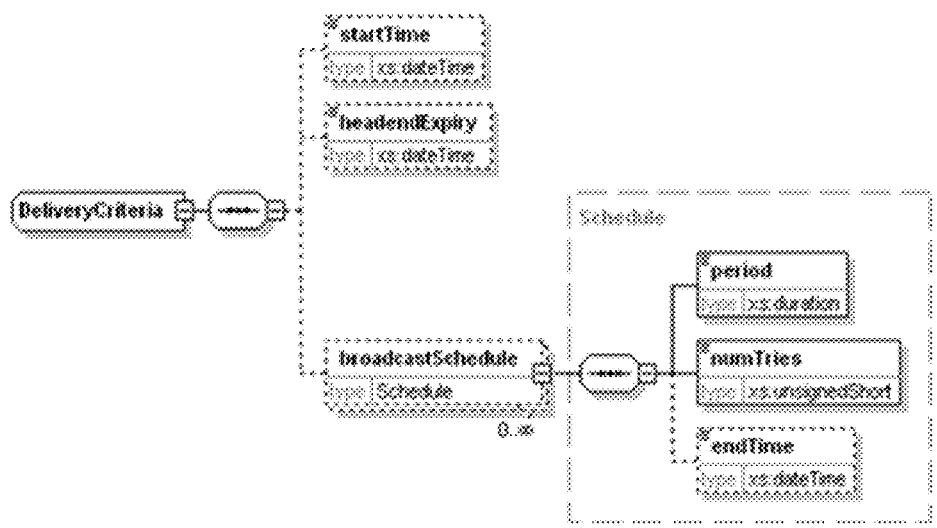

An example data schema that may be used to submit files to the file ingestion system 31 is illustrated in FIGS. 69 and 70. The file ingestion system may also provide an interface for receiving information regarding the file to be transmitted, such as delivery criteria. For example, as illustrated in the data schema shown in FIG. 70, the file ingestion interface file delivery request may specify a desired start time, and expiration time, or a broadcast schedule for the files to be transmitted. If a broadcast schedule is specified, the file delivery request may identify a period during which the file should be transmitted and the number of times that the file transmissions should be attempted. The broadcast schedule may also include an end time after which the file should not be transmitted.

The file delivery request operation may provide file delivery applications with the following features: a mechanism to identify a file submitted for transmission; a mechanism to submit multiple files at the same time; a mechanism to group files that may be related together at the application level; a definition of different delivery criteria requirements for each group of related files; and a mechanism which enables files that are submitted a second time to be recognized as a resubmission so that delivery criteria of previously submitted items can be updated.

The mechanism to identify a file submitted for transmission may be submitted via a file ingestion operation. In this operation, a content uniform resource locator (URL) may be identified which provides the location from which the file can be retrieved for broadcast by the file ingestion service. The mechanism may also identify additional parameters further associated with the content and context of the file being ingested for broadcast. For example, the additional parameters may include a filename that can be used to indicate the directory for the file in an application directory structure. The additional parameters may include an attribute list which provides parameters that characterize the file to enable receiver devices to filter and select a particular file for reception.

The mechanism that enables submission of multiple files at the same time may allow applications to identify those files which are related. For example, all interactivity files under a particular directory on a single file information unit in the file delivery request may be considered to be related. Headend applications may be able to ensure that files with cross dependencies are possibly bundled and scheduled for broadcast together. For example, the interactivity files listed in FIG. 68 may update the interactivity catalog file when new files are made available to the receiver device. With this interface, the /itv/sig/cat.xml file may be requested to be transmitted and made available on the receiver device before the new files under directory /itv/res/svc_5/ are transmitted, possibly as a bundle.

The mechanism to enable related files to be grouped together at the application layer may ensure that related files are subjected to the same delivery criteria and are equally needed by the receiver device. The file ingestion system may bundle files that are similar for more efficient use of forward error correction coding when transmitting the file over-the-air. The file injection service may use this relatedness information to bundle together files that are related. Other criteria to decide on bundling of files may also be considered. For example, the file ingestion system may group together different files that are associated with subscribed to services. Thus, the receiver device entitled to receive one file for one service may also be entitled to receive files for other services that are subscribed together.

The mechanism that enables headend applications to define different delivery criteria for transmission requirements for each group of related files may allow the application to request a level of quality of service (QoS) or transmission requirements for the broadcast of the ingested files. The quality of service may represent the quality of the transport service to the intended user population with respect to timeliness (e.g., freshness) and a successful delivery (e.g., redundant transmissions to ensure delivery failures are overcome). The file ingestion system 31 may schedule each group of related files such that their requested delivery criteria are met. If scheduling new files, the file ingestion system may ensure that the delivery criteria of previously ingested files are not compromised, when priority scheduling is considered. Previously scheduled files may be discarded to make room for new files in a priority-based scheduling. The file ingestion system may be configured so that when the same file is submitted a second or third time, it is recognized as a resubmission or update of a previously transmitted file, so that the delivery criteria for the previously submitted files may be reused.

Figure 71:
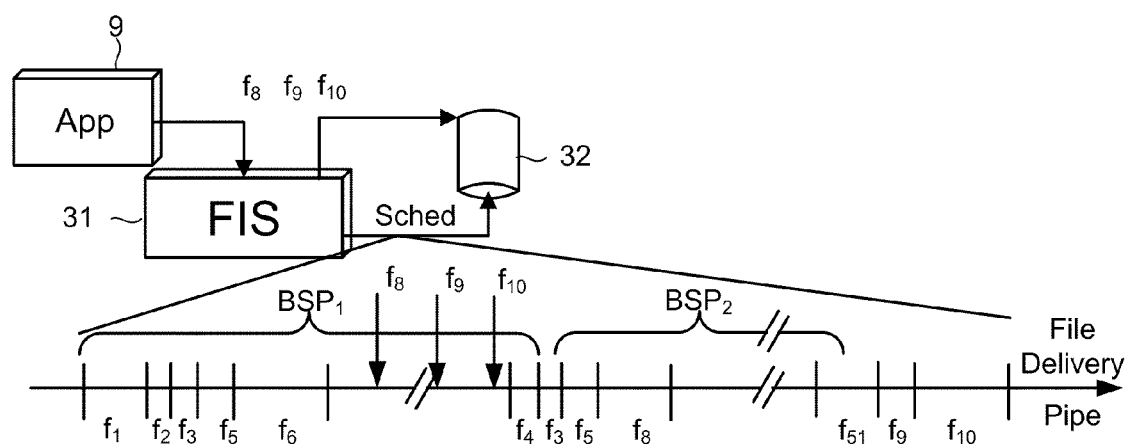
FIG. 71 is a timeline diagram illustrating file transmission scheduling as part of the file ingestion system according to an embodiment.

As the file ingestion system 31 receives files for ingestion, such as during a first broadcast schedule period, the earliest that new files can be scheduled for transmission is in the next broadcast schedule period, as illustrated in FIG. 71. For example, as files $f_8$, $f_9$ and $f_{10}$ are received from a file content provider 9 during a first broadcast schedule period ($BSP_1$), the file ingestion system 31 schedules the file transmissions for the next or later broadcast schedule period ($BSP_2$). As files are scheduled for transmission, they may be stored in a data store 32. The resulting updated broadcast schedule may also be stored in memory, such as in a database.

Files received during a current broadcast schedule period are only allowed to be scheduled for transmission in the next or subsequent broadcast schedule periods as illustrated in FIG. 71. This is because the schedule information in the current broadcast schedule period has already been advertised to the receiver devices via a current broadcast schedule message. Once a broadcast schedule message is broadcast, receiver devices may not be able to detect subsequent schedule changes in the broadcast schedule period that is covered by the broadcast schedule message, since the receiver devices may have deactivated the receiver circuits in order to conserve power if no files of interest are listed in the broadcast schedule message for transmission during the broadcast schedule. Therefore, selection of a broadcast schedule period duration may be a compromise between the possible freshness of content and how often devices will need to receive an updated broadcast schedule message. A smaller broadcast schedule period allows newly received files to be transmitted sooner; however, the need for receiver devices to frequently receive updated broadcast schedule message may impact their battery life.

The scheduler within the file ingestion system 31 therefore considers the current broadcast schedule period to be unavailable to carry newly received files. However, any time period beyond the current broadcast schedule period may be modified as that schedule has not yet been advertised to receiver devices. FIGS. 72A-72D illustrate how broadcast schedules may be modified depending upon when files are received and their urgency.

Figure 72A:
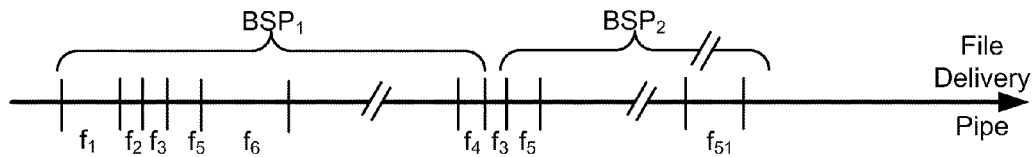
FIGS. 72A-72D are timeline diagrams illustrating how the scheduling of the transmission of files and a file delivery service may be dynamic to accommodate within the broadcast schedule new urgent files received by the file ingestion system.
Figure 72B:
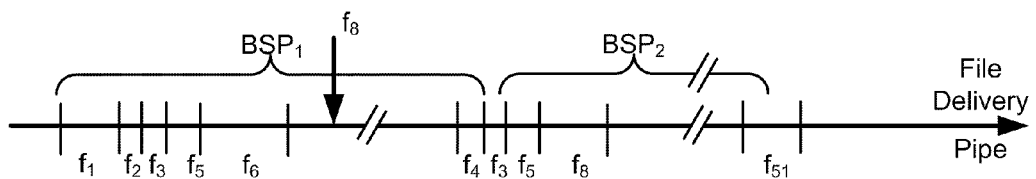
Figure 72C:
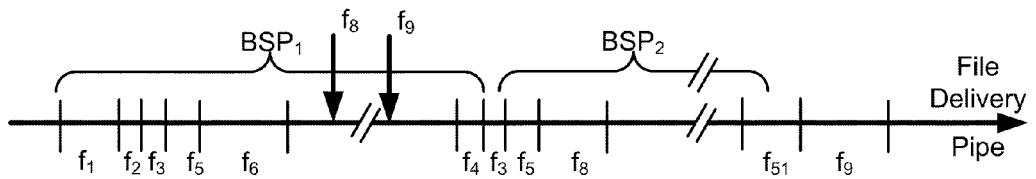
Figure 72D:
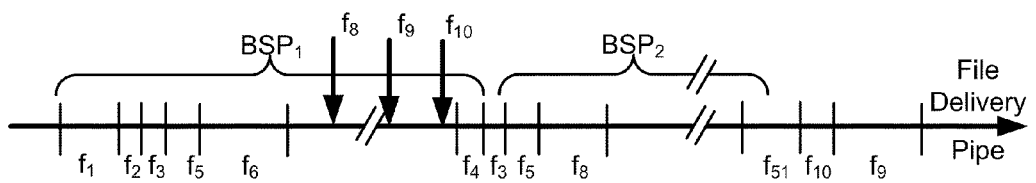

For example, FIG. 72A illustrates a scheduling state before new files $f_8$-$f_{10}$ are submitted to the file ingestion service 31 for transport. FIG. 72B illustrates the scheduling state for the situation in which file $f_8$ specifies urgent delivery requirements. In this situation, the file ingestion system 31 may cause other files with lower priority or less restrictive time delivery requirements (e.g., $f_{51}$) to be delayed (i.e. their scheduled broadcast windows are postponed). Other files (e.g., $f_5$) which cannot tolerate further delays are not rescheduled, and they continue to be scheduled for broadcast in their original broadcast windows. FIG. 72C illustrates a situation in which files in the next broadcast schedule period could not tolerate further delay by the time file $f_9$ is ingested, so file $f_9$ is scheduled for transmission in the subsequent broadcast schedule period. FIG. 72D illustrates the situation in which file $f_{10}$ is ingested at a time when files in the next broadcast schedule period cannot tolerate further delay, and file $f_{10}$ has more urgency than file $f_9$, and as a result, file $f_9$ is pushed into a later broadcast schedule period.

Figure 73:
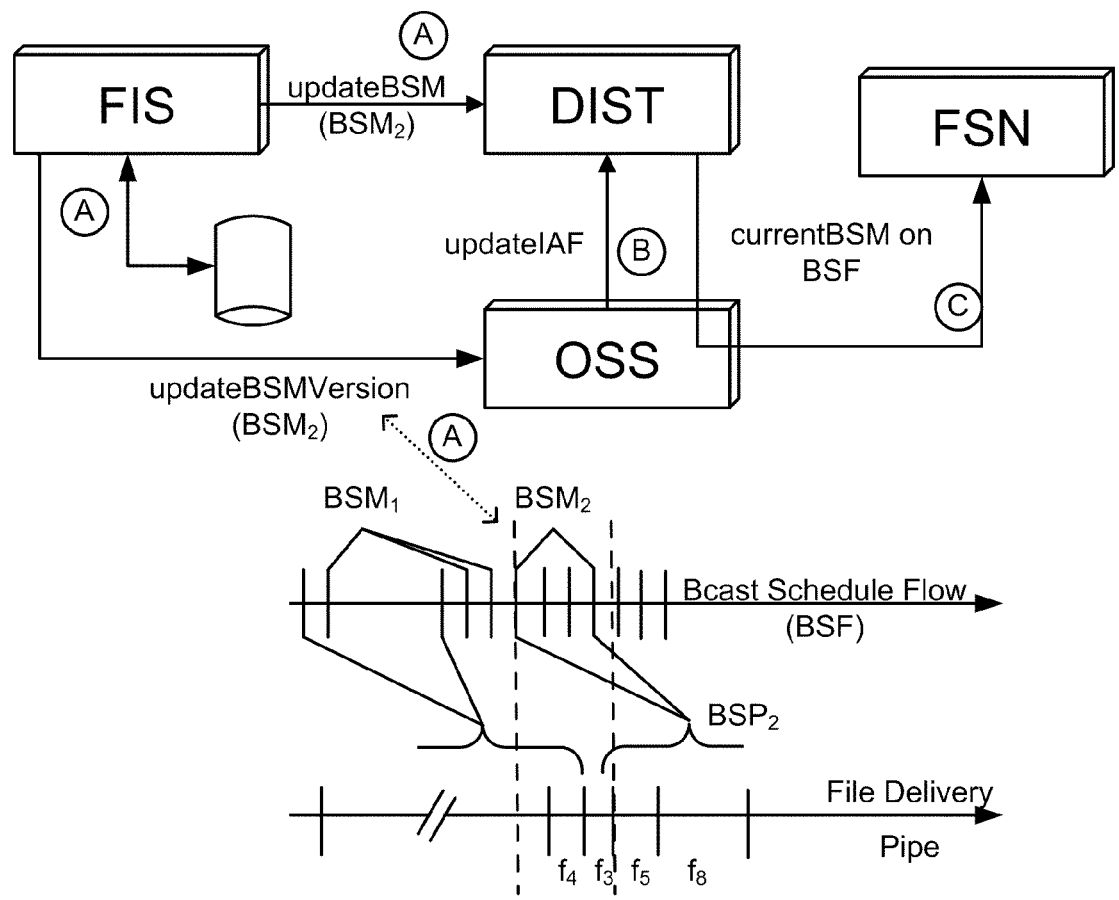
FIGS. 73 and 74 are illustrations of how the ingestion of files by the file ingestion system leads to the generation of a broadcast schedule message and to the transmission of ingested files at a scheduled time as listed in the Broadcast Schedule Message.

The file ingestion system may also be responsible for coordinating the delivery of files to the broadcast network or broadcast transmission. This process may involve the broadcast of broadcast schedule message (BSM) information, as illustrated in FIG. 73. This process may involve the dispatching of files to the broadcast network, as illustrated in FIG. 74.

Figure 75:
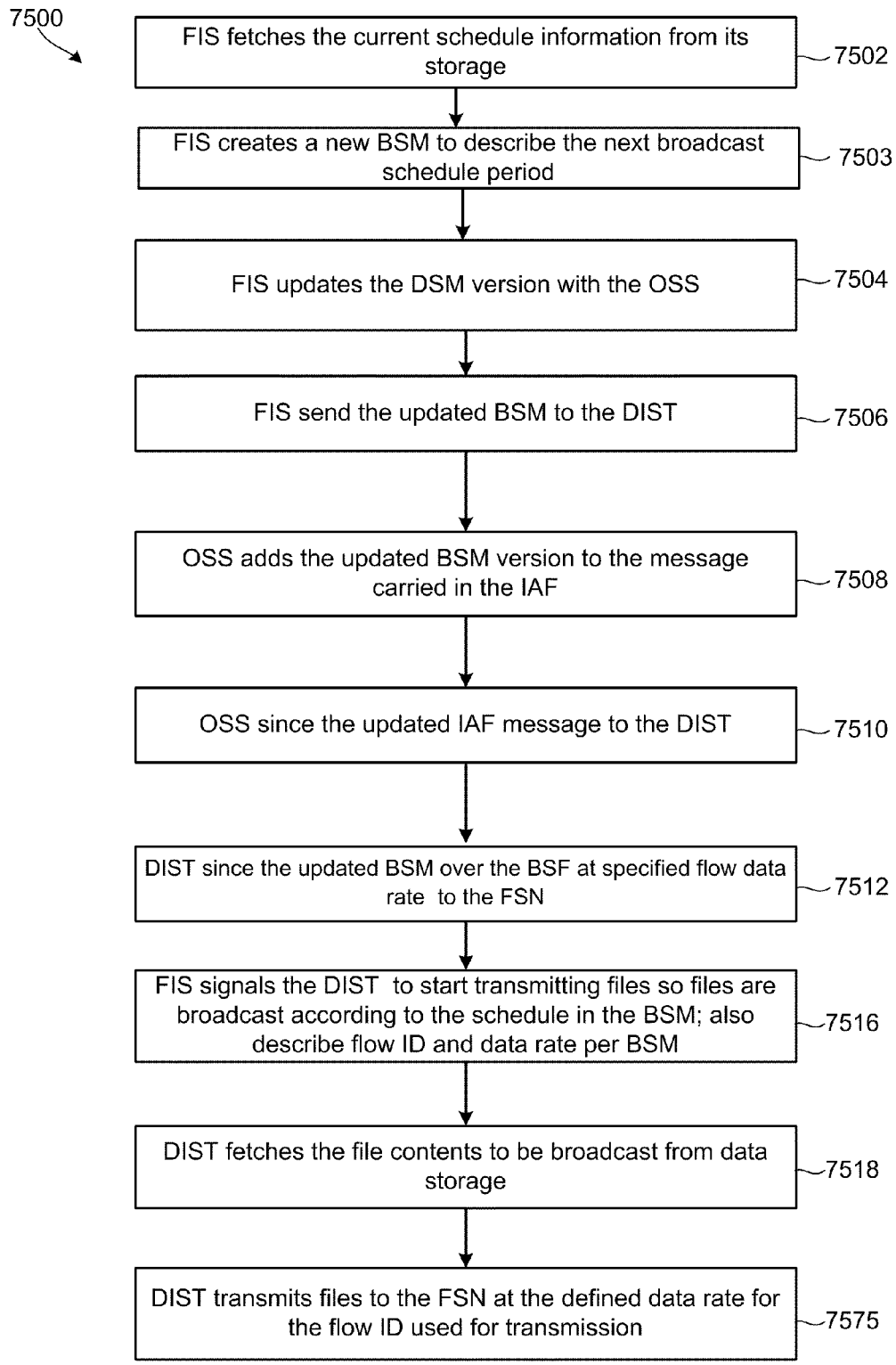
FIG. 75 is a process flow diagram of an embodiment method for ingesting and processing a file for deliver via a broadcast file delivery service.

Processes involved in updating the broadcast schedule message being transmitted over the air are illustrated in FIG. 73 and end in the process flow diagram of the example method 7500 illustrated in FIG. 75. At some time before the end of the current broadcast schedule period, the file ingestion system 31 may fetch the current schedule information from its storage 32, step 7502, and may create a new broadcast schedule message to describe the next broadcast schedule period in step 7503 (operation A). In step 7504, the file ingestion system may update the broadcast schedule message version with the OSS, which is a complement that manages and advertises overhead version changes. In step 7506, the file ingestion system may send the updated broadcast schedule message to the distribution server (DIST), which is a component that transmits files and overhead messages at a configured rate for broadcast. In step 7508, the OSS may add the updated broadcast schedule message version to the message carried in the initial acquisition flow (IAF), and may send the updated IAF message to the distribution server in step 7510 (communication B). The distribution server may send the updated broadcast schedule message over the broadcast schedule flow at the configured broadcast schedule flow data rate to the flow service node (FSN), which is a component within the broadcast network that is involved with the actual over the transmission.

Figure 74:
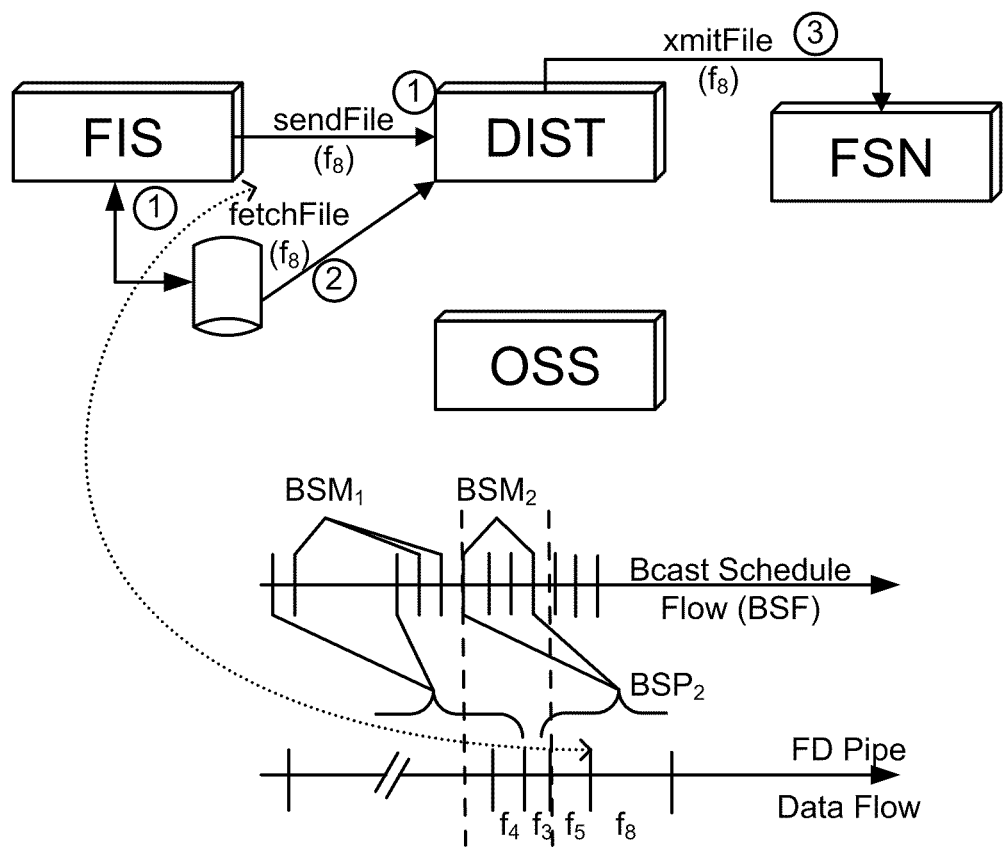

Processes involved in updating the transmitted broadcast schedule messages are illustrated in FIGS. 74 and 75. The file ingestion system 31 also makes use of the schedule information on the current broadcast schedule message, whose version is advertised via the OSS, and whose content is sent via the distribution server as described above. In step 7516, the file ingestion system may signal the distribution server (operation 1) to start transmitting files such that the files are broadcast over the air according to the broadcast schedule messages advertised to receiver devices. In doing so, the file ingestion service may describe the flow ID and data rate to be used when transmitting files consistent with the information described in the current broadcast schedule message. In step 7518, the distribution server may fetch the file contents to be broadcast next (operation 2), and then transmit the file to the FSN at the data rate defined for the flow ID used for the transmission of the files in step 7520 (operation 3).

As discussed above, transmission resources in a broadcast network, such as a MediaFLO® technology broadcast network, may be defined in terms of OFDM symbols within super frames, which in MediaFLO® are one second duration. The symbols on such super frames may be further divided into local and wide-area multiplex symbols. Different broadcast networks may have other time, frequency or code multiplexing mechanisms (i.e., different from OFDM) for the transport of media over the shared broadcast resources. The term "multiplex" is used herein to refer generally to broadcast resources available for media transport (e.g., over a given radio frequency bandwidth) via the broadcast network. The amount of broadcast resources available for transporting files may be a function of the radio frequency bandwidth, the transport encoding mechanism, and the amount of other media or data, such as real-time content and overhead data, also carried by the broadcast signal.

In a multimedia broadcast network, such as a MediaFLO® network, a variety of content may be broadcast simultaneously, including content designated for a local area, which is referred to as a local area content or a local multiplex (LM), and content provided to multiple local area broadcasters, which is referred to as wide area content for a wide multiplex (WM). The local and wide multiplex may be different parts (e.g., of an OFDM frame) of a multiplex that uses a given radio frequency bandwidth. The local area content may be content that is specific to a local operations infrastructure (LOI), such as a regional broadcast.

Figure 76:
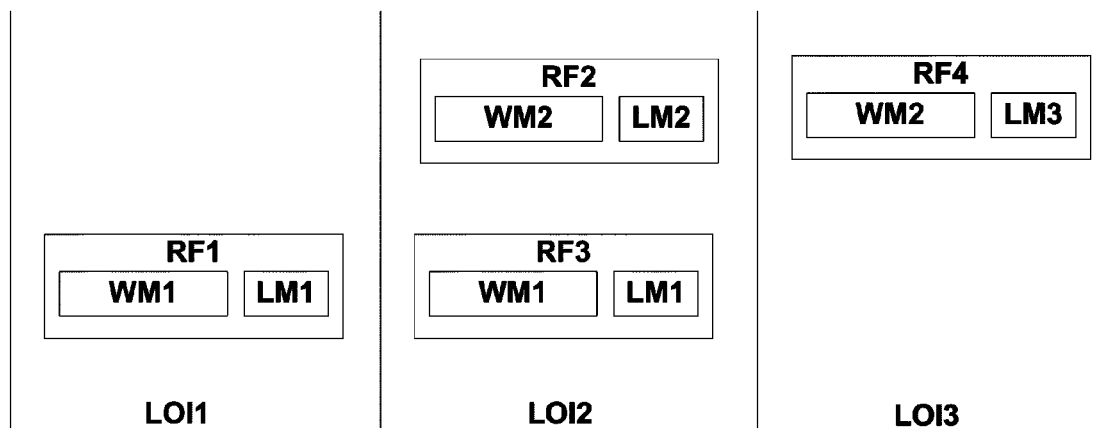
FIG. 76 illustrates how different signal multiplexes, made up of a wide multiplex and a local multiplex, may be broadcast in different local operating infrastructures.

FIG. 76 illustrates that, in any given local operations infrastructure, multiple radio frequency signals may exist. In the illustrated example, local operating infrastructure 1 (LOI1) includes a single radio frequency signal (RF1), which includes a first wide multiplex (WM1) and a first local multiplex (LM1) component. Local operating infrastructure 2 (LOI2) includes two radio frequency signals (RF2 and RF3), each made up of a wide multiplex (WM2, WM1) and a local multiplex (LM2, LM1). In the illustrated example, local operating infrastructure 3 (LOI3) includes a single radio frequency signal (RF4) made up of a wide multiplex (WM2) and a local multiplex (LM3).

As illustrated in FIG. 76, the wide and local multiplex components carried in any radio frequency signal may be the same as or different from those in other radio frequency signals. Additionally, the different radio frequency signals may also use different transport technologies, such as Media-FLO® technology, ISDB-T, ATSC-M/H, etc. FIG. 76 illustrates that a given multiplex (e.g., WM1 or LM2) may be carried in different radio frequency signals in different local operating infrastructures. Also, a given local operating infrastructure may have multiple radio frequency signals available.

Figure 77:
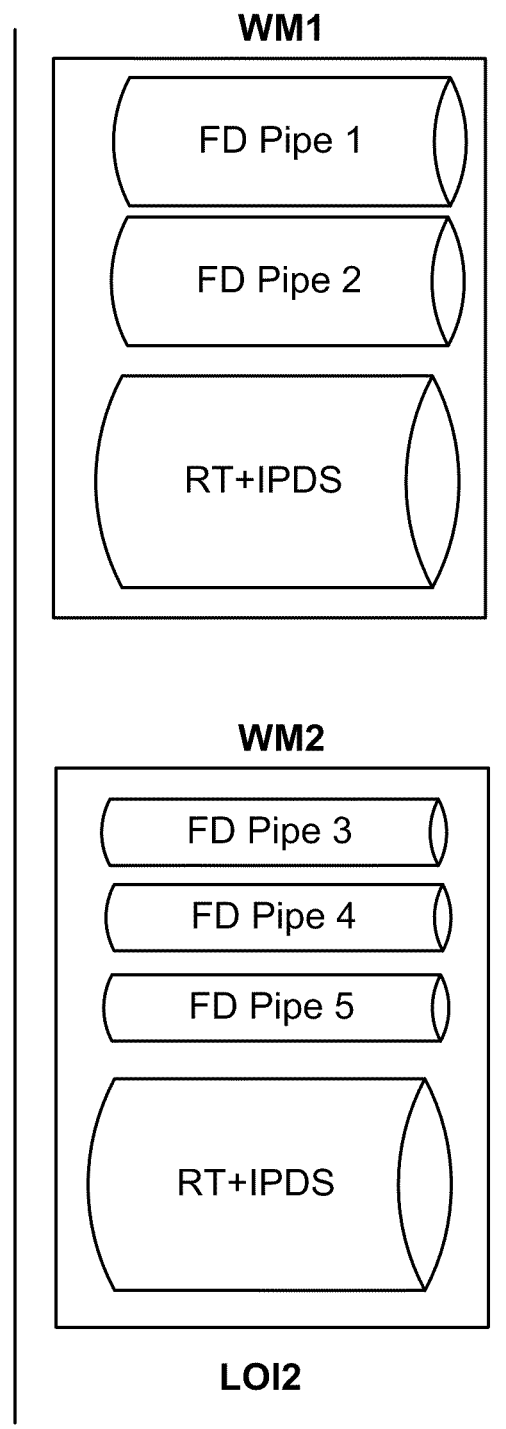
FIG. 77 is an illustration of how different capacity file delivery pipes may be allocated in different wide multiplex signals according to an embodiment.

FIG. 77 illustrates that multiple file delivery types may be defined per multiplex. As discussed above, the various embodiments may be implemented with the file transmissions sharing a single common resource pool, such as an amount of symbols (e.g., OFDM symbols) per second, per multiplex. As discussed above, such resource pools may be abstracted and defined as one or more file delivery pipes (FDPs) within the file delivery framework. FIG. 77 illustrates that many of these file delivery pipes may be defined in a single multiplex. Specifically, FIG. 77 illustrates that a wide multiplex (WM1) may include two file delivery pipes (FD Pipe 1, FD Pipe 2), allowing the rest of the multiplex bandwidth to be dedicated to transmitting real-time and IP data services (RT+IPDS). Similarly, a second wide multiplex (WM2) may include three file delivery pipes (FD Pipes 3-5), with the rest of the multiplex bandwidth dedicated to transmitting real-time and IP data services.

In various embodiments, the file delivery pipes may be organized within a broadcast network, as a logical entity defined by a multiplex (e.g., the geographic reach of the file delivery pipe), a transmission data rate, and a set of pipe flow IDs. The transmission data rate defined for a pipe may depend upon the portion of the multiplex bandwidth allocated to the pipe. In various embodiments, the amount of resources allocated to a file delivery pipe may be configurable, with the configuration depending upon the data rate supported by the deployed receiver devices.

FIG. 77 also illustrates that, in various embodiments, the file delivery pipes may be defined and organized by their data rates. The variation in the data rates of the file delivery pipes is illustrated by the diameter of each pipe (e.g., the file delivery pipes in WM1 have higher data rates, thus are fatter, than the file delivery pipes in WM2). Defining and organizing file delivery pipes into groups of higher and/or lower data rates helps address the limitations that arise from a diverse set of deployed receiver devices. For example, early generation receiver devices typically support a limited maximum data rate, whereas later generation receiver devices may be able to support higher data rates. Defining and organizing the file delivery pipes by their data rates allows the file delivery service to support both early and late generation receiver devices.

Figure 78A:
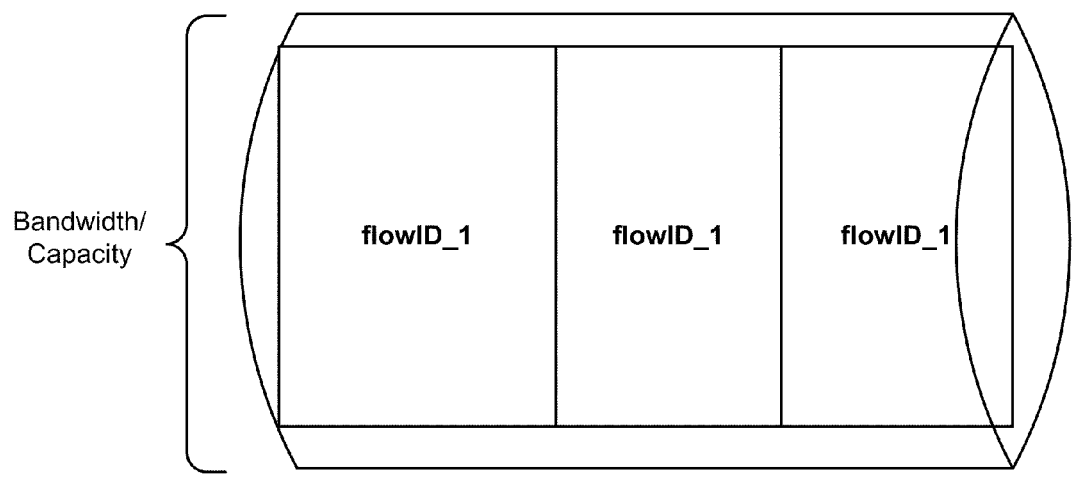
FIGS. 78A and 78B illustrate how file delivery transmissions may be transmitted over different capacity file delivery pipes.
Figure 78B:
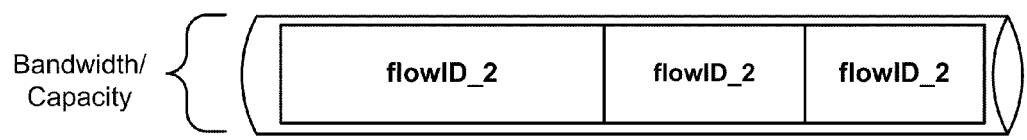

FIGS. 78A and 78B illustrate that the file delivery pipes may also be sized and organized to address time diversity considerations. For example, file delivery pipes in a multiplex may be organized to provide a high-bandwidth/high-capacity file delivery pipe for carrying large files, and a lower bandwidth/lower capacity file delivery pipe for carrying smaller files. Such an organization may be useful when the broadcast system is requested to transport small urgent files periodically. In various embodiments, the file delivery pipes may be defined as being either a "fat" file delivery pipe, illustrated in FIG. 78A, or a "thin" file delivery pipe, illustrated in FIG. 78B. By defining a "thin" file delivery pipe within the multiplex, the broadcast network can accommodate such urgent files when they are received without delay or disrupting the large file transmissions being carried over the "fat" file delivery pipe.

File delivery pipes may also be organized so as to separate the different types of file traffic, such as to support low latency small files on one pipe while carrying high-latency large files on a separate pipe, as illustrated in FIGS. 79A-79G. In various embodiments, the file delivery pipes may be configured to support "latency sensitive" datacasting for transporting the information. In various embodiments, the system may be configured such that it provides for uniform handling of all datacast transports. In various embodiments, the low latency traffic may be aggregated onto one or more delivery pipes. In various embodiments, multiple BSMs may used so as to support various preset and dynamic latency targets. In various embodiments, applications may apply Forward Error Correction (FEC) protection prior to the transport of latency sensitive data.

Figure 79A:
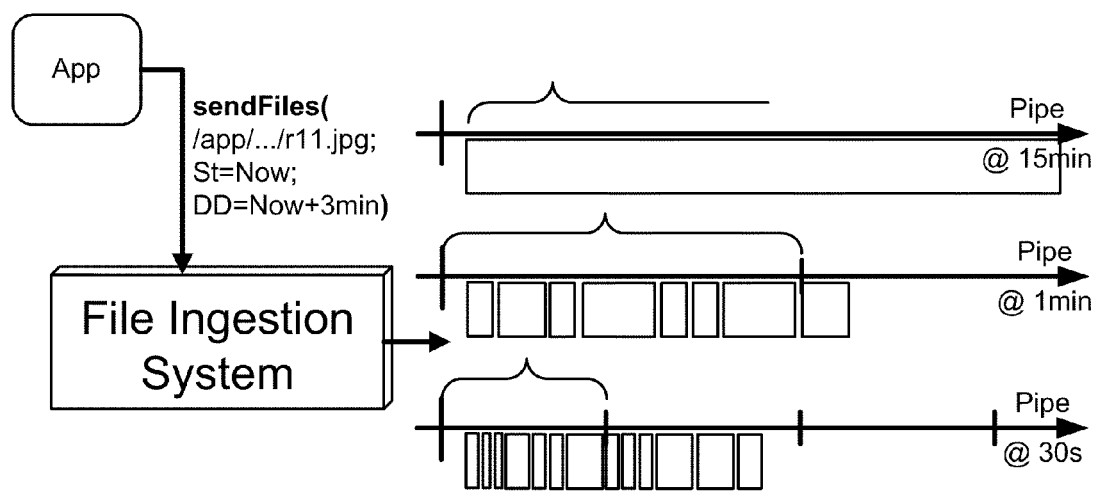
FIG. 79A is a timeline diagram illustrating data transmission organization aspects according to an embodiment.

FIG. 79A illustrates that the file delivery pipes may be defined to support different specific latency requirements, such as defining separate file delivery pipes for files with 15 minute, one minute and 30 second latency limitations. Provisioning of files to particular file delivery pipes may also be based upon priority. For example, FIGS. 78A-B and 79A illustrate that some file delivery pipes may be dedicated to low latency (i.e., urgent) application files, while other file delivery pipes may be dedicated to carrying medium-to high-latency (i.e., non-urgent) application files.

Figure 79B:
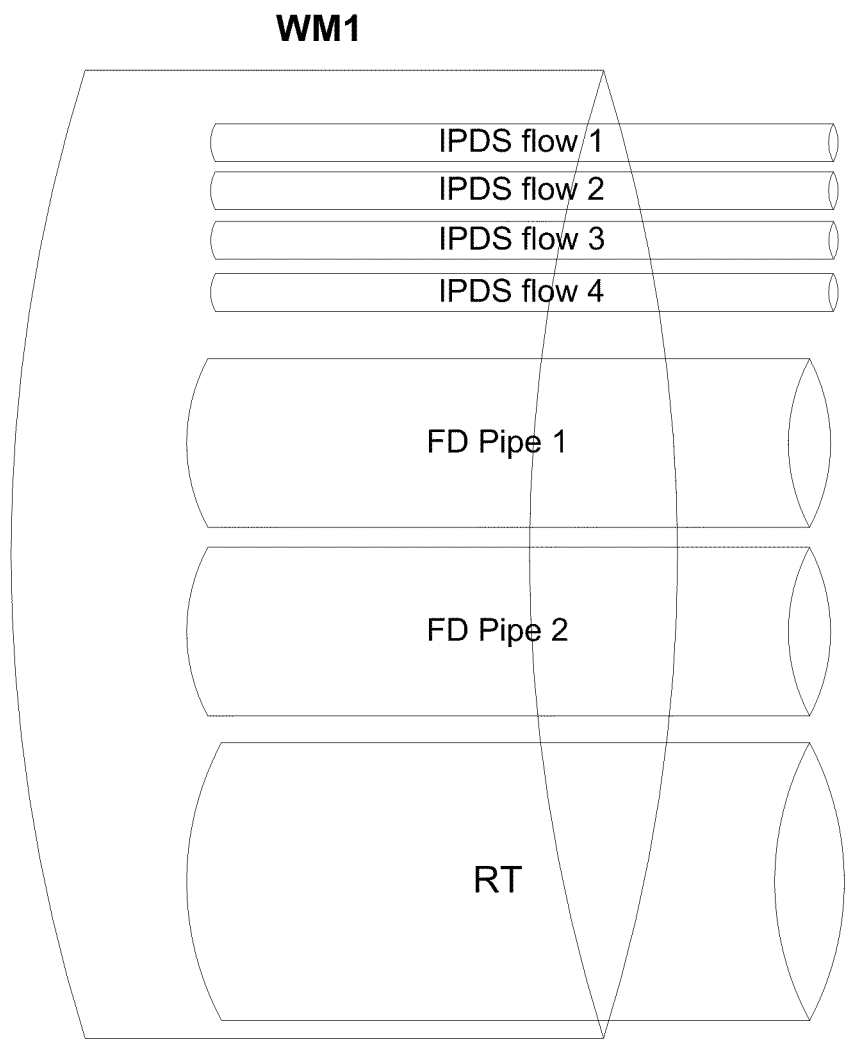
FIGS. 79B-79D illustrate how file delivery transmissions may be partitioned and transmitted over different file delivery pipes.
Figure 79C:
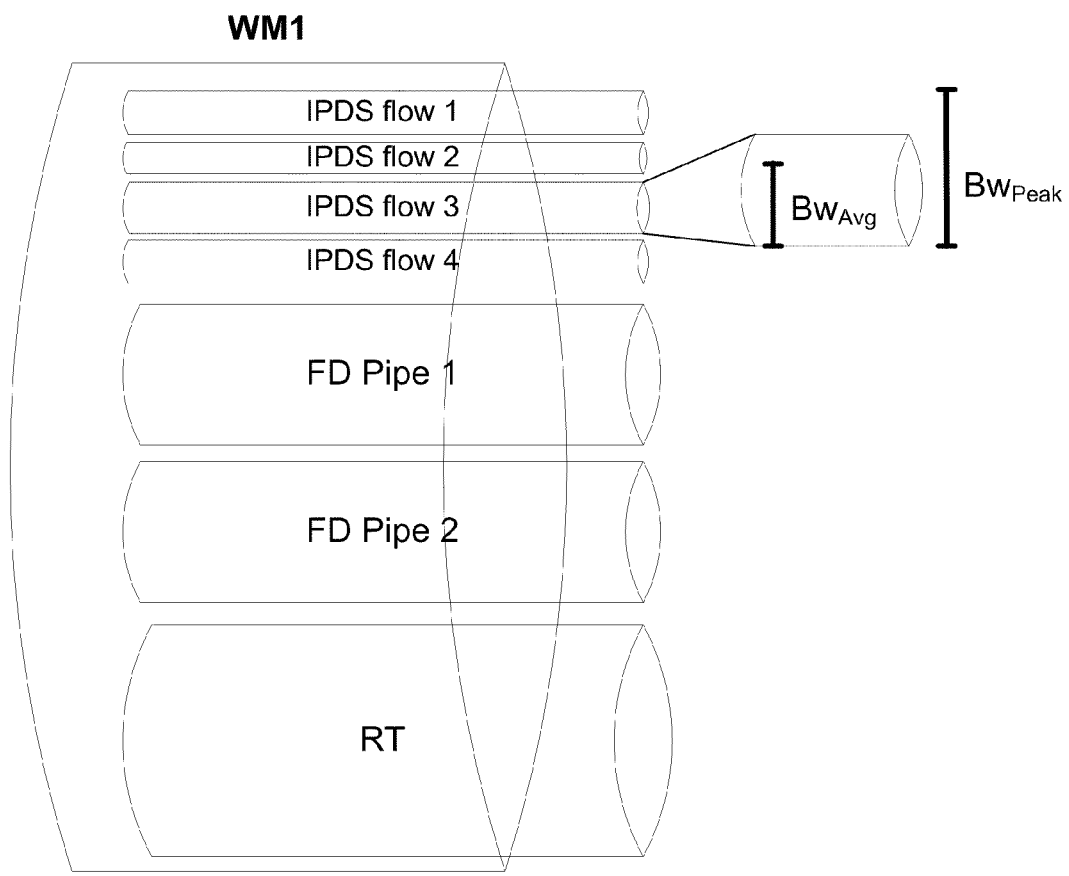
Figure 79D:
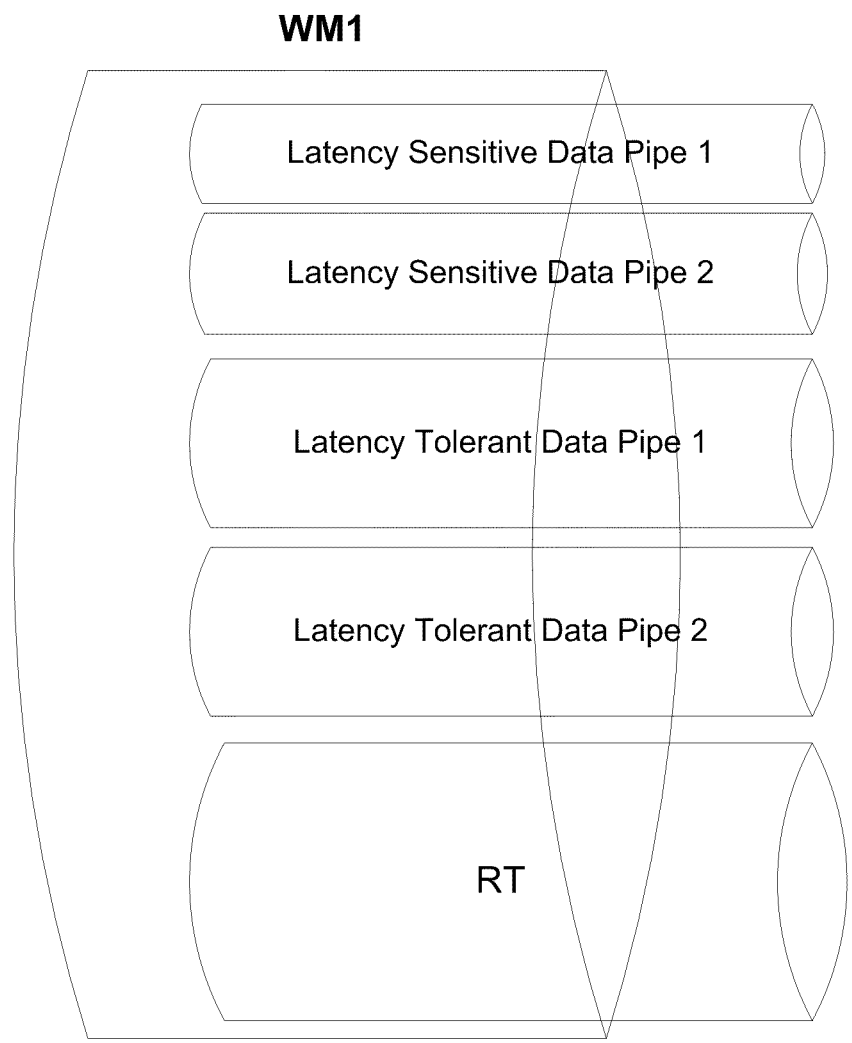

FIG. 79B illustrates that real time (RT) content may be allocated bandwidth from a multiplex per stream, or in aggregate. Latency tolerant content may be allocated aggregate bandwidth over a set of FD pipes (FD pipes 1-2) that are shared across different latency tolerant datacasting streams. Latency sensitive content may be transmitted on IPDS flows (IPDS flows 1-4) dedicated to individual latency sensitive datacasting streams. Since the pipe bandwidth may be constrained by device limitations, the latency sensitive content may be allocated bandwidth based on peak and average data rate, and burst size requirements. This is illustrated in FIG. 79C, which shows that aggregate bandwidth may be based on peak ($Bw_{Peak}$) and average ($Bw_{Avg}$) data rates, and burst size requirements. However, in certain situations, it may be difficult to estimate an optimal aggregate bandwidth based on peak ($Bw_{Peak}$) and average ($Bw_{Avg}$) data rates. For example, if the estimate is too conservative, the excess bandwidth that is lost is hard to recover. If the bandwidth allocation strategy is too aggressive, synchronized bursts on different streams may causes packet losses or impact the real time transmission. Thus, in various embodiments, the aggregate latency sensitive flows may be "packetized" and streamed in pipes using a datacasting delivery framework (DDF), which may advertise the data broadcast via a BSM. For example, FIG. 79D illustrates a unified system for transport for latency tolerant and sensitive content wherein latency sensitive data, latency tolerant data, and real time data, are separated and transmitted on individual streams. FIG. 79D illustrates that latency sensitive data may be transmitted on one set of pipes (Latency Sensitive Data Pipes 1-2), whereas the latency tolerant data may be transmitted on another set of pipes (Latency Tolerant Data Pipes 1-2).

As discussed above, in various embodiments, the data broadcast may be advertised via a BSM. In various embodiments, the BSM may advertise the schedule information only over smaller broadcast schedule periods (bsp: 30 seconds to 5 minutes) (BSP typically 15 minutes). In various embodiments, multiple schedule periods may be used to support addressing the different latency requirements. This improves battery efficiency for low latency data and provides for a much larger period of data change (e.g., the system does not have to be monitored every second). Further, for CBR stream data having low latency (30+ seconds), the packetization of the data allows the system to avoid monitoring the data stream every second.

Figure 79E:
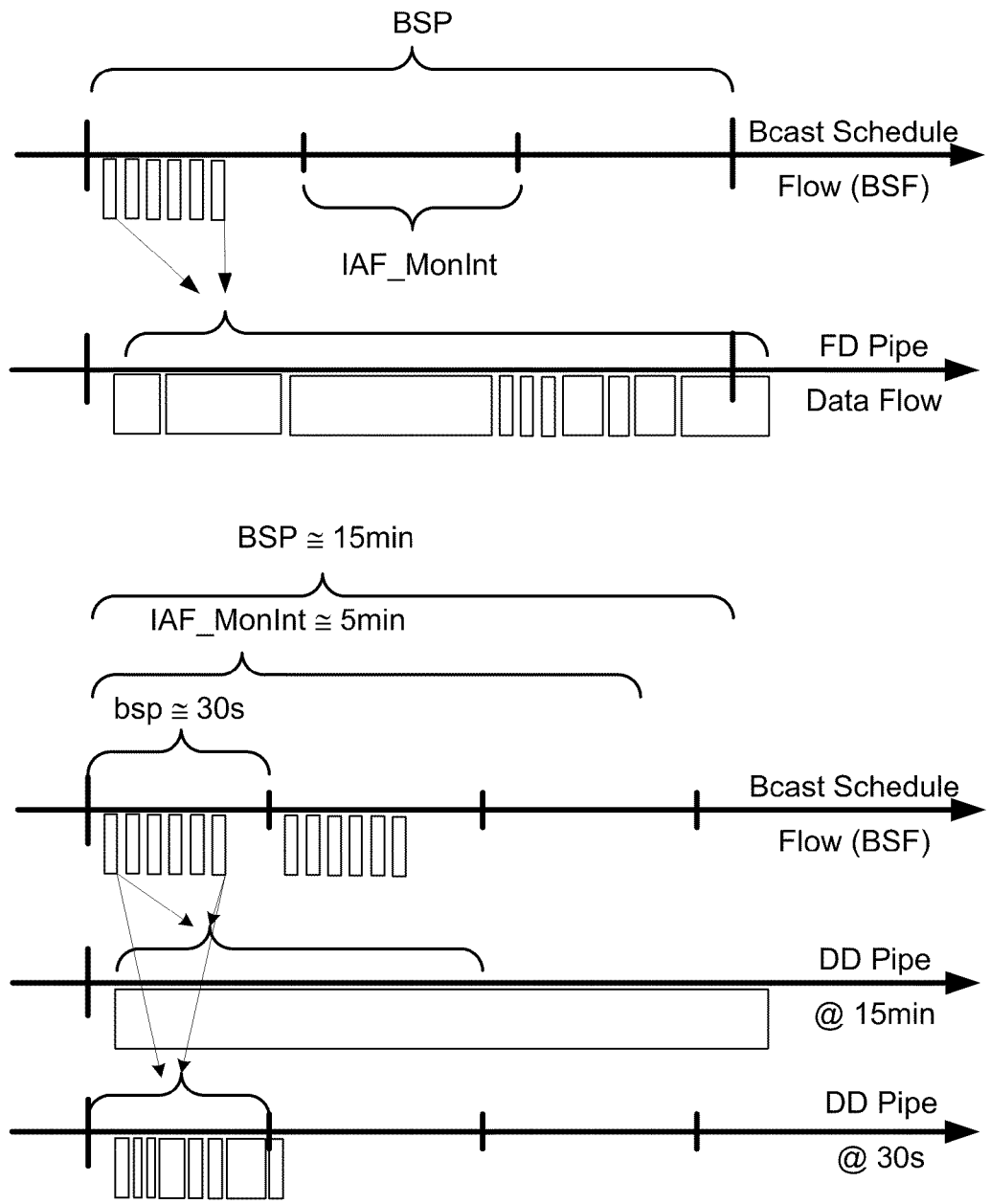
FIGS. 79E-79F are additional timeline diagrams illustrating data transmission organization details according to various embodiments.

FIG. 79E illustrates another unified system for transport for latency tolerant and sensitive content. FIG. 79E illustrates that various levels of schedule broadcast granularity may be added and layered for the unified transport of latency tolerant and sensitive content. For example, in a first level, the broadcast schedule period may designate a long term schedule period. These long term schedule periods may be in multiples of 5 minutes. In an embodiment, the long term schedule periods may be 15 minutes long. In various embodiments, the long term schedule periods may be designated for applications that can tolerate latencies in excess of 15 minutes. In a second level, an intermediary schedule period may be used. This intermediary schedule period may be the same as an IAF monitor period. In various embodiments, the intermediary schedule period may any duration that is shorter than the long term schedule period. For example, in an embodiment, the intermediary schedule period may be 5 minutes long, and used to accommodate applications with 5 minute-BSP latency constraints. FIG. 79E also illustrates that, in addition to the first and second levels, in various embodiments, multiple short-term schedule periods may be used in addition to the long term and intermediate scheduling periods. These short-term schedule periods may be much smaller than the IAF monitoring period (30 seconds-5 minutes) and may be defined to support low latency (30 seconds-5 minute) data.

Figure 79F:
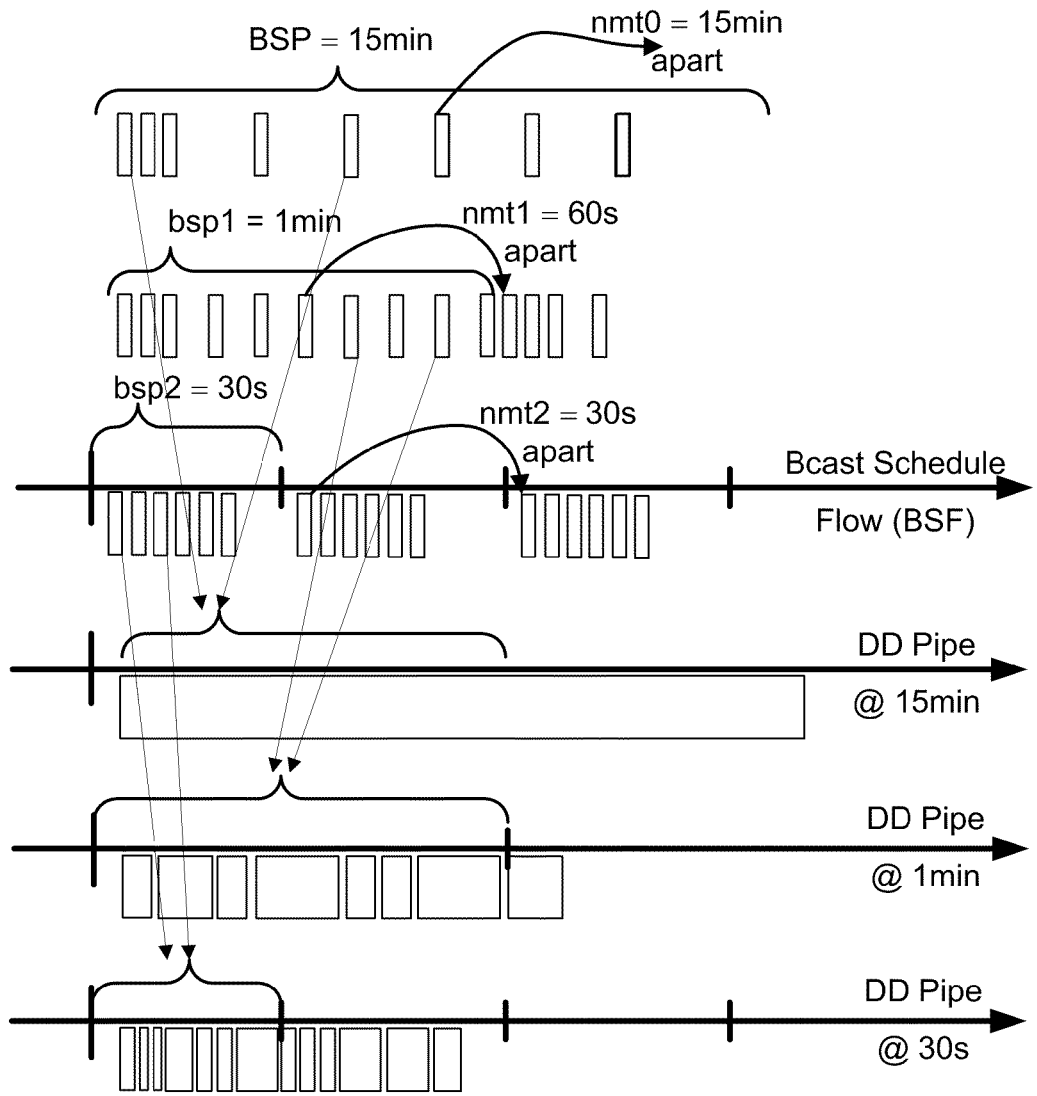

FIG. 79F illustrates yet another unified system for transport for latency tolerant and sensitive content. FIG. 79F illustrates that, in supporting multiple short-term schedule periods, the BSF may carry multiple logical BSMs. Each BSM may describe a schedule covering a specific target latency, and each BSM may carry the next monitor time identifying when BSM is to be updated next. In an embodiment, the number and period for the BSMs may be configurable and driven by an application. In various embodiments, the BSM may be sent more frequently on period changes, and less frequently thereafter. In various embodiments, the device application may request monitoring at a desired latency. For example, FIG. 79G illustrates that the device/server datacasting applications may know of the latency requirements, and that the datacasting delivery framework may map a transport/capture request to a BSM period that meets latency requirements. In various embodiments, the device datacasting delivery framework (DDF) may monitor the BSM at the lowest update period that meets the application's latency requests.

Figure 80:
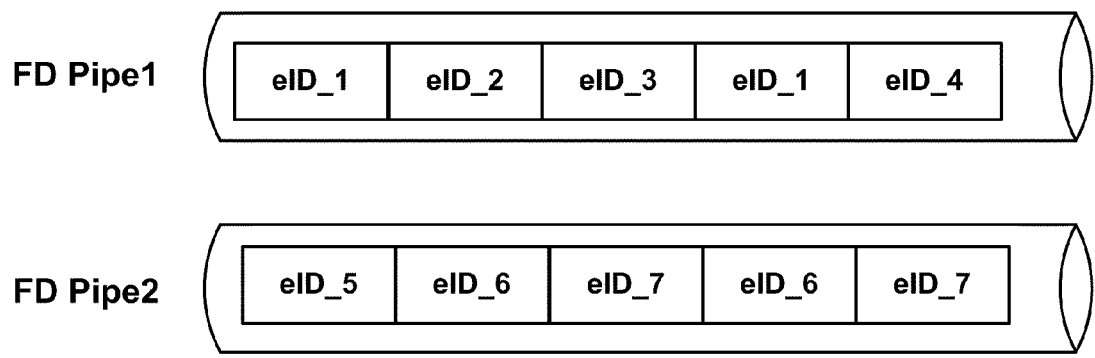
FIG. 80 illustrates how different files may be scheduled for broadcast over parallel file delivery pipes.

FIG. 80 illustrates that file delivery pipes may also be organized so that transmission resources (i.e., pipes) are dedicated to a particular content provider and/or wireless network operator, to enable these organizations to leverage the transport services of the broadcast network. For example, FIG. 80 illustrates that content for files (e.g., eID_1 through eID_4)

from a given content provider/wireless operator are always carried in one pipe, with no contention for using the other pipe.

Figure 81A:
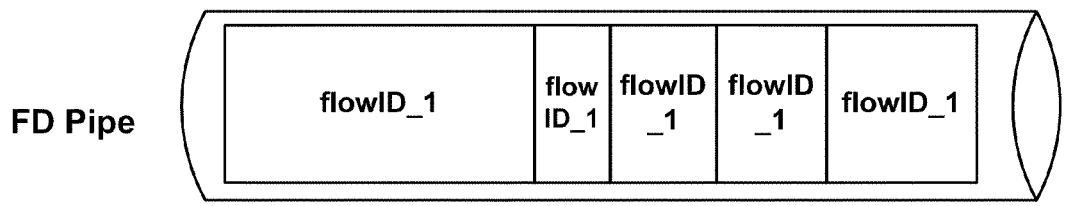
FIGS. 81A-81C illustrate different ways in which files may be transmitted within a file delivery pipe.
Figure 81B:
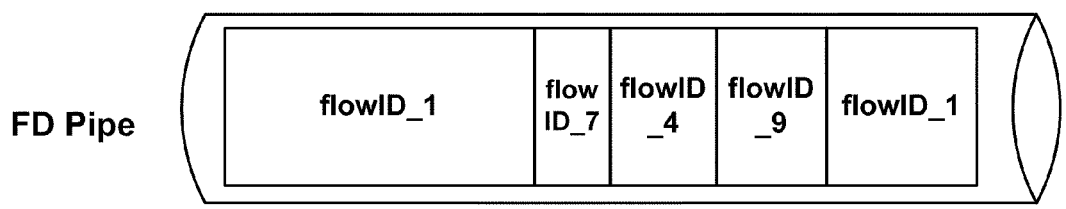
Figure 81C:
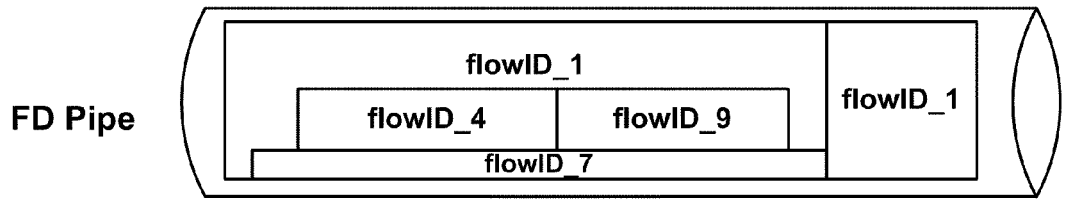

File delivery pipes may be defined by a set of pipe flow IDs which identify the actual transmission flow used to transport files over the logical file delivery pipe. FIG. 81A through FIG. 81C illustrate three alternative organizations for file delivery pipes. For example, as illustrated in FIG. 81A, a file delivery pipe flow ID may be dedicated to a particular application or service (e.g., each application may have a separate pipe flow ID). Access to such services may be constrained to subscription to such applications or services, and access to the file delivery pipe flow may be protected via conditional access solutions. In the various embodiments, application or service discovery of the dedicated resources of conditional access solutions may be made via a separate mechanism, such as a system information transmission. For example, in an embodiment, the broadcast schedule message may describe the flow ID for each transmission.

As another example, FIG. 81B illustrates an implementation in which some flows may be shared across different applications or services that are not subject to subscription, so that conditional access solution protection is not necessary, and no system information-based service discovery is needed (e.g., there is a single/shared pipe flow ID for the different applications). Such applications require no dedicated flow ID assignment, and therefore may share the same flow ID on the time division multiplex to file delivery pipe.

As a third example, FIG. 81C illustrates an organization in which the file delivery pipe scheduling algorithm on the file ingestion system may be configured with additional flexibility of scheduling different files at the same time, with smaller files being transmitted at lower data rates, without interrupting the transmission of larger files as illustrated in FIG. 82 A/B, so long as the aggregate type resources are not exceeded. That is, different and separate pipe flow IDs may be used such that small files can be scheduled in the same pipe as a way to prevent interruption of larger file transmissions. In such an implementation, a file delivery pipe may be configured with multiple flow IDs to accommodate multiple simultaneous transmissions.

With the introduction of multiple file delivery pipes, issues of concurrent perception of files on the receiver devices may arise. This is illustrated in FIGS. 78 A/B, 79A, and 80, which illustrate a system in which multiple pipes are available, and therefore multiple files may be transmitted at the same time, one via each pipe (assuming devices can have access to content from different providers that use different pipes).

Figure 82A:
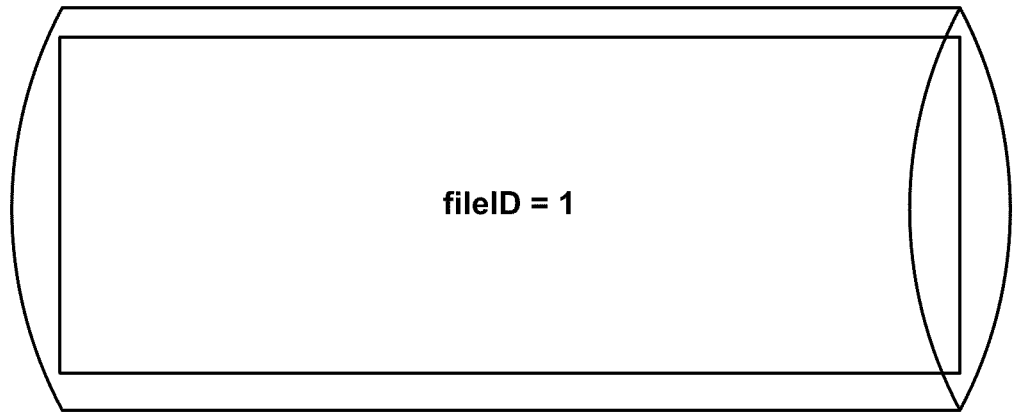
FIGS. 82A-82B illustrate how the transmission of a large file within a file delivery pipe may be interrupted by the transmission of an urgent file.
Figure 82B:
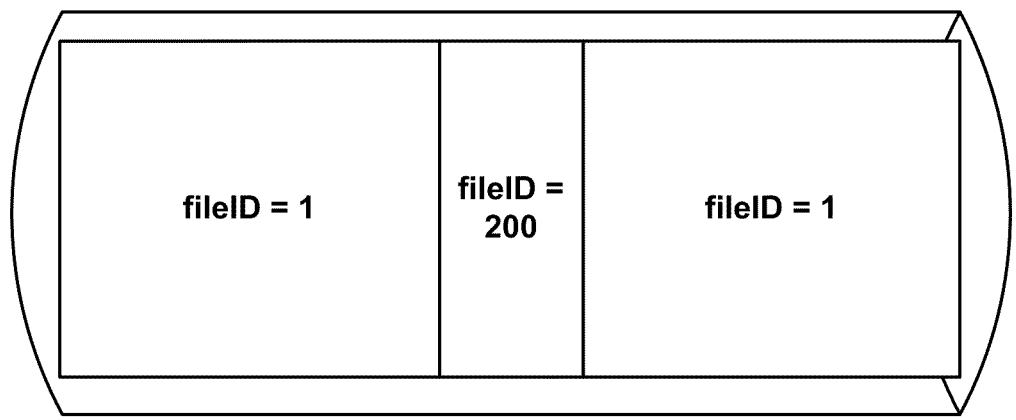

FIGS. 82A and 82B illustrate an alternative to handling transmissions of small files along with large files. As previously mentioned, the broadcast network with file delivery pipes will need a way to associate files to pipes and schedule the file broadcasts. A combination of provisioning and input parameters may be used by the file ingestion system scheduler to associate files to pipes and schedule their transmission. In various embodiments, the pipes may be provisioned with location reach (i.e., where the pipe files are broadcast) to the pipes. In various embodiments, applications/services may have a geographic aspect. For example, a weather application that uses file system abstraction may define file names in directories as /weaApp/East/NYC/ or /weaApp/West/LA/. In such cases, the provisioning of files for the weather application might be /weaApp/East/ on pipe X on a wide multiplex that will be broadcast in the eastern part of the United States and /weaApp/West/ on pipe Y on a wide multiplex that will be broadcast in the western part of the United States. In various embodiments, there may be priority pipes (e.g., for low latency application files). In various embodiments, multiple pipes may target different file sizes and latency requirements (e.g., 15 minutes, 1 minutes, and 30 seconds). In various embodiments, the file ingestion system may have access to pipe provisioning information. In various embodiments, on receiving files to broadcast, the file ingestion system may schedule files: on the appropriate pipe based on provisioned geographical reach and policy; or on the pipe that is most suitable to ensure the latency requirement. In various embodiments, the file ingestion system may schedule files depending on the size of the file. For example, the file ingestion system may pick a low bandwidth pipe or select a flow ID on a fat pipe that schedules the transmission at a low data rate. In an embodiment, the file ingestion system may split the transmission of a larger file on a fat pipe, as illustrated in FIGS. 82A and 82B. Such a disjoint transmission may break the transmission window for a file into multiple disjoint windows separated by the transmission of other files, as illustrated in FIG. 82B. In various embodiments, the BSM may include features and information to describe such disjoint transmissions. In various embodiments, the receiver device may be configured to collect the files from among the different disjoint windows.

Thus, in various embodiments, the file ingestion system may include a scheduler that tries to schedule files at the same time (in different pipes) based upon a combination of provisioning and input parameters (e.g., files that are available to devices of different wireless carriers can be scheduled at the same time). Alternatively, the scheduler may plan multiple transmissions of files that may be transmitted concurrently as a way to allow devices which elected to receive one of the concurrent files in a first transmission to still receive the other file on a second transmission.

In the various embodiments, the file ingestion system may provision files based upon the broadcast reach of each file's data pipe (i.e., the geographic area where the file delivery pipes can be received). That is, applications and services making use of these file delivery capabilities may have various geographic considerations. For example, a weather application that uses file system abstraction may define filenames and directories that identify regions for which the forecast file is pertinent. Thus, the file ingestion system may use the weather application file names to provision each weather application file to particular file delivery pipes based upon whether the file delivery pipe will deliver files to be indicated region. For example, a file with the file directory string "/weaApp/East/NYC/" may be directed to a file delivery pipe within a wide multiplex that will be broadcast in the eastern part of the United States, while a file with the file directory string "/weaApp/West/LA/" may be directed to a file delivery pipe within a wide multiplex that will be broadcast in the eastern part of the United States.

Policy considerations may also be used to define the how the files get provisioned to a particular set of file delivery pipes. For example, a video clip delivery application may organize its files in file directories according to the source of the video clips, such as "/clipApp/ABC/abc/" and "/clipApp/ABC/Disney/ for files of video clips on ABC channels ABC and Disney," while "/clipApp/ESPN/espn/" and "/clipApp/ESPN/espn2/" for files of video clips on ESPN channels. So organized, policy considerations may direct that files from ABC should be provision onto file delivery pipe 1, while ESPN video clip files should be provision onto file delivery pipe 2.

Provisioning of files to particular file delivery pipes may also depend upon a time diversity requirements. For example, small files may be transmitted multiple times, with some time separation between retransmissions, to enable higher reception reliability, or transmitted at lower data rates over longer periods of time.

The various embodiments, the file ingestion system may have access to the file delivery pipe provisioning information. Upon receiving files for transport via the broadcast network, the file ingestion system may provision received files to the appropriate file delivery pipe based upon geographic reach and policy considerations. Additionally or alternatively, the file ingestion system may provision received file to file delivery pipes to ensure the latency requirement specified for the receive files is satisfied. Additionally or alternatively, the file ingestion system may provision received files to file delivery pipes depending upon the size of the file, picking a low bandwidth pipe, or selecting a flow ID on a high-bandwidth ("fat") file delivery pipe and specifying a low data rate transmission, is illustrated in FIG. 81C.

Additionally, the file ingestion system may schedule large files for transmission in a disjoint manner, as illustrated in FIG. 82B, such that a large file may be broken into multiple disjoint transmission windows so that other smaller files may be transmitted in between. Information regarding the organization of disjoint transmission windows may be included in the broadcast schedule message to enable receiver devices to receive the file portions from the different disjoint broadcast windows and reassemble the file portions into the original file upon reception. The file delivery pipe data rate and the size of each file may be used to define the broadcast window for all files scheduled within a particular file delivery pipe.

Figure 83A:
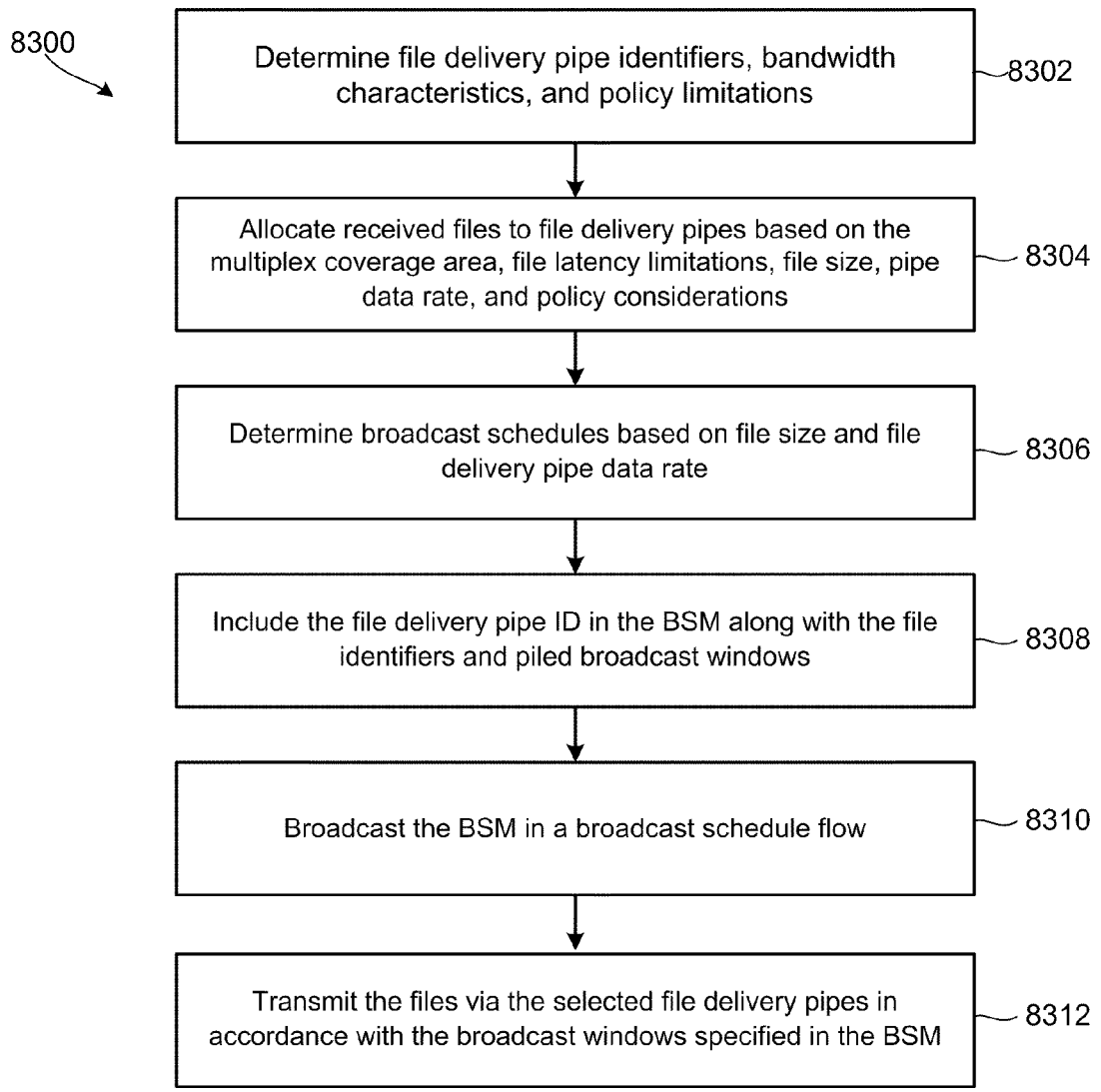
FIGS. 83A and 83B are process flow diagrams of embodiment methods for scheduling and transmitting files via file delivery pipes.

FIG. 83A illustrates an example method 8300 that may be implemented within the file ingestion system to allocate received files to file delivery pipes according to an embodiment. In method 8300 in step 8302, the file ingestion system may determine the file delivery pipe identifiers such as bandwidth characteristics (e.g., data rate) and policy limitations. In step 8304, the file ingestion system may use this knowledge regarding the available file delivery pipes to allocate received files to particular file delivery pipes. As described above, this allocation of files to delivery pipes may be based on the multiple coverage areas (e.g., to ensure the files are delivered to the geographic area encompassing targeted receiver devices), file latency limitations (i.e. file urgency), file size, pipe data rate, and other policy considerations. Once the files have been allocated to particular delivery pipes, the file ingestion system may determine the broadcast schedules (i.e., broadcast windows) for the files being carried by each file delivery pipe according to the requested quality of transport in step 8306. As discussed above, the broadcast schedules may be based upon the broadcast duration for each file, which may be determined by dividing the file size by the file delivery pipe data rate. Files may be scheduled for broadcast within a broadcast scheduling period based upon their relative urgency, such as by broadcasting the more urgent files earlier in the period. In step 8308, the file ingestion service may include the file delivery pipe ID in the broadcast schedule message along with the file identifiers, file broadcast windows, file parameters, etc. In step 8310, the file ingestion system may direct the broadcast system to broadcast the broadcast schedule message in a broadcast schedule flow, and in step 8312, cause the broadcast system to begin transmitting files via the identified file delivery pipes in accordance with the broadcast windows specified in the broadcast schedule message.

Figure 83B:
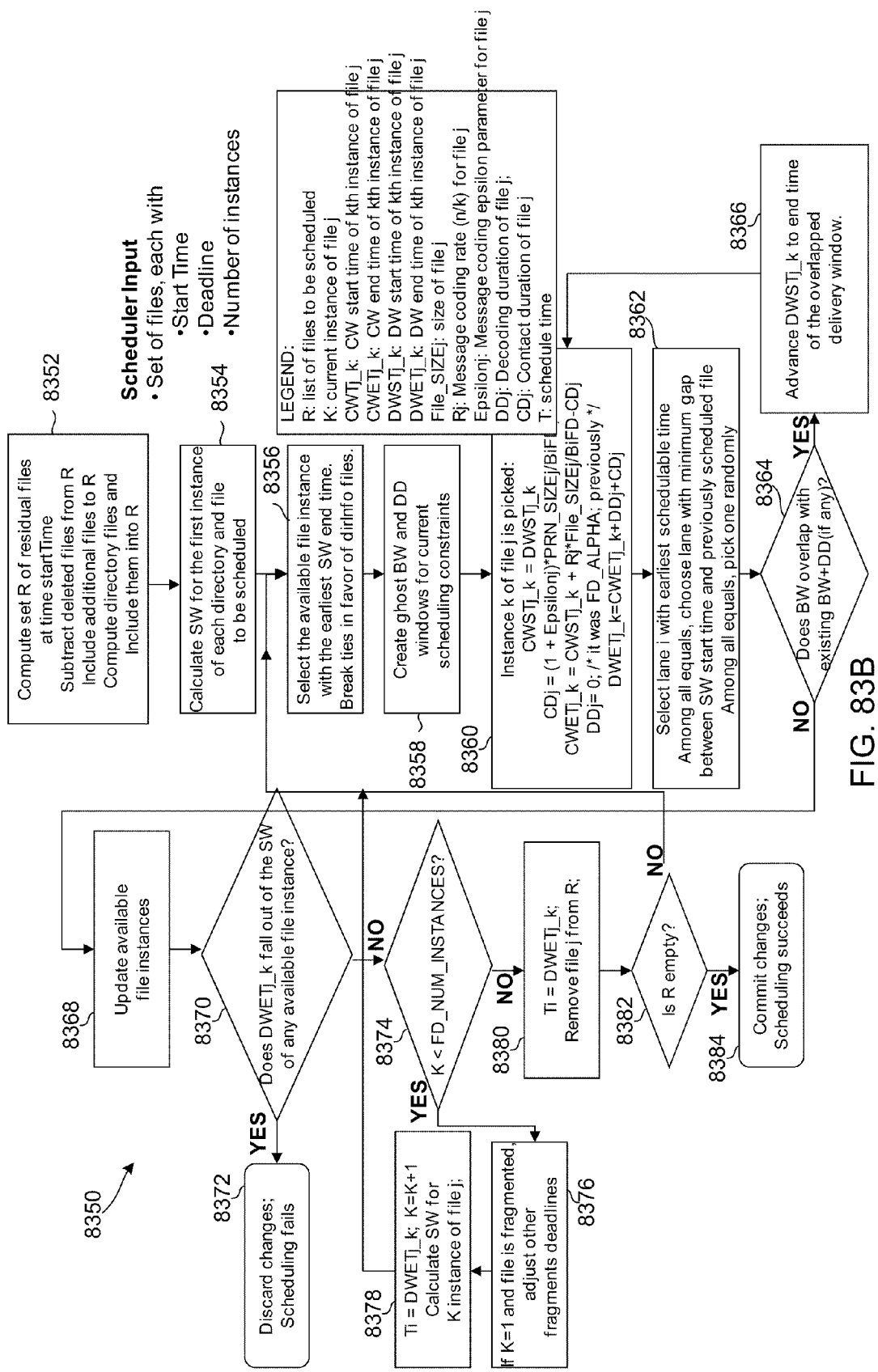

FIG. 83B illustrates an example method 8350 for a scheduler which supports scheduling files for transmission over multiple pipes. Such a scheduler selectively allows files to be simultaneously transmitted over multiple pipes according to schedule constraints provided at the time of the file ingestion as part of the file ingestion process. The multi-pipe scheduler may address multiple overlapping cases, including non-overlapping situations in which a single instance of the file are scheduled across multi-pipes, overlapping multi-files in which two instances of different files overlap, and overlapping single-file cases where two instances of the same file overlap, which may be used to push files with tight transmission deadlines or to send different instances of the same file in different lanes. Referring to FIG. 83B, a multi-pipe scheduler may compute a set of residual files (R) at a start time, subtract deleted files from the residual files, include additional files in the residual files, compute directory files and include them in within the residual files in step 8352.

The scheduler may calculate the schedule window (SW) for the first instance of each directory and file to be scheduled in step 8354. In step 8356, the scheduler may then select the available file instance K with the earliest schedule window in time, breaking ties in favor of directory information files. The scheduler may then create ghost broadcast windows and decoding duration windows for currently scheduling constraints in step 8358. In step 8360, the scheduler may select individual files based on the calculations shown in FIG. 83B. in 8362 step scheduled may then select the lane or pipe with the earliest schedulable time. In doing so, it may select among equals by choosing the lane with a minimum gap between the schedule window start time and the previously scheduled file. If this results in a tie, the scheduler may pick one randomly.

In determination step 8364, the scheduler may determine whether the broadcast window overlaps with existing broadcast windows and decode durations (if any). If so (i.e., determination step 8364="YES"), the scheduler may advance the decode window and time of the kth instance of a file j to the time of the overlap delivery window in step 8366, and return to picking the next instance k of file j in step 8360. If there is no broadcast window overlaps (i.e., determination step 8364="NO"), the scheduler may update the available file instances in step 8368, and determine whether the decode window and time of the kth instance of file j falls out of the schedule window of any available file instances in determination step 8370. If so (i.e., determination step 8370="YES"), the scheduler may discard changes and indicate that the scheduling has failed in step 8372. If not (i.e., determination step 8370="NO"), the scheduler may determine whether the current instance of file j is less than the number of direct instances in the file directory in determination step 8374. If not (i.e., determination step 8374="NO"), the scheduler may remove the file from the residual files in step 8380. In determination step 8382, the scheduler may determine whether the residual files are empty. If the residual files are now empty (i.e., determination step 8382="YES"), the scheduler may commit the changes and indicate that scheduling has succeeded in step 8384. If the residual files are not empty (i.e., determination step 8382="NO"), the scheduler may return to step 8356 to select the available file instance with the earliest schedule window end time.

If the scheduler determines that the instance K is less than the file directory number of instances (i.e., determination step 8374="YES"), the scheduler may set the current instance to one and fragment the file and adjust other fragment deadlines in step 8376. The schedule may then calculate the scheduled time and calculate the schedule window for the Kth instance of file j in step 8378, before returning to step 8356 to select the available file instance with the earliest schedule window and time.

A file content provider may use a sendFileRequest operation to provide files to the file ingestion system. The sendFileRequest operation may include a mechanism to identify the file submitted for transmission (e.g., via fileFetchInfo), and a mechanism to define different delivery criteria or transmission requirements for each file or group of files. Files may be identified based upon a content URL which provides the location from which the file can be retrieved for broadcast. The file identification may also identify additional parameters that further assign or associate context to/with the file being ingested, such as a filename that could be used to indicate the directory for the file in an application directory structure (e.g., /itv/res/svc_5/f1.jpg), and an attribute list that may provide parameters that characterize the file (e.g., Genre=Drama, Gender=Male; Age=20-30, etc.) These additional parameters can be transported in the broadcast schedule message to allow receiver applications implemented on the receiver devices to identify files being broadcast that should be captured.

Whether the attribute list is carried in a cat.xml or directly in the broadcast schedule message is a function of what service is desired by the application submitting the file. If the submitting application prefers to manage a catalog file, such as to provide a catalog file to the user to enable receiver devices to better select the files to download, the application can manage the catalog file and provide logic in the receiver devices (e.g., in the device application that is intended to receive the file) regarding how to use the catalog. If the application needs to have a simple implementation for less capable receiver devices or receiver devices not configured with the corresponding device application, it can rely on the broadcast schedule message to deliver the attribute list using the methods described above.

Figure 84:
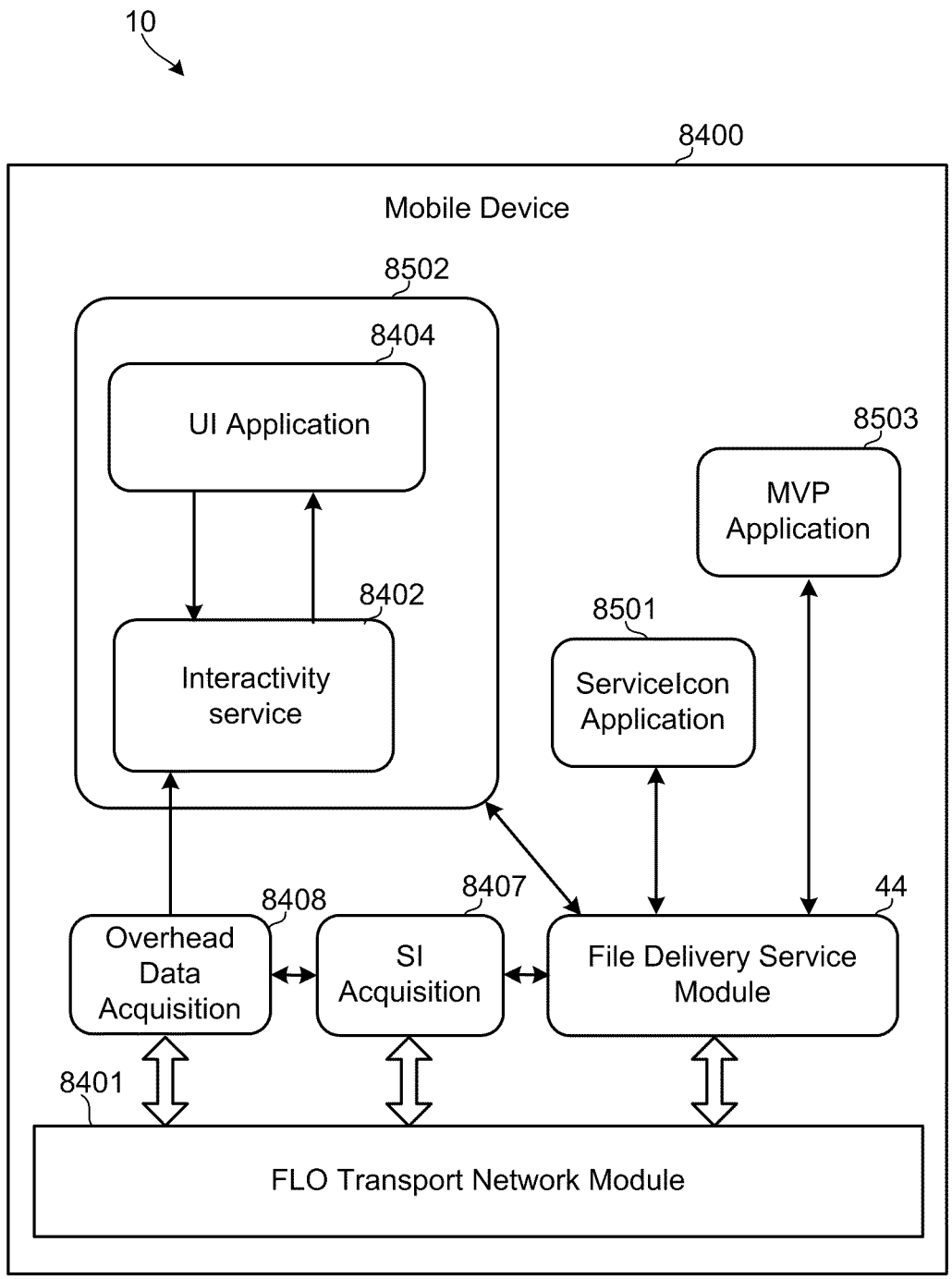
FIG. 84 is a software architecture diagram of a mobile receiver device suitable for use with the various embodiments.

FIG. 84 illustrates functional modules that may be implemented within a receiver device 10 suitable for implementing the various embodiments. Software modules of a receiver device 10 may be organized in a software architecture 8400 similar to that illustrated in FIG. 84. Broadcast transmissions may be received by a receiver device physical layer and processed by a broadcast receiver module, such as a FLO transport network module 8401. Video and audio streams received by the file transport network 8401 may be processed by a media receiver module (not shown). File transfer streams received on the file transport network 8401 may be provided to and processed by a file manager module 44, which functions to receive file packets and direct them to appropriate modules and applications within the device software architecture 8400. Overhead data streams may be passed to an overhead data acquisition module 8408, which functions to process overhead data packets and direct received metadata and overhead data to appropriate modules within the device system architecture 8400. A Service SI acquisition module 8407 may acquire the Service SI data from the overhead data streams, and forward this information to the file delivery system module 44 and overhead data acquisition module 8408. From received Service SI data, the file delivery system module 44 may determine flow IDs for file data flows carrying interactivity resources data. From received Service SI data, the overhead data acquisition module 8408 may determine signaling flows carrying interactivity signaling data. To support interactivity events, the device software architecture 8400 may include a file reception service 8402 which serves as an interface between the user interface (UI) applications 8404 and the file transport network 8401 for receiving, managing and storing interactivity events. Together the interactivity service 8402 and UI applications 8404 may be organized as the interactivity application 8502. The user interface application module 8404 may include a number of interactivity applications, and a user agent.

In the various embodiments, the file delivery service module 44 may provide a number of services to device applications. A single file capture service may allow a device application to request the capture of a single file. To do so, the device application provides the file delivery service module 44 with the application-specific file name, such as in a request like singeCapture (/itv/res/svc_5/f2.jpg).

As discussed above, another service that may be provided by the file delivery service module 44 is a continuous file capture service which allows a device application to request the continuous capture of updates of a single filename, or all files under a given directory. A device application may specify an application-specific filename in a capture all requests to indicate that all updates of the specified file should be received. A common use for this service would be to track changes in an application overhead file, such as a catalog file. For example, to receive all updates of an interactivity application catalog file, the application could issue a captureAll (/itv/sig/cat.xml) request. An device application may specify an application-specific directory when the application is interested in receiving all files in that directory are not currently stored on the receiver device. In most cases, this will be all new files under the desired directory. For example, in a weather application, such a request could be captureAll (/weaApp/NYC/) to request the download of all files with a NYC sub-directory file name. Unlike the single file capture service, the capture all service continues monitoring for new transmissions of the requested file or new files under a specified directory. This service depends upon the file transport network incapable of signaling when new files are available for reception, or when a new version of the file is available. Such information may be provided in the broadcast schedule message in the form of a new file name, or the same file name with an updated version number included in the file metadata. The file delivery service module 44 on the receiver device may be configured to keep track of the version of files stored in memory, and track the version information provided in the broadcast schedule message to avoid receiving the same file mobile times, since doing so would drain the device battery unnecessarily.

Figure 85:
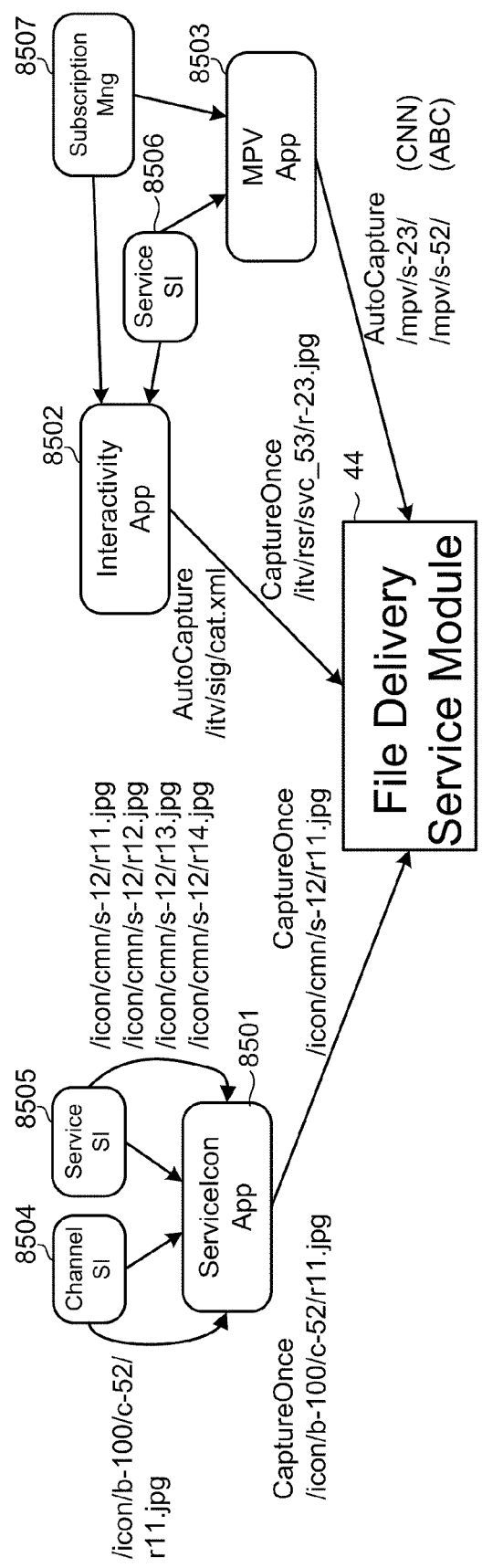
FIG. 85 is an illustration of how applications operating within a receiver device may specify files for reception by a filed delivery service module.

As illustrated in FIG. 85, device applications, such as a service icon application 8501, and interactivity application 8502, and an Multi-Presentation list View (MPV) application 8503, may specify files to be acquired along with the type of file acquisition to be performed (i.e., captureOnce or auto-Capture). In order to identify the file name or file extension, the device applications may receive such information from a channel system information (SI) 8504 and/or a service SI 8505, 8506 which is provided as part of an overhead broadcast transmission. Some device applications may also be supported by a subscription manager 8507, which may be an application that manages the registration and subscriptions to broadcast services subscribed to by various device applications.

A third service that may be offered in the file delivery service module 44 is a cancel service which allows a device application to cancel the single capture of a file (singleCapture) or cancel a continuous capture of a file or directory (captureAll). When activated, the cancel service stops the file delivery service module 44 from trying to acquire files associated with the original request is canceled.

Figure 86:
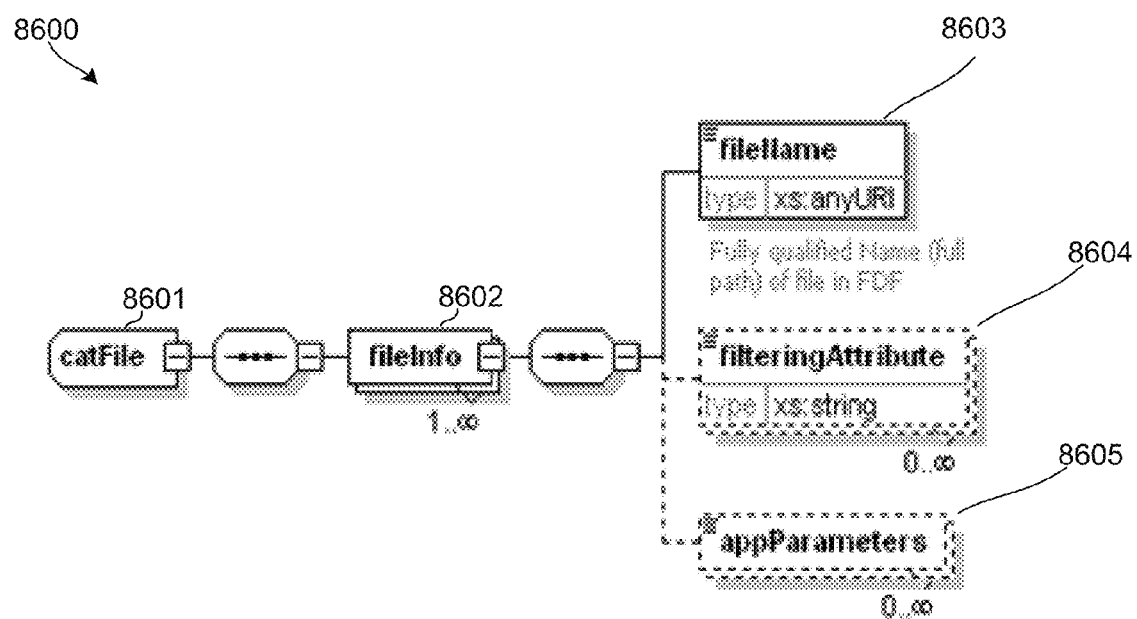
FIG. 86 is an example data schema that may be used in a file delivery catalog according to an embodiment.

FIG. 86 illustrates an example data schema 8600 that may be used for files in a catalog of files scheduled for broadcast according to an embodiment. As shown in FIG. 86, a catalog file 8601 may comprise file information 8602 which itself may comprise a file name data field 8603, and optional filtering attributes data field 8604, and an optional application parameters data field 8605. The file name data field 8604 may include a fully qualified abstract file name such as a file name string including a root directory and subdirectories. The optional filtering attribute data field 8604 may include additional information useful for filtering, such as a subdirectory, file type or file extension, or other suitable file description parameter. The optional application parameters data field 8605 may include information regarding the application for which the data file is intended, which may be useful for determining whether the individual file should be received.

Figure 87A:
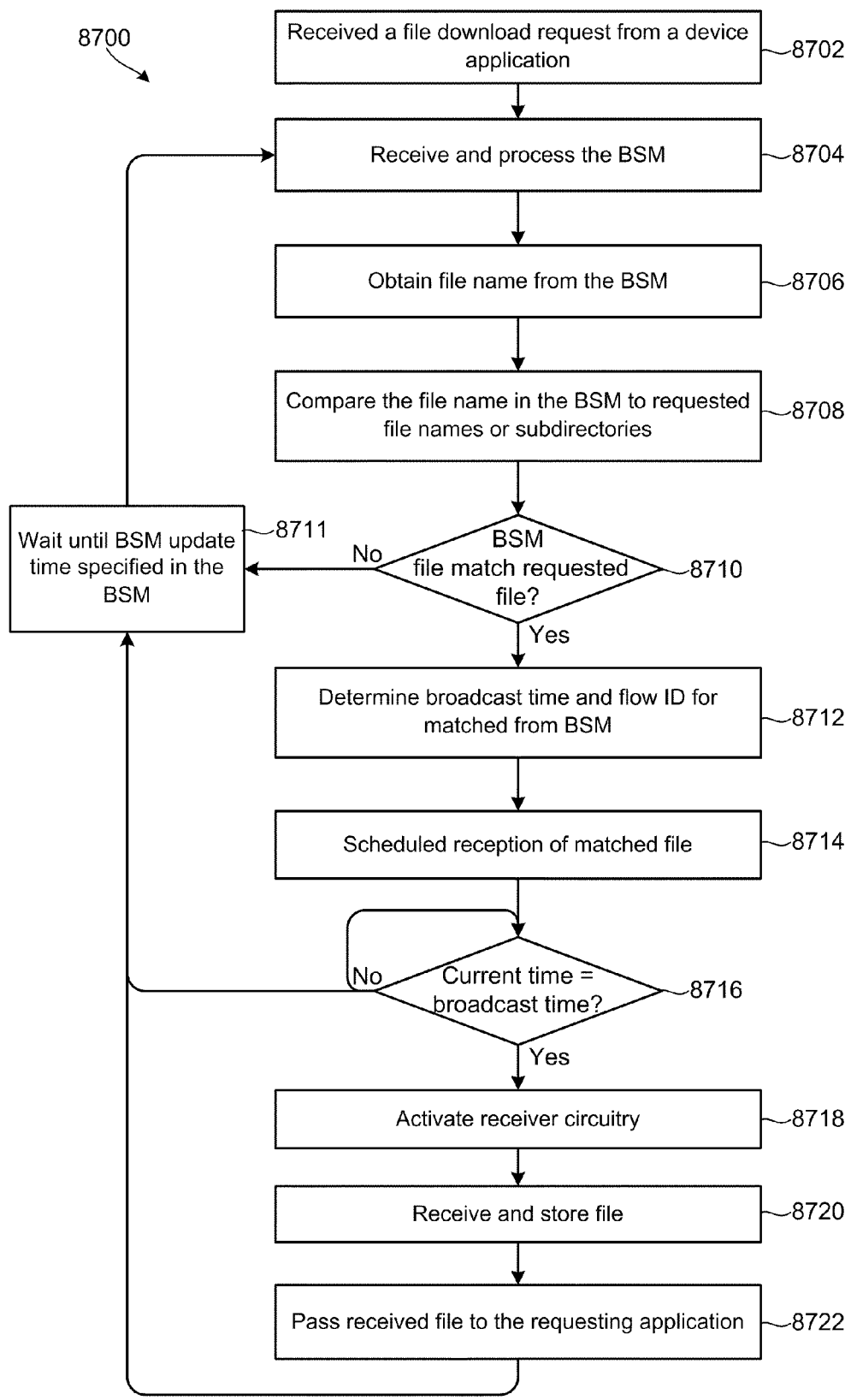
FIGS. 87A and 87B are process flow diagrams of embodiment methods that may be implemented within a receiver device for receiving files delivered via a broadcast file delivery service.

To provide the file capture services, the file delivery service module 44 uses the information provided in the broadcast schedule message to determine which files to receive and when to receive them. FIG. 87A illustrates an embodiment method 8700a that a processor or integrated receiver/processor chip of a receiver device may implement in response to receiving singleCapture service file download request from the device application. In method 8700a at step 8702, the processor of the receiver device may receive a file download request from a device application (i.e., an application operating within a processor of the receiver device).

As described above, the broadcast schedule message includes the name of the file that will be broadcast, along with the information that the file delivery service module 44 needs in order to select files for reception. So, in step 8704, the file delivery device module 44 implemented within the processor monitors the received broadcast schedule messages. Step 8704 may involve momentarily activating the receiver circuitry of the receiver device long enough to receive a broadcast schedule message from the overhead flow, as well as processing the received a broadcast schedule message to obtain its included information. In step 8706, the processor may obtain the name of the file or files that will be broadcast (including their file extensions). As mentioned above, such filenames that were file extensions may be included within the broadcast schedule records (BSRs) of the broadcast schedule message. In step 8708, the processor may compare the file name or file extensions string obtained from the broadcast schedule message to the file name or file extension specified by the requesting device application provided in step 8702. In determination step 8710, the processor may determine whether there is a match between the file name or file extension specified in the broadcast schedule message and that requested by the device application. If there is no match (i.e., determination step 8710="No"), the processor may wait until the time indicated in the broadcast schedule message that the broadcast schedule message will be updated in step 8711. As described above, the same broadcast schedule message may be broadcast repeatedly until an update time. By specifying in the broadcast schedule message when an updated message will be broadcast, receiver devices can conserve battery power by leaving their receiver circuitry deactivated until a new broadcast schedule message is being transmitted. When the current time equals the identify broadcast schedule message update time, the processor may return to step 8704 to receive and process the updated broadcast schedule message.

If the processor determines that the file name or file extension specified in the broadcast schedule message matches the file name or extension specified by the device application in step 8702 (i.e., determination step 8710="Yes"), the processor may schedule a reception of the matching file. This may be accomplished by obtaining from the broadcast schedule message the broadcast time and reception information (e.g., a flow ID, an IP flow identifier by an IP address, and/or a UDP port number) for the matched file in step 8712, and scheduling reception of the matched file based upon broadcast time in step 8714. Scheduling reception of the matched file may be accomplished in determination step 8716, for example, by storing the obtained broadcast time in a memory register that is frequently compared to the current time in order to generate an interrupt to initiate the file reception routine when the current time matches the time stored in the memory. While the current time does not match the scheduled broadcast time (i.e., determination step 8716="No"), the processor may execute step 8711 to wait for the time when the broadcast schedule message is updated, since the reception processing of broadcast schedule messages (as described above with respect to steps 8704 through 8711) may continue in parallel. Just before the scheduled broadcast time (i.e., when determination step 8716="Yes"), the processor may wake up the receiver device receiver circuitry in step 8718, and receive the selected file from the advertised transport stream in step 8720. As part of step 8720, the file delivery service module 44 operating within the processor may store the received file in memory as described above and, in some embodiments, note its version number. In step 8722, file delivery service module 44 operating within the processor may pass the received file to the requesting application using processes described above, which fulfills the original application request. After receiving the file, the processor may deactivate the receiver circuitry and return to step 8711 to wait for the time when the broadcast schedule message will be updated.

When the device application requests a file download using the singleCapture service, one or more specific file names may be specified by the device application in step 8702. Once the specified file has been received and stored in memory and/or passed to the requesting device application, the file download request may be canceled by the processor so that subsequent broadcasts of the same file are not received.

When information regarding files being transported via the broadcast network is identified in a catalog file provided by the headend side application submitting the files for transport, the catalog file may include the information identified in the data schema shown in FIG. 86. Using the information provided in such a catalog file, a device application may specify files for capture based on their filenames when a file system abstraction is used, and/or filtering attributes which may be associated with each file. An application on the receiver device may then use the received catalog file in combination with information known to the application (such as the receiver device user's gender and age) to select for download files whose attributes match those of the receiver device or the user. Since the file name may be included in the catalog file, a device application may request capture of a file using its file name in a singleCapture operation.

Figure 87B:
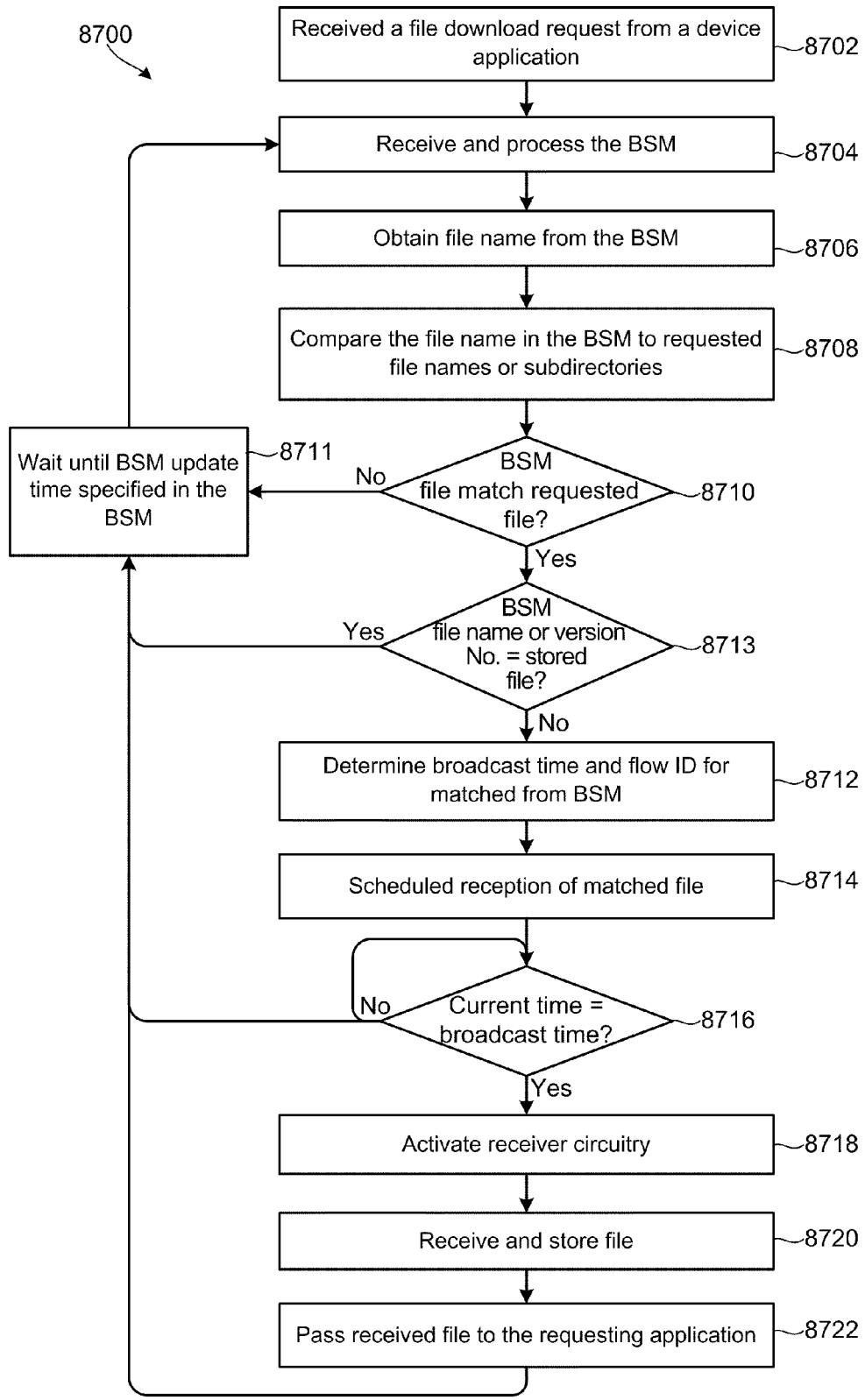

FIG. 87B illustrates an embodiment method 8700b that may be implemented within a processor of the receiver device to accomplish the capture all service. When the device application requests a file download using the continuous capture request service (e.g., autoCapture (itv/sig/cat.xml) or autoCapture (itv:1)), such as to continue to receive all updates for a particular file, the operations described above with reference to FIG. 87A may be performed with the exception that the file download request is not automatically canceled once a matching file has been received and stored in memory. Since the file download request remains active, the processor may continue to receive files matching the file extension criteria. In order to conserve battery power by avoiding reception of redundant files (since files may be broadcast multiple times to ensure reliable reception) the processor may perform the additional determination step 8713 of comparing the file name or version number for a matched file specified in the broadcast schedule message to the file name and/or version number stored in memory. If the matched file has the same file name, file ID/Element ID) or version number as a file stored in memory (i.e., determination step 8713="Yes"), there is no need to receive the file again, so the processor may proceed to step 8711 to wait until the broadcast schedule message is updated. However, if the file name, file ID/Element ID or version number of the matched file identified in the broadcast schedule message has a different file name or version number than that stored in memory (i.e., determination step 8713="No"), the processor may proceed to schedule the reception of the identified file by proceeding to steps 8712 through 8722 as described above with reference to FIG. 87A. Since the file delivery request is not canceled automatically upon reception of the matching file, the file delivery service module 44 operating within the processor may continue to monitor the broadcast schedule message and capture all matching file updates as long as the request remains active.

The use of file name abstractions for file delivery via a broadcast system, unicast network, or a combination of broadcast and unicast networks enables a file delivery service that is simple to deploy. Applications using such communication networks can be easier to develop since familiar file extension concepts may be utilized. The various embodiments may be implemented within existing broadcast systems by providing a headend system for ingesting files (e.g., a file ingestion system) and naming files for broadcast as part of paths in a file system. The file ingestion system provides interfaces for ingesting files, schedules file transport opportunities (if transmitted over a broadcast network), and advertises the available files to devices via some solution specific signaling mechanism, such as a broadcast schedule message overhead flow in a broadcast network. Within receiver devices, a file delivery service module may be implemented, such as in a software update, to understand the headend signaling and receive device application requests to capturing broadcast files, as well as maintain appropriate state information to avoid duplicate file receptions and to detect file updates. In such a system, device application development is simplified since the applications only need to know their root directory and application-specific subdirectory organization to specify files for reception from the broadcast service. Applications can then request that files be captured without requiring further discovery mechanisms or knowledge of the broadcast system, such as system information. The file capture request may be made via a registration process or through an application-to-file delivery framework interface or API. For application developers, this file extension paradigm is analogous to requesting access to files on a file system, or fetching files via a file transfer protocol as FTP.

A broadcast file transport network transmitting overhead information in the form of a broadcast schedule message provides information to receiving devices regarding the files that will be broadcast, as well as additional information to associate context to each file (e.g., a directory name on an application directory space, or a list of attribute characteristics, etc.). Such context information may be used by receiving devices to select for reception from the different file broadcasts being advertised those files which are relevant to a service or application resident on the receiver device. File ID and/or Element ID information provided in the broadcast schedule message may also allow the receiver devices to determine whether a file is a new file or an update to a previously received file. The broadcast schedule message construct supports describing aliasing of application file names or attribute strings. The broadcast schedule message construct also allows identifying the type of file being transported, e.g., a single file versus bundles of files. Using information available in the broadcast schedule message, or optionally, a file delivery catalog system, receiver devices can identify for reception (i.e. filter and select) files of interest for reception, so that the receiver circuitry is activated only to receive those files which are useful to applications resident on the receiver devices.

A file ingestion system enables the ingestion of files for transport over a broadcast network by enabling file content providers to identify and characterize the files, and define transmission requirements that dictate how timely and how reliably the files need to be carried over the shared, and often scarce, broadcast resources. Timeliness and receiver battery constraints may require that the broadcast system only advertise a small amount of schedule information at a time. A scheduling functionality of the file ingestion system may accommodate new file transmission requirements by balancing those requirements against the file transmission requirements of previously ingested files. Further, the file ingestion system may be configured to ensure that a flow of fresh schedule information, such as in the form of regularly updated broadcast schedule message messages, is timely made available to receiver devices, and that the files are transmitted per the advertised schedule.

To enable the efficient transmission of files within limited broadcast resources, file delivery may be organized into file delivery pipes as a mechanism to conceptually capture the resource allocation for the transport of files on a broadcast network. Different strategies may be implemented to adjust multiple pipe configurations and provisioning to bind application files to pipes when applications use the file system abstraction described herein. Scheduling algorithms may make use the different pipe configurations to satisfy application delivery requirements within the bandwidth and operating conditions of the broadcast network.

The various embodiments provide a number of advantages and useful features with respect to broadcasting, receiving and handling files. These include, a mechanism for naming files using a file system abstraction when delivering files over a broadcast distribution system, a mechanism for signaling file names as a means of identifying files when submitting them for ingestion and transport over a broadcast delivery system, mechanisms for requesting download of files from a broadcast delivery system that describes available files via a file system abstraction, and a mechanism for binding files to a file delivery application based on directory and subdirectories associated with the application.

The file delivery framework (FDF) provides a flexible mechanism to deliver files to devices in the background. It has the following key design goals: flexible file broadcast schedule—the file broadcast windows can be dynamically scheduled and signaled to the devices; scalable with large number of applications—it can multiplex data from multiple applications into the same flow to significantly reduce the number of data flows in the system; and Power efficiency—the device only consumes energy in selectively receiving the data the user is interested in.

The broadcast schedule message provides a mechanism of advertising the schedule for the transmission of files over the broadcast network that associates files to services or applications via file names, attributes, and application/service identifiers. The broadcast schedule message may also identify whether a file being broadcast is a new, updated or a repeated file, so that receiver devices can be configured to capture a single or all updated versions of a file. The broadcast schedule message may signal the transport stream where the file can be received, in addition to the broadcast windows and identification of possible multiple instances of when a file may be broadcast. The broadcast schedule message may also identify when the broadcast schedule message will be updated with new schedule information. The broadcast schedule message may also describe application/service IDs and aliasing information for the files being transported. The broadcast schedule message may advertise only an unchangeable portion of the file broadcast schedule information at a time in order to balance content freshness against battery impact on receiver devices.

Various embodiments also provide a mechanism that enables receiver devices to discover the broadcast network transport technology, the frequency used, the portion of the transport in a given frequency, and the transport stream in that technology and frequency that provides the delivery schedule information for files transmitted over a broadcast technology. Receiver devices may make use of the advertised schedule provided in the broadcast schedule message to select files for reception based on the service or application to which the file is associated, and whether the file is new or an update to a previously received file.

The various embodiments may include dedicating broadcast transmission resources for the multiplexed transport of files of different delivery and different geographical coverage requirements, the partitioning of resources available for file transport across different file delivery pipes in order to address different delivery requirements, different receiver constraints, or provide traffic separation. Different classes of files may be bound to a set of file delivery pipes in order to meet different delivery requirements, different receiver constraints, or provide traffic separation. Transport streams carrying different files may be multiplexed such that the dedicated resources for file transport are utilized to the limit. Transport streams may be further configured to enable transport of a file over different discontinuous transmissions to allow for the interleaving of smaller files. Classes of files may be bound to a set of resources in order to meet different delivery requirements, different receiver constraints, or provide traffic separation. Files may be allocated to file delivery pipes based on the file delivery requirements, the available file delivery pipes, the binding classes of files to a set of resources. Applications and services on the sender side may use a file delivery service of a broadcast system to construct an overhead file, a catalog file, listing all the files that the application is making available for broadcast or other (e.g., unicast) transport along with application-specific attributes.

The file ingestion system may receive and transport catalog files from file content providers along with along other application specific files, and receiver devices may be configured to select files were reception based upon the information in such catalog files. Applications resident on receiver devices may use updated catalog file to determine the files of interest based on application-specific logic applied over the available attributes characterizing each file that are listed in the catalog.

Figure 88:
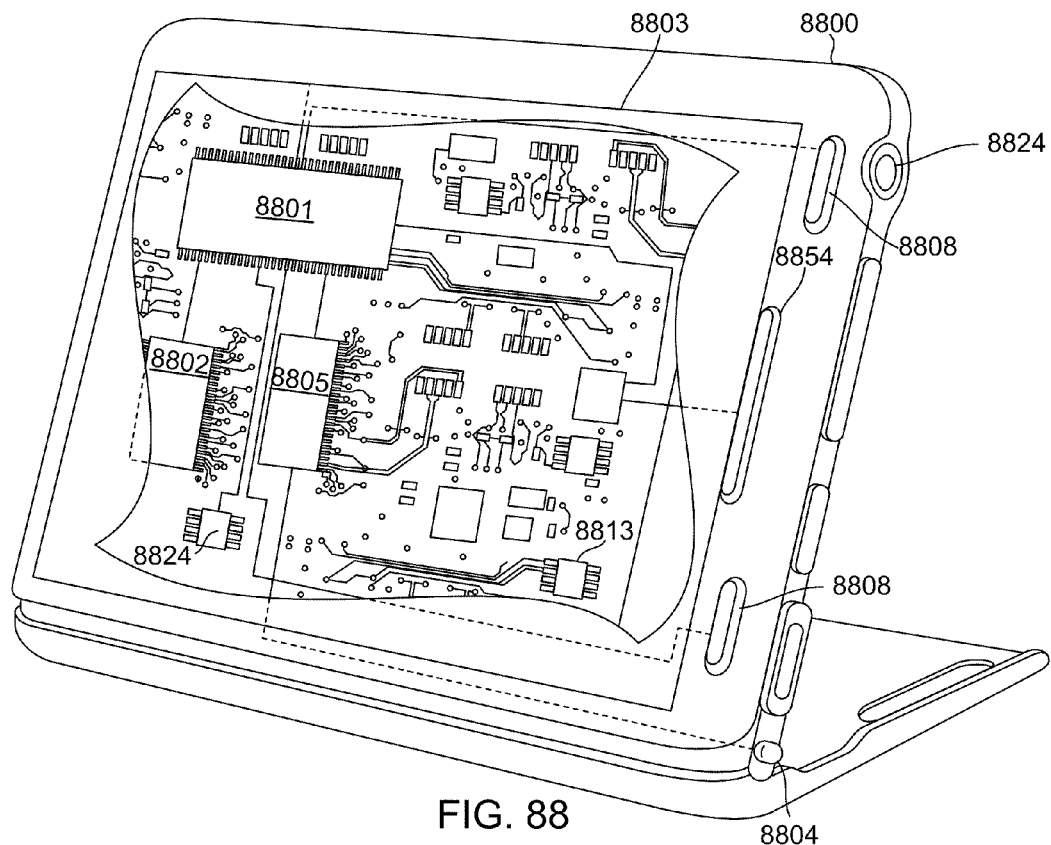
FIG. 88 is a component block diagram of a receiver device suitable for use in an embodiment.

FIG. 88 is a system block diagram of a receiver device suitable for use with any of the embodiments. A typical receiver device 8800 may include a processor 8801 coupled to internal memory 8802, a display 8803, and to a speaker 8854. Additionally, the receiver device 8800 may include an antenna 8804 for sending and receiving electromagnetic radiation that may be connected to a wireless data link and/or cellular telephone transceiver 8805 coupled to the processor 8801 and a mobile multimedia broadcast receiver 8806 coupled to the processor 8801. Receiver devices 8800 typically also include menu selection buttons or rocker switches 8808 for receiving user inputs.

The various embodiment methods for receiving and processing interactivity event signaling messages may be performed by the multimedia broadcast receiver 8824 and portions of the processor 8801 and memory 8802. Alternatively dedicated modules within or coupled to the multimedia broadcast receiver 8824 may perform the embodiment methods.

Figure 89:
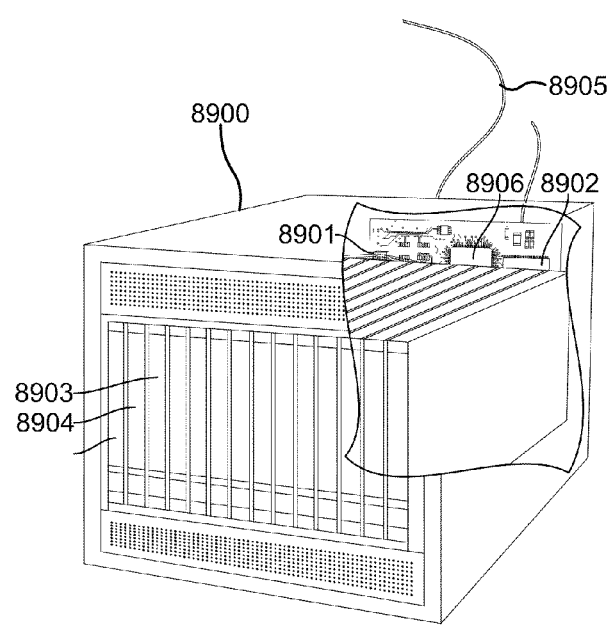
FIG. 89 is a component block diagram of a server device suitable for use in an embodiment.

The various embodiments on the broadcast side described above may be implemented on any of a variety of commercially available server devices, such as the server 8900 illustrated in FIG. 89. Such a server 8900 typically includes a processor 8901 coupled to volatile memory 8902 and a large capacity nonvolatile memory, such as a disk drive 8903. The server 8900 may also include a floppy disc drive, compact disc (CD) or DVD disc drive 8906 coupled to the processor 8901. The server 8900 may also include network access ports 8904 coupled to the processor 8901 for establishing data connections with a network 8905, such as a local area network coupled to other broadcast system computers and servers.

The processors 8801, 8901 may be any programmable microprocessor, microcomputer or multiple processor chip or chips that can be configured by software instructions (applications) to perform a variety of functions, including the functions of the various embodiments described below. In some mobile receiver devices, multiple processors 8901 may be provided, such as one processor dedicated to wireless communication functions and one processor dedicated to running other applications. Typically, software applications may be stored in the internal memory 8802, 8902, 8903 before they are accessed and loaded into the processor 8801, 8901. The processor 8801, 8901 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such, non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of, non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of delivering files to a receiver device over a broadcast communication network, comprising:
   receiving files for transport from a content provider, the received files having a file name and containing information regarding file contents and communication requirements, wherein the content provider specifies broadcast transport requirements for each of the received files;
   ingesting the received files via a file ingestion system;
   sending a notice from the file ingestion system notifying the broadcast network of the ingested files and the broadcast transport requirements of the ingested files;
   scheduling, in the file ingestion system, transmission times of the ingested files on one or more broadcast transmission streams;
   scheduling the received files for transmission via a file data flow within broadcast transmissions;
   generating a broadcast scheduling message indicating when files will be broadcast within a broadcast scheduling period, information regarding those files, and a scheduled broadcast time window for each file, wherein the broadcast scheduling message advertises delivery schedules of the received files;
   broadcasting the generated broadcasts scheduling message via the broadcast network;
   broadcasting the received files via the file data flow of the broadcast network in accordance with the scheduled broadcast time windows included within the broadcast scheduling message, wherein the received files are broadcast on transmission resources organized into one or more file delivery pipes;
   identifying files already scheduled for transmission on the broadcast transmission streams but not yet advertised by the broadcast scheduling message; and
   using the transport requirements specified by the content provider to pack newly ingested files into the broadcast transmission streams along with the identified files.

2. The method of claim 1, further comprising:
   assembling two or more ingested files into one or more transport files that are suitable for transport over broadcast transmission streams.

3. The method of claim 1, wherein each of the broadcast transport requirements specified by the content provider comprises a timeliness requirement and a robustness requirement.

4. The method of claim 3, wherein the timeliness requirement comprises a latency tolerance for the ingested file.

5. The method of claim 3, wherein the robustness requirement comprises a level of forward error correction required for the ingested file.

6. The method of claim 1, further comprising multiplexing a number of different files onto each of the broadcast transmission steams using the file delivery pipes.

7. The method of claim 6, further comprising scheduling the ingested files across the file delivery pipes in a manner that addresses application-specific delivery requirements specified by the content provider, wherein the application-specific delivery requirements are issued to the content provider by an application running on the receiver device.

8. The method of claim 6, further comprising:
   organizing sender-side applications into classes; and
   mapping the classes of applications to specific file delivery pipes.

9. The method of claim 1, further comprising:
   associating each received file with a transport file ID uniquely identifying the file and providing versioning support; and
   scheduling each file delivery pipe to carry a sequence of the received files based on the transport file ID.

10. The method of claim 1, wherein each file is scheduled to be broadcast within a broadcast window over a dedicated file delivery pipe, each broadcast window having a size.

11. The method of claim 10, wherein the size of the broadcast window of each file delivery pipe is calculated as a function of a data rate of the file delivery pipe and a size of the file being transmitted over the file delivery pipe.

12. The method of claim 10, wherein the size of the broadcast window of each file delivery pipe is proportional to a size of the file being transmitted over the file delivery pipe divided by data rate of the file delivery pipe.

13. A method of delivering files to a receiver device over a broadcast communication network, comprising:
   receiving files for transport from a content provider, the received files having a file name and containing information regarding file contents and communication requirements;
   scheduling the received files for transmission via a file data flow within broadcast transmissions;

generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;

broadcasting the generated broadcasts scheduling message via the broadcast network; and broadcasting the received files via the file data flow of the broadcast network in accordance with the scheduled broadcast time windows included within the broadcast scheduling message.

14. The method of claim 13, wherein the received files are scheduled for broadcast based upon a relative urgency.

15. The method of claim 13, further comprising:
receiving from an application operating within a receiver device a request to capture files, the request specifying one or more reception criteria;
receiving the broadcast scheduling message in the receiver device;
monitoring the broadcast scheduling message in the receiver device for a file matching the reception criteria;
identifying from the broadcast scheduling message the scheduled broadcast time window when a file matching the reception criteria will be broadcast;
activating a receiver circuitry of the receiver device at the identified scheduled broadcast time window for the matching file;
selecting a file for reception based upon file information in the received broadcast scheduling message;
receiving in the receiver device the selected file from the broadcast transmissions; and
passing the selected file to the requesting application operating within the receiver device.

16. The method of claim 15, wherein receiving in the receiver device the selected file from the broadcast transmissions further includes storing version identifying information in memory in the receiver device, the version identifying information identifying a version of the received file, the method further comprising:
monitoring the broadcast scheduling message in the receiver device for a file having version identifying information that indicates a newer or updated version of the received file is being broadcast; and
receiving in the receiver device an updated version of the requested file from the broadcast network when the broadcast scheduling message indicates that a new or updated version of the file is being broadcast.

17. The method of claim 15, wherein receiving from an application operating within a receiver device a request to capture files further includes receiving the capture request by the receiver device in the form of commands to capture a file containing the requested file once or as a command to capture all instances of the file.

18. The method of claim 15, wherein the generated broadcast scheduling message further identifies a time when the broadcast scheduling message will be updated, the method further comprising:
broadcasting, via the broadcast network, the broadcast scheduling message multiple times within the broadcast scheduling period;
deactivating the receiver circuitry in the receiver device after the broadcast scheduling message has been received;
determining when the current time equals the time the broadcast scheduling message will be updated;
reactivating the receiver circuitry in the receiver device when the current time equals the time the broadcast scheduling message will be updated; and
receiving an updated broadcast scheduling message.

19. The method of claim 15, wherein:
receiving from an application operating within a receiver device a request to capture files comprises receiving a request to capture a file that specifies a file directory; and
selecting a file for reception based upon file information in the received broadcast scheduling message comprises selecting a file for reception based upon the file identifier matching the identified file directory.

20. The method of claim 13, wherein broadcasting the generated broadcast scheduling message includes broadcasting the broadcast scheduling message as part of an overhead transport stream that provides delivery schedule information for files broadcast on a given frequency.

21. The method of claim 13, wherein broadcasting the generated broadcast scheduling message includes broadcasting the broadcast scheduling message as part of an overhead transport stream that provides delivery schedule information for files broadcast on a given frequency, the delivery schedule information setting delivery schedules advertized by the broadcast scheduling message.

22. The method of claim 21, wherein the broadcast scheduling message advertises all the successfully scheduled files over a broadcast schedule period.

23. The method of claim 21, wherein the broadcast scheduling message advertises only a fraction of the successfully scheduled files over a broadcast schedule period.

24. The method of claim 23, further comprising:
determining the files already accepted for transmission but whose delivery schedules have not yet been advertised by the broadcast scheduling message; and
modifying the delivery schedule information of the files already accepted for transmission but whose delivery schedules have not yet been advertised by the broadcast scheduling message.

25. The method of claim 13, wherein generating a broadcast scheduling message comprises generating the broadcast schedule message to describe a series of files that will be broadcast within the broadcast schedule period, each broadcast schedule period defining a quantity representing the number of advertised file broadcast schedules included in the broadcast schedule message.

26. The method of claim 13, wherein at least one received file is scheduled to be broadcast within more than one broadcast time window in a single broadcast schedule period.

27. The method of claim 13, wherein:
generating a broadcast scheduling message comprises generating the broadcast schedule message to contain reception information for a plurality of files that are to be broadcast within a single broadcast schedule period; and
broadcasting the generated broadcasts scheduling message via the broadcast network comprises transmitting the broadcast schedule message repeatedly in the same broadcast time window.

28. The method of claim 22, wherein the broadcast schedule message is rebroadcast in each broadcast superframe.

29. The method of claim 28, wherein multiple broadcast windows exist during a broadcast schedule period associated with a single file being transmitted on the file data flow.

30. The method of claim 29, wherein the single file is split into disjoint pieces, interleaved with other files, and transmitted with other files over the file data flow.

31. The method of claim 13, wherein generating a broadcast scheduling message comprises generating the broadcast schedule message to comprise a flow broadcast schedule record that describes the broadcast schedules for the files broadcast on the file data flow.

32. The method of claim 13, wherein generating a broadcast scheduling message comprises generating the broadcast schedule message to comprise attribute strings that provide multiple attributes that characterize the file content.

33. The method of claim 13, wherein generating a broadcast scheduling message comprises generating the broadcast schedule message to comprise a broadcast schedule information record.

34. The method of claim 33, wherein generating the broadcast schedule message to comprise a broadcast schedule information record comprises generating the broadcast schedule information record of the broadcast schedule message to comprise a header portion and a body portion.

35. The method of claim 13, further comprising:
using an initial acquisition flow (IAF) system to signal a new version for the broadcast schedule messages.

36. The method of claim 13, further comprising receiving in the receiver device a latest directory information message from an initial acquisition flow (IAF) and executing a comparison operation that compares version information of a received broadcast schedule message extracted from the latest directory information message to version information of an unexpired processed broadcast schedule message.

37. The method of claim 36, further comprising activating receiver circuitry in the receiver device to receive the updated broadcast schedule message if the results of the comparing operation indicate that the versions are different.

38. The method of claim 13, further comprising receiving in the receiver device the broadcast schedule message and comparing a version parameter in the received broadcast schedule message to a version parameter in a directory info message unit, and if the compared versions are different, ignoring the received broadcast schedule message.

39. A method of delivering files to a receiver device over a broadcast communication network, comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file;
broadcasting the generated broadcasts scheduling message via the broadcast network; and
broadcasting the received files via the file data flow of the broadcast network in accordance with the scheduled broadcast time windows included within the broadcast scheduling message,
wherein the broadcast scheduling message includes prefix matching strings that identify multiple files that identify file content associated with the files broadcast on the file data flow.

40. The method of claim 39, wherein the broadcast schedule record comprises exactly one prefix matching string that identifies file content associated with a file name.

41. The method of claim 39, wherein the receiver device is configured to perform 2-way prefix matching with the values in the prefix matching strings.

42. A method of delivering files to a receiver device over a broadcast communication network, comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file;
broadcasting the generated broadcasts scheduling message via the broadcast network; and
broadcasting the received files via the file data flow of the broadcast network in accordance with the scheduled broadcast time windows included within the broadcast scheduling message,
wherein the broadcast scheduling message includes prefix matching strings that identify multiple directory names that identify file content associated with the files broadcast on the file data flow.

43. The method of claim 42, wherein the broadcast schedule record comprises exactly one prefix matching string that identifies file content associated with a file name.

44. The method of claim 42, wherein the receiver device is configured to perform 2-way prefix matching with the values in the prefix matching strings.

45. A method of delivering files to a receiver device over a broadcast communication network, comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion of the broadcast schedule information record including a next monitor time data field and a monitoring period data field;
broadcasting the generated broadcasts scheduling message via the broadcast network; and
broadcasting the received files via the file data flow of the broadcast network in accordance with the scheduled broadcast time windows included within the broadcast scheduling message.

46. The method of claim 45, further comprising:
extracting the next monitor time data field and the monitoring period data field from the header portion of the broadcast schedule information record; and
using the extracted next monitor time data field and the extracted monitoring period data field to deliver data at different latencies.

47. The method of claim 45, wherein the header portion includes an information field that contains information about the file data flow.

48. The method of claim 47, wherein the information field comprises a flow ID data field and a data rate data field.

49. The method of claim 45, wherein the next monitor time data field specifies the next time that the receiver device should monitor the broadcast schedule flow for an updated broadcast schedule message.

50. A method of delivering files to a receiver device over a broadcast communication network, comprising:
- receiving files for transport from a content provider, the received files having a file name and containing information regarding file contents and communication requirements;
- scheduling the received files for transmission via a file data flow within broadcast transmissions;
- generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion including a monitoring period data field;
- determining whether the broadcast network supports initial acquisition flow (IAF) systems;
- generating the header portion of the broadcast schedule information record to include a next monitor time field upon determining that the broadcast network does not support initial acquisition flow (IAF) systems;
- broadcasting the generated broadcasts scheduling message via the broadcast network; and
- broadcasting the received files via the file data flow of the broadcast network in accordance with the scheduled broadcast time windows included within the broadcast scheduling message.

51. A method of delivering files to a receiver device over a broadcast communication network, comprising:
- receiving files for transport from a content provider, the received files having a file name and containing information regarding file contents and communication requirements;
- scheduling the received files for transmission via a file data flow within broadcast transmissions;
- generating a broadcast scheduling message indicating when files will be broadcast within a broadcast scheduling period, information regarding those files, and a scheduled broadcast time window for each file, wherein the broadcast scheduling message advertises all the successfully scheduled files over a broadcast schedule period;
- broadcasting the generated broadcasts scheduling message via the broadcast network as part of an overhead transport stream that provides delivery schedule information for files broadcast on a given frequency, the delivery schedule information setting delivery schedules advertised by the broadcast scheduling message; and
- broadcasting the received files via the file data flow of the broadcast network in accordance with the scheduled broadcast time windows included within the broadcast scheduling message,
- wherein the broadcast network sets a next monitoring field device provision parameter to be a variable number of seconds prior to a start time of the broadcast schedule period,
- the method further comprising:
  - detecting, in the receiver device, broadcast schedule message updates; and
  - receiving an updated broadcast schedule message before the start of the broadcast schedule period.

52. A server, comprising:
- a network interface configured to communicate with a broadcast communication network; and
- a processor coupled to the network interface and configured with processor-executable instructions to perform operations comprising:
  - receiving files for transport from a content provider, the received files having a file name and containing information regarding file contents and communication requirements, wherein the content provider specifies broadcast transport requirements for each of the received files;
  - ingesting the received files via a file ingestion system;
  - sending a notice from the file ingestion system notifying the broadcast network of the ingested files and the broadcast transport requirements of the ingested files;
  - scheduling, in the file ingestion system, transmission times of the ingested files on one or more broadcast transmission streams;
  - scheduling the received files for transmission via a file data flow within broadcast transmissions;
  - generating a broadcast scheduling message indicating when files will be broadcast within a broadcast scheduling period, information regarding those files, and a scheduled broadcast time window for each file, wherein the broadcast scheduling message advertises delivery schedules of the received files;
  - broadcasting the generated broadcasts scheduling message via the broadcast network;
  - broadcasting the received files via the file data flow of the broadcast network in accordance with the scheduled broadcast time windows included within the broadcast scheduling message, wherein the received files are broadcast on transmission resources organized into one or more file delivery pipes;
  - identifying files already scheduled for transmission on the broadcast transmission streams but not yet advertised by the broadcast scheduling message; and
  - using the transport requirements specified by the content provider to pack newly ingested files into the broadcast transmission streams along with the identified files.

53. The server of claim 52, wherein the processor is configured with processor-executable instructions to perform operations further comprising multiplexing a number of different files onto each of the broadcast transmission steams using the file delivery pipes.

54. The server of claim 53, wherein the processor is configured with processor-executable instructions to perform operations further comprising scheduling the ingested files across the file delivery pipes in a manner that addresses application-specific delivery requirements specified by the content provider, wherein the application-specific delivery requirements are issued to the content provider by an application running on a receiver device.

55. The server of claim 53, wherein the processor is configured with processor-executable instructions to perform operations further comprising:
- organizing sender-side applications into classes; and
- mapping the classes of applications to specific file delivery pipes.

56. The server of claim 52, wherein the processor is configured with processor-executable instructions to perform operations further comprising:
- associating each received file with a transport file ID uniquely identifying the file and providing versioning support; and
- scheduling each file delivery pipe to carry a sequence of the received files based on the transport file ID.

57. The server of claim 52, wherein the processor is configured with processor-executable instructions to perform operations such that each file is scheduled to be broadcast within a broadcast window over a dedicated file delivery pipe, each broadcast window having a size.

58. The server of claim 57, wherein the processor is configured with processor-executable instructions to perform operations such that the size of the broadcast window of each file delivery pipe is calculated as a function of a data rate of the file delivery pipe and a size of the file being transmitted over the file delivery pipe.

59. The server of claim 57, wherein the processor is configured with processor-executable instructions to perform operations such that the size of the broadcast window of each file delivery pipe is proportional to a size of the file being transmitted over the file delivery pipe divided by data rate of the file delivery pipe.

60. The server of claim 52, wherein the processor is configured with processor-executable instructions to perform operations further comprising:
    assembling two or more ingested files into one or more transport files that are suitable for transport over broadcast transmission streams.

61. The server of claim 52, wherein the processor is configured with processor-executable instructions to perform operations such that each of the broadcast transport requirements specified by the content provider comprises a timeliness requirement and a robustness requirement.

62. The server of claim 61, wherein the processor is configured with processor-executable instructions to perform operations such that the timeliness requirement comprises a latency tolerance for the ingested file.

63. The server of claim 61, wherein the processor is configured with processor-executable instructions to perform operations such that the robustness requirement comprises a level of forward error correction required for the ingested file.

64. A server, comprising:
    means for receiving files for transport from a content provider, the received files having a file name and containing information regarding file contents and communication requirements, wherein the content provider specifies broadcast transport requirements for each of the received files;
    means for ingesting the received files via a file ingestion system;
    means for sending a notice from the file ingestion system notifying a broadcast network of the ingested files and the broadcast transport requirements of the ingested files;
    means for scheduling, in the file ingestion system, transmission times of the ingested files on one or more broadcast transmission streams;
    means for scheduling the received files for transmission via a file data flow within broadcast transmissions;
    means for generating a broadcast scheduling message indicating when files will be broadcast within a broadcast scheduling period, information regarding those files, and a scheduled broadcast time window for each file, wherein the broadcast scheduling message advertises delivery schedules of the received files;
    means for broadcasting the generated broadcasts scheduling message via the broadcast network;
    means for broadcasting the received files via the file data flow of the broadcast network in accordance with the scheduled broadcast time windows included within the broadcast scheduling message, wherein the received files are broadcast on transmission resources organized into one or more file delivery pipes;
    means for identifying files already scheduled for transmission on the broadcast transmission streams but not yet advertised by the broadcast scheduling message; and
    means for using the transport requirements specified by the content provider to pack newly ingested files into the broadcast transmission streams along with the identified files.

65. The server of claim 64, further comprising means for multiplexing a number of different files onto each of the broadcast transmission steams using the file delivery pipes.

66. The server of claim 65, further comprising means for scheduling the ingested files across the file delivery pipes in a manner that addresses application-specific delivery requirements specified by the content provider, wherein the application-specific delivery requirements are issued to the content provider by an application running on a receiver device.

67. The server of claim 65, further comprising:
    means for organizing sender-side applications into classes; and
    mapping the classes of applications to specific file delivery pipes.

68. The server of claim 64, further comprising:
    means for associating each received file with a transport file ID uniquely identifying the file and providing versioning support; and
    means for scheduling each file delivery pipe to carry a sequence of the received files based on the transport file ID.

69. The server of claim 64, wherein each file is scheduled to be broadcast within a broadcast window over a dedicated file delivery pipe, each broadcast window having a size.

70. The server of claim 69, wherein the size of the broadcast window of each file delivery pipe is calculated as a function of a data rate of the file delivery pipe and a size of the file being transmitted over the file delivery pipe.

71. The server of claim 69, wherein the size of the broadcast window of each file delivery pipe is proportional to a size of the file being transmitted over the file delivery pipe divided by data rate of the file delivery pipe.

72. The server of claim 64, further comprising:
    means for assembling two or more ingested files into one or more transport files that are suitable for transport over broadcast transmission streams.

73. The server of claim 64, wherein each of the broadcast transport requirements specified by the content provider comprises a timeliness requirement and a robustness requirement.

74. The server of claim 73, wherein the timeliness requirement comprises a latency tolerance for the ingested file.

75. The server of claim 73, wherein the robustness requirement comprises a level of forward error correction required for the ingested file.

76. A non-transitory server-readable storage medium having stored thereon processor-executable instructions configured to cause a server processor to perform operations comprising:
    receiving files for transport from a content provider, the received files having a file name and containing information regarding file contents and communication requirements, wherein the content provider specifies broadcast transport requirements for each of the received files;
    ingesting the received files via a file ingestion system;
    sending a notice from the file ingestion system notifying a broadcast network of the ingested files and the broadcast transport requirements of the ingested files;

scheduling, in the file ingestion system, transmission times of the ingested files on one or more broadcast transmission streams;

scheduling the received files for transmission via a file data flow within broadcast transmissions;

generating a broadcast scheduling message indicating when files will be broadcast within a broadcast scheduling period, information regarding those files, and a scheduled broadcast time window for each file, wherein the broadcast scheduling message advertises delivery schedules of the received files;

broadcasting the generated broadcasts scheduling message via the broadcast network;

broadcasting the received files via the file data flow of the broadcast network in accordance with the scheduled broadcast time windows included within the broadcast scheduling message, wherein the received files are broadcast on transmission resources organized into one or more file delivery pipes;

identifying files already scheduled for transmission on the broadcast transmission streams but not yet advertised by the broadcast scheduling message; and using the transport requirements specified by the content provider to pack newly ingested files into the broadcast transmission streams along with the identified files.

77. The non-transitory server-readable storage medium of claim 76, wherein the stored processor-executable instructions are configured to cause a server processor to perform operations further comprising multiplexing a number of different files onto each of the broadcast transmission steams using the file delivery pipes.

78. The non-transitory server-readable storage medium of claim 77, wherein the stored processor-executable instructions are configured to cause a server processor to perform operations further comprising scheduling the ingested files across the file delivery pipes in a manner that addresses application-specific delivery requirements specified by the content provider, wherein the application-specific delivery requirements are issued to the content provider by an application running on a receiver device.

79. The non-transitory server-readable storage medium of claim 77, wherein the stored processor-executable instructions are configured to cause a server processor to perform operations further comprising:
organizing sender-side applications into classes; and
mapping the classes of applications to specific file delivery pipes.

80. The non-transitory server-readable storage medium of claim 76, wherein the stored processor-executable instructions are configured to cause a server processor to perform operations further comprising:
associating each received file with a transport file ID uniquely identifying the file and providing versioning support; and
scheduling each file delivery pipe to carry a sequence of the received files based on the transport file ID.

81. The non-transitory server-readable storage medium of claim 76, wherein the stored processor-executable instructions are configured to cause a server processor to perform operations such that each file is scheduled to be broadcast within a broadcast window over a dedicated file delivery pipe, each broadcast window having a size.

82. The non-transitory server-readable storage medium of claim 81, wherein the stored processor-executable instructions are configured to cause a server processor to perform operations such that the size of the broadcast window of each file delivery pipe is calculated as a function of a data rate of the file delivery pipe and a size of the file being transmitted over the file delivery pipe.

83. The non-transitory server-readable storage medium of claim 81, wherein the stored processor-executable instructions are configured to cause a server processor to perform operations such that the size of the broadcast window of each file delivery pipe is proportional to a size of the file being transmitted over the file delivery pipe divided by data rate of the file delivery pipe.

84. The non-transitory server-readable storage medium of claim 76, wherein the stored processor-executable instructions are configured to cause a server processor to perform operations further comprising:
assembling two or more ingested files into one or more transport files that are suitable for transport over broadcast transmission streams.

85. The non-transitory server-readable storage medium of claim 76, wherein the stored processor-executable instructions are configured to cause a server processor to perform operations such that each of the broadcast transport requirements specified by the content provider comprises a timeliness requirement and a robustness requirement.

86. The non-transitory server-readable storage medium of claim 85, wherein the stored processor-executable instructions are configured to cause a server processor to perform operations such that the timeliness requirement comprises a latency tolerance for the ingested file.

87. The non-transitory server-readable storage medium of claim 85, wherein the stored processor-executable instructions are configured to cause a server processor to perform operations such that the robustness requirement comprises a level of forward error correction required for the ingested file.

88. A server, comprising:
a network interface configured to communicate with a broadcast communication network; and
a processor coupled to the network interface and configured with processor-executable instructions to perform operations comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that a receiver device should monitor the broadcast schedule flow for an updated broadcast schedule message;
broadcasting the generated broadcasts scheduling message via the broadcast network; and
broadcasting the received files via the file data flow of the broadcast network in accordance with the scheduled broadcast time windows included within the broadcast scheduling message.

89. The server of claim 88, wherein the processor is configured with processor-executable instructions to perform operations such that generating a broadcast scheduling message comprises generating the broadcast schedule message to comprise a flow broadcast schedule record that describes the broadcast schedules for the files broadcast on the file data flow.

90. The server of claim 88, wherein the processor is configured with processor-executable instructions to perform operations such that generating a broadcast scheduling message comprises generating the broadcast schedule message to comprise attribute strings that provide multiple attributes that characterize the file content.

91. The server of claim 88, wherein the processor is configured with processor-executable instructions to perform operations such that generating a broadcast scheduling message comprises generating the broadcast schedule message to comprise a broadcast schedule information record.

92. The server of claim 91, wherein the processor is configured with processor-executable instructions to perform operations such that generating the broadcast schedule message to comprise a broadcast schedule information record comprises generating the broadcast schedule information record of the broadcast schedule message to comprise a header portion and a body portion.

93. The server of claim 88, wherein the processor is configured with processor-executable instructions to perform operations further comprising:
using an initial acquisition flow (IAF) system to signal a new version for the broadcast schedule messages.

94. The server of claim 88, wherein the processor is configured with processor-executable instructions to perform operations such that broadcasting the generated broadcast scheduling message includes broadcasting the broadcast scheduling message as part of an overhead transport stream that provides delivery schedule information for files broadcast on a given frequency.

95. The server of claim 88, wherein the processor is configured with processor-executable instructions to perform operations such that broadcasting the generated broadcast scheduling message includes broadcasting the broadcast scheduling message as part of an overhead transport stream that provides delivery schedule information for files broadcast on a given frequency, the delivery schedule information setting delivery schedules advertised by the broadcast scheduling message.

96. The server of claim 95, wherein the processor is configured with processor-executable instructions to perform operations such that the broadcast scheduling message advertises only a fraction of the successfully scheduled files over a broadcast schedule period.

97. The server of claim 96, wherein the processor is configured with processor-executable instructions to perform operations further comprising:
determining the files already accepted for transmission but whose delivery schedules have not yet been advertised by the broadcast scheduling message; and
modifying the delivery schedule information of the files already accepted for transmission but whose delivery schedules have not yet been advertised by the broadcast scheduling message.

98. The server of claim 95, wherein the processor is configured with processor-executable instructions to perform operations such that the broadcast scheduling message advertises all the successfully scheduled files over a broadcast schedule period.

99. The server of claim 98, wherein the processor is configured with processor-executable instructions to perform operations such that the broadcast schedule message is rebroadcast in each broadcast superframe.

100. The server of claim 99, wherein the processor is configured with processor-executable instructions to perform operations such that multiple broadcast windows exist during a broadcast schedule period associated with a single file being transmitted on the file data flow.

101. The server of claim 100, wherein the processor is configured with processor-executable instructions to perform operations such that the single file is split into disjoint pieces, interleaved with other files, and transmitted with other files over the file data flow.

102. The server of claim 88, wherein the processor is configured with processor-executable instructions to perform operations such that generating a broadcast scheduling message comprises generating the broadcast schedule message to describe a series of files that will be broadcast within the broadcast schedule period, each broadcast schedule period defining a quantity representing the number of advertised file broadcast schedules included in the broadcast schedule message.

103. The server of claim 88, wherein the processor is configured with processor-executable instructions to perform operations such that at least one received file is scheduled to be broadcast within more than one broadcast time window in a single broadcast schedule period.

104. The server of claim 88, wherein the processor is configured with processor-executable instructions to perform operations such that:
generating a broadcast scheduling message comprises generating the broadcast schedule message to contain reception information for a plurality of files that are to be broadcast within a single broadcast schedule period; and
broadcasting the generated broadcasts scheduling message via the broadcast network comprises transmitting the broadcast schedule message repeatedly in the same broadcast time window.

105. The server of claim 88, wherein the processor is configured with processor-executable instructions to perform operations such that the received files are schedules for broadcast based upon a relative urgency.

106. A server, comprising:
means for receiving files for transport from a content provider, the received files having a file name and containing information regarding file contents and communication requirements;
means for scheduling the received files for transmission via a file data flow within broadcast transmissions;
means for generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that a receiver device should monitor the broadcast schedule flow for an updated broadcast schedule message;
means for broadcasting the generated broadcasts scheduling message via the broadcast network; and
means for broadcasting the received files via the file data flow of the broadcast network in accordance with the scheduled broadcast time windows included within the broadcast scheduling message.

107. The server of claim 106, wherein means for generating a broadcast scheduling message comprises means for generating the broadcast schedule message to comprise a flow broadcast schedule record that describes the broadcast schedules for the files broadcast on the file data flow.

108. The server of claim 106, wherein means for generating a broadcast scheduling message comprises means for generating the broadcast schedule message to comprise attribute strings that provide multiple attributes that characterize the file content.

109. The server of claim 106, wherein the means for generating a broadcast scheduling message comprises means for generating the broadcast schedule message to comprise a broadcast schedule information record.

110. The server of claim 109, wherein means for generating the broadcast schedule message to comprise a broadcast schedule information record comprises means for generating the broadcast schedule information record of the broadcast schedule message to comprise a header portion and a body portion.

111. The server of claim 106, further comprising:
means for using an initial acquisition flow (IAF) system to signal a new version for the broadcast schedule messages.

112. The server of claim 106, wherein means for broadcasting the generated broadcast scheduling message includes means for broadcasting the broadcast scheduling message as part of an overhead transport stream that provides delivery schedule information for files broadcast on a given frequency.

113. The server of claim 106, wherein means for broadcasting the generated broadcast scheduling message includes means for broadcasting the broadcast scheduling message as part of an overhead transport stream that provides delivery schedule information for files broadcast on a given frequency, the delivery schedule information setting delivery schedules advertised by the broadcast scheduling message.

114. The server of claim 113, wherein the broadcast scheduling message advertises only a fraction of the successfully scheduled files over a broadcast schedule period.

115. The server of claim 114, further comprising:
means for determining the files already accepted for transmission but whose delivery schedules have not yet been advertised by the broadcast scheduling message; and
means for modifying the delivery schedule information of the files already accepted for transmission but whose delivery schedules have not yet been advertised by the broadcast scheduling message.

116. The server of claim 113, wherein the broadcast scheduling message advertises all the successfully scheduled files over a broadcast schedule period.

117. The server of claim 116, wherein the broadcast schedule message is rebroadcast in each broadcast superframe.

118. The server of claim 117, wherein multiple broadcast windows exist during a broadcast schedule period associated with a single file being transmitted on the file data flow.

119. The server of claim 118, wherein the single file is split into disjoint pieces, interleaved with other files, and transmitted with other files over the file data flow.

120. The server of claim 106, wherein means for generating a broadcast scheduling message comprises means for generating the broadcast schedule message to describe a series of files that will be broadcast within the broadcast schedule period, each broadcast schedule period defining a quantity representing the number of advertised file broadcast schedules included in the broadcast schedule message.

121. The server of claim 106, wherein at least one received file is scheduled to be broadcast within more than one broadcast time window in a single broadcast schedule period.

122. The server of claim 106, wherein:
means for generating a broadcast scheduling message comprises means for generating the broadcast schedule message to contain reception information for a plurality of files that are to be broadcast within a single broadcast schedule period; and means for broadcasting the generated broadcasts scheduling message via the broadcast network comprises means for transmitting the broadcast schedule message repeatedly in the same broadcast time window.

123. The server of claim 106, wherein the received files are schedules for broadcast based upon a relative urgency.

124. A non-transitory server-readable storage medium having stored thereon processor-executable instructions configured to cause a server processor to perform operations comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that a receiver device should monitor the broadcast schedule flow for an updated broadcast schedule message;
broadcasting the generated broadcasts scheduling message via the broadcast network; and
broadcasting the received files via the file data flow of the broadcast network in accordance with the scheduled broadcast time windows included within the broadcast scheduling message.

125. The non-transitory server-readable storage medium of claim 124, wherein the stored processor-executable instructions are configured to cause a server processor to perform operations such that generating a broadcast scheduling message comprises generating the broadcast schedule message to comprise a flow broadcast schedule record that describes the broadcast schedules for the files broadcast on the file data flow.

126. The non-transitory server-readable storage medium of claim 124, wherein the stored processor-executable instructions are configured to cause a server processor to perform operations such that generating a broadcast scheduling message comprises generating the broadcast schedule message to comprise attribute strings that provide multiple attributes that characterize the file content.

127. The non-transitory server-readable storage medium of claim 124, wherein the stored processor-executable instructions are configured to cause a server processor to perform operations such that generating a broadcast scheduling message comprises generating the broadcast schedule message to comprise a broadcast schedule information record.

128. The non-transitory server-readable storage medium of claim 127, wherein the stored processor-executable instructions are configured to cause a server processor to perform operations such that generating the broadcast schedule message to comprise a broadcast schedule information record comprises generating the broadcast schedule information record of the broadcast schedule message to comprise a header portion and a body portion.

129. The non-transitory server-readable storage medium of claim 124, wherein the stored processor-executable instructions are configured to cause a server processor to perform operations further comprising:
using an initial acquisition flow (IAF) system to signal a new version for the broadcast schedule messages.

130. The non-transitory server-readable storage medium of claim 124, wherein the stored processor-executable instructions are configured to cause a server processor to perform operations such that broadcasting the generated broadcast scheduling message includes broadcasting the broadcast scheduling message as part of an overhead transport stream that provides delivery schedule information for files broadcast on a given frequency.

131. The non-transitory server-readable storage medium of claim 124, wherein the stored processor-executable instructions are configured to cause a server processor to perform operations such that broadcasting the generated broadcast scheduling message includes broadcasting the broadcast scheduling message as part of an overhead transport stream that provides delivery schedule information for files broadcast on a given frequency, the delivery schedule information setting delivery schedules advertised by the broadcast scheduling message.

132. The non-transitory server-readable storage medium of claim 131, wherein the stored processor-executable instructions are configured to cause a server processor to perform operations such that the broadcast scheduling message advertises only a fraction of the successfully scheduled files over a broadcast schedule period.

133. The non-transitory server-readable storage medium of claim 132, wherein the stored processor-executable instructions are configured to cause a server processor to perform operations further comprising:
determining the files already accepted for transmission but whose delivery schedules have not yet been advertised by the broadcast scheduling message; and
modifying the delivery schedule information of the files already accepted for transmission but whose delivery schedules have not yet been advertised by the broadcast scheduling message.

134. The non-transitory server-readable storage medium of claim 131, wherein the stored processor-executable instructions are configured to cause a server processor to perform operations such that the broadcast scheduling message advertises all the successfully scheduled files over a broadcast schedule period.

135. The non-transitory server-readable storage medium of claim 134, wherein the stored processor-executable instructions are configured to cause a server processor to perform operations such that the broadcast schedule message is rebroadcast in each broadcast superframe.

136. The non-transitory server-readable storage medium of claim 135, wherein the stored processor-executable instructions are configured to cause a server processor to perform operations such that multiple broadcast windows exist during a broadcast schedule period associated with a single file being transmitted on the file data flow.

137. The non-transitory server-readable storage medium of claim 136, wherein the stored processor-executable instructions are configured to cause a server processor to perform operations such that the single file is split into disjoint pieces, interleaved with other files, and transmitted with other files over the file data flow.

138. The non-transitory server-readable storage medium of claim 124, wherein the stored processor-executable instructions are configured to cause a server processor to perform operations such that generating a broadcast scheduling message comprises generating the broadcast schedule message to describe a series of files that will be broadcast within the broadcast schedule period, each broadcast schedule period defining a quantity representing the number of advertised file broadcast schedules included in the broadcast schedule message.

139. The non-transitory server-readable storage medium of claim 124, wherein the stored processor-executable instructions are configured to cause a server processor to perform operations such that at least one received file is scheduled to be broadcast within more than one broadcast time window in a single broadcast schedule period.

140. The non-transitory server-readable storage medium of claim 124, wherein the stored processor-executable instructions are configured to cause a server processor to perform operations such that:
generating a broadcast scheduling message comprises generating the broadcast schedule message to contain reception information for a plurality of files that are to be broadcast within a single broadcast schedule period; and
broadcasting the generated broadcasts scheduling message via the broadcast network comprises transmitting the broadcast schedule message repeatedly in the same broadcast time window.

141. The non-transitory server-readable storage medium of claim 124, wherein the stored processor-executable instructions are configured to cause a server processor to perform operations such that the received files are schedules for broadcast based upon a relative urgency.

142. A server, comprising:
a network interface configured to communicate with a broadcast communication network; and
a processor coupled to the network interface and configured with processor-executable instructions to perform operations comprising:
receiving files for transport from a content provider, the received files having a file name and containing information regarding file contents and communication requirements;
scheduling the received files for transmission via a file data flow within broadcast transmissions;
generating a broadcast scheduling message indicating when files will be broadcast within a broadcast scheduling period, information regarding those files, and a scheduled broadcast time window for each file;
broadcasting the generated broadcasts scheduling message via the broadcast network; and
broadcasting the received files via the file data flow of the broadcast network in accordance with the scheduled broadcast time windows included within the broadcast scheduling message,
wherein the processor is configured with processor-executable instructions to perform operations such that the broadcast scheduling message includes prefix matching strings that identify multiple files that identify file content associated with the files broadcast on the file data flow.

143. The server of claim 142, wherein the processor is configured with processor-executable instructions to perform operations such that the broadcast schedule record comprises exactly one prefix matching string that identifies file content associated with a file name.

144. The server of claim 142, wherein the processor is configured with processor-executable instructions to perform operations such that the receiver device is configured to perform 2-way prefix matching with the values in the prefix matching strings.

145. A server, comprising:
  means for receiving files for transport from a content provider, the received files having a file name and containing information regarding file contents and communication requirements;
  means for scheduling the received files for transmission via a file data flow within broadcast transmissions;
  means for generating a broadcast scheduling message indicating when files will be broadcast within a broadcast scheduling period, information regarding those files, and a scheduled broadcast time window for each file;
  means for broadcasting the generated broadcasts scheduling message via the broadcast network; and
  means for broadcasting the received files via the file data flow of the broadcast network in accordance with the scheduled broadcast time windows included within the broadcast scheduling message,
  wherein the broadcast scheduling message includes prefix matching strings that identify multiple files that identify file content associated with the files broadcast on the file data flow.

146. The server of claim 145, wherein the broadcast schedule record comprises exactly one prefix matching string that identifies file content associated with a file name.

147. The server of claim 145, wherein the receiver device is configured to perform 2-way prefix matching with the values in the prefix matching strings.

148. A non-transitory server-readable storage medium having stored thereon processor-executable instructions configured to cause a server processor to perform operations comprising:
  receiving files for transport from a content provider, the received files having a file name and containing information regarding file contents and communication requirements;
  scheduling the received files for transmission via a file data flow within broadcast transmissions;
  generating a broadcast scheduling message indicating when files will be broadcast within a broadcast scheduling period, information regarding those files, and a scheduled broadcast time window for each file;
  broadcasting the generated broadcasts scheduling message via the broadcast network; and
  broadcasting the received files via the file data flow of the broadcast network in accordance with the scheduled broadcast time windows included within the broadcast scheduling message,
  wherein the stored processor-executable instructions are configured to cause a server processor to perform operations such that the broadcast scheduling message includes prefix matching strings that identify multiple files that identify file content associated with the files broadcast on the file data flow.

149. The non-transitory server-readable storage medium of claim 148, wherein the stored processor-executable instructions are configured to cause a server processor to perform operations such that the broadcast schedule record comprises exactly one prefix matching string that identifies file content associated with a file name.

150. The non-transitory server-readable storage medium of claim 148, wherein the stored processor-executable instructions are configured to cause a server processor to perform operations such that the receiver device is configured to perform 2-way prefix matching with the values in the prefix matching strings.

151. A server, comprising:
  a network interface configured to communicate with a broadcast communication network; and
  a processor coupled to the network interface and configured with processor-executable instructions to perform operations comprising:
    receiving files for transport from a content provider, the received files having a file name and containing information regarding file contents and communication requirements;
    scheduling the received files for transmission via a file data flow within broadcast transmissions;
    generating a broadcast scheduling message indicating when files will be broadcast within a broadcast scheduling period, information regarding those files, and a scheduled broadcast time window for each file;
    broadcasting the generated broadcasts scheduling message via the broadcast network; and
    broadcasting the received files via the file data flow of the broadcast network in accordance with the scheduled broadcast time windows included within the broadcast scheduling message,
  wherein the processor is configured with processor-executable instructions to perform operations such that the broadcast scheduling message includes prefix matching strings that identify multiple directory names that identify file content associated with the files broadcast on the file data flow.

152. The server of claim 151, wherein the processor is configured with processor-executable instructions to perform operations such that the broadcast schedule record comprises exactly one prefix matching string that identifies file content associated with a file name.

153. The server of claim 151, wherein the processor is configured with processor-executable instructions to perform operations such that the receiver device is configured to perform 2-way prefix matching with the values in the prefix matching strings.

154. A server, comprising:
  means for receiving files for transport from a content provider, the received files having a file name and containing information regarding file contents and communication requirements;
  means for scheduling the received files for transmission via a file data flow within broadcast transmissions;
  means for generating a broadcast scheduling message indicating when files will be broadcast within a broadcast scheduling period, information regarding those files, and a scheduled broadcast time window for each file;
  means for broadcasting the generated broadcasts scheduling message via the broadcast network; and
  means for broadcasting the received files via the file data flow of the broadcast network in accordance with the scheduled broadcast time windows included within the broadcast scheduling message,
  wherein the broadcast scheduling message includes prefix matching strings that identify multiple directory names that identify file content associated with the files broadcast on the file data flow.

155. The server of claim 154, wherein the broadcast schedule record comprises exactly one prefix matching string that identifies file content associated with a file name.

156. The server of claim 154, wherein the receiver device is configured to perform 2-way prefix matching with the values in the prefix matching strings.

157. A non-transitory server-readable storage medium having stored thereon processor-executable instructions configured to cause a server processor to perform operations comprising:
  receiving files for transport from a content provider, the received files having a file name and containing information regarding file contents and communication requirements;
  scheduling the received files for transmission via a file data flow within broadcast transmissions;
  generating a broadcast scheduling message indicating when files will be broadcast within a broadcast scheduling period, information regarding those files, and a scheduled broadcast time window for each file;
  broadcasting the generated broadcasts scheduling message via the broadcast network; and
  broadcasting the received files via the file data flow of the broadcast network in accordance with the scheduled broadcast time windows included within the broadcast scheduling message,
  wherein the stored processor-executable instructions are configured to cause a server processor to perform operations such that the broadcast scheduling message includes prefix matching strings that identify multiple directory names that identify file content associated with the files broadcast on the file data flow.

158. The non-transitory server-readable storage medium of claim 157, wherein the stored processor-executable instructions are configured to cause a server processor to perform operations such that the broadcast schedule record comprises exactly one prefix matching string that identifies file content associated with a file name.

159. The non-transitory server-readable storage medium of claim 157, wherein the stored processor-executable instructions are configured to cause a server processor to perform operations such that the receiver device is configured to perform 2-way prefix matching with the values in the prefix matching strings.

160. A server, comprising:
  a network interface configured to communicate with a broadcast communication network; and
  a processor coupled to the network interface and configured with processor-executable instructions to perform operations comprising:
    receiving files for transport from a content provider, the received files having a file name and containing information regarding file contents and communication requirements;
    scheduling the received files for transmission via a file data flow within broadcast transmissions;
    generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion of the broadcast schedule information record including a next monitor time data field and a monitoring period data field;
    broadcasting the generated broadcasts scheduling message via the broadcast network; and
    broadcasting the received files via the file data flow of the broadcast network in accordance with the scheduled broadcast time windows included within the broadcast scheduling message.

161. The server of claim 160, wherein the processor is configured with processor-executable instructions to perform operations further comprising:
  extracting the next monitor time data field and the monitoring period data field from the header portion of the broadcast schedule information record; and
  using the extracted next monitor time data field and the extracted monitoring period data field to deliver data at different latencies.

162. The server of claim 160, wherein the processor is configured with processor-executable instructions to perform operations such that the header portion includes an information field that contains information about the file data flow.

163. The server of claim 162, wherein the processor is configured with processor-executable instructions to perform operations such that the information field comprises a flow ID data field and a data rate data field.

164. The server of claim 160, wherein the processor is configured with processor-executable instructions to perform operations such that the next monitor time data field specifies the next time that the receiver device should monitor the broadcast schedule flow for an updated broadcast schedule message.

165. A server, comprising:
  means for receiving files for transport from a content provider, the received files having a file name and containing information regarding file contents and communication requirements;
  means for scheduling the received files for transmission via a file data flow within broadcast transmissions;
  means for generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion of the broadcast schedule information record including a next monitor time data field and a monitoring period data field;
  means for broadcasting the generated broadcasts scheduling message via the broadcast network; and
  means for broadcasting the received files via the file data flow of the broadcast network in accordance with the scheduled broadcast time windows included within the broadcast scheduling message.

166. The server of claim 165, further comprising:
  means for extracting the next monitor time data field and the monitoring period data field from the header portion of the broadcast schedule information record; and
  means for using the extracted next monitor time data field and the extracted monitoring period data field to deliver data at different latencies.

167. The server of claim 165, wherein the header portion includes an information field that contains information about the file data flow.

168. The server of claim 167, wherein the information field comprises a flow ID data field and a data rate data field.

169. The server of claim 165, wherein the next monitor time data field specifies the next time that the receiver device should monitor the broadcast schedule flow for an updated broadcast schedule message.

170. A non-transitory server-readable storage medium having stored thereon processor-executable instructions configured to cause a server processor to perform operations comprising:

receiving files for transport from a content provider, the received files having a file name and containing information regarding file contents and communication requirements;

scheduling the received files for transmission via a file data flow within broadcast transmissions;

generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion of the broadcast schedule information record including a next monitor time data field and a monitoring period data field;

broadcasting the generated broadcasts scheduling message via the broadcast network; and broadcasting the received files via the file data flow of the broadcast network in accordance with the scheduled broadcast time windows included within the broadcast scheduling message.

171. The non-transitory server-readable storage medium of claim 170, wherein the stored processor-executable instructions are configured to cause a server processor to perform operations further comprising:

extracting the next monitor time data field and the monitoring period data field from the header portion of the broadcast schedule information record; and using the extracted next monitor time data field and the extracted monitoring period data field to deliver data at different latencies.

172. The non-transitory server-readable storage medium of claim 170, wherein the stored processor-executable instructions are configured to cause a server processor to perform operations such that the header portion includes an information field that contains information about the file data flow.

173. The non-transitory server-readable storage medium of claim 172, wherein the stored processor-executable instructions are configured to cause a server processor to perform operations such that the information field comprises a flow ID data field and a data rate data field.

174. The non-transitory server-readable storage medium of claim 170, wherein the stored processor-executable instructions are configured to cause a server processor to perform operations such that the next monitor time data field specifies the next time that the receiver device should monitor the broadcast schedule flow for an updated broadcast schedule message.

175. A server, comprising:

a network interface configured to communicate with a broadcast communication network; and a processor coupled to the network interface and configured with processor-executable instructions to perform operations comprising:

receiving files for transport from a content provider, the received files having a file name and containing information regarding file contents and communication requirements;

scheduling the received files for transmission via a file data flow within broadcast transmissions;

generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion including a monitoring period data field;

determining whether the broadcast network supports initial acquisition flow (IAF) systems;

generating the header portion of the broadcast schedule information record to include a next monitor time field upon determining that the broadcast network does not support initial acquisition flow (IAF) systems;

broadcasting the generated broadcasts scheduling message via the broadcast network; and broadcasting the received files via the file data flow of the broadcast network in accordance with the scheduled broadcast time windows included within the broadcast scheduling message.

176. A server, comprising:

means for receiving files for transport from a content provider, the received files having a file name and containing information regarding file contents and communication requirements;

means for scheduling the received files for transmission via a file data flow within broadcast transmissions;

means for generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion including a monitoring period data field;

means for determining whether the broadcast network supports initial acquisition flow (IAF) systems;

means for generating the header portion of the broadcast schedule information record to include a next monitor time field upon determining that the broadcast network does not support initial acquisition flow (IAF) systems;

means for broadcasting the generated broadcasts scheduling message via the broadcast network; and means for broadcasting the received files via the file data flow of the broadcast network in accordance with the scheduled broadcast time windows included within the broadcast scheduling message.

177. A non-transitory server-readable storage medium having stored thereon processor-executable instructions configured to cause a server processor to perform operations comprising:

receiving files for transport from a content provider, the received files having a file name and containing information regarding file contents and communication requirements;

scheduling the received files for transmission via a file data flow within broadcast transmissions;

generating a broadcast scheduling message indicating when files will be broadcast within a broadcast scheduling period, information regarding those files, and a scheduled broadcast time window for each file, the broadcast scheduling message including a broadcast schedule information record comprising a header portion and a body portion, the header portion including a monitoring period data field;

determining whether the broadcast network supports initial acquisition flow (IAF) systems;

generating the header portion of the broadcast schedule information record to include a next monitor time field upon determining that the broadcast network does not support initial acquisition flow (IAF) systems;

broadcasting the generated broadcasts scheduling message via the broadcast network; and broadcasting the received files via the file data flow of the broadcast network in accordance with the scheduled broadcast time windows included within the broadcast scheduling message.

178. A system, comprising:
a server, comprising:
  a network interface configured to communicate with a broadcast communication network; and
  a server processor coupled to the network interface; and
a receiver device, comprising:
  receiver circuitry configured to receive signals from a broadcast communication network; and
  a device processor coupled to the receiver circuitry,
wherein the server processor is configured with processor-executable instructions to perform operations comprising:
  receiving files for transport from a content provider, the received files having a file name and containing information regarding file contents and communication requirements;
  scheduling the received files for transmission via a file data flow within broadcast transmissions;
  generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;
  broadcasting the generated broadcasts scheduling message via the broadcast network; and
  broadcasting the received files via the file data flow of the broadcast network in accordance with the scheduled broadcast time windows included within the broadcast scheduling message, and
wherein the device processor is configured with processor-executable instructions to perform operations comprising:
  receiving from an application operating within the receiver device a request to capture files, the request specifying one or more reception criteria;
  receiving the broadcast scheduling message via the receiver circuitry;
  monitoring the broadcast scheduling message for a file matching the reception criteria;
  identifying from the broadcast scheduling message the scheduled broadcast time window when a file matching the reception criteria will be broadcast;
  activating the receiver circuitry at the identified scheduled broadcast time window for the matching file;
  selecting a file for reception based upon file information in the received broadcast scheduling message;
  receiving the selected file from the broadcast transmissions via the receiver circuitry; and
  passing the selected file to the requesting application operating within the receiver device.

179. The system of claim 178, wherein:
the receiver device further comprises a memory coupled to the processor;
the device processor is configured with processor-executable instructions to perform operations such that receiving in the receiver device the selected file from the broadcast transmissions further includes storing version identifying information in the memory, the version identifying information identifying a version of the received file; and
the device processor is configured with processor-executable instructions to perform operations further comprising:
  monitoring the broadcast scheduling message for a file having version identifying information that indicates a newer or updated version of the received file is being broadcast; and
  receiving via the receiver circuitry an updated version of the requested file from the broadcast network when the broadcast scheduling message indicates that a new or updated version of the file is being broadcast.

180. The system of claim 178, wherein the device processor is configured with processor-executable instructions to perform operations such that receiving from an application operating within the receiver device a request to capture files further includes receiving the capture request in the form of commands to capture a file containing the requested file once or as a command to capture all instances of the file.

181. The system of claim 178, wherein:
the server processor is configured with processor-executable instructions to perform operations such that the generated broadcast scheduling message further identifies a time when the broadcast scheduling message will be updated,
the server processor is configured with processor-executable instructions to perform operations further comprising broadcasting the broadcast scheduling message multiple times within the broadcast scheduling period; and
the device processor is configured with processor-executable instructions to perform operations further comprising:
  deactivating the receiver circuitry after the broadcast scheduling message has been received;
  determining when the current time equals the time the broadcast scheduling message will be updated;
  reactivating the receiver circuitry when the current time equals the time the broadcast scheduling message will be updated; and
  receiving an updated broadcast scheduling message via the receiver circuitry.

182. The system of claim 178, wherein the device processor is configured with processor-executable instructions to perform operations such that:
receiving from an application operating within the receiver device a request to capture files comprises receiving a request to capture a file that specifies a file directory; and
selecting a file for reception based upon file information in the received broadcast scheduling message comprises selecting a file for reception based upon the file identifier matching the identified file directory.

183. A system, comprising:
a server; and
a receiver device,
wherein the server comprises:
  means for receiving files for transport from a content provider, the received files having a file name and containing information regarding file contents and communication requirements;
  means for scheduling the received files for transmission via a file data flow within broadcast transmissions;
  means for generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;

means for broadcasting the generated broadcasts scheduling message via the broadcast network; and means for broadcasting the received files via the file data flow of the broadcast network in accordance with the scheduled broadcast time windows included within the broadcast scheduling message, and wherein the receiver comprises:

receiver circuitry configured to receive signals from a broadcast communication network;

means for receiving from an application operating within the receiver device a request to capture files, the request specifying one or more reception criteria;

means for receiving the broadcast scheduling message via the receiver circuitry;

means for monitoring the broadcast scheduling message for a file matching the reception criteria;

means for identifying from the broadcast scheduling message the scheduled broadcast time window when a file matching the reception criteria will be broadcast;

means for activating the receiver circuitry at the identified scheduled broadcast time window for the matching file;

means for selecting a file for reception based upon file information in the received broadcast scheduling message;

means for receiving the selected file from the broadcast transmissions via the receiver circuitry; and means for passing the selected file to the requesting application operating within the receiver device.

184. The system of claim 183, wherein means for receiving the selected file from the broadcast transmissions further includes means for storing version identifying information the version identifying information identifying a version of the received file, and wherein the receiver device further comprises:

means for monitoring the broadcast scheduling message for a file having version identifying information that indicates a newer or updated version of the received file is being broadcast; and means for receiving an updated version of the requested file from the broadcast network when the broadcast scheduling message indicates that a new or updated version of the file is being broadcast.

185. The system of claim 183, wherein means for receiving from an application operating within a receiver device a request to capture files further includes means for receiving the capture request by the receiver device in the form of commands to capture a file containing the requested file once or as a command to capture all instances of the file.

186. The system of claim 183, wherein:

means for generating a broadcast scheduling message comprises means for generating a broadcast scheduling message that further identifies a time when the broadcast scheduling message will be updated;

the server further comprises means for broadcasting the broadcast scheduling message multiple times within the broadcast scheduling period; and the receiver device further comprises:

means for deactivating the receiver circuitry after the broadcast scheduling message has been received;

means for determining when the current time equals the time the broadcast scheduling message will be updated;

means for reactivating the receiver circuitry when the current time equals the time the broadcast scheduling message will be updated; and means for receiving an updated broadcast scheduling message.

187. The system of claim 183, wherein:

means for receiving from an application operating within a receiver device a request to capture files comprises means for receiving a request to capture a file that specifies a file directory; and means for selecting a file for reception based upon file information in the received broadcast scheduling message comprises means for selecting a file for reception based upon the file identifier matching the identified file directory.

188. A system, comprising:

a server, comprising:

a network interface configured to communicate with a broadcast communication network; and a server processor coupled to the network interface; and a receiver device, comprising:

receiver circuitry configured to receive signals from a broadcast communication network; and a device processor coupled to the receiver circuitry, wherein the server processor is configured with processor-executable instructions to perform operations comprising:

receiving files for transport from a content provider, the received files having a file name and containing information regarding file contents and communication requirements;

scheduling the received files for transmission via a file data flow within broadcast transmissions;

generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;

broadcasting the generated broadcasts scheduling message via the broadcast network; and broadcasting the received files via the file data flow of the broadcast network in accordance with the scheduled broadcast time windows included within the broadcast scheduling message, and wherein the device processor is configured with processor-executable instructions to perform operations comprising:

receiving a latest directory information message from an initial acquisition flow (IAF) and executing a comparison operation that compares version information of a received broadcast schedule message extracted from the latest directory information message to version information of an unexpired processed broadcast schedule message.

189. The system of claim 188, wherein the device processor is configured with processor-executable instructions to perform operations further comprising activating the receiver circuitry to receive the updated broadcast schedule message if the results of the comparing operation indicate that the versions are different.

190. A system, comprising:
a server; and
a receiver device,
wherein the server comprises:
- means for receiving files for transport from a content provider, the received files having a file name and containing information regarding file contents and communication requirements;
- means for scheduling the received files for transmission via a file data flow within broadcast transmissions;
- means for generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;
- means for broadcasting the generated broadcasts scheduling message via the broadcast network; and
- means for broadcasting the received files via the file data flow of the broadcast network in accordance with the scheduled broadcast time windows included within the broadcast scheduling message, and wherein the receiver device comprises:
- means for receiving a latest directory information message from an initial acquisition flow (IAF) and executing a comparison operation that compares version information of a received broadcast schedule message extracted from the latest directory information message to version information of an unexpired processed broadcast schedule message.

191. The system of claim 190, wherein the receiver device further comprises means for the activating receiver circuitry to receive the updated broadcast schedule message if the results of the comparing operation indicate that the versions are different.

192. A system, comprising:
a server, comprising:
- a network interface configured to communicate with a broadcast communication network; and
- a server processor coupled to the network interface; and a receiver device, comprising:
- receiver circuitry configured to receive signals from a broadcast communication network; and
- a device processor coupled to the receiver circuitry, wherein the server processor is configured with processor-executable instructions to perform operations comprising:
- receiving files for transport from a content provider, the received files having a file name and containing information regarding file contents and communication requirements;
- scheduling the received files for transmission via a file data flow within broadcast transmissions;
- generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;
- broadcasting the generated broadcasts scheduling message via the broadcast network; and
- broadcasting the received files via the file data flow of the broadcast network in accordance with the scheduled broadcast time windows included within the broadcast scheduling message, and wherein the device processor is configured with processor-executable instructions to perform operations comprising:
- receiving the broadcast schedule message;
- comparing a version parameter in the received broadcast schedule message to a version parameter in a directory info message unit; and
- ignoring the received broadcast schedule message when the compared versions are different.

193. A system, comprising:
a server; and
a receiver device,
wherein the server comprises:
- means for receiving files for transport from a content provider, the received files having a file name and containing information regarding file contents and communication requirements;
- means for scheduling the received files for transmission via a file data flow within broadcast transmissions;
- means for generating a broadcast scheduling message indicating when files will be broadcast within a broadcast scheduling period, information regarding those files, and a scheduled broadcast time window for each file, the broadcast scheduling message including a broadcast schedule monitoring record having a next monitor time data field that specifies a next time that the receiver device should monitor the broadcast schedule flow for an updated broadcast schedule message;
- means for broadcasting the generated broadcasts scheduling message via the broadcast network; and
- means for broadcasting the received files via the file data flow of the broadcast network in accordance with the scheduled broadcast time windows included within the broadcast scheduling message, and wherein the receiver device comprises:
- means for receiving the broadcast schedule message;
- means for comparing a version parameter in the received broadcast schedule message to a version parameter in a directory info message unit; and
- means for ignoring the received broadcast schedule message when the compared versions are different.

194. A system, comprising:
a server, comprising:
- a network interface configured to communicate with a broadcast communication network; and
- a server processor coupled to the network interface; and a receiver device, comprising:
- receiver circuitry configured to receive signals from a broadcast communication network; and
- a device processor coupled to the receiver circuitry, wherein the server processor is configured with processor-executable instructions to perform operations comprising:
- receiving files for transport from a content provider, the received files having a file name and containing information regarding file contents and communication requirements;
- scheduling the received files for transmission via a file data flow within broadcast transmissions;

generating a broadcast scheduling message indicating when files will be broadcast within a broadcast scheduling period, information regarding those files, and a scheduled broadcast time window for each file, wherein the broadcast scheduling message advertises all the successfully scheduled files over a broadcast schedule period;

broadcasting the generated broadcasts scheduling message via the broadcast network as part of an overhead transport stream that provides delivery schedule information for files broadcast on a given frequency, the delivery schedule information setting delivery schedules advertised by the broadcast scheduling message; and broadcasting the received files via the file data flow of the broadcast network in accordance with the scheduled broadcast time windows included within the broadcast scheduling message, wherein the server processor is configured with processor-executable instructions to perform operations such that the broadcast network sets a next monitoring field device provision parameter to be a variable number of seconds prior to a start time of the broadcast schedule period, and wherein the device processor is configured with processor-executable instructions to perform operations comprising:

detecting broadcast schedule message updates; and receiving an updated broadcast schedule message before the start of the broadcast schedule period.

195. A system, comprising:

a server; and a receiver device, wherein the server comprises:

means for receiving files for transport from a content provider, the received files having a file name and containing information regarding file contents and communication requirements;

means for scheduling the received files for transmission via a file data flow within broadcast transmissions;

means for generating a broadcast scheduling message indicating when files will be broadcast within a broadcast scheduling period, information regarding those files, and a scheduled broadcast time window for each file, wherein the broadcast scheduling message advertises all the successfully scheduled files over a broadcast schedule period;

means for broadcasting the generated broadcasts scheduling message via the broadcast network as part of an overhead transport stream that provides delivery schedule information for files broadcast on a given frequency, the delivery schedule information setting delivery schedules advertised by the broadcast scheduling message; and means for broadcasting the received files via the file data flow of the broadcast network in accordance with the scheduled broadcast time windows included within the broadcast scheduling message, wherein the broadcast network sets a next monitoring field device provision parameter to be a variable number of seconds prior to a start time of the broadcast schedule period, and wherein the receiver device comprises:

means for detecting broadcast schedule message updates; and means for receiving an updated broadcast schedule message before the start of the broadcast schedule period.

* * * * *